US010434019B2

(12) United States Patent
Bekoscke et al.

(10) Patent No.: US 10,434,019 B2
(45) Date of Patent: Oct. 8, 2019

(54) WHEELCHAIR SUSPENSION

(71) Applicant: INVACARE CORPORATION, Elyria, OH (US)

(72) Inventors: Robert Bekoscke, Medina, OH (US); Kevin Burns, North Olmsted, OH (US)

(73) Assignee: Invacare Corporation, Elyria, OH (US)

( * ) Notice: Subject to any disclaimer, the term of this patent is extended or adjusted under 35 U.S.C. 154(b) by 0 days.

(21) Appl. No.: 15/645,749

(22) Filed: Jul. 10, 2017

(65) Prior Publication Data

US 2018/0028379 A1 Feb. 1, 2018

Related U.S. Application Data

(60) Continuation of application No. 15/060,121, filed on Mar. 3, 2016, now Pat. No. 9,700,470, which is a (Continued)

(51) Int. Cl.
*B60K 1/00* (2006.01)
*A61G 5/06* (2006.01)

(Continued)

(52) U.S. Cl.
CPC .............. *A61G 5/06* (2013.01); *A61G 5/043* (2013.01); *A61G 5/045* (2013.01); *A61G 5/10* (2013.01);

(Continued)

(58) Field of Classification Search
CPC .......... A61G 5/043; A61G 5/045; A61G 5/06; A61G 5/10; A61G 5/04; A61G 2005/1089;

(Continued)

(56) References Cited

U.S. PATENT DOCUMENTS

| | | | |
|---|---|---|---|
| 865,514 | A | 9/1907 | Mullenmeister |
| 1,116,086 | A | 11/1914 | Lewis |

(Continued)

FOREIGN PATENT DOCUMENTS

| | | | |
|---|---|---|---|
| CA | 2254372 | | 5/2000 |
| CN | 1138825 | A | 12/1996 |

(Continued)

OTHER PUBLICATIONS

Notice of Allowance from U.S. Appl. No. 14/162,955 dated May 26, 2015.

(Continued)

*Primary Examiner* — Toan C To
(74) *Attorney, Agent, or Firm* — Calfee, Halter & Griswold LLP

(57) ABSTRACT

A wheelchair suspension includes a frame, a drive assembly pivot arm, a drive assembly, a front caster pivot arm, a front caster, and a spring and shock absorbing assembly. The drive assembly pivot arm is pivotally connected to the frame. The drive assembly includes a drive wheel and is mounted to the drive assembly pivot arm. The front caster pivot arm is pivotally mounted to the frame and coupled to the drive assembly pivot arm. The front caster is coupled to the at least one front caster pivot arm. The spring and shock absorbing assembly is pivotally connected to the drive assembly pivot arm at a first pivotal connection and pivotally connected to the front caster pivot arm at a second pivotal connection. The first and second pivotal connections are positioned such that a majority of the force applied by the spring and shock absorbing assembly is applied to the drive wheel when the suspension is on a flat, horizontal support surface.

8 Claims, 143 Drawing Sheets

Related U.S. Application Data division of application No. 13/768,878, filed on Feb. 15, 2013, now Pat. No. 9,308,143.

(60) Provisional application No. 61/598,962, filed on Feb. 15, 2012.

(51) Int. Cl.
*A61G 5/04* (2013.01)
*A61G 5/10* (2006.01)
*B60G 3/20* (2006.01)

(52) U.S. Cl.
CPC .......... *A61G 5/1078* (2016.11); *A61G 5/1089* (2016.11); *B60G 3/207* (2013.01); *B60G 2300/24* (2013.01)

(58) Field of Classification Search
CPC ........ A61G 2203/14; A61G 2005/1078; Y10S 180/907; B60G 3/207
USPC ........... 180/65.1, 9.7, 907; 280/124.104, 755
See application file for complete search history.

(56) References Cited

U.S. PATENT DOCUMENTS 1,151,414 A 8/1915 Steinbach
1,773,254 A 9/1930 Becker
1,973,627 A 9/1934 Harter
2,398,211 A 4/1946 du Pont
2,427,482 A 9/1947 Wiessman
2,767,995 A 10/1956 Stout
2,949,153 A 8/1960 Hickman
2,986,200 A 5/1961 Nobile
3,104,112 A 9/1963 Crail
3,174,176 A 3/1965 Olson
3,191,990 A 6/1965 Rugg et al.
3,195,670 A 7/1965 Dunn
3,210,092 A 10/1965 Kraus et al.
3,282,605 A 11/1966 Nihlean et al.
3,314,672 A 4/1967 Persson
3,506,079 A 4/1970 Madler et al.
3,573,877 A 4/1971 Locke
3,580,591 A 5/1971 Coffey
3,589,700 A 6/1971 Ruet et al.
3,592,282 A 7/1971 Soileau
3,602,522 A 8/1971 Zamotin
3,618,968 A 11/1971 Greer
3,627,157 A 12/1971 Blatchly
3,661,228 A 5/1972 Glasser
3,664,450 A 5/1972 Udden et al.
3,682,462 A 8/1972 Papousek
3,689,103 A 9/1972 Meulendyk
3,709,313 A 1/1973 James
3,848,883 A 11/1974 Breacain
3,862,751 A 1/1975 Schwaller
3,876,012 A 4/1975 Regier
3,881,773 A 5/1975 Rodaway
3,883,153 A 5/1975 Singh et al.
3,893,529 A 7/1975 Karchak, Jr. et al.
3,901,337 A 8/1975 Cragg
3,901,527 A 8/1975 Danziger et al.
3,905,437 A 9/1975 Kaiho et al.
3,917,312 A 11/1975 Rodaway
3,930,551 A 1/1976 Cragg
3,952,822 A 4/1976 Udden et al.
3,953,054 A 4/1976 Udden et al.
3,976,152 A 8/1976 Bell
4,078,817 A 3/1978 Ferguson et al.
4,108,449 A 8/1978 Rhodes
4,118,020 A 10/1978 Myers
4,119,163 A 10/1978 Ball
4,128,137 A 12/1978 Booth
4,190,263 A 2/1980 Powers
4,222,449 A 9/1980 Feliz
4,245,847 A 1/1981 Knott
4,247,125 A 1/1981 Rayment
4,264,085 A 4/1981 Volin
4,310,167 A 1/1982 McLaurin
4,333,681 A 6/1982 Nelson
4,337,958 A 7/1982 Witt et al.
4,341,278 A 7/1982 Meyer
4,375,295 A 3/1983 Volin
4,387,325 A 6/1983 Klimo
4,405,142 A 9/1983 Whetstine
4,436,320 A 3/1984 Brudermann et al.
4,437,678 A 3/1984 Schultz
4,455,029 A 6/1984 Taylor
4,455,031 A 6/1984 Hosaka
4,456,295 A 6/1984 Francu
4,483,407 A 11/1984 Iwamoto et al.
4,500,102 A 2/1985 Haury et al.
4,513,832 A 4/1985 Engman
4,515,385 A 5/1985 Christian
4,542,918 A 9/1985 Singleton
4,545,593 A 10/1985 Farnam
4,545,616 A 10/1985 Booth
4,556,229 A 12/1985 Bihler et al.
4,565,385 A 1/1986 Morford
4,592,570 A 6/1986 Nassiri
RE32,242 E 9/1986 Minnebraker
4,618,155 A 10/1986 Jayne
4,641,848 A 2/1987 Ayers
4,655,471 A 4/1987 Peek
4,687,068 A 8/1987 Pagett
4,720,223 A 1/1988 Neights et al.
4,721,321 A 1/1988 Haury et al.
4,721,322 A 1/1988 Hawkins
4,730,842 A 3/1988 Summers et al.
4,736,983 A 4/1988 Furbee
4,759,418 A 7/1988 Goldenfeld et al.
4,763,910 A 8/1988 Brandli et al.
4,805,712 A 2/1989 Singleton
4,805,925 A 2/1989 Haury et al.
4,811,966 A 3/1989 Singleton
4,823,900 A 4/1989 Farnam
4,826,194 A 5/1989 Sakita
4,840,394 A 6/1989 Bickler
4,861,056 A 8/1989 Duffy, Jr. et al.
4,862,983 A 9/1989 Kreft
4,886,294 A 12/1989 Nahachewski
4,905,972 A 3/1990 Scowen
4,919,441 A 4/1990 Marier et al.
4,926,952 A 5/1990 Farman
4,934,626 A 6/1990 Kimura
4,951,766 A 8/1990 Basedow et al.
4,962,942 A 10/1990 Barnett et al.
4,967,864 A 11/1990 Boyer et al.
4,989,890 A 2/1991 Lockard et al.
5,020,816 A 6/1991 Mulholland
5,042,607 A 8/1991 Falkenson et al.
5,044,647 A 9/1991 Patterson
5,044,648 A 9/1991 Knapp
5,076,390 A 12/1991 Haskins
5,076,602 A 12/1991 Robertson et al.
5,113,959 A 5/1992 Mastov et al.
5,123,495 A 6/1992 Littlejohn et al.
5,125,468 A 6/1992 Coker
5,137,295 A 8/1992 Peek
5,156,226 A 10/1992 Boyer et al.
5,176,393 A 1/1993 Robertson et al.
5,180,025 A 1/1993 Yeh et al.
5,180,275 A 1/1993 Czech et al.
5,181,133 A 1/1993 Lipton
5,181,733 A 1/1993 Tague
5,183,133 A 2/1993 Roy et al.
5,197,559 A 3/1993 Garin, III et al.
5,203,610 A 4/1993 Miller
5,209,509 A 5/1993 Gay et al.
5,222,567 A 6/1993 Broadhead et al.
5,228,709 A 7/1993 Kao
5,230,522 A 7/1993 Gehlsen et al.
5,241,876 A 9/1993 Mathis
5,248,007 A 9/1993 Watkins et al.

(56) References Cited

U.S. PATENT DOCUMENTS

| | | | |
|---|---|---|---|
| 5,290,055 | A | 3/1994 | Treat, Jr. |
| 5,294,141 | A | 3/1994 | Mentessi et al. |
| 5,297,021 | A | 3/1994 | Koerlin et al. |
| 5,301,964 | A | 4/1994 | Papac |
| 5,316,328 | A | 5/1994 | Bussinger |
| 5,341,533 | A | 8/1994 | Seitz |
| 5,351,774 | A | 10/1994 | Okamoto |
| 5,366,037 | A | 11/1994 | Richey |
| 5,372,211 | A | 12/1994 | Wilcox et al. |
| 5,403,031 | A | 4/1995 | Gottschalk et al. |
| 5,419,571 | A | 5/1995 | Vaughan |
| 5,435,404 | A | 7/1995 | Garin, III |
| 5,447,317 | A | 9/1995 | Gehlsen et al. |
| 5,464,271 | A | 11/1995 | McFarland |
| 5,467,838 | A | 11/1995 | Wu |
| 5,482,261 | A | 1/1996 | Ortega |
| 5,485,140 | A | 1/1996 | Bussin |
| 5,489,139 | A | 2/1996 | McFarland |
| 5,513,875 | A | 5/1996 | Tahara et al. |
| 5,518,081 | A | 5/1996 | Thibodeau |
| 5,531,284 | A | 7/1996 | Okamoto |
| 5,540,297 | A | 7/1996 | Meier |
| 5,562,172 | A | 10/1996 | Mick |
| 5,564,512 | A | 10/1996 | Scheulderman |
| 5,575,348 | A | 11/1996 | Goertzen et al. |
| 5,611,555 | A | 3/1997 | Vidal |
| 5,628,377 | A | 5/1997 | LaGloan |
| 5,701,122 | A | 12/1997 | Canedy |
| 5,727,802 | A | 3/1998 | Garven, Jr. et al. |
| 5,727,809 | A | 3/1998 | Ordelman et al. |
| 5,762,155 | A | 6/1998 | Scheulderman |
| 5,772,048 | A | 6/1998 | Sopcisak |
| 5,772,226 | A | 6/1998 | Bobichon |
| 5,772,237 | A | 6/1998 | Finch et al. |
| D397,645 | S | 9/1998 | Schaffner |
| 5,833,248 | A | 11/1998 | Eguchi |
| 5,848,658 | A | 12/1998 | Pulver |
| 5,851,018 | A | 12/1998 | Curran et al. |
| 5,851,019 | A | 12/1998 | Gill et al. |
| 5,853,059 | A | 12/1998 | Goertzen et al. |
| D404,693 | S | 1/1999 | Schaffner et al. |
| 5,855,387 | A | 1/1999 | Gill et al. |
| 5,899,475 | A | 5/1999 | Verhaeg et al. |
| 5,904,214 | A | 5/1999 | Lin |
| 5,921,532 | A | 7/1999 | Pierce et al. |
| 5,944,131 | A | 8/1999 | Schaffner et al. |
| 5,954,351 | A | 9/1999 | Koschinat |
| 5,957,474 | A | 9/1999 | Mundy et al. |
| 5,964,473 | A | 10/1999 | Degonda et al. |
| 5,988,304 | A | 11/1999 | Behrents |
| 5,996,716 | A | 12/1999 | Montiglio et al. |
| 6,003,624 | A | 12/1999 | Jorgensen et al. |
| 6,029,763 | A | 2/2000 | Swisher |
| 6,041,876 | A | 3/2000 | Pulver et al. |
| 6,047,979 | A | 4/2000 | Kraft et al. |
| 6,062,600 | A | 5/2000 | Kamen et al. |
| 6,068,280 | A | 5/2000 | Torres |
| 6,070,898 | A | 6/2000 | Dickie et al. |
| 6,073,951 | A | 6/2000 | Jindra et al. |
| 6,079,698 | A | 6/2000 | Patterson et al. |
| 6,079,725 | A | 6/2000 | Lazaros |
| D429,665 | S | 8/2000 | Dickie |
| 6,095,271 | A | 8/2000 | Dickie et al. |
| 6,129,165 | A | 10/2000 | Schaffner et al. |
| 6,131,679 | A | 10/2000 | Pulver et al. |
| 6,135,222 | A | 10/2000 | Furukawa |
| 6,161,856 | A | 12/2000 | Peterson |
| 6,168,178 | B1 | 1/2001 | Garven, Jr. et al. |
| 6,176,335 | B1 | 1/2001 | Schaffner et al. |
| 6,179,076 | B1 | 1/2001 | Fernie et al. |
| 6,186,252 | B1 | 2/2001 | Schaffner et al. |
| 6,196,343 | B1 | 3/2001 | Strautnieks |
| 6,199,647 | B1 | 3/2001 | Schaffner et al. |
| 6,206,119 | B1 | 3/2001 | Wu |
| 6,209,670 | B1 | 4/2001 | Fernie et al. |
| 6,217,114 | B1 | 4/2001 | Degonda |
| 6,225,894 | B1 | 5/2001 | Kyrtsos |
| 6,234,263 | B1 | 5/2001 | Boivin et al. |
| 6,234,507 | B1 | 5/2001 | Dickie et al. |
| 6,241,275 | B1 | 6/2001 | Slagerman |
| 6,264,218 | B1 | 7/2001 | Slagerman |
| 6,279,927 | B1 | 8/2001 | Nishihira et al. |
| 6,312,000 | B1 | 11/2001 | Pauls et al. |
| 6,322,089 | B1 | 11/2001 | Dantele et al. |
| 6,341,657 | B1 | 1/2002 | Hopely et al. |
| 6,341,671 | B1 | 1/2002 | Ebersole |
| 6,347,688 | B1 | 2/2002 | Hall et al. |
| 6,357,793 | B1 | 3/2002 | Dickie et al. |
| 6,375,209 | B1 | 4/2002 | Schlangen |
| 6,394,738 | B1 | 5/2002 | Springer |
| 6,405,816 | B1 | 6/2002 | Kamen et al. |
| 6,425,597 | B1 | 7/2002 | Peterson |
| 6,428,020 | B1 | 8/2002 | Steadman |
| 6,428,029 | B1 | 8/2002 | Barclay |
| 6,429,541 | B2 | 8/2002 | Takenaka et al. |
| 6,454,286 | B1 | 9/2002 | Hosino |
| 6,460,641 | B1 | 10/2002 | Kral |
| 6,460,869 | B1 | 10/2002 | Tremouilles |
| 6,494,474 | B1 | 12/2002 | Kramer, Jr. |
| 6,533,305 | B1 | 3/2003 | Falk |
| 6,533,306 | B2 | 3/2003 | Watkins |
| 6,543,564 | B1 | 4/2003 | Kamen et al. |
| 6,543,798 | B2 | 4/2003 | Schaffner et al. |
| 6,554,086 | B1 | 4/2003 | Goertzen et al. |
| 6,568,030 | B1 | 5/2003 | Watanabe et al. |
| 6,581,711 | B1 | 6/2003 | Tuluie |
| 6,588,799 | B1 | 7/2003 | Sanchez |
| 6,601,863 | B1 | 8/2003 | Mentessi et al. |
| 6,640,916 | B2 | 11/2003 | Schaffner et al. |
| 6,684,969 | B1 | 2/2004 | Flowers et al. |
| 6,688,437 | B2 | 2/2004 | Usherovich |
| 6,702,306 | B1 | 3/2004 | Ockwell |
| 6,712,369 | B2 | 3/2004 | Wu |
| 6,715,845 | B2 | 4/2004 | Kamen et al. |
| D491,115 | S | 6/2004 | Taylor |
| 6,776,430 | B2 | 8/2004 | White et al. |
| 6,851,711 | B2 | 2/2005 | Goertzen et al. |
| 6,857,490 | B2 | 2/2005 | Quigg |
| 6,923,278 | B2 | 8/2005 | Mulhern et al. |
| 6,923,280 | B2 | 8/2005 | Goertzen et al. |
| 6,935,448 | B2 | 8/2005 | Goertzen et al. |
| 6,938,923 | B2 | 9/2005 | Mulhern et al. |
| 7,021,641 | B2 | 4/2006 | Wu |
| 7,040,429 | B2 | 5/2006 | Molnar et al. |
| 7,055,634 | B2 | 6/2006 | Molnar |
| 7,066,290 | B2 | 6/2006 | Fought |
| 7,083,195 | B2 | 8/2006 | Goertzen et al. |
| 7,100,716 | B2 | 9/2006 | Engels et al. |
| 7,175,193 | B2 | 2/2007 | Wu |
| 7,219,755 | B2 | 5/2007 | Goertzen et al. |
| 7,219,924 | B2 | 5/2007 | Mulhern et al. |
| 7,232,008 | B2 | 6/2007 | Levi et al. |
| 7,234,554 | B2 | 6/2007 | Mulhern et al. |
| 7,264,272 | B2 | 9/2007 | Mulhern et al. |
| 7,273,118 | B2 | 9/2007 | Huang |
| 7,293,801 | B2 | 11/2007 | Bertrand et al. |
| 7,316,282 | B2 | 1/2008 | Mulhern et al. |
| 7,370,876 | B2 | 5/2008 | Hsu et al. |
| 7,374,002 | B2 | 5/2008 | Fought |
| 7,380,824 | B2 | 6/2008 | Chen et al. |
| 7,389,835 | B2 | 6/2008 | Mulhern et al. |
| 7,398,842 | B2 | 7/2008 | Fontecchio et al. |
| 7,413,038 | B2 | 8/2008 | Mulhern et al. |
| 7,461,897 | B2 | 12/2008 | Kruse et al. |
| 7,472,767 | B2 | 1/2009 | Molnar |
| 7,490,683 | B2 | 2/2009 | Schaffner |
| 7,506,709 | B2 | 3/2009 | Kiwak et al. |
| 7,516,984 | B2 | 4/2009 | Tang |
| 6,196,343 | C1 | 7/2009 | Strautnieks |
| 7,556,109 | B2 | 7/2009 | Chen et al. |
| 7,597,163 | B2 | 10/2009 | Goertzen et al. |
| 7,735,591 | B2 | 6/2010 | Puskar-Pasewicz et al. |
| 7,766,106 | B2 | 8/2010 | Puskar-Pasewicz et al. |
| 7,775,307 | B2 | 8/2010 | Cheng |

(56) References Cited

U.S. PATENT DOCUMENTS

| | | | |
|---|---|---|---|
| 7,828,310 | B2 | 11/2010 | Vreeswijk et al. |
| D632,229 | S | 2/2011 | Kruse |
| 7,882,909 | B2 | 2/2011 | Pearlman et al. |
| 7,896,394 | B2 | 3/2011 | Jackson et al. |
| 8,037,953 | B2 | 10/2011 | Puskar-Pasewicz et al. |
| 8,113,531 | B2 | 2/2012 | Zhou |
| 8,118,321 | B2 | 2/2012 | Hunziker et al. |
| 8,172,015 | B2 | 5/2012 | Molnar |
| 8,172,016 | B2 | 5/2012 | Goertzen et al. |
| 8,177,257 | B2 | 5/2012 | Dugas et al. |
| 8,186,463 | B2 | 5/2012 | Hunziker et al. |
| 8,210,556 | B2 | 7/2012 | Zhou et al. |
| 8,272,461 | B2 | 9/2012 | Bekoscke et al. |
| 8,286,738 | B2 | 10/2012 | Cheng |
| 8,297,388 | B2 | 10/2012 | Lindenkamp et al. |
| 8,573,341 | B2 | 11/2013 | Fought et al. |
| 8,794,359 | B2 * | 8/2014 | Bekoscke .............. A61G 5/043 180/65.1 |
| 8,910,975 | B2 | 12/2014 | Bekoscke et al. |
| 9,010,470 | B2 | 4/2015 | Cuson et al. |
| 9,308,143 | B2 | 4/2016 | Bekoscke |
| 9,346,335 | B2 | 5/2016 | Bekoscke et al. |
| 9,370,455 | B2 | 6/2016 | Molnar |
| 9,987,177 | B2 | 6/2018 | Goertzen et al. |
| 2001/0011613 | A1 | 8/2001 | Schaffner et al. |
| 2001/0013437 | A1 | 8/2001 | Husted et al. |
| 2002/0023787 | A1 | 2/2002 | Kamen et al. |
| 2002/0088657 | A1 | 7/2002 | Brett et al. |
| 2002/0175027 | A1 | 11/2002 | Usherovich |
| 2003/0030243 | A1 | 2/2003 | Engels |
| 2003/0075365 | A1 | 4/2003 | Fought |
| 2003/0122332 | A1 | 7/2003 | Engels et al. |
| 2003/0168264 | A1 | 9/2003 | Goertzen et al. |
| 2003/0168265 | A1 | 9/2003 | Goertzen et al. |
| 2003/0201632 | A1 | 10/2003 | Mulhern et al. |
| 2003/0205420 | A1 | 11/2003 | Mulnern et al. |
| 2004/0004342 | A1 | 1/2004 | Mulhern et al. |
| 2004/0032119 | A1 | 2/2004 | Tran et al. |
| 2004/0060748 | A1 | 4/2004 | Molnar |
| 2004/0084230 | A1 | 5/2004 | Grymko et al. |
| 2004/0094944 | A1 | 5/2004 | Goertzen et al. |
| 2004/0144580 | A1 | 7/2004 | Wu |
| 2004/0150204 | A1 | 8/2004 | Goertzen et al. |
| 2004/0159476 | A1 | 8/2004 | Molnar |
| 2004/0168839 | A1 | 9/2004 | Wu |
| 2004/0188152 | A1 | 9/2004 | Schaffner |
| 2004/0232683 | A1 | 11/2004 | Mulhern |
| 2004/0262859 | A1 | 12/2004 | Turturiello |
| 2005/0034903 | A1 | 2/2005 | Wu |
| 2005/0077694 | A1 | 4/2005 | Levi et al. |
| 2005/0077714 | A1 | 4/2005 | Mulhern et al. |
| 2005/0077715 | A1 | 4/2005 | Mulhern et al. |
| 2005/0127631 | A1 | 6/2005 | Schaffner |
| 2005/0151360 | A1 | 7/2005 | Bertrand et al. |
| 2005/0206124 | A1 | 9/2005 | Levi |
| 2005/0206149 | A1 | 9/2005 | Mulhern et al. |
| 2005/0225040 | A1 | 10/2005 | Goertzen et al. |
| 2005/0225041 | A1 | 10/2005 | Longino |
| 2006/0021806 | A1 | 2/2006 | Goertzen et al. |
| 2006/0076747 | A1 | 4/2006 | Pauls et al. |
| 2006/0076748 | A1 | 4/2006 | Pauls et al. |
| 2006/0082117 | A1 | 4/2006 | Turturiellox |
| 2006/0086554 | A1 | 4/2006 | Jackson et al. |
| 2006/0201723 | A1 | 9/2006 | Hsu et al. |
| 2006/0213705 | A1 | 9/2006 | Molnar |
| 2006/0244249 | A1 | 11/2006 | Goertzen et al. |
| 2006/0249317 | A1 | 11/2006 | Fought |
| 2006/0255581 | A1 | 11/2006 | Goertzen et al. |
| 2006/0266565 | A1 | 11/2006 | Fontecchio et al. |
| 2007/0018418 | A1 | 1/2007 | Huang |
| 2007/0023209 | A1 | 2/2007 | Wu |
| 2007/0039766 | A1 | 2/2007 | Jackson et al. |
| 2007/0080003 | A1 | 4/2007 | Koerlin et al. |
| 2007/0095582 | A1 | 5/2007 | Stuijt et al. |
| 2007/0107955 | A1 | 5/2007 | Puskar-Pasewicz et al. |
| 2007/0181353 | A1 | 8/2007 | Puskar-Pasewicz et al. |
| 2007/0209848 | A1 | 9/2007 | Tang |
| 2008/0053720 | A1 | 3/2008 | Chen et al. |
| 2008/0083573 | A1 | 4/2008 | Tseng |
| 2008/0087481 | A1 | 4/2008 | Grymko et al. |
| 2008/0157513 | A1 | 7/2008 | Cheng |
| 2008/0208394 | A1 | 8/2008 | Fought |
| 2009/0091092 | A1 | 4/2009 | Molnar |
| 2009/0121532 | A1 | 5/2009 | Kruse et al. |
| 2009/0145677 | A1 | 6/2009 | Zhou |
| 2009/0295119 | A1 | 12/2009 | Bloswich |
| 2010/0004820 | A1 | 1/2010 | Bekoscke et al. |
| 2010/0013172 | A1 | 1/2010 | Goertzen |
| 2010/0065346 | A1 | 3/2010 | Porcheron |
| 2010/0084209 | A1 | 4/2010 | Bekoscke et al. |
| 2010/0102529 | A1 | 4/2010 | Lindenkamp et al. |
| 2010/0301576 | A1 | 12/2010 | Dugas et al. |
| 2011/0083913 | A1 | 4/2011 | Cuson et al. |
| 2011/0215540 | A1 | 9/2011 | Hunziker |
| 2012/0217070 | A1 | 8/2012 | Goertzen |
| 2012/0217713 | A1 | 8/2012 | Molnar |
| 2012/0299262 | A1 | 11/2012 | Bekoscke |
| 2013/0207364 | A1 | 8/2013 | Bekoscke et al. |
| 2015/0196438 | A1 | 7/2015 | Mulhern |
| 2016/0287456 | A1 * | 10/2016 | Bekoscke .............. A61G 5/045 |
| 2016/0318367 | A1 * | 11/2016 | Bekoscke .............. A61G 5/043 |
| 2018/0028379 | A1 | 2/2018 | Bekoske |

FOREIGN PATENT DOCUMENTS

| | | | |
|---|---|---|---|
| CN | 1839779 | A | 10/2006 |
| CN | 101636139 | A | 1/2010 |
| DE | 152186 | | 9/1903 |
| DE | 2256934 | | 5/1973 |
| DE | 1399822 | | 8/1977 |
| DE | 19806500 | | 3/2002 |
| DE | 10136368 | | 5/2003 |
| DE | 10136369 | | 5/2003 |
| EP | 18101 | | 10/1980 |
| EP | 127929 | | 12/1984 |
| EP | 268960 | | 6/1988 |
| EP | 312969 | | 4/1989 |
| EP | 339500 | | 11/1989 |
| EP | 369791 | | 5/1990 |
| EP | 419085 | | 3/1991 |
| EP | 445171 | | 9/1991 |
| EP | 511113 | | 10/1992 |
| EP | 677285 | | 10/1995 |
| EP | 702945 | | 3/1996 |
| EP | 829247 | | 3/1998 |
| EP | 841052 | | 5/1998 |
| EP | 908165 | | 4/1999 |
| EP | 908166 | | 4/1999 |
| EP | 927551 | | 7/1999 |
| EP | 988848 | | 3/2000 |
| EP | 1147969 | | 10/2001 |
| EP | 1279391 | | 1/2003 |
| EP | 1279392 | | 1/2003 |
| EP | 1434345 | | 7/2004 |
| EP | 1479362 | | 11/2004 |
| EP | 1513479 | | 3/2005 |
| EP | 1522292 | | 4/2005 |
| EP | 1522295 | | 4/2005 |
| EP | 1582189 | | 10/2005 |
| EP | 2226048 | | 9/2010 |
| EP | 2111204 | | 4/2011 |
| FR | 27505 | | 7/1924 |
| FR | 2215054 | | 8/1974 |
| FR | 2399822 | | 3/1979 |
| FR | 2455886 | | 12/1980 |
| FR | 2498925 | | 8/1982 |
| FR | 2738147 | | 7/1997 |
| FR | 2749502 | | 12/1997 |
| FR | 2858764 | | 2/2005 |
| GB | 151915 | | 10/1920 |
| GB | 154369 | | 12/1920 |
| GB | 265885 | | 2/1927 |
| GB | 474349 | | 10/1937 |
| GB | 841175 | | 7/1960 |

(56) References Cited

FOREIGN PATENT DOCUMENTS

| | | |
|---|---|---|
| GB | 1503910 | 3/1978 |
| GB | 2040237 | 8/1980 |
| GB | 2061197 | 5/1981 |
| GB | 2141980 | 1/1985 |
| GB | 2224980 | 5/1990 |
| JP | 57-186589 | 11/1982 |
| JP | 03-011978 | 12/1989 |
| JP | 04-158864 | 6/1992 |
| JP | 07-328073 | 12/1995 |
| JP | 8-038552 | 2/1996 |
| JP | 410248877 | 9/1998 |
| JP | 11059506 | 3/1999 |
| JP | 2000 102569 | 4/2000 |
| JP | 2000 288032 | 10/2000 |
| JP | 2001 070347 | 3/2001 |
| JP | 2001 104391 | 4/2001 |
| JP | 2001 212181 | 8/2001 |
| JP | 2001 258948 | 9/2001 |
| JP | 2001 327545 | 11/2001 |
| JP | 2002 143223 | 5/2002 |
| JP | 2002 165841 | 6/2002 |
| JP | 2004 202264 | 7/2004 |
| SE | 431393 | 11/1983 |
| WO | 82/00445 | 2/1982 |
| WO | 84/04451 | 11/1984 |
| WO | 87/06205 | 4/1987 |
| WO | 89/06117 | 7/1989 |
| WO | 90/05515 | 5/1990 |
| WO | 90/06097 | 6/1990 |
| WO | 92/09463 | 6/1992 |
| WO | 93/24342 | 12/1993 |
| WO | 94/13241 | 6/1994 |
| WO | 94/15567 | 7/1994 |
| WO | 96/15752 | 5/1996 |
| WO | 97/44206 | 11/1997 |
| WO | 98/46184 | 10/1998 |
| WO | 99/17700 | 4/1999 |
| WO | 00/08910 | 2/2000 |
| WO | 00/09356 | 2/2000 |
| WO | 00/12040 | 3/2000 |
| WO | 00/54718 | 9/2000 |
| WO | 00/66060 | 11/2000 |
| WO | 01/01914 | 1/2001 |
| WO | 02/34190 | 5/2002 |
| WO | 03/030800 | 4/2003 |
| WO | 03/034969 | 5/2003 |
| WO | 03/049664 | 6/2003 |
| WO | 03/101364 | 12/2003 |
| WO | 04/16451 | 2/2004 |
| WO | 04/037569 | 5/2004 |
| WO | 07/11668 | 1/2007 |
| WO | 07/22387 A2 | 2/2007 |
| WO | 07/79346 | 7/2007 |
| WO | 08/124953 | 3/2008 |
| WO | 08/84462 | 7/2008 |
| WO | 08/97879 | 8/2008 |
| WO | 08/100759 | 8/2008 |

OTHER PUBLICATIONS

Office Action from U.S. Appl. No. 14/446,735 dated Jan. 14, 2016.
Response to Office Action from U.S. Appl. No. 14/446,735 dated Apr. 12, 2016.
Restriction Requirement from U.S. Appl. No. 14/486,766 dated Jun. 8, 2015.
Response to Restriction Requirement from U.S. Appl. No. 14/486,766 dated Aug. 10, 2015.
Office Action from U.S. Appl. No. 14/486,766 dated Sep. 16, 2015.
Response to Office Action from U.S. Appl. No. 14/486,766 dated Dec. 8, 2015.
Notice of Allowance from U.S. Appl. No. 14/486,766 dated Feb. 9, 2016.
Office Action from U.S. Appl. No. 14/566,899 dated Sep. 17, 2015.
Response to Office Action from U.S. Appl. No. 14/566,899 dated Dec. 10, 2015.
Notice of Allowance from U.S. Appl. No. 14/566,899 dated Jan. 21, 2016.
Office Action from U.S. Appl. No. 14/585,393 dated Sep. 3, 2015.
Response to Office Action from U.S. Appl. No. 14/585,393 dated Jan. 21, 2016.
Notice of Allowance from U.S. Appl. No. 14/585,393 dated Feb. 22, 2016.
Office Action from U.S. Appl. No. 14/690,678 dated Nov. 16, 2015.
Response to Office Action from U.S. Appl. No. 14/690,678 dated Mar. 16, 2016.
Office Action from U.S. Appl. No. 14/875,110 dated May 20, 2016.
International Search Report from PCT/US03/34124 dated Dec. 28, 2004.
International Search Report and Written Opinion from PCT/US08/53242 dated Sep. 3, 2008.
Notice of Allowance from U.S. Appl. No. 14/446,735 dated Jul. 15, 2016.
Notice of Allowance from U.S. Appl. No. 14/446,735 dated Nov. 16, 2016.
Office Action from U.S. Appl. No. 14/690,678 dated Jul. 15, 2016.
Response to Office Action from U.S. Appl. No. 14/875,110 dated Sep. 20, 2016.
Final Office Action from U.S. Appl. No. 14/875,110 dated Feb. 15, 2017.
Office Action from U.S. Appl. No. 15/060,121 dated Oct. 31, 2016.
Office Action from U.S. Appl. No. 15/146,260 dated Apr. 10, 2017.
Office Action from U.S. Appl. No. 15/159,264 dated Nov. 17, 2016.
Pre-Brief Conference Request and Notice of Appeal from U.S. Appl. No. 14/690,678 dated Dec. 19, 2016.
Pre-Brief Appeal Conference Decision from U.S. Appl. No. 14/690,678 dated Feb. 3, 2017.
Office Action from U.S. Appl. No. 14/690,678 dated May 10, 2017.
Response to Office Action from U.S. Appl. No. 14/875,110 dated May 15, 2017.
Response to Office Action from U.S. Appl. No. 15/060,121 dated Jan. 31, 2017.
Notice of Allowance from U.S. Appl. No. 15/060,121 dated May 17, 2017.
Response to Office Action from U.S. Appl. No. 15/159,264 dated Feb. 17, 2017.
Amendment from U.S. Appl. No. 14/690,678 dated Jul. 31, 2017.
Notice of Allowance from U.S. Appl. No. 14/690,678 dated Oct. 26, 2017.
Office Action from U.S. Appl. No. 14/875,110 dated May 24, 2017.
Amendment from U.S. Appl. No. 14/875,110 dated Sep. 25, 2017.
Amendment from U.S. Appl. No. 15/146,260 dated Jun. 22, 2017.
Notice of Allowance from U.S. Appl. No. 15/146,260 dated Jul. 27, 2017.
Ex Parte Quayle Action from U.S. Appl. No. 15/151,929 dated Aug. 8, 2017.
Response to Ex Parte Quayle Action from U.S. Appl. No. 15/151,929 dated Oct. 9, 2017.
Final Office Action from U.S. Appl. No. 15/159,264 dated Jun. 13, 2017.
Response After Final from U.S. Appl. No. 15/159,264 dated Sep. 12, 2017.
Advisory Action from U.S. Appl. No. 15/159,264 dated Sep. 28, 2017.
Final Office Action from U.S. Appl. No. 14/875,110 dated Dec. 11, 2017.
Response to Office Action from U.S. Appl. No. 14/875,110 dated Jan. 23, 2018.
Notice of Allowance from U.S. Appl. No. 15/151,929 dated Nov. 16, 2017.
Office Action from U.S. Appl. No. 15/159,264 dated Dec. 26, 2017.
Notice of Appeal from Control No. 90/007,491 dated Nov. 9, 2006.
Advisory Action from Control No. 90/007,491 dated Nov. 22, 2006.
Appeal Brief from Control No. 90/007,491 dated Jan. 16, 2007.
Advisory Action from Control No. 90/007,491 dated Apr. 20, 2007.
Amended Appeal Brief from Control No. 90/007,491 dated Jun. 29, 2007.

(56) References Cited

OTHER PUBLICATIONS

Examiner's Answer from Control No. 90/007,491 dated Sep. 24, 2007.
Reply Brief from Control No. 90/007,491 dated Nov. 21, 2007.
Supplemental Examiner's Answer from Control No. 90/007,491 dated Dec. 18, 2007.
Request for Oral Hearing from Control No. 90/007,491 dated Feb. 19, 2008.
Reply Brief from Control No. 90/007,491 dated Feb. 19, 2008.
Office communication from Control No. 90/007,491 dated Mar. 14, 2008.
Office communication from Control No. 90/007,491 dated Jul. 3, 2008.
Notice of Hearing from Control No. 90/007,491 dated Aug. 22, 2008.
Hearing Attendance Confirmation from Control No. 90/007,491 dated Sep. 17, 2008.
Record of Oral Hearing from Control No. 90/007,491 dated Nov. 13, 2008.
Decision on Appeal from Control No. 90/007,491 dated Nov. 19, 2008.
Amendment for U.S. Appl. No. 09/698,481 dated Mar. 27, 2002.
Complaint for Patent Infringement Demand for Jury Trial, Case No. 1:06CV0517.
Request for Reexamination of U.S. Pat. No. 6,196,343, filed Apr. 28, 2006, 17 pgs.
Affidavit, executed Apr. 3, 2006 by Mark Sullivan, Invacare Corporation Vice President of Rehab submitted in reexamination Control No. 90/007,491, 5 pgs.
Affidavit, executed Apr. 3, 2006 by Gerold Goertzen Invacare Corporation Director of Research & Development submitted in reexamination Control No. 90/007,491, 7 pgs.
Office Action from U.S. Appl. No. 08/228,584 dated Apr. 14, 1995.
Response from U.S. Appl. No. 08/228,584 dated Jul. 6, 1995.
Office Action from U.S. Appl. No. 08/228,584 dated Sep. 28, 1995.
Interview Summary from U.S. Appl. No. 08/228,584 dated Nov. 30, 1995.
Response from U.S. Appl. No. 08/228,584 dated Dec. 28, 1995.
Office Action from U.S. Appl. No. 08/228,584 dated Mar. 29, 1996.
Response from U.S. Appl. No. 08/228,584 dated Jun. 3, 1996.
Notice of Allowance from U.S. Appl. No. 08/228,584 dated Jun. 24, 1996.
Office Action from U.S. Appl. No. 08/694,484 dated Dec. 2, 1996.
Response from U.S. Appl. No. 08/694,484 dated Apr. 2, 1997.
Office Action from U.S. Appl. No. 08/694,484 dated Jul. 7, 1997.
Office Action from U.S. Appl. No. 08/694,484 dated Dec. 3, 1997.
Office Action from U.S. Appl. No. 08/694,484 dated Feb. 10, 1998.
Response from U.S. Appl. No. 08/694,484 dated May 4, 1998.
Notice of Allowance from U.S. Appl. No. 08/694,484 dated Jul. 31, 1998.
Office Action from U.S. Appl. No. 09/191,332 dated Jan. 19, 2000.
Response from U.S. Appl. No. 09/191,332 dated Apr. 18, 2000.
Notice of Allowance from U.S. Appl. No. 09/191,332 dated Jul. 3, 2000.
Notice of Allowance from U.S. Appl. No. 09/426,369 dated Oct. 20, 2000.
Office Action from U.S. Appl. No. 09/607,468 dated Sep. 26, 2001.
Response from U.S. Appl. No. 09/607,468 dated Dec. 21, 2001.
Office Action from U.S. Appl. No. 09/607,468 dated Apr. 18, 2002.
Response from U.S. Appl. No. 09/607,468 dated Jun. 21, 2002.
Notice of Allowance from U.S. Appl. No. 09/607,468 dated Jun. 28, 2002.
U.S. Patent Office Action from U.S. Appl. No. 09/698,481 dated Nov. 27, 2001.
Response from U.S. Appl. No. 09/698,481 dated Mar. 27, 2002.
U.S. Patent Office Action from U.S. Appl. No. 09/698,481 dated Jun. 27, 2002.
Response from U.S. Appl. No. 09/698,481 dated Oct. 29, 2002.
U.S. Patent Office Advisory Action from U.S. Appl. No. 09/698,481 dated Nov. 13, 2002.
Supplemental Amendment after Final from U.S. Appl. No. 09/698,481 dated Nov. 27, 2002.
Notice of Allowance from U.S. Appl. No. 09/698,481 dated Dec. 12, 2002.
Office Action from U.S. Appl. No. 09/712,547 dated May 23, 2001.
Response from U.S. Appl. No. 09/712,547 dated Aug. 23, 2001.
Office Action from U.S. Appl. No. 09/712,547 dated Oct. 30, 2001.
Response from U.S. Appl. No. 09/712,547 dated Jan. 28, 2002.
Notice of Allowance from U.S. Appl. No. 09/712,547 dated Mar. 11, 2002.
Office Action from U.S. Appl. No. 09/974,348 dated Feb. 27, 2003.
Response from U.S. Appl. No. 09/974,348 dated Jul. 28, 2003.
Office Action from U.S. Appl. No. 09/974,348 dated Oct. 22, 2003.
Interview Record from U.S. Appl. No. 09/974,348 dated Oct. 28, 2003.
Response from U.S. Appl. No. 09/974,348 dated Jan. 26, 2004.
Advisory Action from U.S. Appl. No. 09/974,348 dated Feb. 27, 2004.
Response from U.S. Appl. No. 09/974,348 dated Apr. 16, 2004.
Notice of Allowance from U.S. Appl. No. 09/974,348 dated May 11, 2004.
Notice of Allowance from U.S. Appl. No. 09/974,348 dated May 20, 2005.
Office Action from related U.S. Appl. No. 10/044,826, dated Apr. 29, 2003.
Response from U.S. Appl. No. 10/044,826 dated Oct. 29, 2003.
Notice of Abandonment from U.S. Appl. No. 10/044,826 dated Nov. 18, 2003.
Response from U.S. Appl. No. 10/044,826 dated Jan. 20, 2004.
International Search Report from PCT/US02/29996 dated Jun. 24, 2003, 2 pgs.
Response from U.S. Appl. No. 10/044,826 dated Aug. 16, 2004.
Notice of Allowability from U.S. Appl. No. 10/044,826 dated Jun. 14, 2005.
Notice of Allowance from U.S. Appl. No. 10/044,826 dated Apr. 3, 2006.
U.S. Patent Office Action from U.S. Appl. No. 10/390,133 dated Aug. 8, 2003.
Response from U.S. Appl. No. 10/390,133 dated Feb. 11, 2004.
U.S. Patent Office Action from U.S. Appl. No. 10/390,133 dated Jun. 16, 2004.
Response from U.S. Appl. No. 10/390,133 dated Dec. 20, 2004.
Supplemental Notice of Allowance from U.S. Appl. No. 10/390,133 dated Mar. 30, 2005.
Notice of Allowance from U.S. Appl. No. 10/390,133 dated Jan. 11, 2005.
U.S. Patent Office Action from U.S. Appl. No. 10/390,386 dated Aug. 8, 2003.
Response from U.S. Appl. No. 10/390,386 dated Nov. 11, 2003.
U.S. Patent Office Action from U.S. Appl. No. 10/390,386 dated Jan. 28, 2004.
Response from U.S. Appl. No. 10/390,386 dated May 28, 2004.
U.S. Patent Office Action from U.S. Appl. No. 10/390,386 dated Oct. 12, 2004.
Response from U.S. Appl. No. 10/390,386 dated Mar. 16, 2005.
Notice of Allowance from U.S. Appl. No. 10/390,386 dated Apr. 7, 2005.
Notice of Allowance from U.S. Appl. No. 10/643,010 dated Sep. 30, 2004.
Office Action from U.S. Appl. No. 10/695,045 dated Feb. 22, 2005.
Response from U.S. Appl. No. 10/695,045 dated Jul. 25, 2005.
Office Action from U.S. Appl. No. 10/695,045 dated Oct. 20, 2005.
Response from U.S. Appl. No. 10/695,045 dated Jan. 17, 2006.
Notice of Allowance from U.S. Appl. No. 10/695,045 dated Apr. 11, 2006.
Office Action from U.S. Appl. No. 10/762,977 dated Jan. 18, 2005.
Response from U.S. Appl. No. 10/762,977 dated May 18, 2005.
Office Action from U.S. Appl. No. 10/762,977 dated Aug. 11, 2005.
Response from U.S. Appl. No. 10/762,977 dated Oct. 3, 2005.
Office Action from U.S. Appl. No. 10/762,977 dated Oct. 25, 2005.
Notice of Allowance from U.S. Appl. No. 10/762,977 dated Feb. 23, 2006.

(56) References Cited

OTHER PUBLICATIONS

Notice of Allowance from U.S. Appl. No. 11/077,483 dated Aug. 9, 2007.
Amendment from U.S. Appl. No. 12/522,837 dated Jun. 15, 2011.
Notice of Allowance from U.S. Appl. No. 12/522,837 dated Jul. 26, 2011.
Notice of Allowance from U.S. Appl. No. 12/522,837 dated Jun. 28, 2012.
Office Action from U.S. Appl. No. 12/523,630 dated Dec. 21, 2011.
Response from U.S. Appl. No. 12/523,630 dated Mar. 15, 2012.
Notice of Allowance from U.S. Appl. No. 12/523,630 dated Jun. 11, 2012.
Restriction /Election Requirement for U.S. Appl. No. 12/524,476 dated Dec. 31, 2012.
Office Action from U.S. Appl. No. 12/524,476 dated May 22, 2013.
Amendment in U.S. Appl. No. 12/524,476 dated Nov. 20, 2013.
Final Office Action in U.S. Appl. No. 12/524,476 dated Feb. 27, 2014.
Notice of Allowance from U.S. Appl. No. 12/524,476 dated Aug. 15, 2014.
Office Action from U.S. Appl. No. 12/568,728 dated Jun. 10, 2010.
Response from U.S. Appl. No. 12/568,728 dated Nov. 5, 2010.
Office Action from U.S. Appl. No. 12/568,728 dated Jan. 24, 2011.
Notice of Allowance from U.S. Appl. No. 12/568,728 dated Oct. 26, 2011.
Examiner-Initiated Interview Summary from U.S. Appl. No. 12/568,728 dated Dec. 8, 2011.
RCE with Remarks (Amendments to Specification) from U.S. Appl. No. 12/568,728 dated Jan. 9, 2012.
Notice of Allowance from U.S. Appl. No. 12/568,728 dated Jan. 24, 2012.
Office Action from U.S. Appl. No. 13/413,839 dated Sep. 26, 2013.
Response to Office Action from U.S. Appl. No. 13/413,839 dated Feb. 26, 2014.
Notice of Allowance from U.S. Appl. No. 13/413,839 dated May 1, 2014.
Restriction Requirement in U.S. Appl. No. 13/465,404 dated Jan. 3, 2013.
Response to Restriction Requirement in U.S. Appl. No. 13/465,404 dated Feb. 4, 2013.
Office Action in U.S. Appl. No. 13/465,404 dated Apr. 11, 2013.
Response to Office Action in U.S. Appl. No. 13/465,404 dated Jul. 11, 2013.
Notice of Allowance in U.S. Appl. No. 13/465,404 dated Sep. 27, 2013.
Office Action from U.S. Appl. No. 13/465,268 dated Jul. 19, 2012.
Response to Office Action from U.S. Appl. No. 13/465,268 dated Jan. 22, 2013.
Final Office Action in U.S. Appl. No. 13/465,268 dated Apr. 15, 2013.
Amendment with RCE, terminal disclaimer for U.S. Appl. No. 13/465,268 dated Oct. 15, 2013.
Non-Final Office Action in U.S. Appl. No. 13/465,268 dated Apr. 15, 2014.
Notice of Allowance for U.S. Appl. No. 13/465,268 dated Oct. 24, 2014.
First Office Action in U.S. Appl. No. 13/566,473 dated Dec. 6, 2012.
Response in U.S. Appl. No. 13/566,473 dated Apr. 8, 2013.
Office Action in U.S. Appl. No. 13/568,623 dated Feb. 1, 2013.
Response to Office Action in U.S. Appl. No. 13/568,623 dated Jun. 19, 2013.
Notice of Allowance in U.S. Appl. No. 13/568,623 dated Oct. 9, 2013.
Notice of Allowance in U.S. Appl. No. 13/568,623 dated Apr. 2, 2014.
Restriction Requirement in U.S. Appl. No. 12/900,548 dated Jun. 28, 2013.
Response to Restriction Requirement in U.S. Appl. No. 12/900,548 dated Jul. 29, 2013.
Office Action in U.S. Appl. No. 12/900,548 dated Sep. 9, 2013.
Response to Office Action in U.S. Appl. No. 12/900,548 dated Jan. 28, 2014.
Office Action in U.S. Appl. No. 12/900,548 dated Jun. 2, 2014.
RCE and Amendment Filed in U.S. Appl. No. 12/900,548 dated Oct. 1, 2014.
Notice of Allowance in U.S. Appl. No. 12/900,548 dated Dec. 18, 2014.
Restriction Requirement from U.S. Appl. No. 13/768,878 dated Jun. 4, 2014.
Response to Restriction Requirement in U.S. Appl. No. 13/768,878 dated Sep. 4, 2014.
Notice of Allowance for U.S. Appl. No. 13/768,878 dated Dec. 11, 2015.
Office Action from U.S. Appl. No. 13/768,878 dated Dec. 3, 2014.
Response to Office Action from U.S. Appl. No. 13/768,878 dated Jan. 21, 2015.
Office Action from U.S. Appl. No. 11/145,477 dated Mar. 28, 2006.
Office Action from U.S. Appl. No. 11/145,477 dated Sep. 8, 2006.
Response from U.S. Appl. No. 11/145,477 dated Dec. 12, 2006.
Notice of Allowance from U.S. Appl. No. 11/145,477 dated Jan. 8, 2007.
U.S. Patent Office Action from U.S. Appl. No. 11/209,001 dated Jul. 25, 2006.
Office Action from U.S. Appl. No. 11/209,001 dated Nov. 8, 2006.
Notice of Abandonment from U.S. Appl. No. 11/209,001 dated Jul. 10, 2007.
Office Action from U.S. Appl. No. 11/429,687 dated Apr. 9, 2008.
Response from U.S. Appl. No. 11/429,687 dated Jun. 17, 2008.
Notice of Allowance from U.S. Appl. No. 11/429,687 dated Sep. 8, 2008.
Office Action from U.S. Appl. No. 11/472,509 dated May 4, 2007.
Interview Summary from U.S. Appl. No. 11/472,509 dated Aug. 3, 2007.
Response from U.S. Appl. No. 11/472,509 dated Aug. 3, 2007.
Office Action from U.S. Appl. No. 11/472,509 dated Nov. 30, 2007.
Response from U.S. Appl. No. 11/472,509 dated Apr. 30, 2008.
Response from U.S. Appl. No. 11/472,509 dated Jul. 22, 2008.
Office Action from U.S. Appl. No. 11/472,509 dated May 15, 2009.
Response from U.S. Appl. No. 11/472,509 dated Nov. 15, 2009.
Office Action from U.S. Appl. No. 11/472,509 dated Sep. 2, 2010.
Response from U.S. Appl. No. 11/472,509 dated Jan. 3, 2011.
Notice of Appeal and Pre-Appeal Brief Request and Statement from U.S. Appl. No. 11/472,509 filed Mar. 2, 2011.
Interview Summary from U.S. Appl. No. 11/472,509 filed Mar. 2, 2011.
Non-Final Rejection from U.S. Appl. No. 11/472,509 dated Mar. 3, 2011.
Pre-Brief Appeal Conference Decision from U.S. Appl. No. 11/472,509 dated Mar. 23, 2011.
Non-Final Rejection from U.S. Appl. No. 11/472,509 dated Apr. 7, 2011.
Response from U.S. Appl. No. 11/472,509 dated Aug. 8, 2011.
Notice of Allowance from U.S. Appl. No. 11/472,509 dated Nov. 14, 2011.
Supplemental amendment identifying cross-references to related applications from U.S. Appl. No. 11/472,509 dated Aug. 7, 2012.
Notice of Allowance from U.S. Appl. No. 11/472,509 dated Oct. 19, 2012.
Office Action from U.S. Appl. No. 11/474,834 dated Mar. 21, 2007.
Response from U.S. Appl. No. 11/474,834 dated Jun. 28, 2007.
Office Action from U.S. Appl. No. 11/474,834 dated Sep. 20, 2007.
Response from U.S. Appl. No. 11/474,834 dated Nov. 20, 2007.
Notice of Allowance from U.S. Appl. No. 11/474,834 dated Jan. 17, 2008.
Office Action from U.S. Appl. No. 11/490,899 dated Nov. 8, 2006.
Office Action from U.S. Appl. No. 11/490,899 dated Jan. 9, 2007.
Response from U.S. Appl. No. 11/490,899 dated Mar. 20, 2007.
Notice of Allowance from U.S. Appl. No. 11/490,899 dated Jun. 6, 2007.
Notice of Allowance from U.S. Appl. No. 11/490,899 dated Feb. 10, 2009.
Notice of Allowance from U.S. Appl. No. 11/490,899 dated May 26, 2009.

(56) References Cited

OTHER PUBLICATIONS

Office Action from U.S. Appl. No. 12/118,099 dated Oct. 28, 2010.
Response to Office Action from U.S. Appl. No. 12/118,099 dated Apr. 25, 2011.
Notice of Allowance from U.S. Appl. No. 12/118,099 dated Jul. 28, 2011.
Notice of Allowance from U.S. Appl. No. 12/118,099 dated Jul. 3, 2013.
Office Action from U.S. Appl. No. 12/330,554 dated Apr. 11, 2011.
Response to Office Action from U.S. Appl. No. 12/330,554 dated Jul. 11, 2011.
Notice of Allowance from U.S. Appl. No. 12/330,554 dated Sep. 23, 2011.
Notice of Allowance from U.S. Appl. No. 12/330,554 dated Nov. 15, 2011.
Notice of Allowance from U.S. Appl. No. 12/330,554 dated Feb. 14, 2012.
Office Action from U.S. Appl. No. 12/522,837 dated Feb. 15, 2011.
"All-Terrain Wheelchair, Designer's Corner", Design News, Feb. 24, 1992, cover page and p. 54.
Big Bounder Power Wheelchair: Conventional "Tubular Style Frame"; http://www.wheelchair.com/bigbounderpage.htm, Accessed on the World Wide Web on Dec. 17, 2003, p. 1-4.
"Bounder Plus Power Wheelchair: Convention "Tubular" Style Frame"; http://www.wheelchairs.com/plus.htm, Accessed on the World Wide Web on Dec. 17, 2003, p. 1-4.
"Frog Legs: Smooth Ride Ahead"; http://www.froglegsinc.com/index.php, Accessed on the World Wide Web on Dec. 17, 2003, p. 105.
"Frog Legs Tires", http://mdtap.org/tt/1999.09/prod.html, Accessed on the World Wide Web on Dec. 17, 2003, p. 1-3.
Golden Technologies advertisement video http://youtu.be/TyEvrmoaHME.
"Invacare pronto M7I jr. Power Wheelchair Manual"; Accessed on the World Wide Web on Dec. 17, 2003.
"Invacare Storm Series TDX Power Wheelchairs Manual"; Accessed on the World Wide Web on Dec. 17, 2003, p. 1-24.
"Invacare Xterra Series GT Power Wheelchair Manual", Accessed on the World Wide Web on Dec. 17, 2003, p. 1-4.
"Jazzy 1122", Pride Mobile Products Corp., Accessed on the World Wide Web on Dec. 17, 2003, p. 1-2.
"Jazzy 1133", Pride Mobile Products Corp., Accessed on the World Wide Web on Dec. 17, 2003, p. 1-2.
"Jazzy 1170XL", Pride Mobile Products Corp., Accessed on the World Wide Web on Dec. 17, 2003, p. 1-2.
Kauzlarich, J. et al., "Wheelchair Caster Shimmy II: Damping", Journal for Rehabilitative Research and Development, May/Jun. 2000, vol. 37, No. 3, pp. 305-314.
McLauren, C., "Future Developments—Current Directions in Wheelchair Research", Journal for Rehabilitative Research and Development, Jul./Aug. 1985, vol. 42, No. 4 Suppl. No. 2, pp. 88-99.
"Bruno Independent Living Aids ISP 9001 Certified"; http://www.bruno.com/power_chairs.htm, Accessed on the World Wide Web on Dec. 17, 2003, p. 1-5.
"Top End Terminator SS Sports Wheelchair", http://phc-online.com/terminator_ss.htm, Accessed on the World Wide Web on Dec. 17, 2003, p. 1-5.
"TransActions of the Institute of Measurement and Control", The British Library of Science Technology and Business, vol. 24, Nov. 5, 2002, 15 pgs.
M.J. Lawn, et al. "Modeling of a Stair-Climbing Wheelchair Mechanism with High Single-Step Capability", IEEE TransActions on Neutral Systems and Rehabilitation Engineering, vol. 11, No. 3, Sep. 2003, pp. 323-332.
Quickie G-424 User Instruction Manual & Warranty, 930484 Rev. A (27 sheets) (alleged date not later than 2000).
10 photographs (8.5×11) of Quickie G-424 Wheelchair obtained Nov. 24, 2004.
Sunrise Medical, Inc., Power Products Parts Manual, 930307 Rev. K (264 double sided sheets), Jul. 2004. (Note: various dates are alleged therein based on wheelchair products listed including the Quickie G-424).
Permobil Chairman HD3 Owner's Manual dated May 2003, 52 pages.
Permobil C400 Power Wheelchair, Owner's Manual, version 6, 2010, Permobil AB, Sweden, 100 pgs.
Permobil C500 Power Wheelchair, Owner's Manual, version 6, 2010, Permobil AB, Sweden, 100 pgs.
Pride Mobility, Jet 3 Ultra Owner's Manual dated Jun. 2007, 43 pages.
Quantum Series Owner's Manual dated Feb. 2009, 43 pages.
"Bike" magazine article, "Ten Underrated Products You Probably Don't Own but Maybe Should" (in part), Jan. 1994, pp. 82 and 83.
"Bike" magazine article "Softride Contour", Mar. 1994, pp. 64-65.
"Mountain Bike Action", picture and caption describing "Body Shock", Jan. 1994, pp. 48.
International Search Report from PCT/US98/07543 dated Aug. 19, 1998.
International Search Report from PCT/US01/42656 dated Jan. 14, 2003.
International Preliminary Examination Report from PCT/US02/29996 dated Dec. 11, 2003.
International Search Report from PCT/US02/29998 dated Dec. 12, 2002.
International Preliminary Examination Report from PCT/US02/29998 dated Jan. 13, 2004.
International Search Report and Written Opinion from PCT/US03/25736 dated Dec. 28, 2004.
International Preliminary Examination Report from PCT/US03/34124 dated Aug. 25, 2006.
International Search Report and Written Opinion from PCT/IB08/050111 dated Jun. 4, 2008.
Amendments under Article 34(2)(b) PCT and Comments from PCT/IB08/050111 dated Oct. 2, 2008.
International Preliminary Report on Patentability for International Patent Application No. PCT/IB08/050111 dated Apr. 22, 2009.
International Search Report and Written Opinion from PCT/US08/52878 dated Jul. 3, 2008.
International Search Report and Written Opinion from PCT/US10/51888 dated Dec. 6, 2010.
International Search Report and Written Opinion for PCT/US13/026441 dated Apr. 23, 2013.
Office Action dated Feb. 2, 2006 from Control No. 90/007,491.
Interview Summary from Control No. 90/007,491 dated Mar. 23, 2006.
Statement as to the substance of an Interview from Control No. 90/007,491 Apr. 3, 2006.
Response from Control No. 90/007,491 dated Apr. 3, 2006.
Office Action dated Jul. 5, 2006 from Control No. 90/007,491.
Response to Office Action from Control No. 90/007,491 dated Sep. 11, 2006.
Office Action dated Sep. 21, 2006 from Control No. 90/007,491.
Response from Control No. 90/007,491 dated Nov. 9, 2006.
Amendment from U.S. Appl. No. 15/159,264 dated Apr. 26, 2018.
Final Office Action from U.S. Appl. No. 15/159,264 dated Aug. 10, 2018.
Office Action from U.S. Appl. No. 15/447,988 dated Aug. 7, 2018.
Amendment from U.S. Appl. No. 15/447,988 dated Nov. 7, 2018.
Notice of Allowance from U.S. Appl. No. 15/447,988 dated Dec. 14, 2018.
Office Action from U.S. Appl. No. 15/822,967 dated Apr. 8, 2019.
Office Action from U.S. Appl. No. 15/935,538 dated Mar. 26, 2019.
Amendment from U.S. Appl. No. 15/822,967 dated Jul. 31, 2019.
Response to Office Action from U.S. Appl. No. 15/935,538 dated Jun. 26, 2019.
Notice of Allowance from U.S. Appl. No. 15/935,538 dated Aug. 9, 2019.

* cited by examiner

FIG. 57C
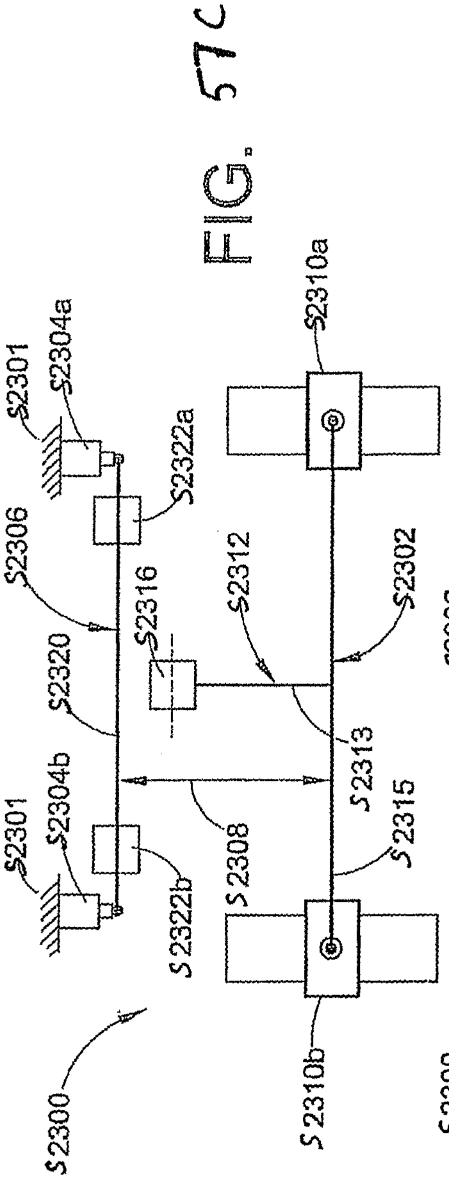
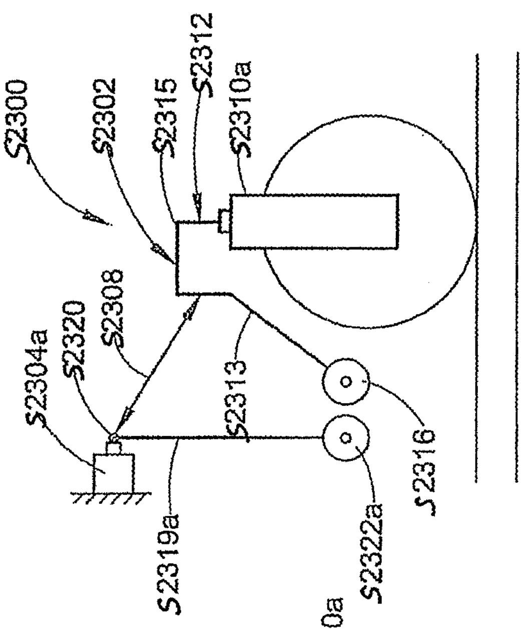
FIG. 57B
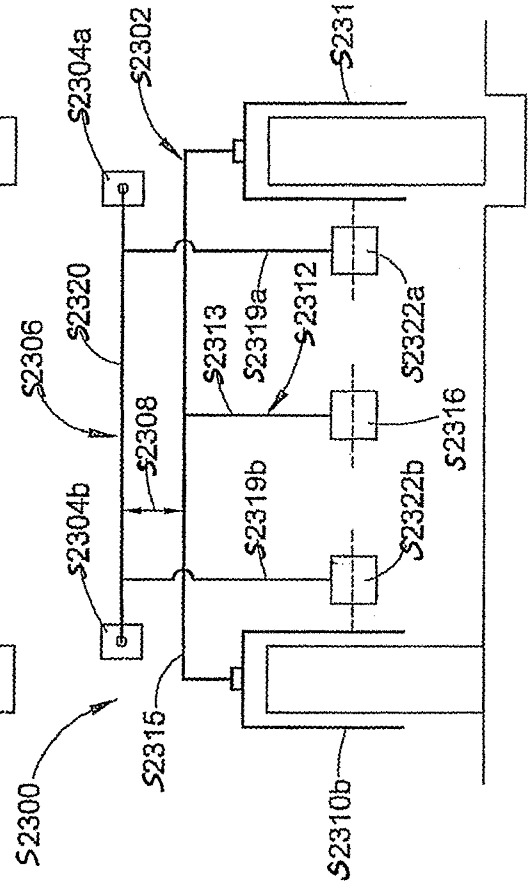
FIG. 57A

WHEELCHAIR SUSPENSION

RELATED APPLICATIONS

This application is a continuation of U.S. application Ser. No. 15/060,121, filed on Mar. 3, 2016, and entitled "Wheelchair Suspension," which is a divisional of U.S. application Ser. No. 13/768,878, filed on Feb. 15, 2013, and entitled "Wheelchair Suspension," which claims priority to U.S. Provisional Application No. 61/598,962, filed on Feb. 15, 2012, and entitled "Wheelchair Suspension." The above-mentioned applications are incorporated herein by reference in their entirety.

BACKGROUND

Wheelchairs and scooters are an important means of transportation for a significant portion of society. Whether manual or powered, these vehicles provide an important degree of independence for those they assist. However, this degree of independence can be limited if the wheelchair is required to traverse obstacles such as, for example, curbs that are commonly present at sidewalks, driveways, and other paved surface interfaces. This degree of independence can also be limited if the vehicle is required to ascend inclines or descend declines.

Most wheelchairs have front and rear casters to stabilize the chair from tipping forward or backward and to ensure that the drive wheels are always in contact with the ground. The caster wheels are typically much smaller than the driving wheels and located both forward and rearward of the drive wheels. Though this configuration provides the wheelchair with greater stability, it can hamper the wheelchair's ability to climb over obstacles such as, for example, curbs or the like, because the size of the front casters limits the height of the obstacle that can be traversed.

Though equipped with front and rear suspended casters, most mid-wheel drive wheelchairs exhibit various degrees of tipping forward or rearward when descending declines or ascending inclines. This is because the suspensions suspending the front or rear stabilizing casters are compromised so that they are not made too rigid, which would prevent tipping and also not provide much suspension, or are made too flexible thereby effectively not providing any degree of suspension or stabilization.

SUMMARY

A wheelchair suspension includes a frame, a drive assembly and a front caster pivot arm. The drive assembly and the front caster pivot arm may be coupled, independent, or selectively coupled based on the relative positions of the drive assembly and the front caster pivot arm to enhance the vehicle's ability to traverse obstacles.

In one embodiment, A wheelchair suspension includes a frame, a drive assembly pivot arm, a drive assembly, a front caster pivot arm, a front caster, and a spring and shock absorbing assembly. The drive assembly pivot arm is pivotally connected to the frame. The drive assembly includes a drive wheel and is mounted to the drive assembly pivot arm. The front caster pivot arm is pivotally mounted to the frame and coupled to the drive assembly pivot arm. The front caster is coupled to the at least one front caster pivot arm. The spring and shock absorbing assembly is pivotally connected to the drive assembly pivot arm at a first pivotal connection and pivotally connected to the front caster pivot arm at a second pivotal connection. The first and second pivotal connections are positioned such that a majority of the force applied by the spring and shock absorbing assembly is applied to the drive wheel when the suspension is on a flat, horizontal support surface.

BRIEF DESCRIPTION OF THE DRAWINGS

In the accompanying drawings which are incorporated in and constitute a part of the specification, embodiments of the invention are illustrated, which together with a general description of the invention given above and the detailed description given below, serve to provide examples of the principles of this invention.

FIGS. 57A-57C illustrate the rear caster suspension and rear caster position sensing arrangement of FIGS. 56A-56C, where downward movement of one rear caster is inhibited by a second rear caster;

FIG. 63 illustrates an embodiment of a mid-wheel drive wheelchair that includes a tip or stability control system and front caster pivot arms that are coupled to drive assemblies;

FIG. 70 is a view taken along lines 70-70 in FIG. 66;

FIG. 73 is a view taken along lines 73-73 in FIG. 72;

FIG. 74 is a view taken along lines 74-74 in FIG. 73;

FIG. 75 is an enlarged portion of FIG. 71 as indicated by reference FIG. 75 in FIG. 71;

FIG. 76 is a schematic illustration of a vibration damping assembly;

FIG. 77 illustrates a perspective view of a rear caster position sensing arrangement and rear caster suspension of the wheelchair illustrated by FIG. 65;

FIG. 78 is a side view of the rear caster position sensing arrangement and rear caster suspension of FIG. 77;

FIG. 79 is a view taken along lines 79-79 in FIG. 78;

FIG. 80 is a view taken along lines 80-80 in FIG. 78;

FIG. 81 is a view taken along lines 81-81 in FIG. 79;

FIG. 82 is a view taken along lines 82-82 in FIG. 81;

FIG. 82A is a view similar to FIG. 82, where the rear caster position sensing arrangement has moved to an engaged position;

FIG. 83 is a view taken along lines 83-83 in FIG. 78;

Figure 84A:
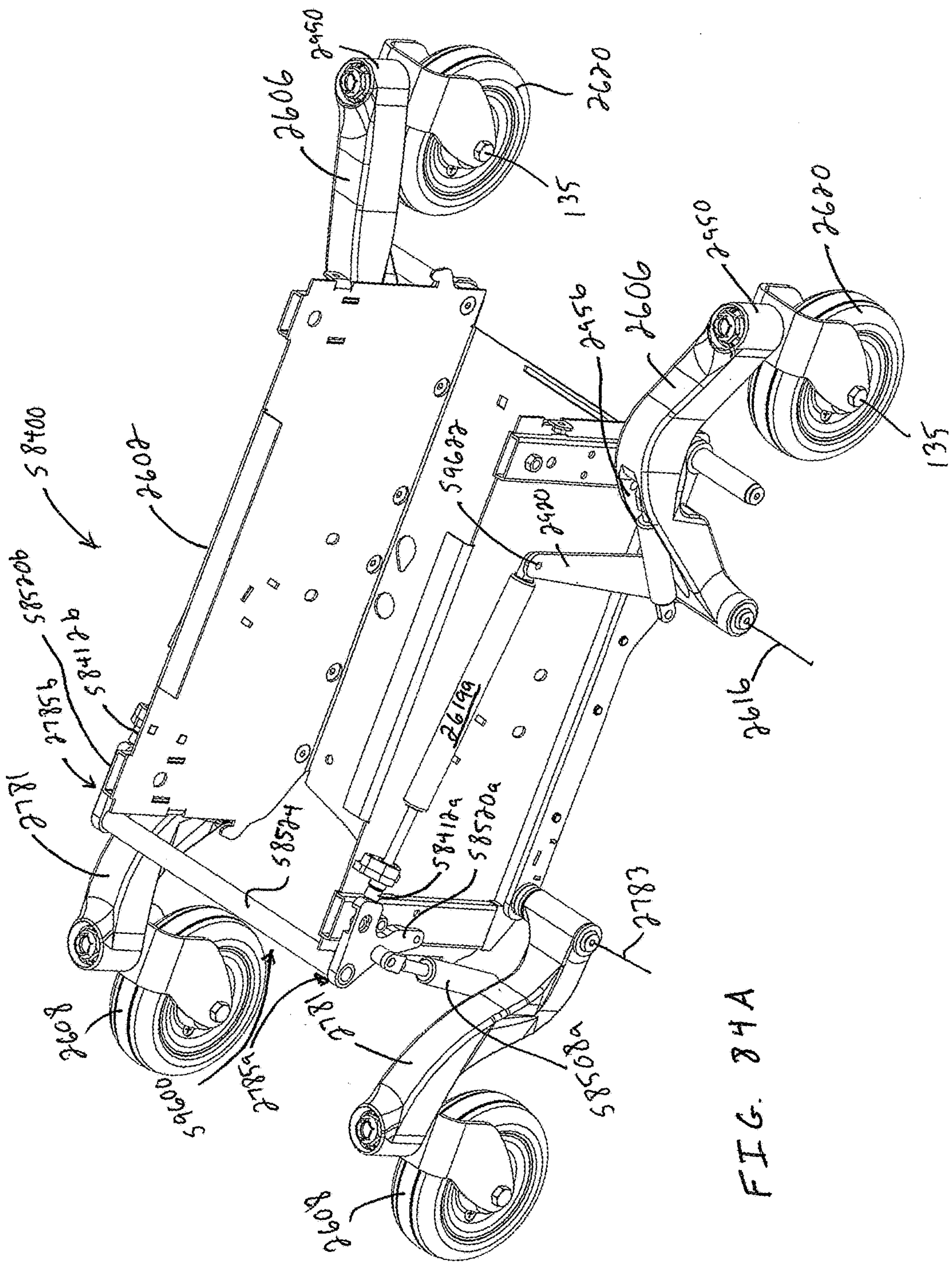
Figure 84B:
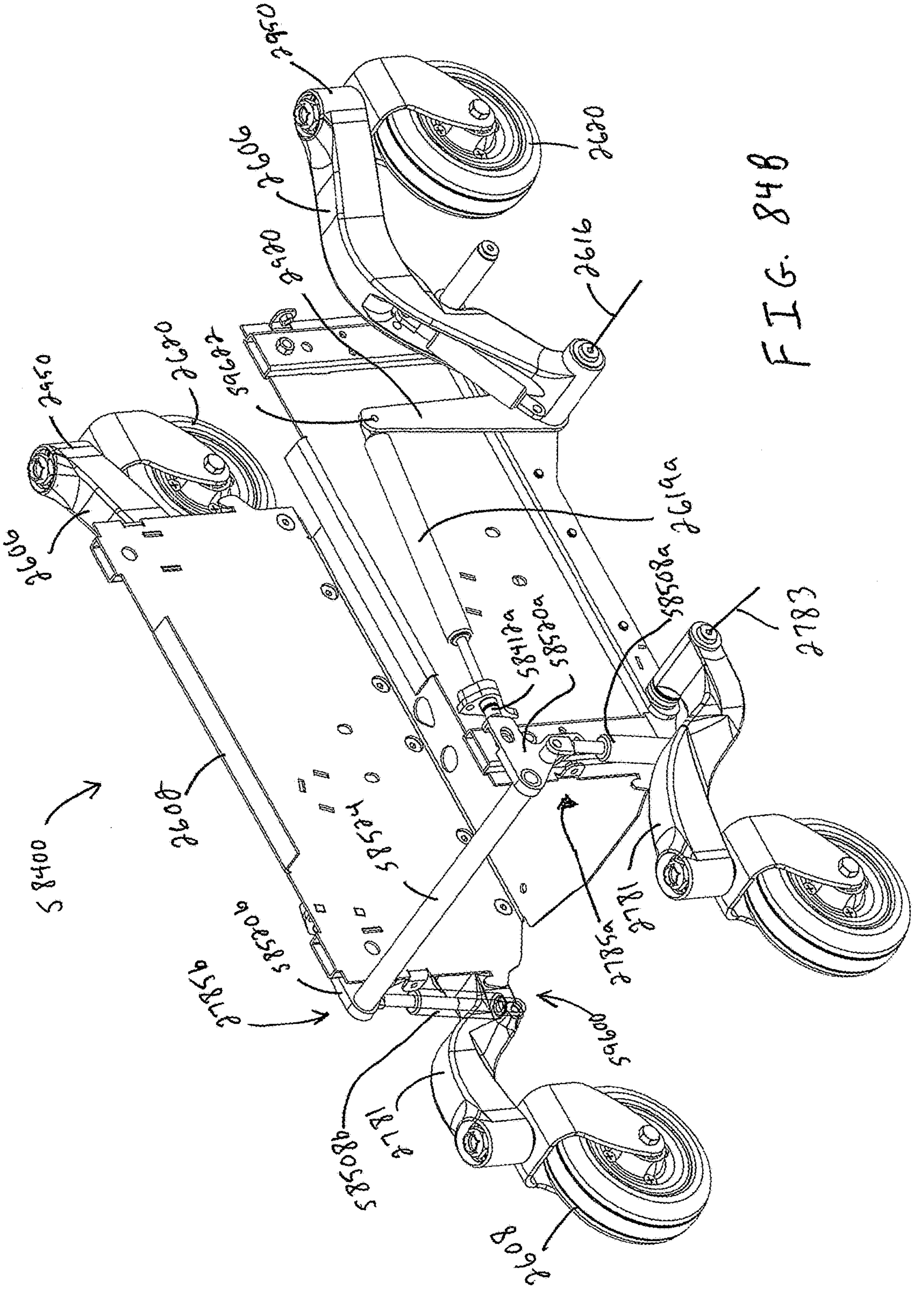
Figure 85A:
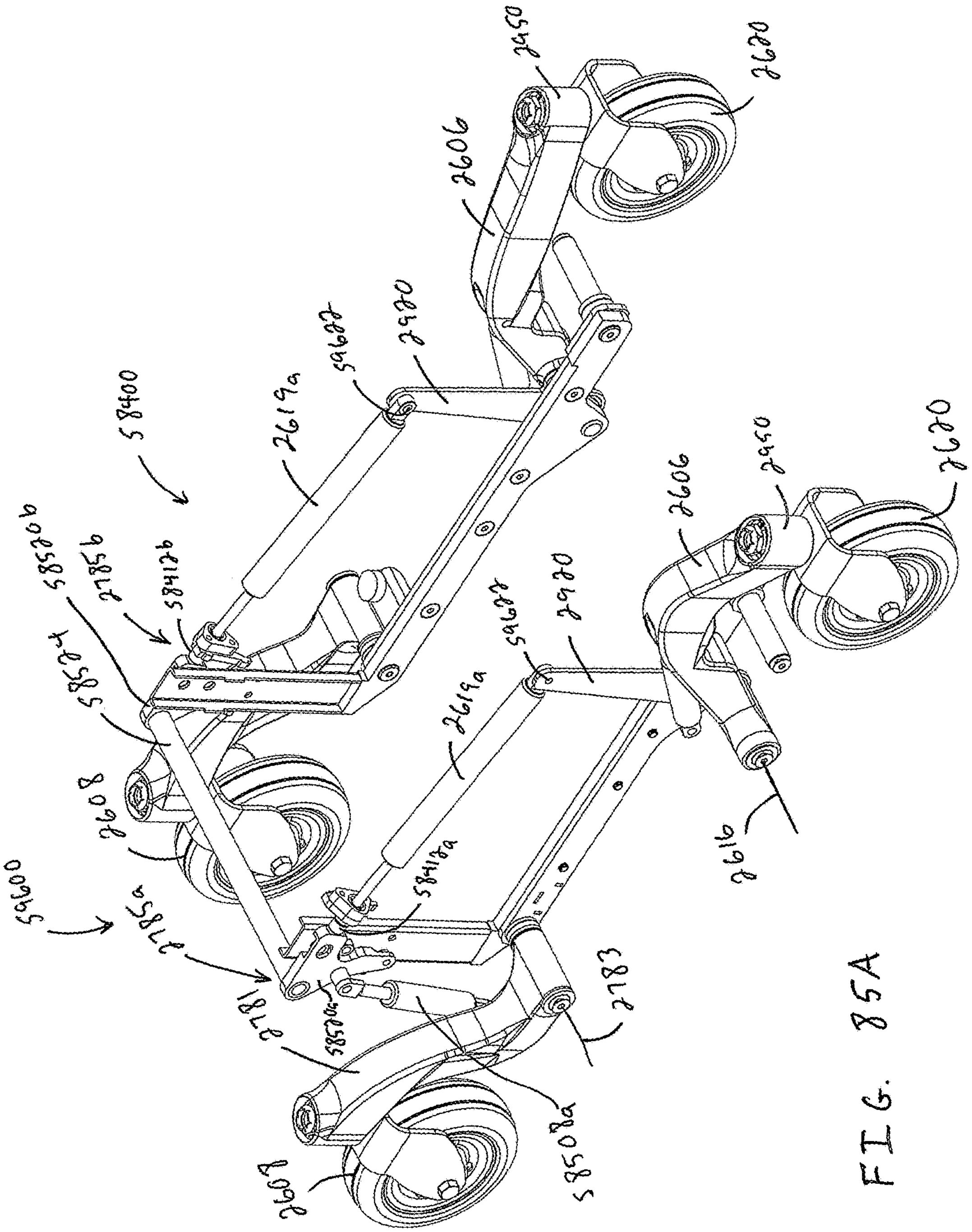
Figures 85B, 86:
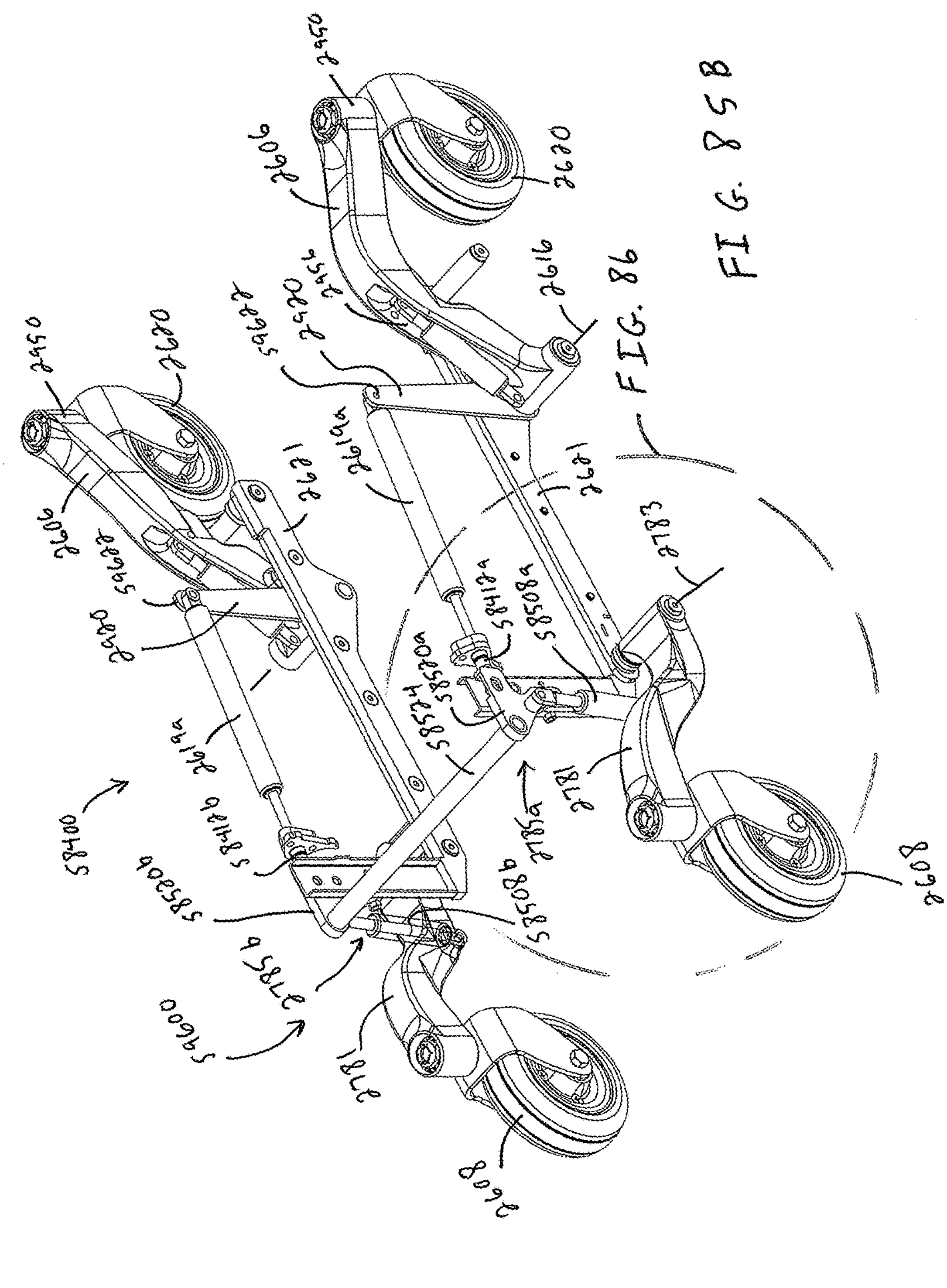
Figure 86:
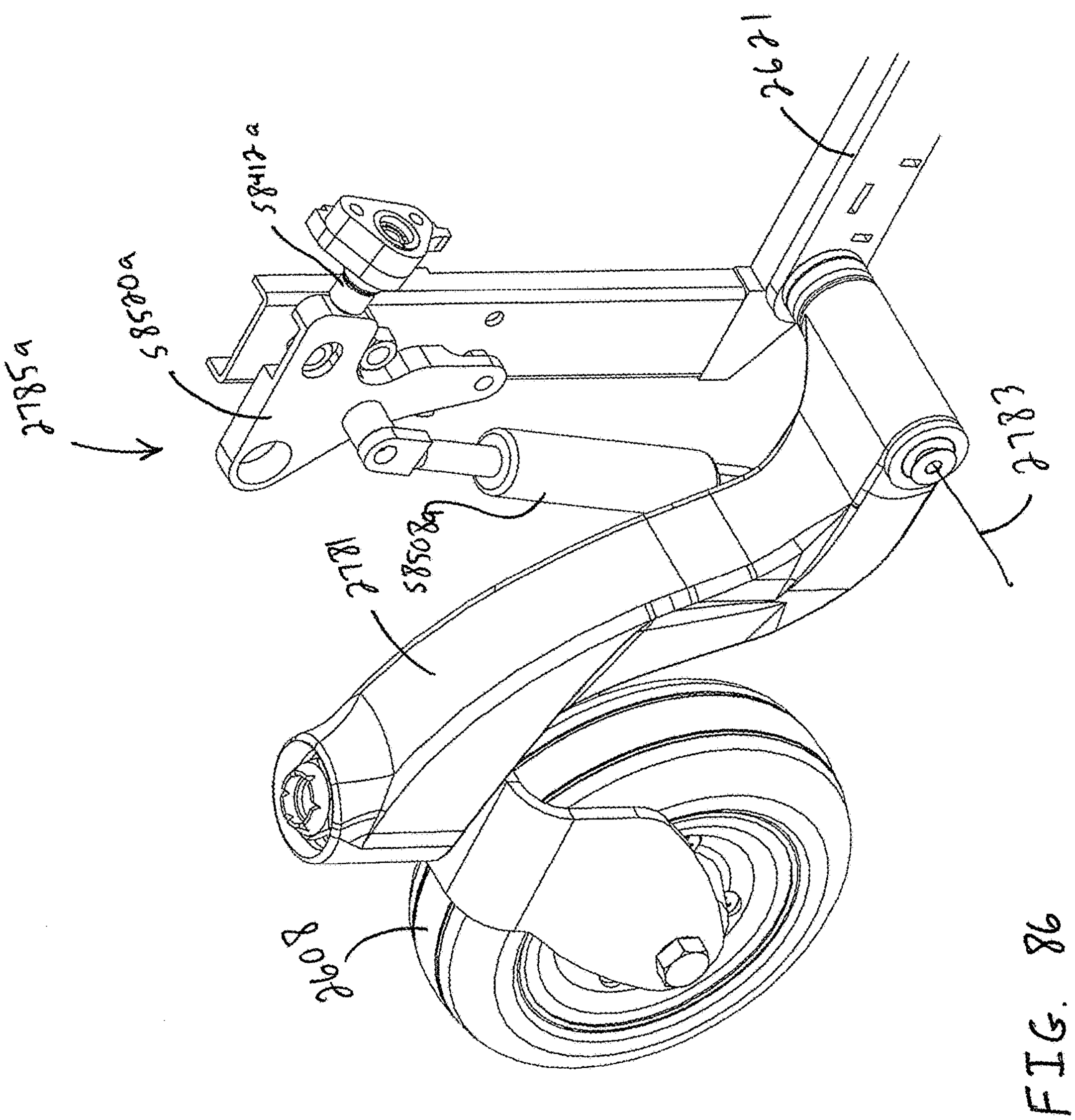
Figure 87A:
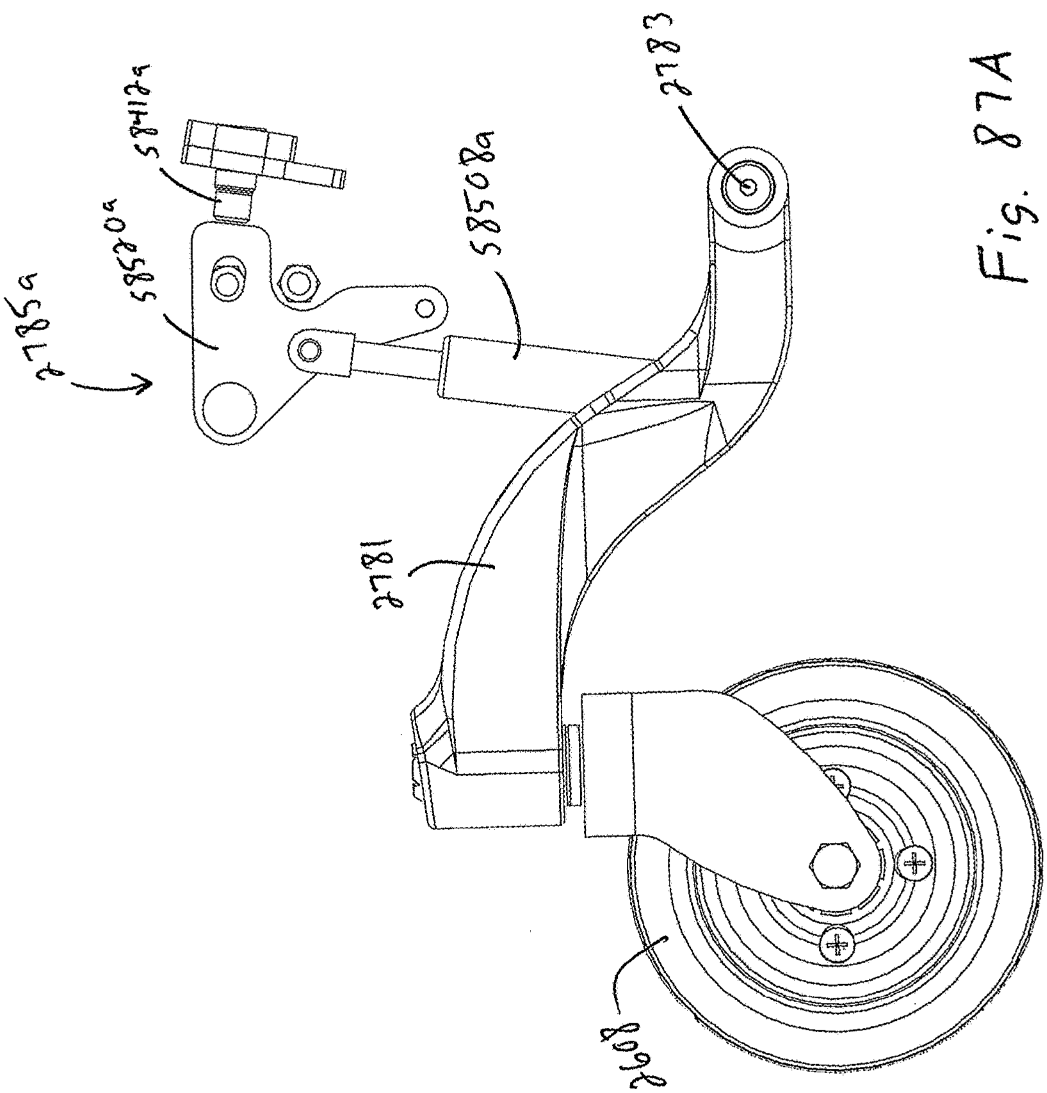
Figure 87B:
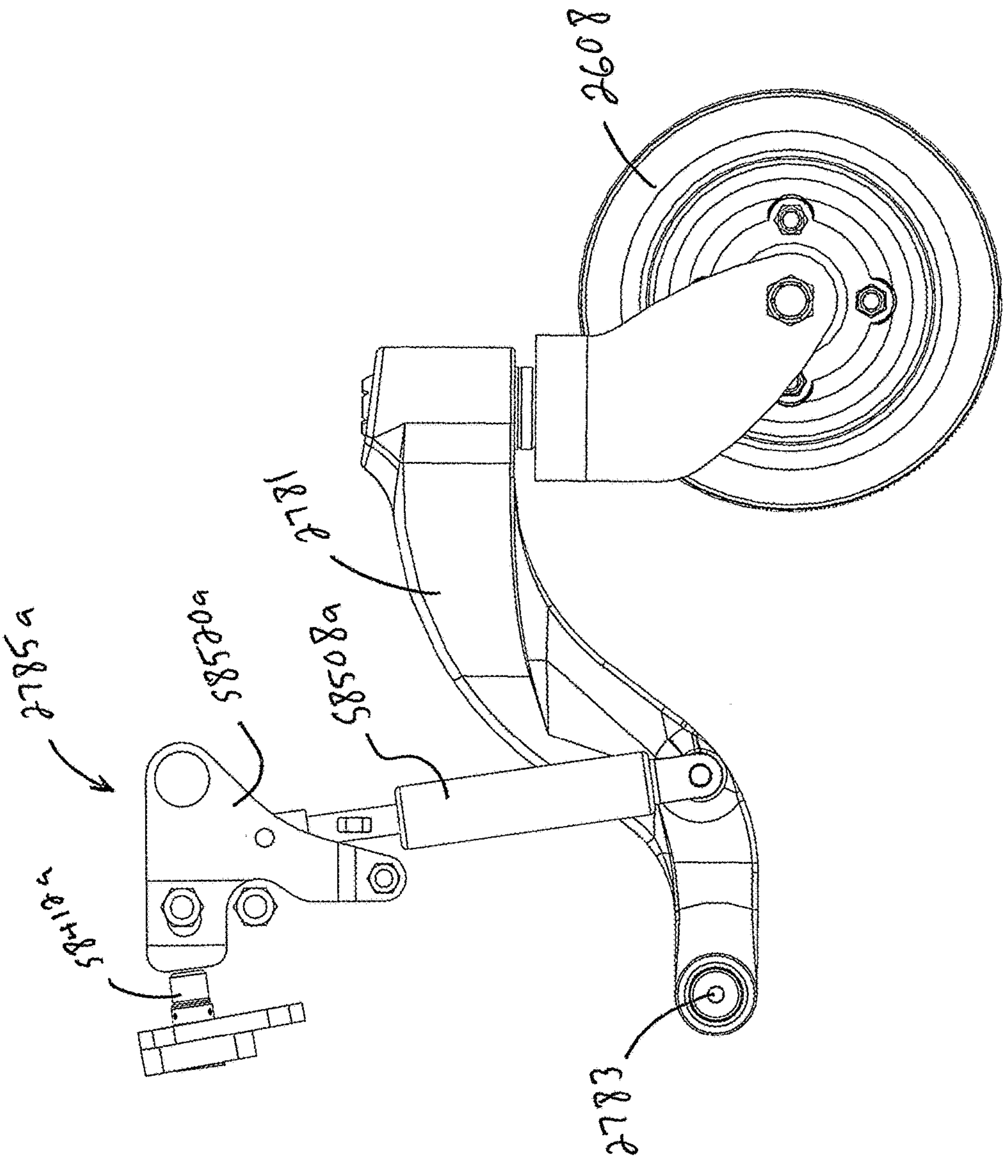
Figure 88:
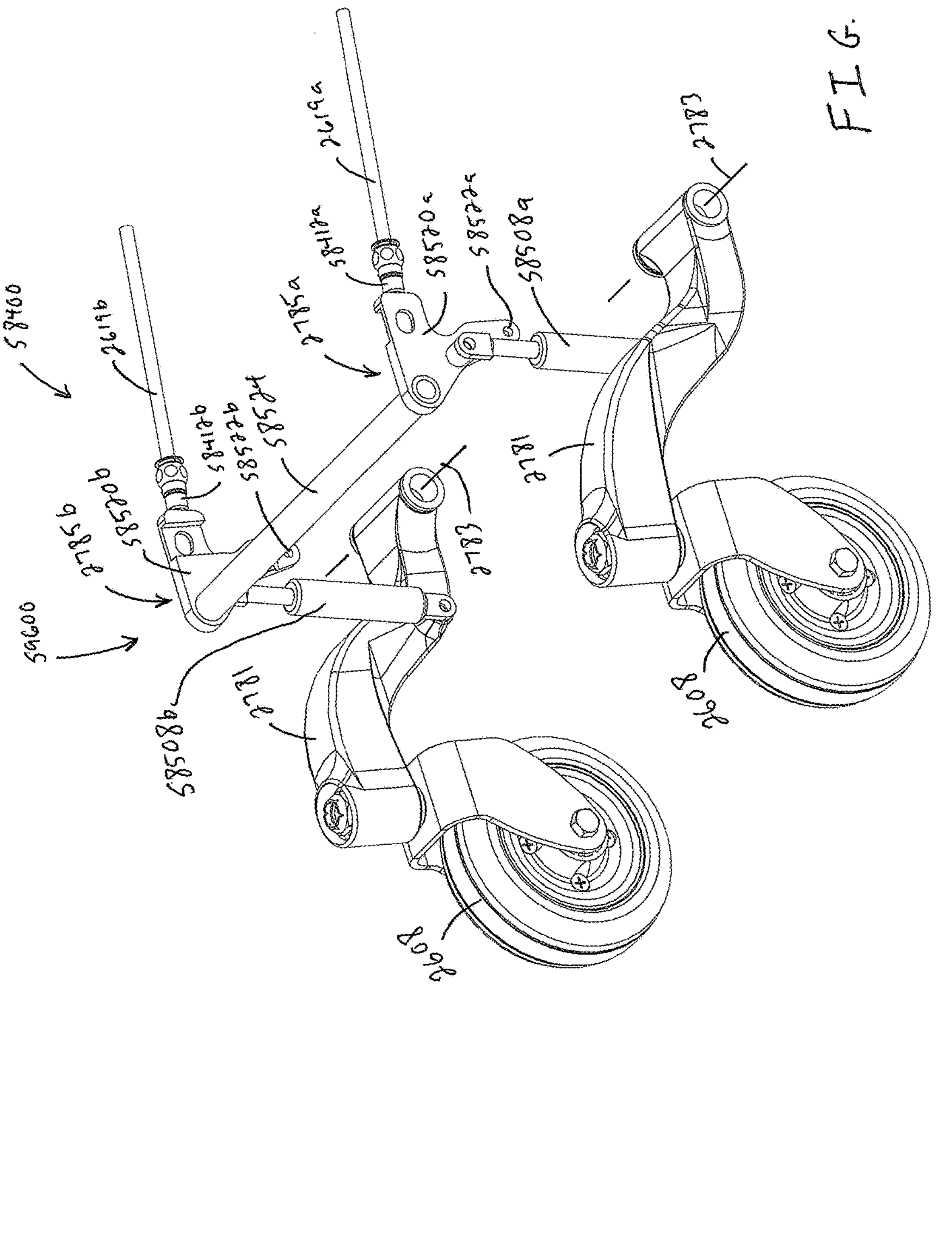
Figure 89A:
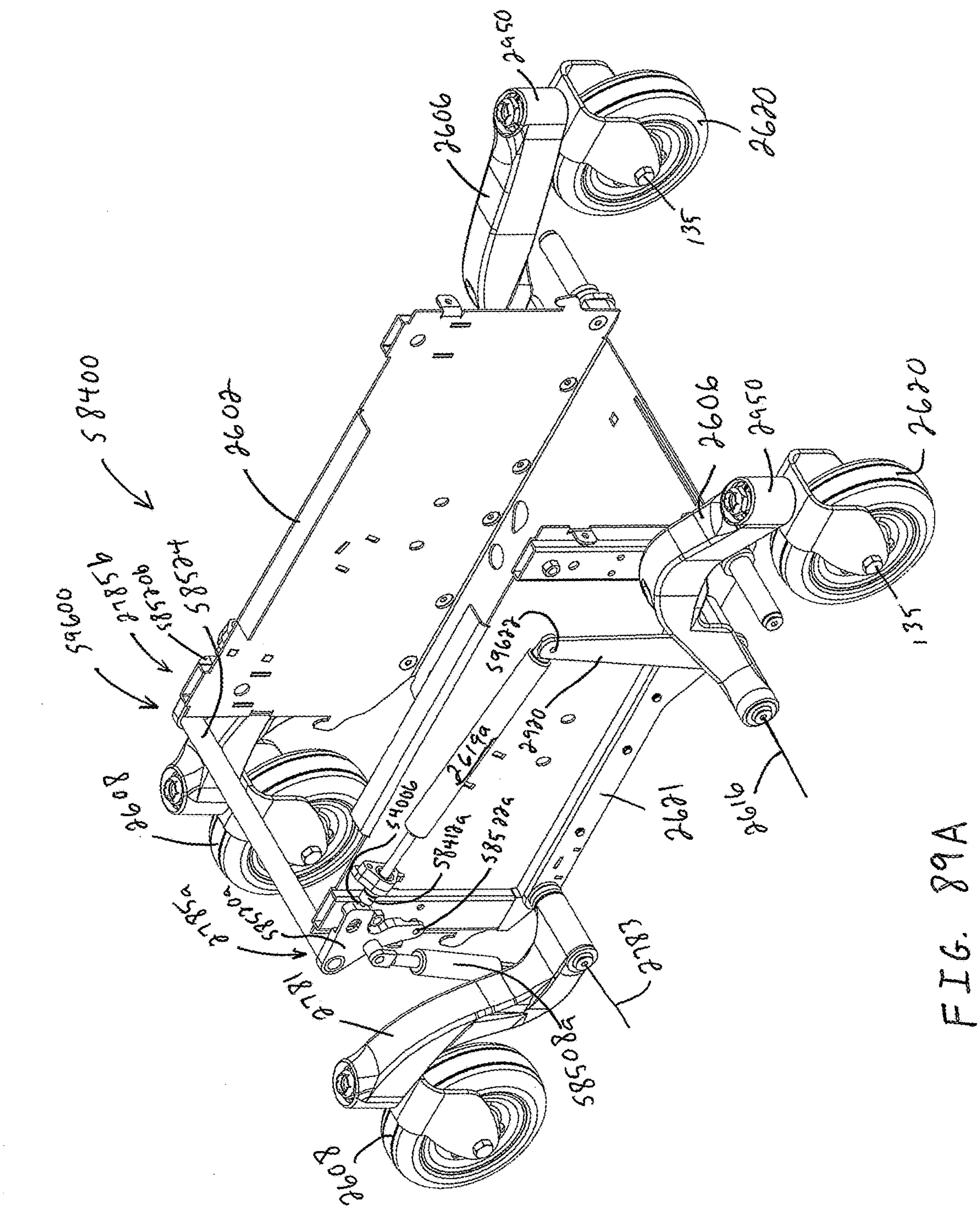
Figure 89B:
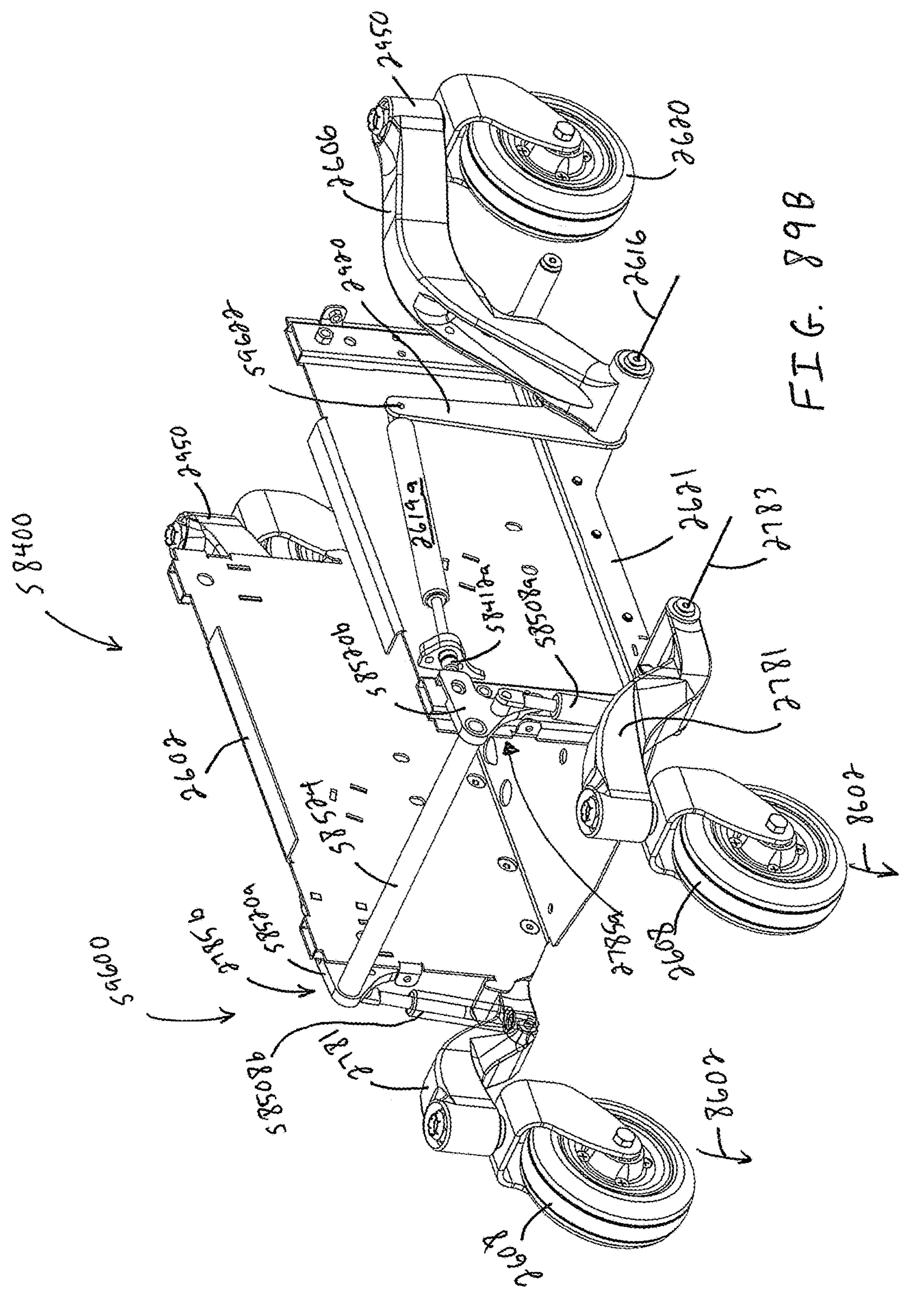
Figure 90A:
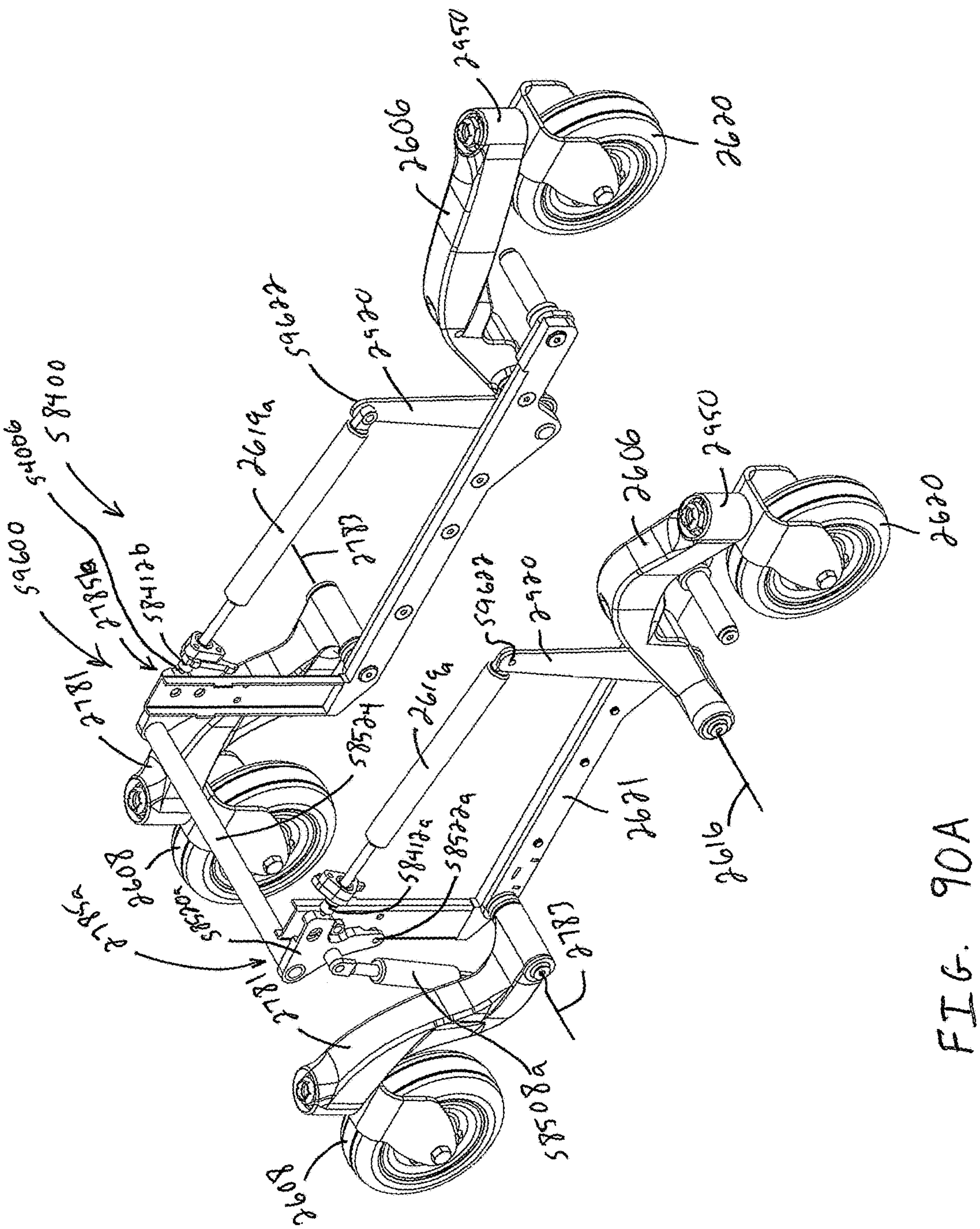
Figures 90B, 91:
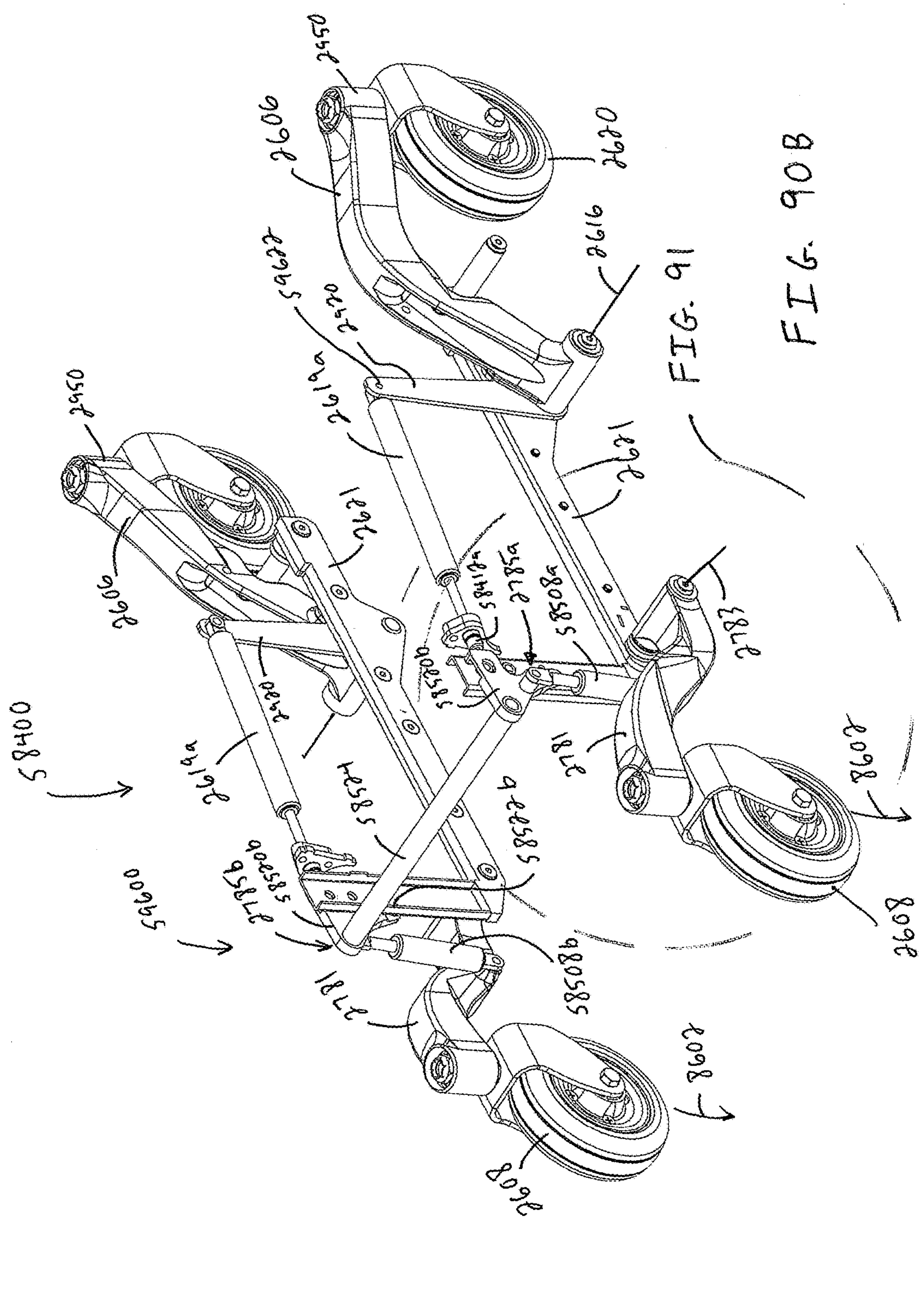
Figure 91:
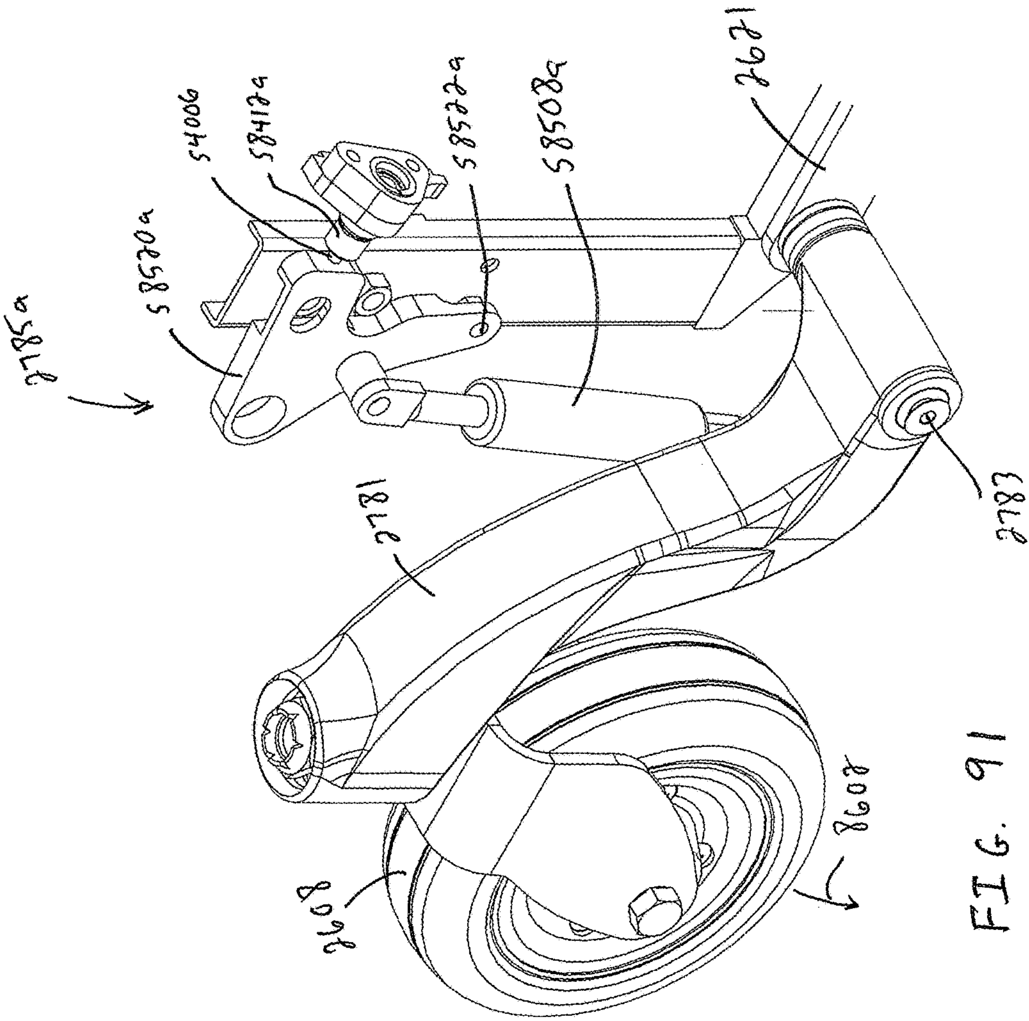
Figure 92A:
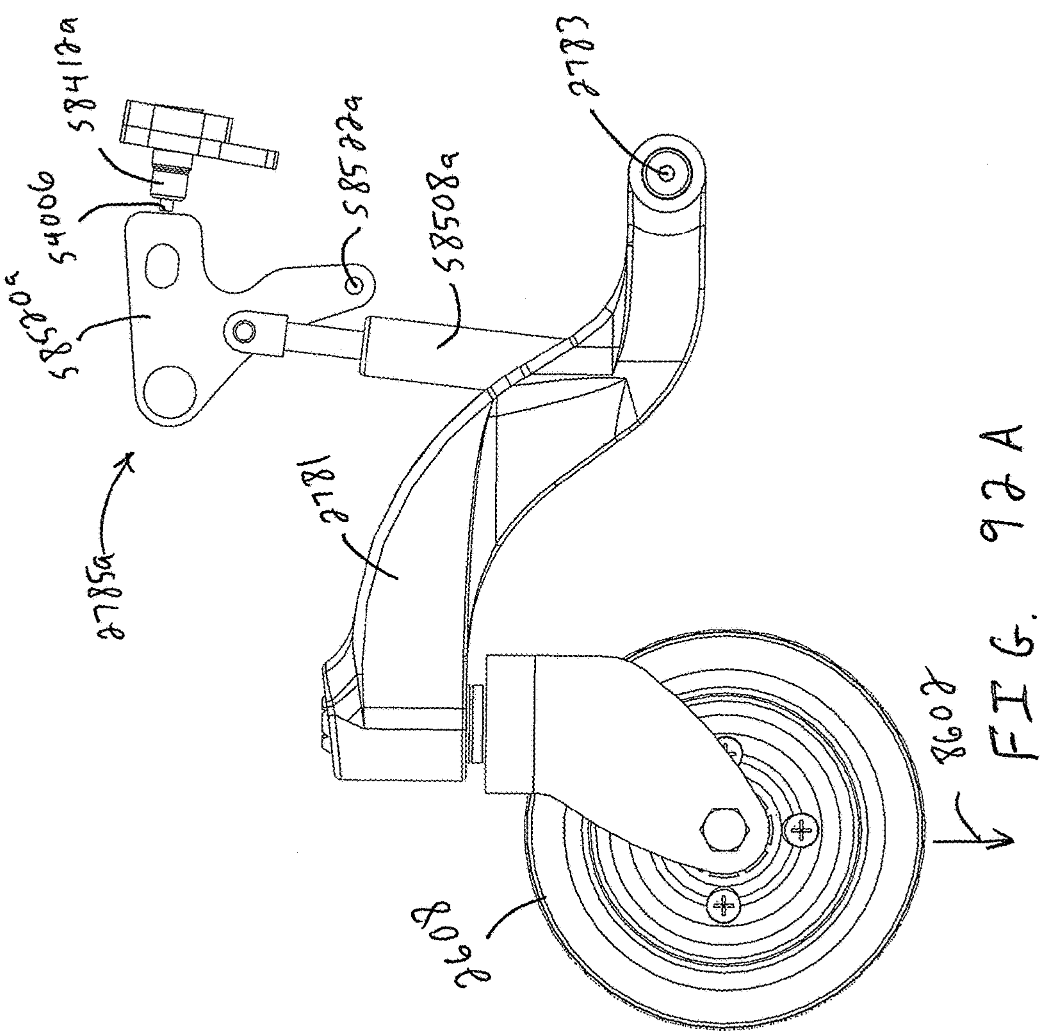
Figure 92B:
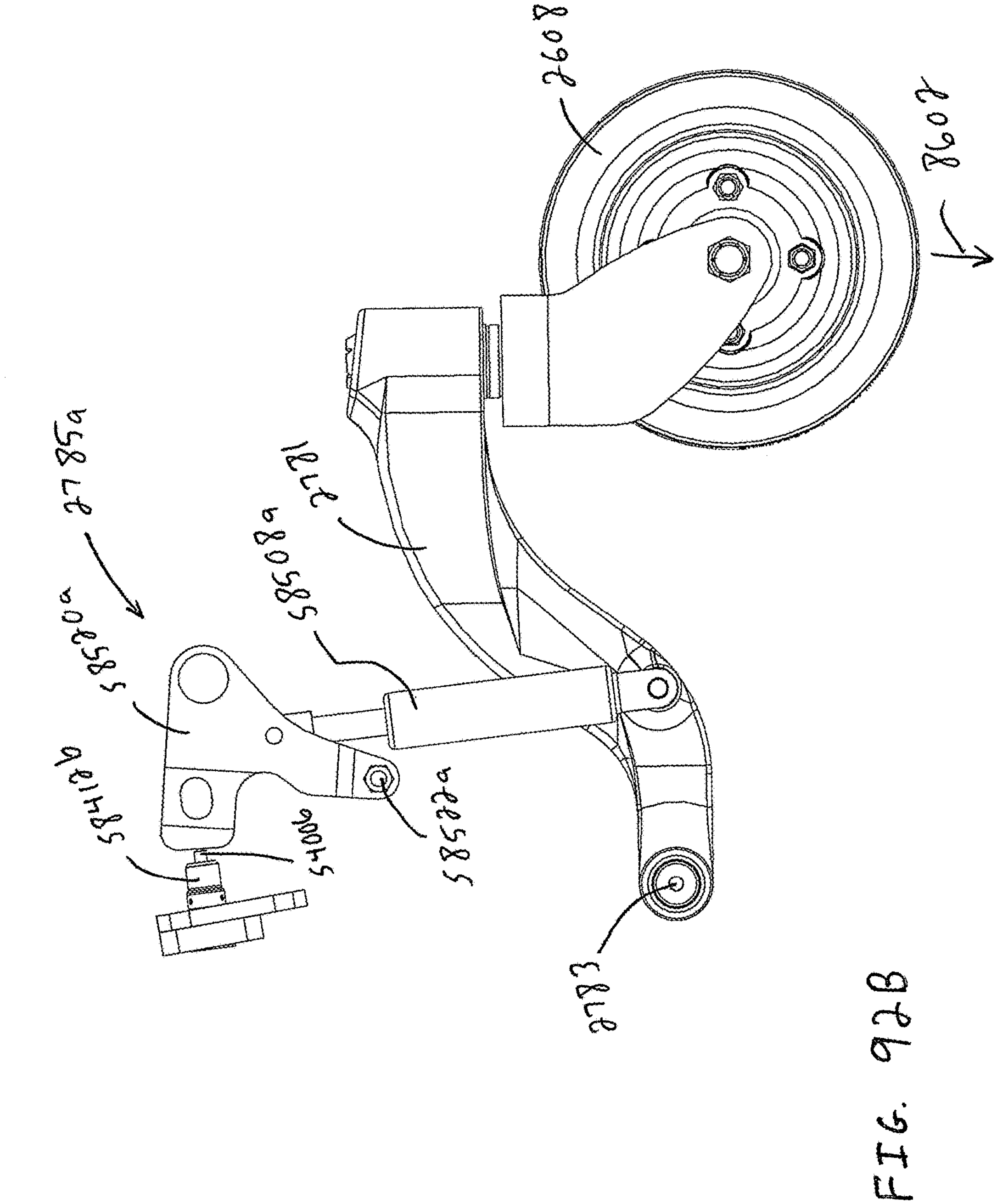
Figure 93:
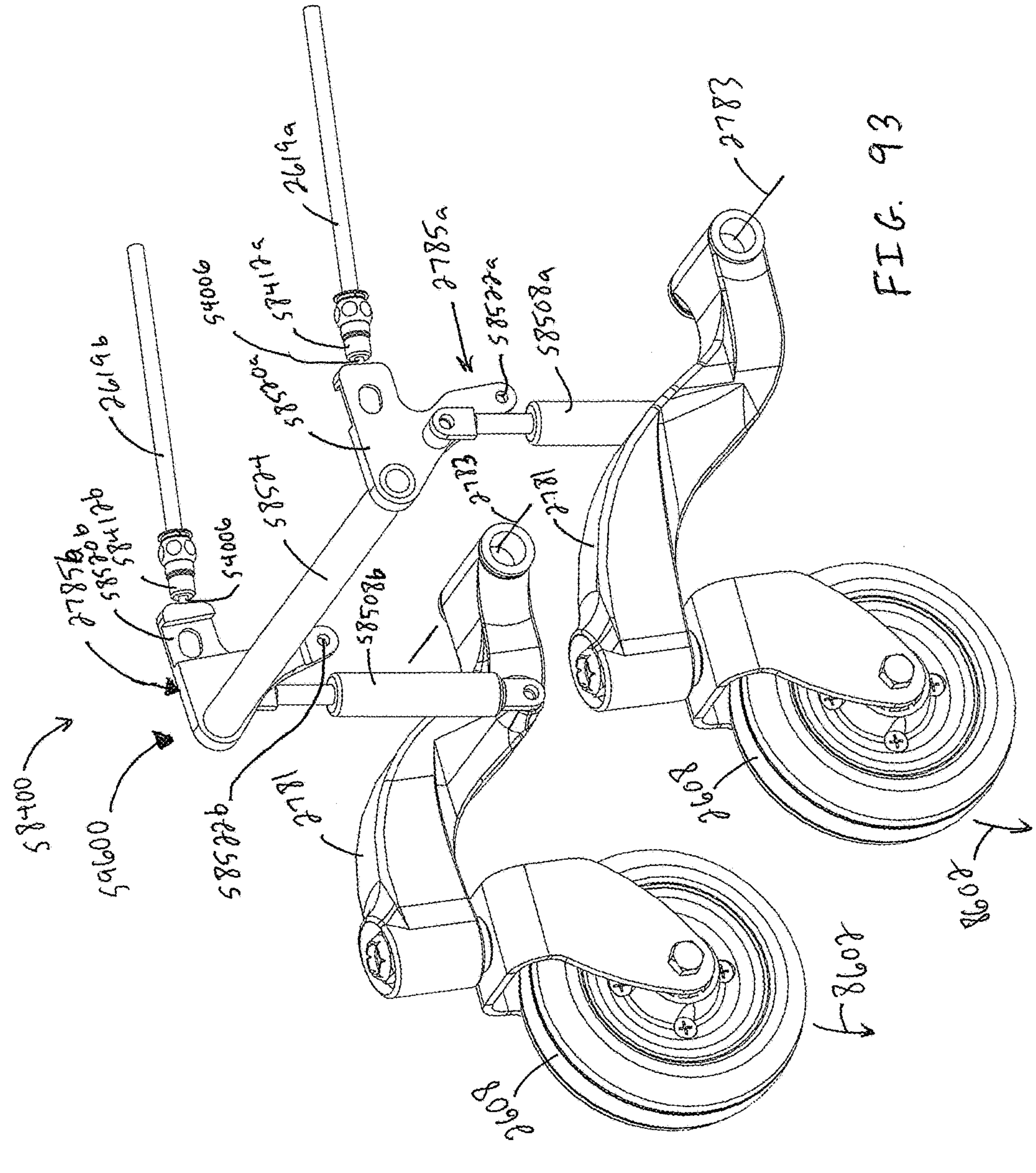

FIG. 84A is a perspective view of an exemplary embodiment of a wheelchair frame that includes a tip or stability control system in a first state;

FIG. 84B is another perspective view of the wheelchair frame that includes the tip or stability control system of FIG. 84A;

FIG. 85A is a perspective view of an exemplary embodiment of a tip or stability control system in a first state;

FIG. 85B is another perspective view of the tip or stability control system of FIG. 85A;

FIG. 86 is an enlarged perspective view as indicated by reference 86 in FIG. 85B;

FIG. 87A is a side view of an exemplary embodiment of a trigger arrangement of a tip or stability control system in a first state;

FIG. 87B is another side view of the trigger arrangement shown in FIG. 87A;

FIG. 88 is a perspective view of an exemplary embodiment of a trigger arrangement of a tip or stability control system in a first state;

FIG. 89A is a perspective view of an exemplary embodiment of a wheelchair frame that includes a tip or stability control system in a second state;

FIG. 89B is another perspective view of the wheelchair frame that includes the tip or stability control system of FIG. 89A;

FIG. 90A is a perspective view of an exemplary embodiment of a tip or stability control system in a second state;

FIG. 90B is another perspective view of the tip or stability control system of FIG. 90A;

FIG. 91 is an enlarged perspective view as indicated by reference 91 in FIG. 90B;

FIG. 92A is a side view of an exemplary embodiment of a trigger arrangement of a tip or stability control system in a second state;

FIG. 92B is another side view of the trigger arrangement shown in FIG. 92A; and FIG. 93 is a perspective view of an exemplary embodiment of a trigger arrangement of a tip or stability control system in a second state.

DETAILED DESCRIPTION

The present patent application specification and drawings provide multiple embodiments of wheelchairs, suspensions, and stability control systems that enhance the ability of the vehicle to traverse obstacles and/or improve the ride quality of the wheelchair. Any of the wheelchair suspensions disclosed herein can be used without a stability control system, with any of the stability control systems disclosed herein, or with other stability control systems. Any of the of the stability control systems disclosed herein can be used with any of the suspensions disclosed herein or with any other suspension. Further, any feature or combination of features from each of the embodiments may be used with features or combinations of features of other embodiments.

Suspensions

Figure 1:
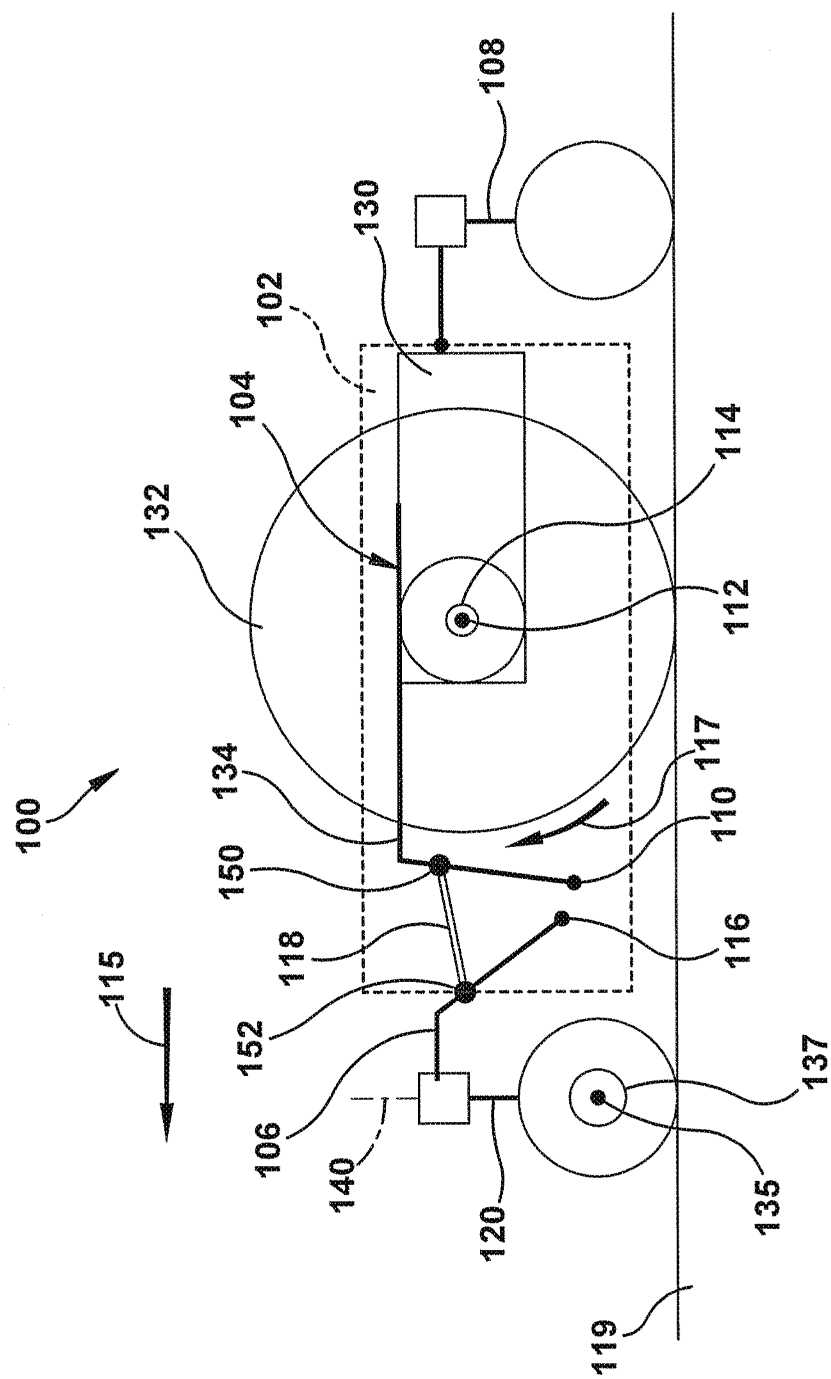
FIG. 1 is a side view of an embodiment of a wheelchair suspension.
Figure 2:
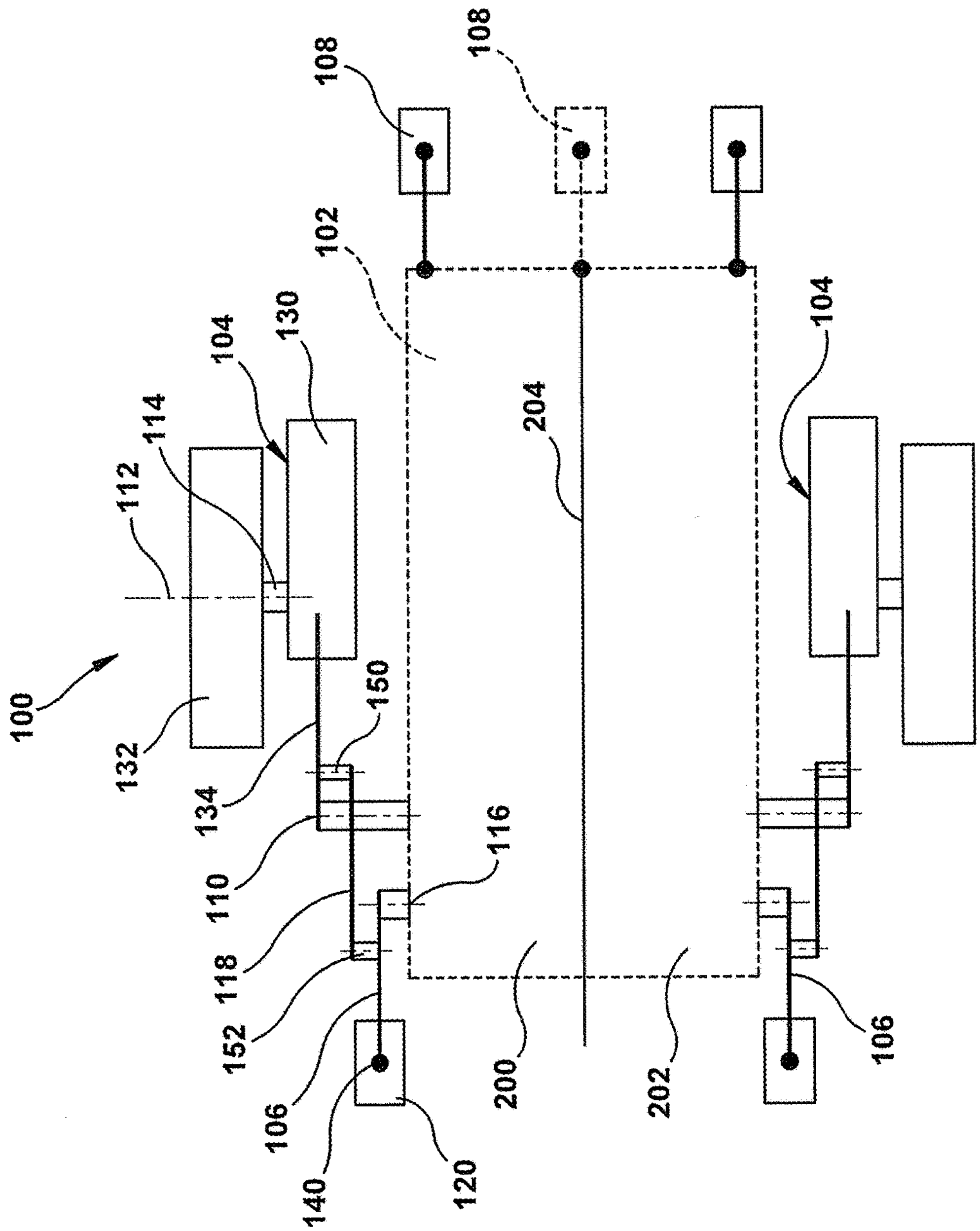
FIG. 2 is a top view of the wheelchair suspension shown in FIG. 1.

FIGS. 1 and 2 illustrate a first embodiment of a wheelchair suspension 100. The wheelchair suspension 100 includes a frame 102, a drive assembly 104, a front caster pivot arm 106, and a rear caster 108. In this application, the term "frame" refers to any component or combination of components that are configured for mounting of a drive assembly and a caster pivot arm. The drive assembly 104 is pivotally mounted to the frame 102 at a drive assembly pivot axis 110. The drive assembly pivot axis 110 can be positioned at a wide variety of different locations on the frame 102. For example, the pivot axis 110 can be positioned at any position on the frame, including but not limited to, any of the positions shown or described with respect to this embodiment or the following embodiments. In the embodiment illustrated by FIGS. 1 and 2, the drive assembly pivot axis 110 of the drive assembly 104 is below an axis of rotation 112 of a drive axle 114 of the drive assembly 104.

Figure 1A:
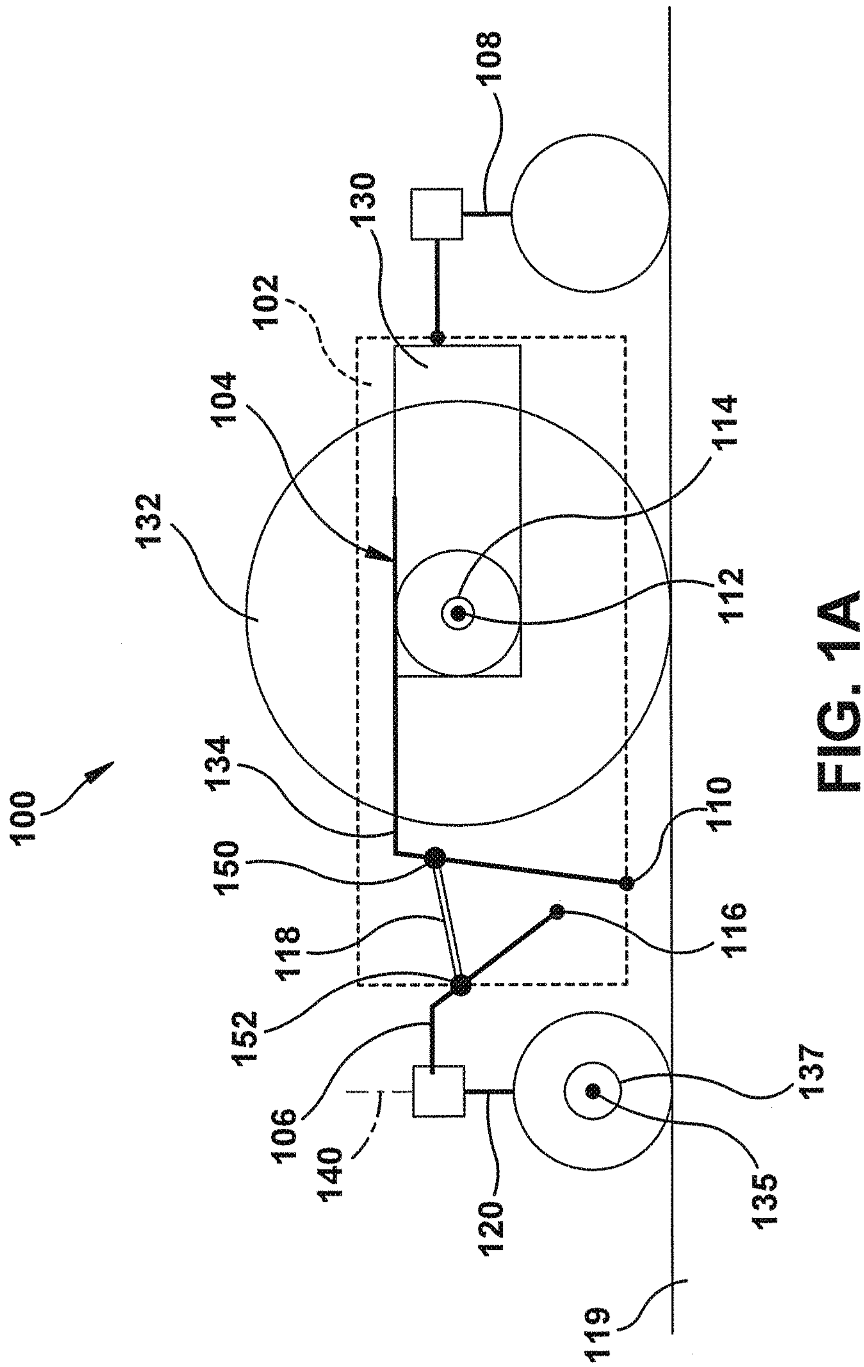
FIG. 1A is a side view of a second configuration of the wheelchair suspension of FIG. 1.

In the embodiment illustrated by FIGS. 1 and 2, each drive assembly 104 includes a motor drive 130, a drive wheel 132, and a pivot arm 134. The motor drive 130 may comprise a motor/gear box combination, a brushless, gearless motor, or any other known arrangement for driving the drive wheel 132. The motor drive 130 drives the drive wheel 132 about the axis of rotation 112. The pivot arm 134 may be a substantially rigid member that is connected to the motor drive 130. In one embodiment, the pivot arm 134 is flexible to provide inherent shock absorbing properties in the pivot arm. The pivot arm 134 may be made from a wide variety of materials, including, but not limited to, metals and plastics. The pivot arm 134 is pivotally coupled to the frame at the drive assembly pivot axis 110. In the embodiment illustrated by FIGS. 1 and 2, the pivot arm 134 extends forward and downward from the motor drive to the drive assembly pivot axis 110. In this application, the terms "above" and "below" refer to the relative positions of the components when all of the wheels of the suspension are on a flat, level surface. In FIG. 1, the pivot axis 110 of the drive assembly pivot arm 134 is below the drive wheel axis of rotation 112 and is above an axis 135 of an axle 137 that the front caster wheel rotates around. FIG. 1A illustrates another configuration where the pivot axis 110 of the drive assembly pivot arm 134 is below the drive wheel axis of rotation 112 and the axis 135 of the axle 137 that the front caster wheel rotates around.

Torque is applied by the drive assembly 104 to the drive wheel 132 to cause the wheelchair to accelerate or decelerate. If the pivot arm 134 were not pivotally connected to the frame 102, applying torque with the drive assembly 104 to the drive wheel 132 to accelerate the wheelchair in the direction indicated by arrow 115 would cause the pivot arm 134 to rotate upward, around the drive axis as indicated by arrow 117. The torque applied by the drive wheel(s) of the vehicle to accelerate the vehicle lifts the front wheel(s) of the vehicle off of the ground, if the torque is great enough. In the suspension 100 illustrated by FIGS. 1 and 2, the drive assembly 104 is pivotally connected to the frame 102 at the pivot axis. As a result, the torque applied by the drive assembly 104 to accelerate the wheelchair urges the drive assembly 104 to rotate with respect to the frame 102 about the pivot axis 110.

The front caster pivot arm 106 is pivotally mounted to the frame 102 at a pivot arm pivot axis 116. The pivot arm pivot axis 116 can be positioned at a wide variety of different locations on the frame 102. For example, the pivot arm pivot axis 116 can be positioned at any position on the frame, including but not limited to, any of the positions shown or described with respect to this embodiment or the following embodiments.

The front caster pivot arm 106 is coupled to the drive assembly 104. The front caster pivot arm 106 can be coupled to the drive assembly in a wide variety of different ways. For example, the front caster pivot arm 106 can be coupled to the drive assembly 104 in any manner that transfers motion of the drive assembly to the front caster pivot arm, including but not limited to, a fixed length link, a variable length link, a flexible link, a chain, a cord, a belt, a wire, a gear train, or any other known structure for transferring motion from one structure to another structure. In the embodiment illustrated by FIG. 1, a link 118 is pivotally connected to the drive assembly 104 and the front caster pivot arm 106. The link 118 transfers motion of the drive assembly 104 to the front caster pivot arm 106. That is, the relative movement of the drive assembly 104 with respect to the frame 102 causes relative movement of the front caster pivot arm 106 with respect to the frame.

A front caster 120 is coupled to the caster pivot arm 106. Torque applied by the drive assembly 104 urges the front caster pivot arm 106 and the front caster 120 upward with respect to a support surface 119. In one embodiment, the torque applied by the drive assembly 104 lifts the front caster 120 off the support surface 119. In another embodiment, the torque applied by the drive assembly 104 urges the front caster 120 upward, but does not lift the front caster 120 up off of the support surface. In this embodiment, when an obstacle is encountered, the front caster 120 engages the obstacle and the torque of the drive assembly urges the caster upward to assist the caster over the obstacle.

The rear caster 108 is coupled to the frame. Any number of rear casters may be included. For example, one caster 108 may be included (shown in phantom in FIG. 2) or two rear casters 108 may be included (shown in solid lines in FIG. 2). In the FIG. 1C embodiment, rear casters are omitted. The suspension illustrated by FIG. 1C may be included as part of a rear drive wheelchair. Rear casters may be omitted from any of the embodiments disclosed herein. The rear casters 108 may be coupled to the frame 102 in a wide variety of different ways. For example, the rear casters 108 may be rigidly fixed to the frame, the rear casters may be individually pivotally coupled to the frame, or the rear casters may be mounted to a transverse beam that is pivotally coupled to the frame.

In the embodiment illustrated by FIG. 2, one drive assembly 104 and one front caster pivot arm 106 are coupled to a first side 200 of the frame 102 and a second drive assembly 104 and a second front caster pivot arm are coupled to a second side 202 of the frame. The first side 200 includes any portion of the frame 102 that is above line 204 in FIG. 2. The second side 202 includes any portion of the frame 102 that is below line 204 in FIG. 2 Only one of the drive assembly and front caster pivot arm arrangements is described in detail, since the drive assembly and pivot arm arrangements may be mirror images of one another in the FIG. 2 embodiment. In another embodiment, two different types of drive assemblies and front caster pivot arm arrangements may be on the sides of the frame.

The front caster 120 is coupled to the front caster pivot arm 106, such that the front caster can rotate about an axis 140. In one embodiment, a biasing member, such as a spring (not shown) may optionally be coupled between the frame and the front caster pivot arm and/or the frame and the drive assembly to bias the front caster into engagement with the support surface 119. The front caster pivot arm 106 may be a substantially rigid member. In one embodiment, the front caster pivot arm 106 is flexible to provide inherent shock absorbing properties in the front caster pivot arm. The pivot arm 106 may be made from a wide variety of materials, including, but not limited to, metals and plastics. The front caster pivot arm 106 is pivotally mounted to the frame 102 at the pivot axis 116. The pivot axis 116 of the front caster pivot arm is forward of the drive assembly pivot axis 110 and may be below the axis of rotation 112 of the drive wheel in the embodiments illustrated by FIGS. 1 and 1A.

In the embodiment illustrated by FIGS. 1 and 2, the link 118 is connected to the drive assembly pivot arm 134 at a pivotal connection 150. The link 118 is connected to the front caster pivot arm 106 at a pivotal connection 152. The link 118 can take a wide variety of different forms. For example, the link may be rigid, flexible, or extendible in length. Any link 118 that transfers at least some portion of motion in at least one direction of the drive assembly 104 to the front caster pivot arm can be used.

Figure 1B:
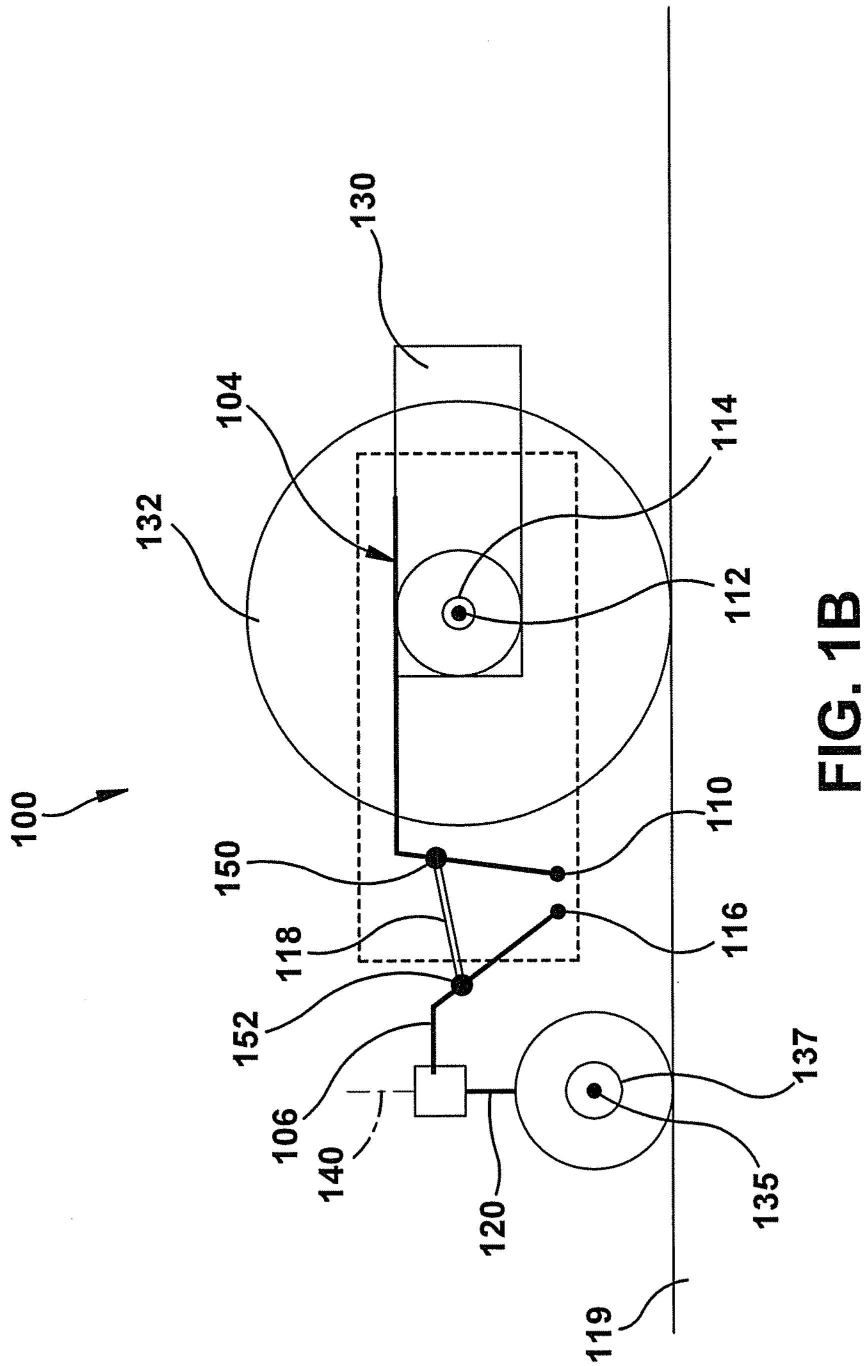
FIG. 1B is a side view of a rear drive configuration of the wheelchair suspension of FIG. 1.
Figure 1C:
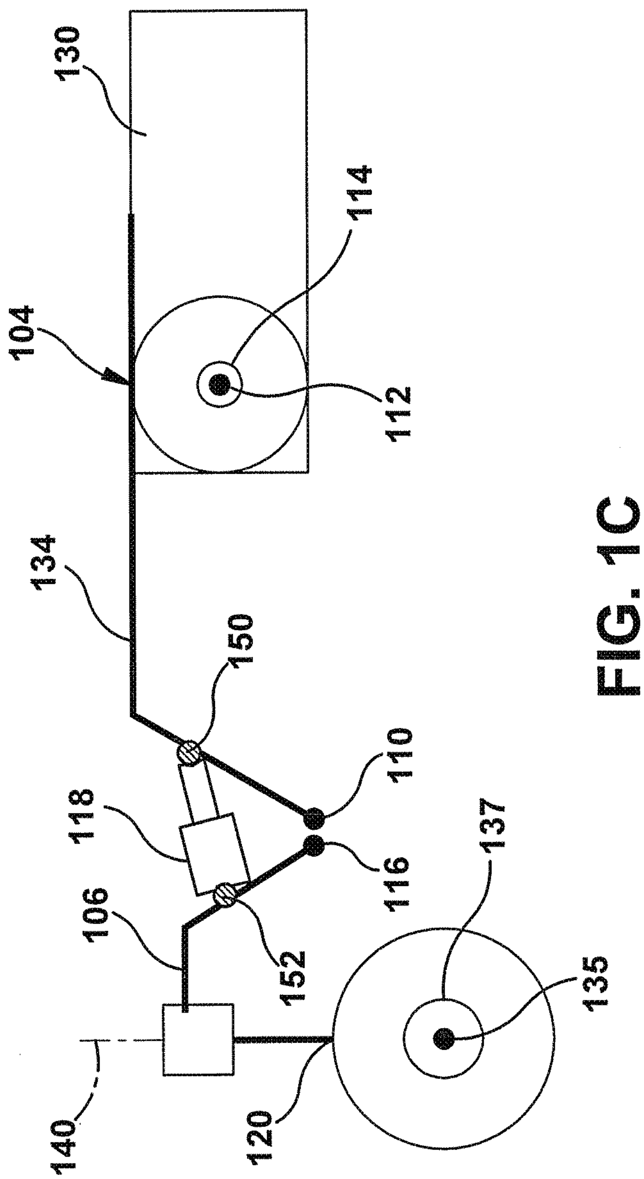
FIG. 1C illustrates components of a wheelchair suspension coupled by one embodiment of a shock absorber or resilient shock absorbing device.
Figure 1D:
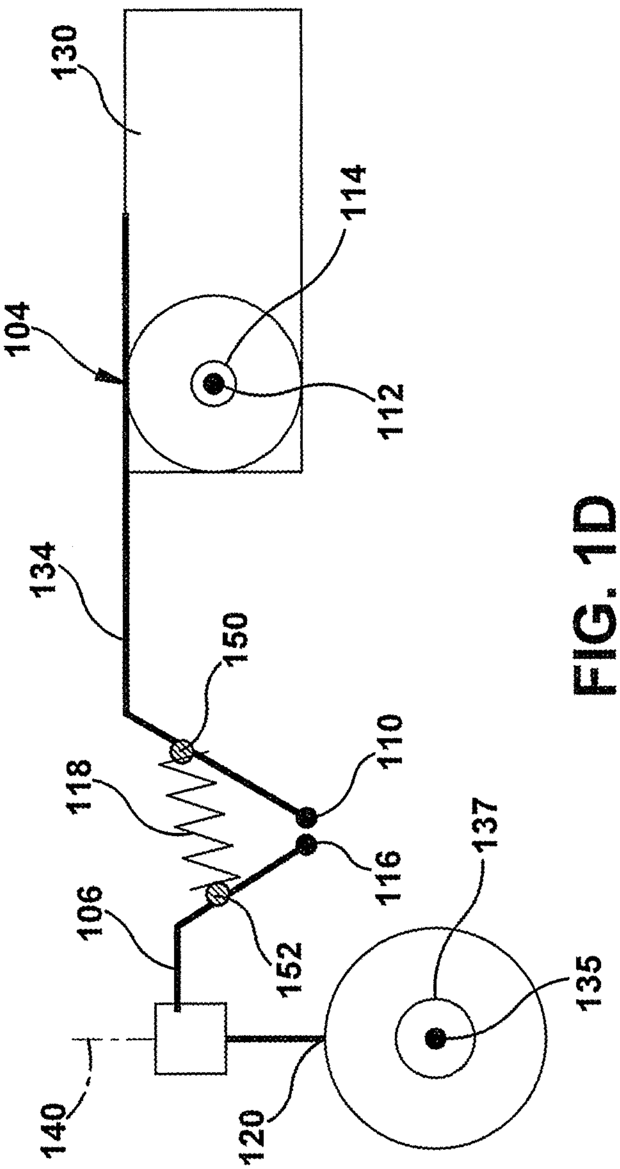
FIG. 1D illustrates components of a wheelchair suspension coupled by one embodiment of a spring or spring-type resilient device.
Figure 1E:
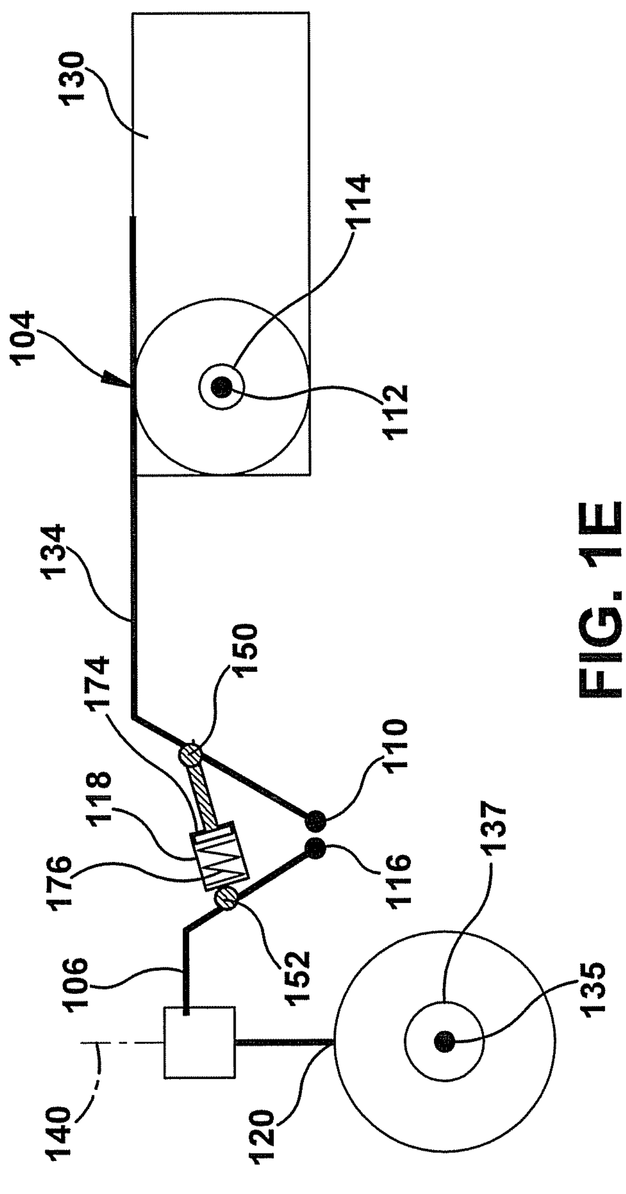
FIG. 1E illustrates components of a wheelchair suspension coupled by one embodiment of a shock absorber with a spring return.

FIGS. 1C, 1D, and 1E illustrate examples of variable length links. These and other variable length links can also be used in the embodiments illustrated by FIGS. 1, 1A and 1B and/or any of the embodiments described below. In FIG. 1C, the link 118 is a shock absorber. Any shock absorbing member or assembly can be used. The shock absorber damps relative motion between the front caster pivot arm 106 and the drive assembly pivot arm 134. An example of one acceptable shock absorber is an all terrain bicycle shock absorber available from the Rock Shox division of SRAM Corporation. In FIG. 1D, the link 118 is a spring. Any spring device or assembly can be used. The spring 172 may urge the front caster pivot arm 106 and the drive assembly pivot arm 134 apart, may urge the front caster pivot arm 106 and the drive assembly together or the spring may be a bidirectional spring. A bidirectional spring would bias the pivotal connections 150 and 152 to a predetermined spacing. In FIG. 1E, the link 118 comprises a shock absorber 174 with a spring return 176. The shock absorber 174 damps relative motion between the front caster pivot arm 106 and the drive assembly pivot arm 134. The spring return 176 may urge the front caster pivot arm 106 and the drive assembly pivot arm 134 apart, may urge the front caster pivot arm 106 and the drive assembly together or the spring may be a bidirectional spring. An example of one acceptable shock absorber with a spring return is a Rock Shox MCR mountain bike shock.

Figure 3A:
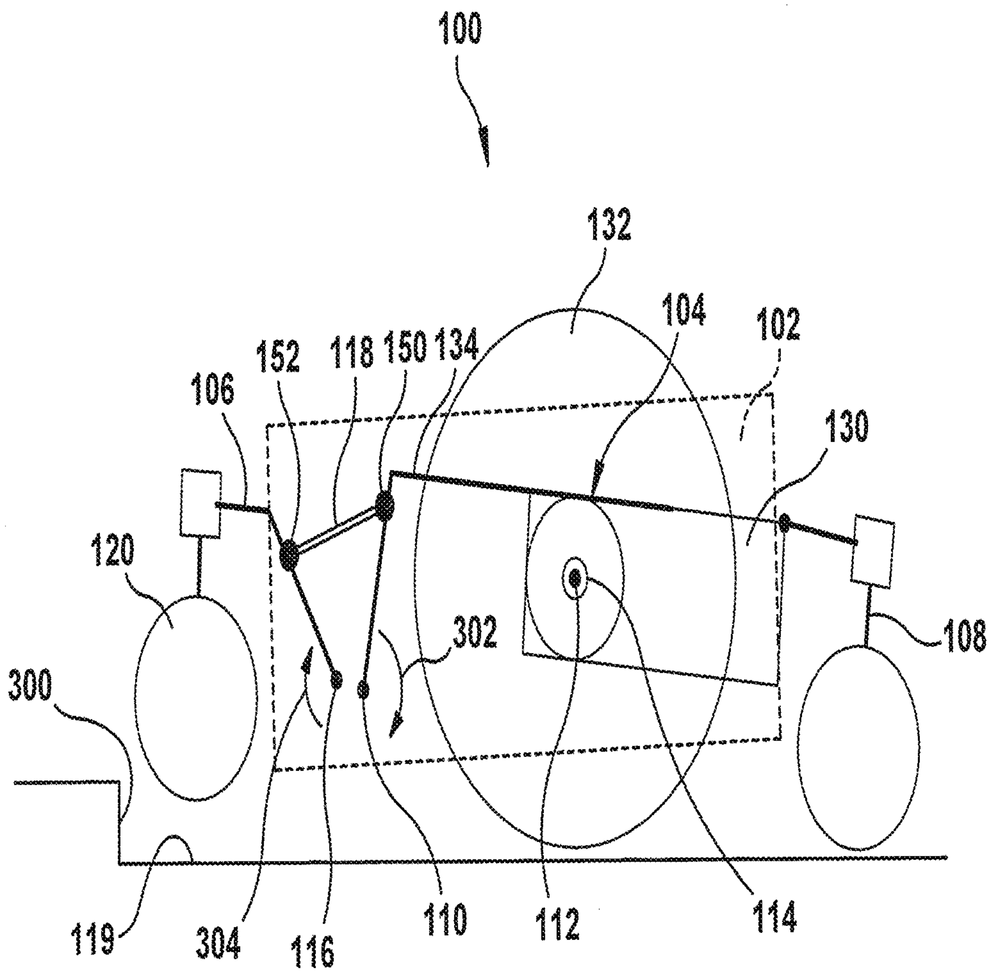
FIGS. 3A and 4A are side views of the wheelchair suspension of FIG. 1 traversing a raised obstacle.

FIG. 3A is an elevational view of the suspension 100 traversing over an obstacle 300 by ascending the obstacle. This operating condition may be accomplished by accelerating the drive wheels 132 in the forward direction as described above. In this scenario, the moment arm generated by drive wheel 132 around the pivot axis 110 in the direction indicated by arrow 302 may be greater than the sum of all moment arms around pivot axis 110 in the opposite direction. When this occurs, the drive assembly 104 to pivots as indicated by arrow 302 around pivot axis 110 with respect to the frame 102. The drive assembly pivot arm 134 pulls the link 118, which causes the front caster pivot arm 106 to pivot as indicated by arrow 304 around pivot axis 116. This causes front caster 120 to rise above obstacle 300 or urge the front caster upward to assist the front caster over the obstacle 300.

Figure 3B:
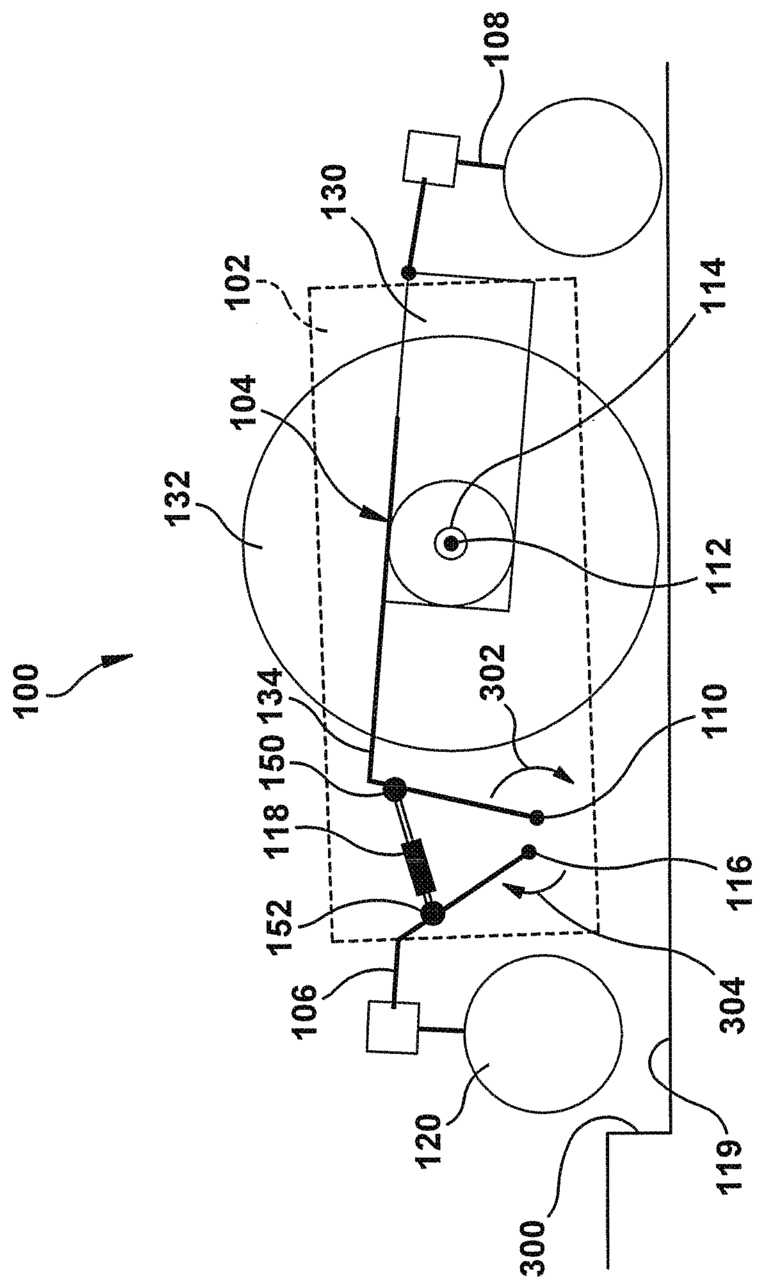
FIGS. 3B and 4B are side views of a wheelchair suspension having a variable length motion transfer member during traversal of a raised obstacle.
Figure 3C:
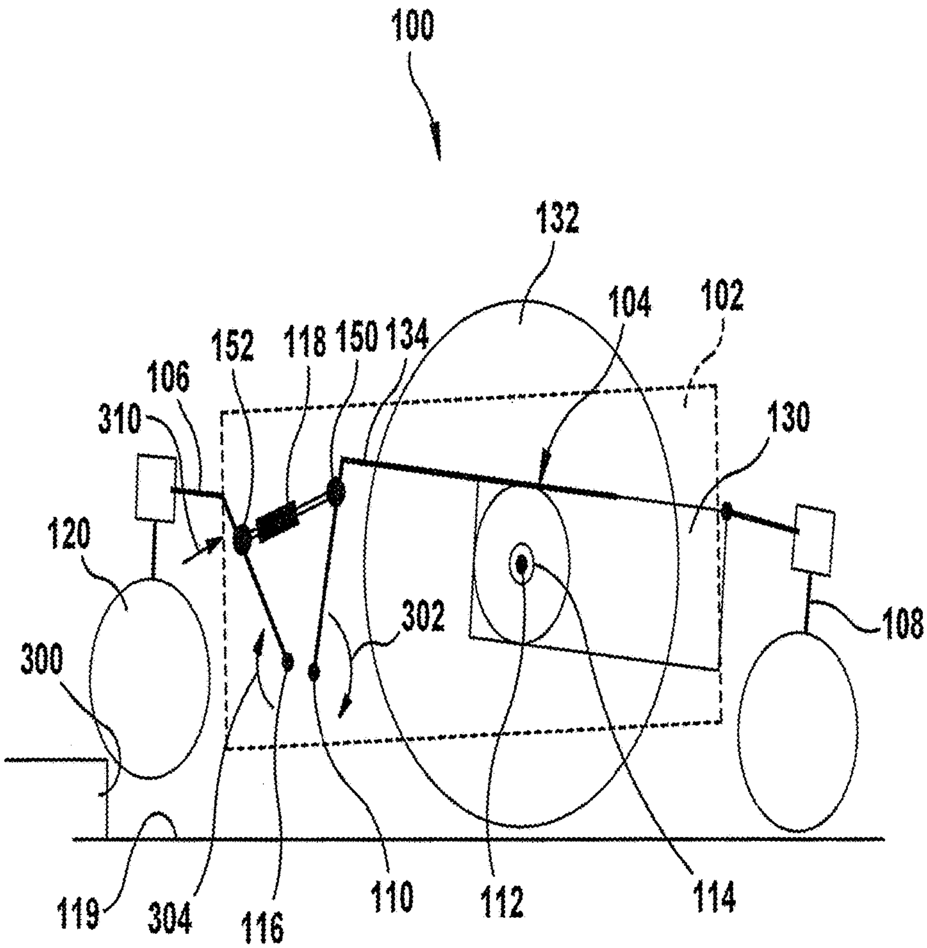
FIGS. 3C and 4C are side views of a wheelchair suspension having a variable length motion transfer member during traversal of a raised obstacle.

FIGS. 3B and 3C illustrate an embodiment of the suspension 100 traversing over the obstacle 300, where the link 118 is a variable length link, such as a spring, a shock absorber, or a shock absorber with a spring return. In this embodiment, the drive assembly pivot arm 134 pulls the link 118 to extend the link to its maximum length or a length where the front caster pivot arm 106 begins to pivot. Once extended, the link 118 pulls the front caster pivot arm 106 to pivot as indicated by arrow 304 around pivot axis 116. This causes front caster 120 to rise above obstacle 300 or urges the front caster upward to assist the front caster over the obstacle 300. Referring to FIG. 3C, when the front caster 120 engages the obstacle 300, the front caster pivot arm 106 pivots as indicated by arrow 310 and the link 118 compresses to absorb shock or energy that results from the impact between the front caster and the obstacle.

Figure 4A:
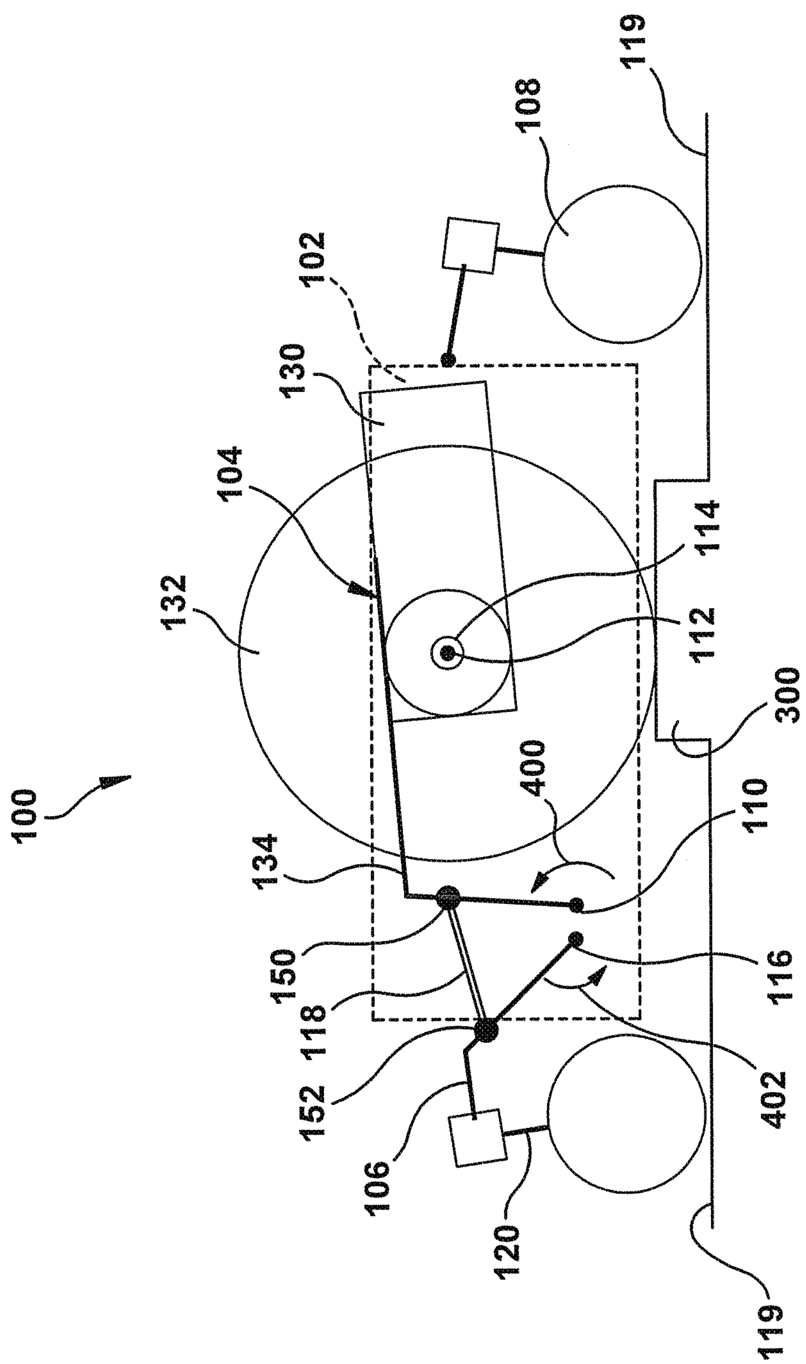

Illustrated in FIG. 4A is a side elevational view of the suspension 100 with the drive wheel 132 traversing the obstacle 300. When the drive wheel 132 comes into contact with the obstacle 300, drive assembly 104 pivots in the direction indicated by arrow 400 around pivot axis 110. The rotation of the drive assembly 104 is translated to the front caster pivot arm 106 to lower the caster 120 down onto the lower support surface elevation. When the link 118 is a rigid member, the drive assembly 104 and the front caster pivot arm 106 act in unison. One or more springs (not shown) may optionally be coupled to the drive assembly 104 and/or the front caster pivot arm 106 to urge the front caster pivot arm 106 to rotate about pivot axis 116 in the direction indicated by arrow 402.

Figure 4B:
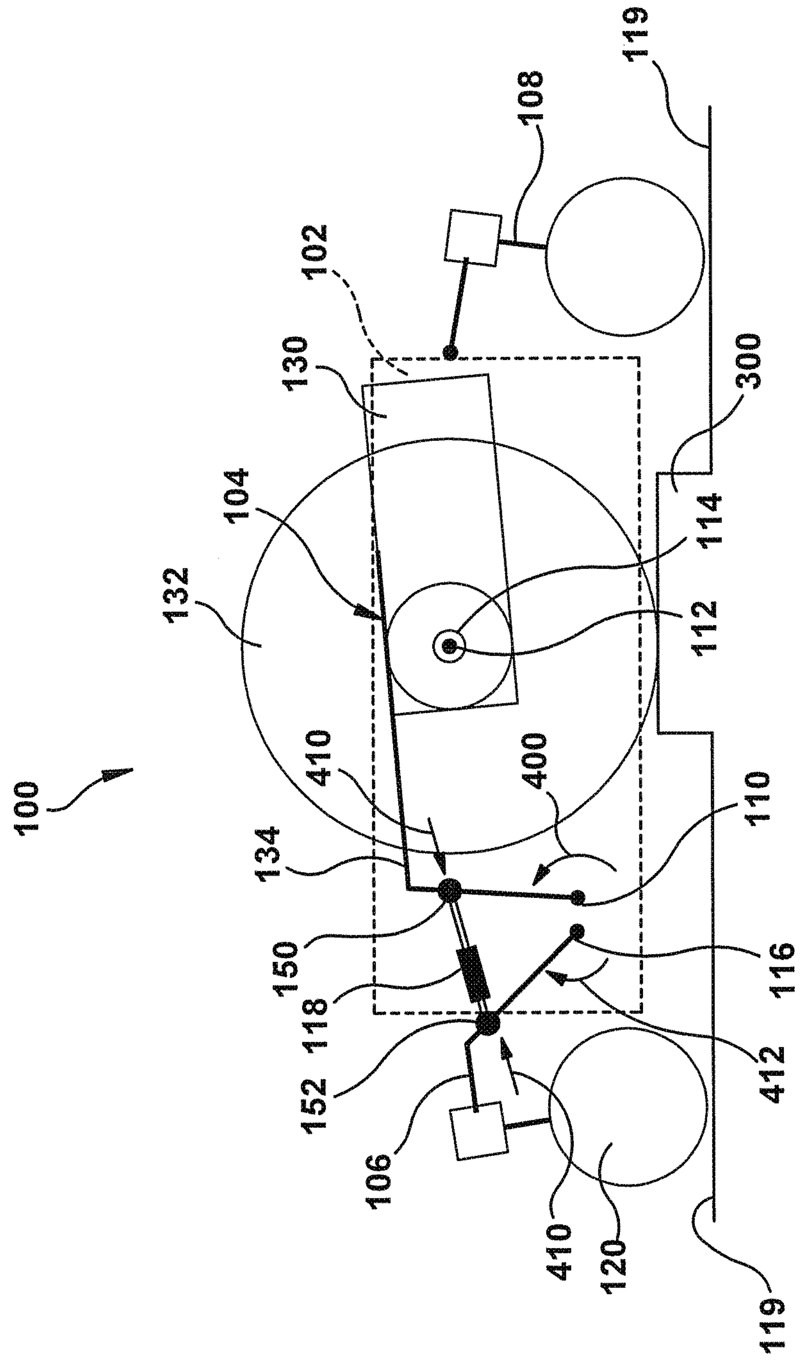

FIG. 4B illustrates an embodiment of the suspension 100 with the drive wheel 132 traversing over the obstacle 300, where the link 118 is a variable length link. When the drive wheel 132 comes into contact with obstacle 300, the drive assembly 104 pivots in the direction indicated by arrow 400 around pivot axis 110 to soften the impact from obstacle 300 that is transferred to the frame 102. During such pivotal movement of the drive assembly 104, the link 118 compresses as indicated by arrows 410 to allow pivoting of the drive assembly 104 with respect to the front caster pivot arm. Compressing of the link 118 absorbs shock that results from the impact between the drive wheel 132 and the obstacle 300. When the front caster 120 comes into contact with the support surface 119, the pivot arm 106 pivots in the direction indicated by arrow 412 around pivot axis 116 to soften the impact support surface 119 that is transferred to the frame 102. During such pivotal movement of the pivot arm 106, the link 118 compresses to allow pivoting of the front caster pivot arm 106 with respect to the drive assembly. Compressing of the link 118 absorbs shock that results from the impact between the front caster 120 and the obstacle 300.

Figure 4C:
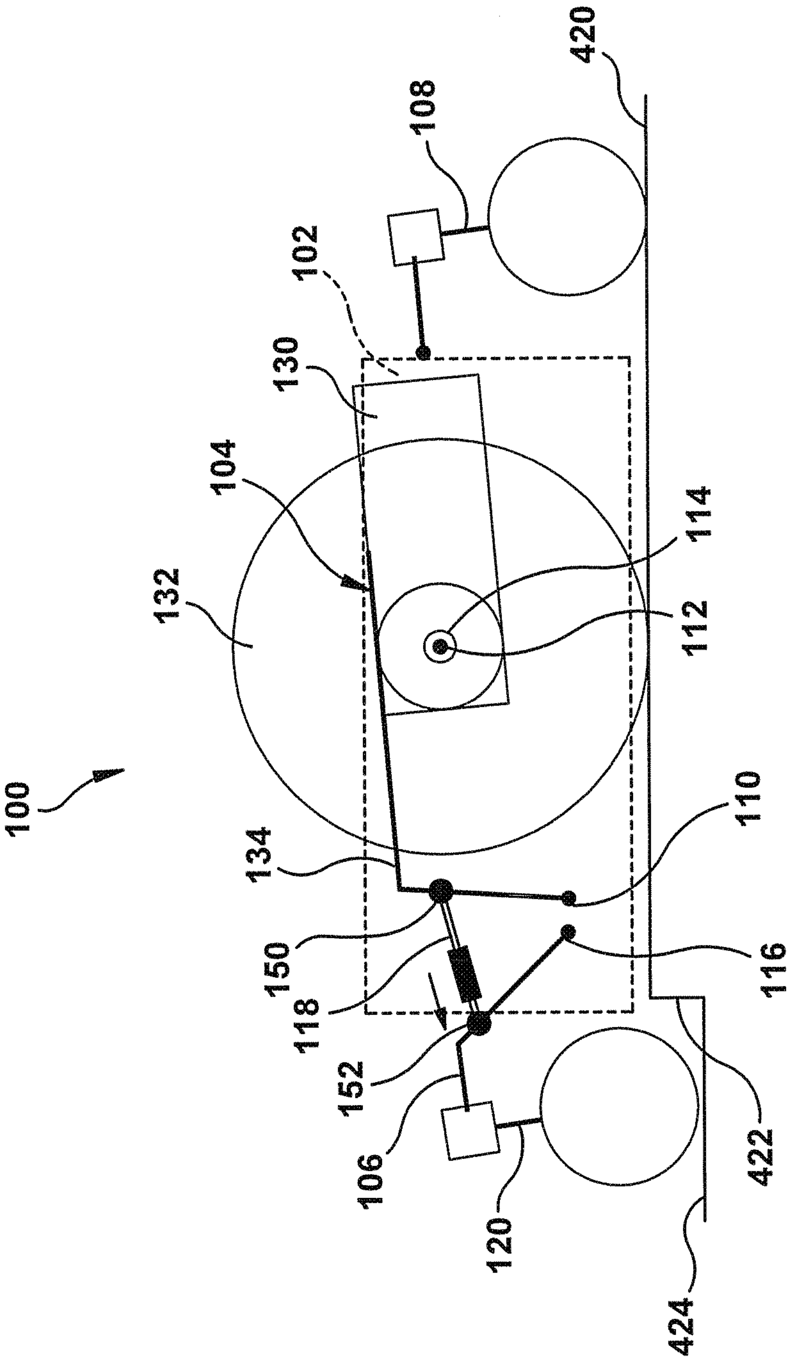

FIG. 4C illustrates an embodiment of the suspension 100 with the drive wheel 132 descending from an elevated surface 420 with a step 422 to a lower surface 424, where the link 118 is a variable length link. When the front caster 120 reaches the step 422, the front caster 422 and the front caster pivot arm 106 begin to move downward. The weight of the front caster pivot arm 106 and front caster 120, in combination with any weight supported by the front caster 120, pulls the link 118 to extend the link to its maximum length or until the front caster 120 engages the lower surface 424. By allowing the front caster 120 to drop down and engage the lower surface 424 before the drive wheel reaches the step, the front caster 120 and the link 118 can absorb shock that results from the drive wheel 132 moving from the upper surface 420 to the lower surface 424.

Figure 5:
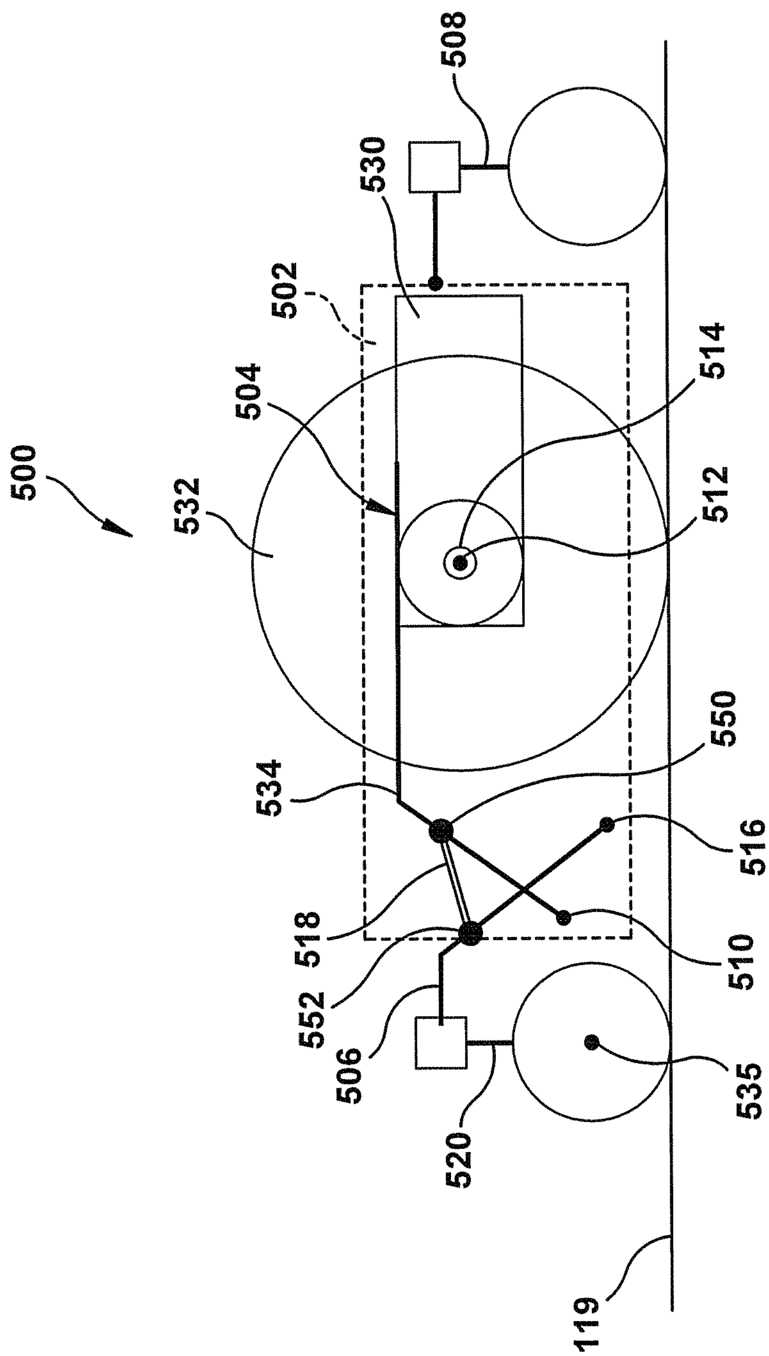
FIG. 5 is a side view of another embodiment of a wheelchair suspension.
Figure 6:
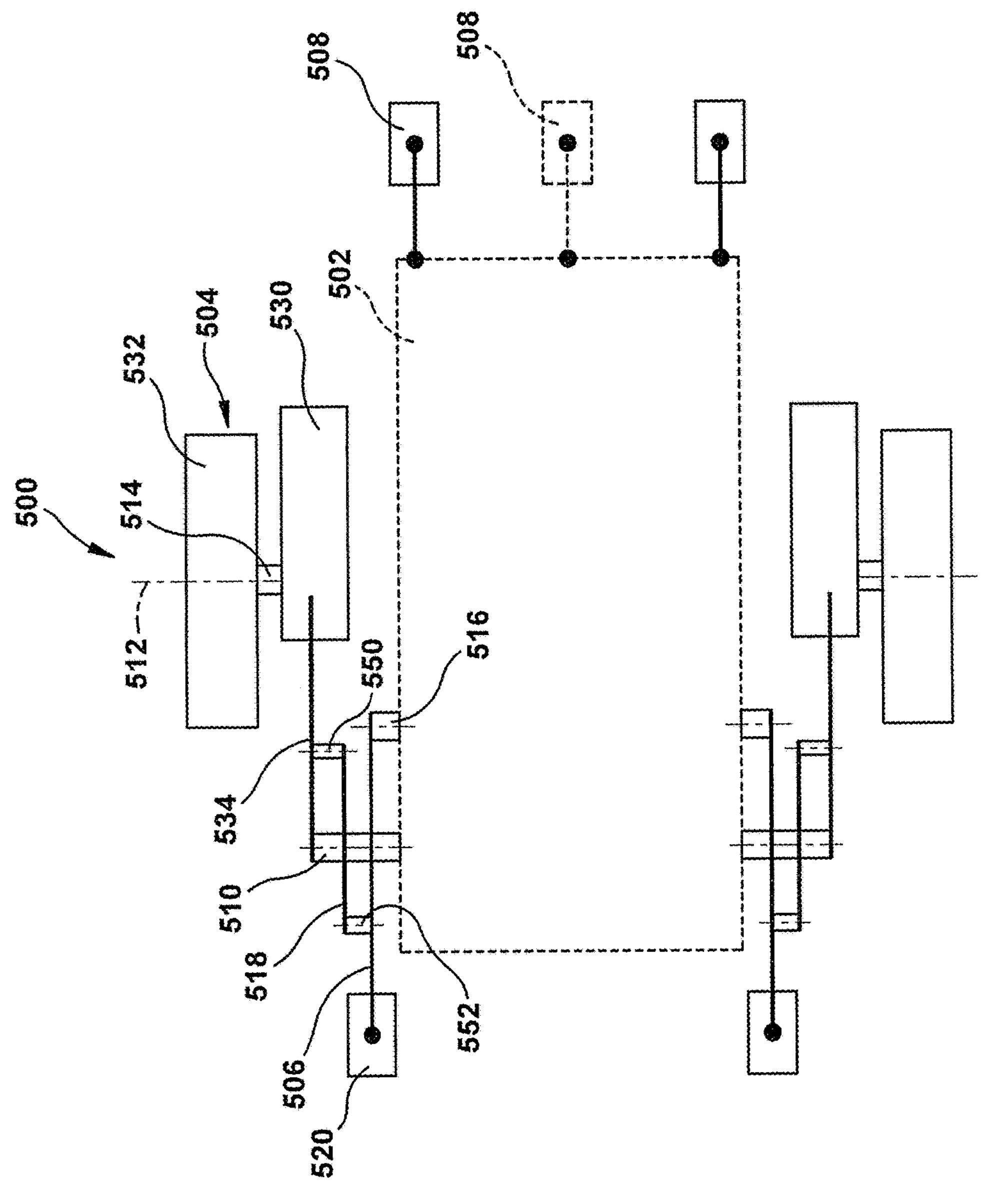
FIG. 6 is a top view of the embodiment of the wheelchair suspension shown in FIG. 5.

FIGS. 5 and 6 illustrate another wheelchair suspension embodiment 500. The wheelchair suspension 500 includes a frame 502, a drive assembly 504, a front caster pivot arm 506, and a rear caster 508. The drive assembly 504 is pivotally mounted to the frame 502 at a drive assembly pivot axis 510. In the embodiment illustrated by FIGS. 5 and 6, the drive assembly pivot axis 510 of the drive assembly 504 is below an axis of rotation 512 of a drive axle 514 of the drive assembly 504 and is in front of a pivot axis 116 of the front caster pivot arm 506. As such, a drive assembly pivot arm 534 and the front caster pivot arm 506 are in a crossed configuration when viewed from the side as shown in FIG. 5. The front caster pivot arm 506 and the drive assembly pivot arm 534 may be laterally offset as shown in FIG. 6, or may be bent to accommodate the crossed configuration. By arranging the front caster pivot arm 506 and the drive assembly pivot arm 534 in the crossed configuration, the length of the front caster pivot arm 506 and/or the drive assembly pivot arm 534 can be increased as compared to a suspension where the front caster pivot arm and the drive assembly pivot arm do not cross.

The front caster pivot arm 506 is coupled to the drive assembly 504. The front caster pivot arm 506 and the drive assembly 504 can be coupled in any manner that transfers at least a portion of the motion of the drive assembly in at least one direction to the front caster pivot arm. In the embodiment illustrated by FIG. 5, a link 518 is pivotally connected to the drive assembly 504 and the front caster pivot arm 506. The link 518 transfers motion of the drive assembly 504 to the front caster pivot arm. A front caster 520 is coupled to the caster pivot arm 506. Torque applied by the drive assembly 504 urges the front caster pivot arm 506 and the front caster 520 upward with respect to a support surface 119.

In the embodiment illustrated by FIGS. 5 and 6, each drive assembly 504 includes a motor drive 530, a drive wheel 532, and the pivot arm 534. The motor drive 530 drives the drive wheel 532 about the axis of rotation 512. In the embodiment illustrated by FIGS. 5 and 6, the pivot arm 534 extends forward and downward from the motor drive to the drive assembly pivot axis 510. In the configuration shown in FIG. 5, the drive assembly pivot axis 510 is below the drive wheel axis of rotation 512 and below an axis of rotation 535 of a wheel of the front caster 520.

In one embodiment, a biasing member, such as a spring (not shown) may optionally be coupled between the frame and the front caster pivot arm or the frame and the drive assembly to bias the front caster into engagement with the support surface 119. The front caster pivot arm 506 may be a substantially rigid member. In one embodiment, the front caster pivot arm 506 is flexible to provide inherent shock absorbing properties in the front caster pivot arm. The pivot arm 506 may be made from a wide variety of materials, including, but not limited to, metals and plastics. The front caster pivot arm 506 is pivotally mounted to the frame 502 at the pivot axis 516. The pivot axis 516 of the front caster pivot arm is rearward of the drive assembly pivot axis 510 and below the axis of rotation 512 of the drive wheel and below the axis of rotation 535 of the wheel of the front caster 520 in the embodiment illustrated by FIGS. 5 and 6.

In the embodiment illustrated by FIGS. 5 and 6, the link 518 is connected to the drive assembly pivot arm 534 at a pivotal connection 550. The link 518 is connected to the front caster pivot arm 506 at a pivotal connection 552. The link 518 can take a wide variety of different forms. For example, the link may be rigid, flexible, or extendible in length. Any link 518 that transfers at least some portion of motion in at least one direction of the drive assembly 504 to the front caster pivot arm can be used.

Figure 7A:
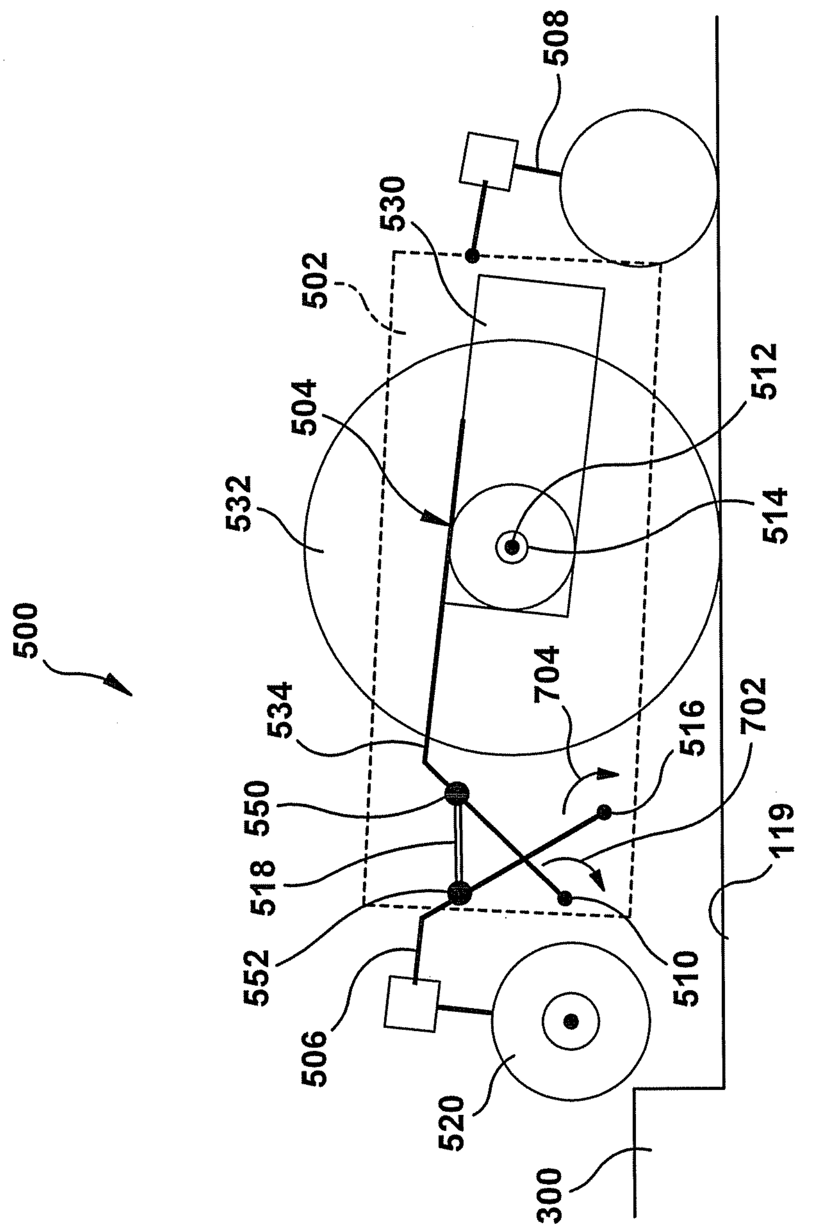
FIG. 7A is a side view of the wheelchair suspension of FIG. 5 traversing a raised obstacle.

FIG. 7A is an elevational view of the suspension 500 traversing over an obstacle 300 by ascending the obstacle. This operating condition may be accomplished by accelerating the drive wheels 532 in the forward direction. In this scenario, the moment arm generated by drive wheel 532 may be greater than opposite moment arms around pivot axis 510. When this occurs, the drive assembly 504 pivots as indicated by arrow 702 around pivot axis 510. The drive assembly pivot arm 534 pulls the link 518, which causes the front caster pivot arm 506 to pivot as indicated by arrow 704 around pivot axis 516. This causes front caster 520 to rise above obstacle 300 or urges the front caster upward to assist the front caster over the obstacle 300.

Figure 7B:
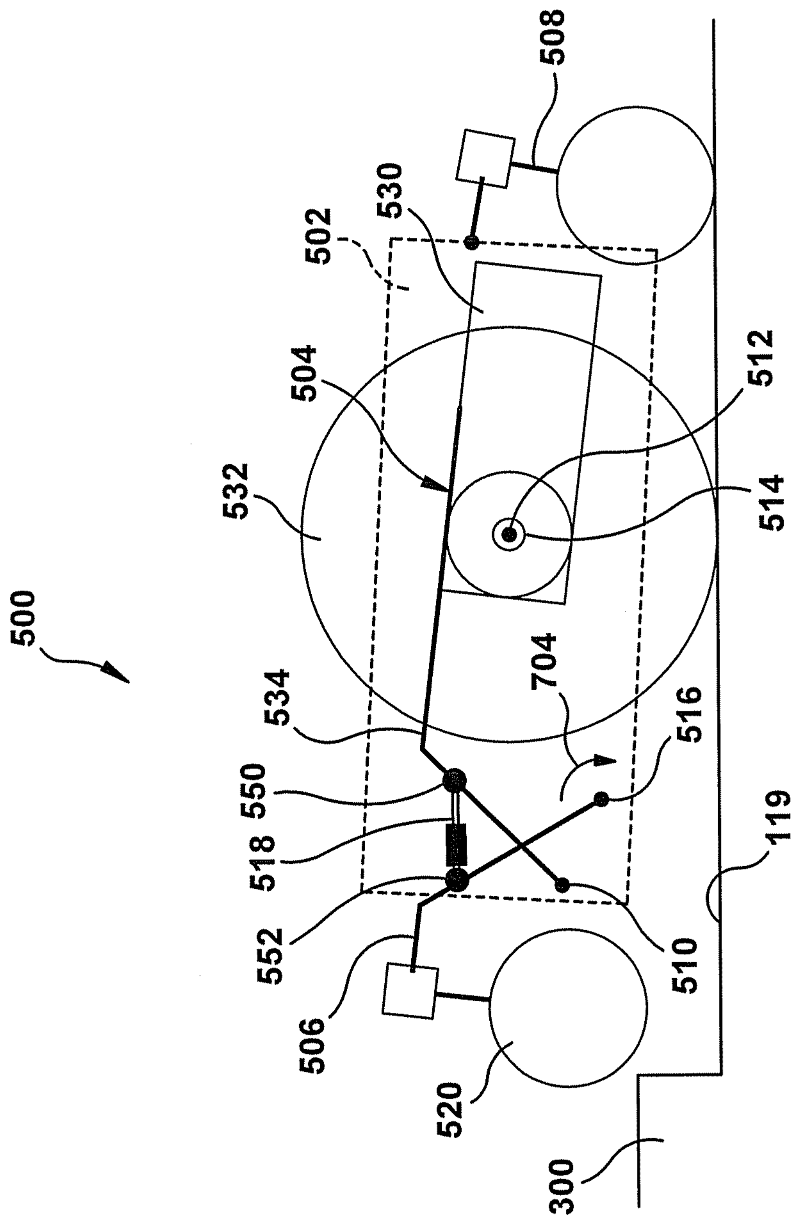
FIG. 7B is a side view of a wheelchair suspension with a variable length motion transfer member traversing a raised obstacle.
Figure 7C:
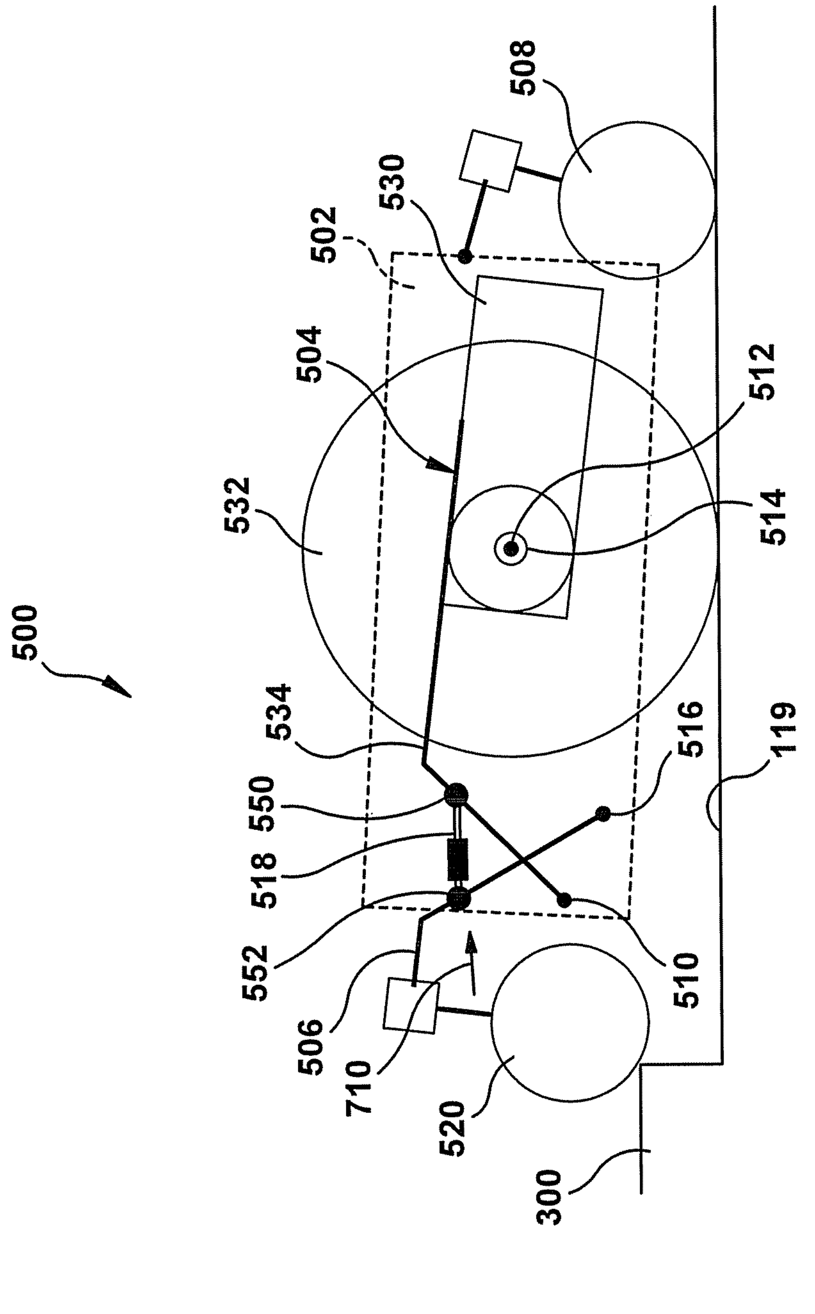
FIG. 7C is a side view of a wheelchair suspension with a variable length motion transfer member traversing a raised obstacle.

FIGS. 7B and 7C illustrate an embodiment of the suspension 500 traversing over the obstacle 300, where the link 518 is a variable length link. In this embodiment, the drive assembly pivot arm 534 pulls the link 518 to extend the link to its maximum length or a length where the front caster pivot arm 506 begins to pivot. Once extended, the link 518 pulls the front caster pivot arm 506 to pivot as indicated by arrow 704 around pivot axis 516. This causes front caster 520 to rise above obstacle 300 or urges the front caster upward to assist the front caster over the obstacle 300. Referring to FIG. 7C, when the front caster 520 engages the obstacle 300, the front caster pivot arm 506 pivots as indicated by arrow 710 and the link 518 compresses to absorb shock that results from the impact between the front caster 520 and the obstacle 300.

Figure 8A:
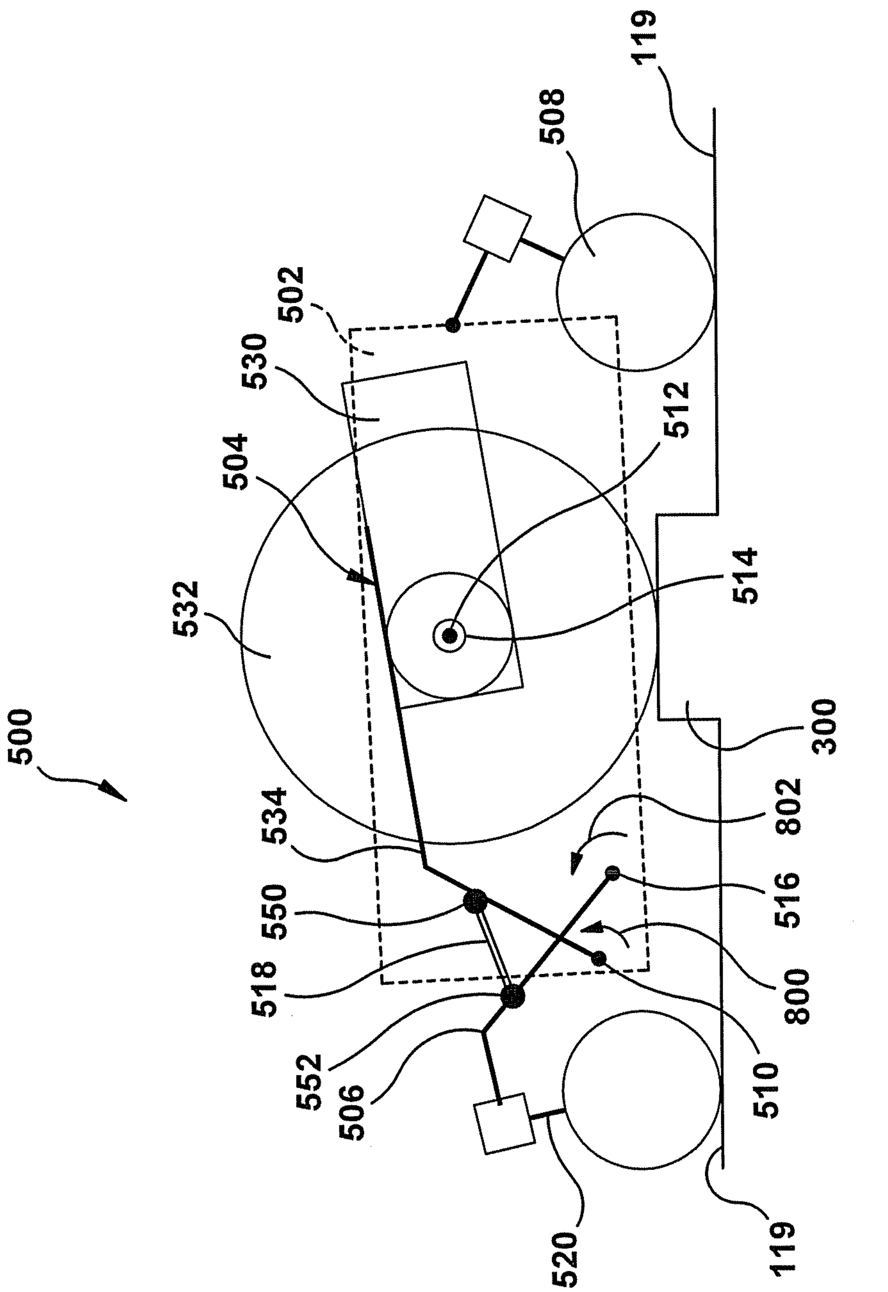
FIG. 8A is a side view of the wheelchair suspension of FIG. 5 traversing a raised obstacle.

Illustrated in FIG. 8A is a side elevational view of the suspension 500 with the drive wheel 532 traversing the obstacle 300. When the drive wheel 532 comes into contact with the obstacle 300, the drive assembly 504 pivots in the direction indicated by arrow 800 around pivot axis 510. The rotation of the drive assembly 504 is translated to the front caster pivot arm 506 to lower the caster 520 down onto the lower driving surface elevation. When the link 518 is a rigid member, the drive assembly 504 and the front caster pivot arm 506 act in unison. One or more springs (not shown) may optionally be included to bias the front caster pivot arm 506 in the direction indicated by arrow 802.

Figure 8B:
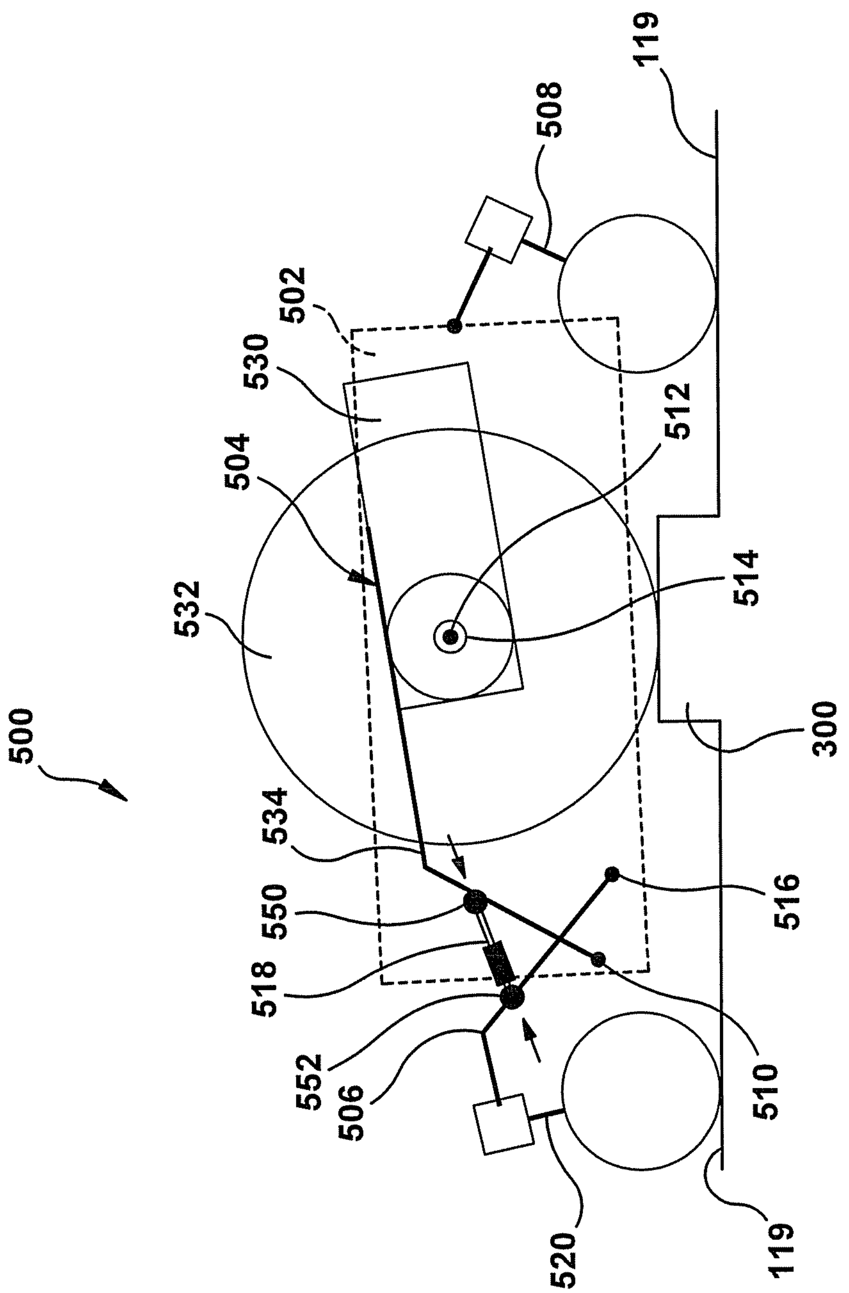
FIG. 8B is a side view of a wheelchair suspension with a variable length motion transfer member traversing a raised obstacle.

FIG. 8B illustrates an embodiment of the suspension 500 with the drive wheel 532 traversing over the obstacle 300, where the link 518 is a variable length link. When the drive wheel 532 comes into contact with obstacle 300, the drive assembly 504 pivots in the direction indicated by arrow 810 around pivot axis 510 to soften the impact from the obstacle 300 that is transferred to the frame 502. During such pivotal movement of the drive assembly 504, the link 518 compresses to allow pivoting of the drive assembly 504 with respect to the front caster pivot arm. Compressing of the link 518 absorbs shock that results from the impact between the drive wheel 532 and the obstacle 300. When the front caster 520 comes into contact with the support surface 519, the pivot arm 506 pivots in the direction indicated by arrow 812 around pivot axis 516 to soften the impact with the support surface 119 that is transferred to the frame 502. During such pivotal movement of the pivot arm 506, the link 518 compresses to allow pivoting of the front caster pivot arm 506 with respect to the drive assembly. Compressing of the link 518 absorbs shock that results from the impact between the front caster 520 and the obstacle 300.

Figure 8C:
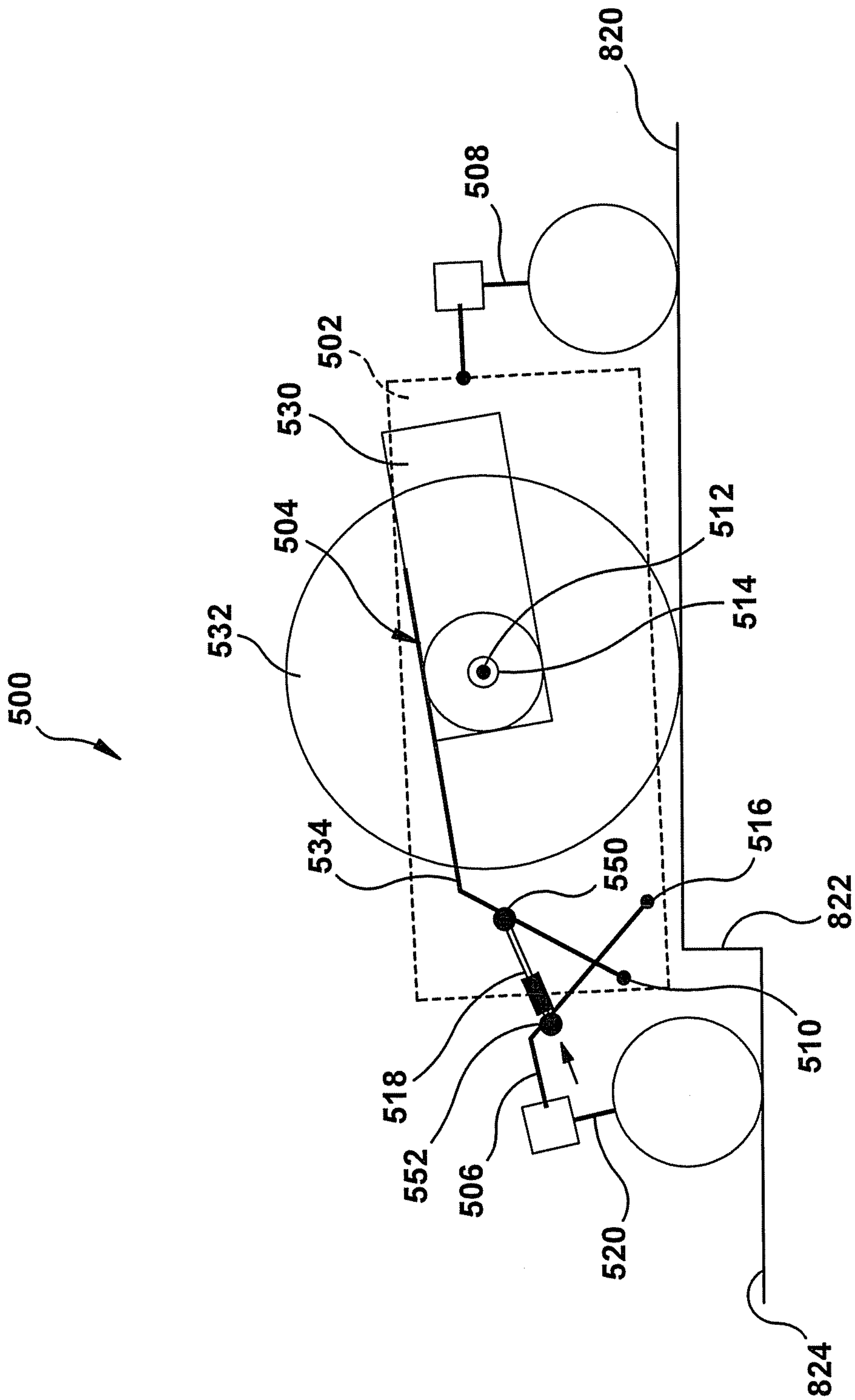
FIG. 8C is a side view of a wheelchair suspension with a variable length motion transfer member traversing a lowered obstacle.

FIG. 8C illustrates an embodiment of the suspension 500 with the drive wheel 532 descending from an elevated surface 820 with a step 822 to a lower surface 824, where the link 518 is a variable length link. When the front caster 520 reaches the step 822, the front caster 520 and the front caster pivot arm 506 begin to move downward. The weight of the front caster pivot arm 506 and front caster 520, in addition to any weight supported by the front caster 520, pulls the link 518 to extend the link to its maximum length or until the front caster 520 engages the lower surface 824. By allowing the front caster 520 to drop down and/or engage the lower surface 824 before the drive wheel reaches the step, the front caster 520 and the link 518 can absorb shock that results from the drive wheel 532 moving from the upper surface 420 to the lower surface 424.

Figure 9:
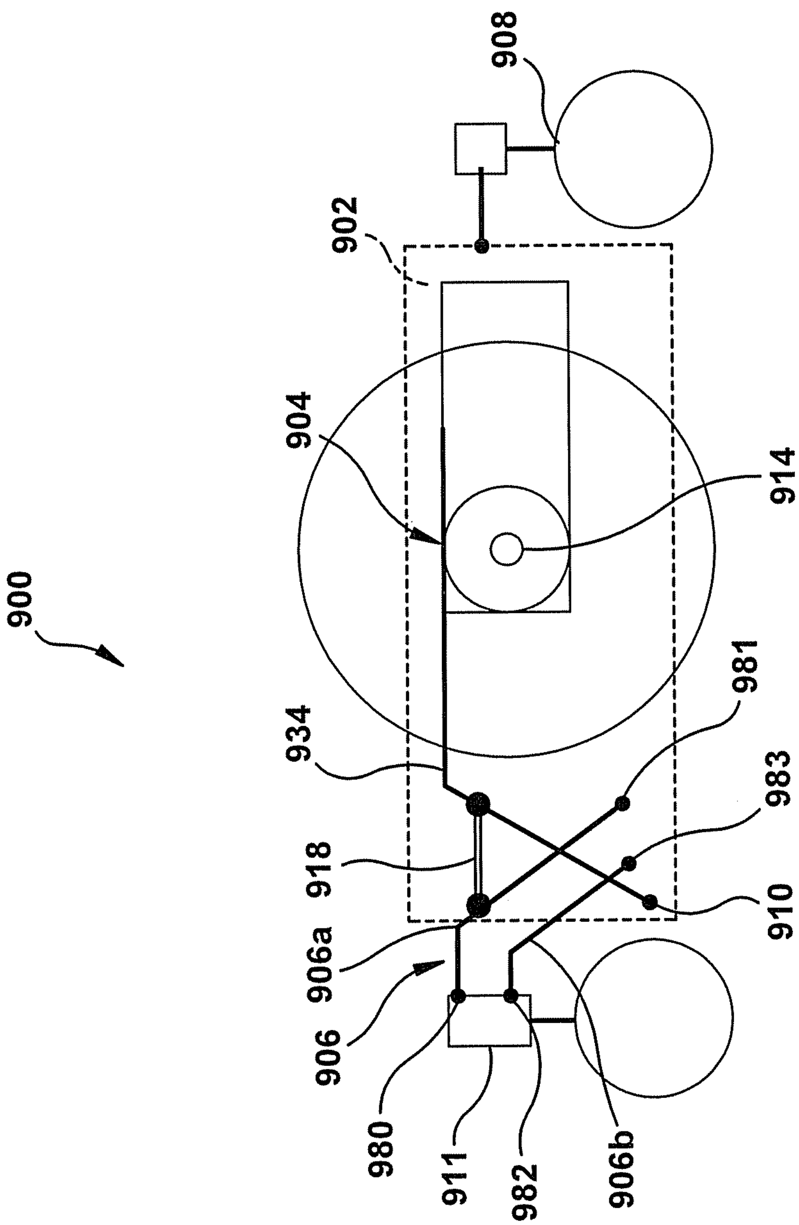
FIG. 9 is a side view of an embodiment of a wheelchair suspension with a front caster pivot arm that comprises links of a four-bar linkage.
Figure 10:
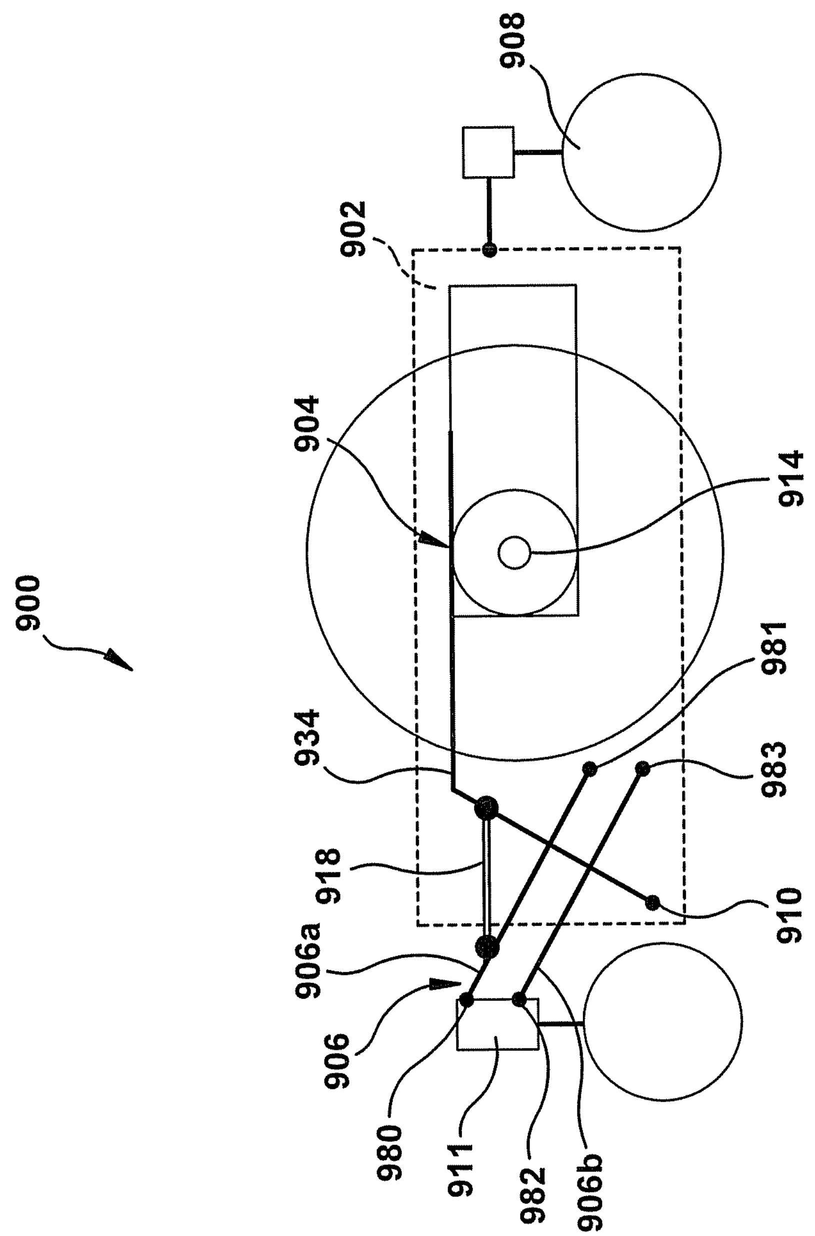
FIG. 10 is a side view of a second configuration of the wheelchair suspension of FIG. 9.
Figure 11:
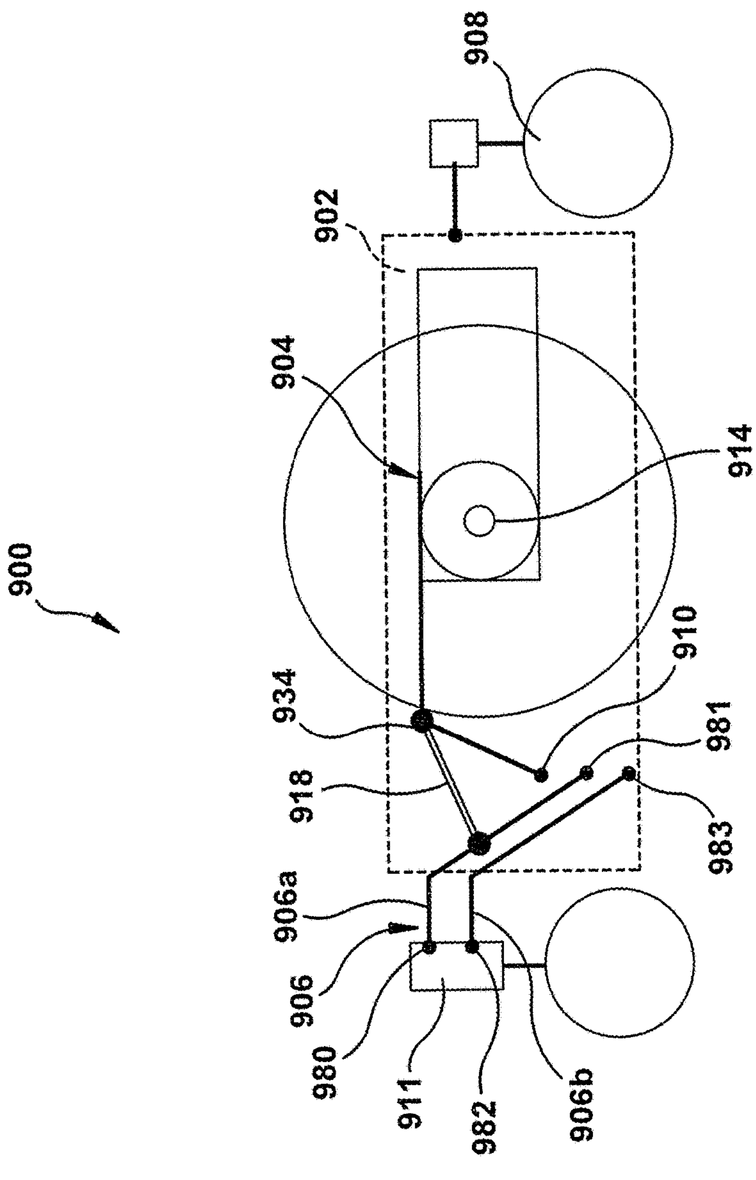
FIG. 11 is a side view of a third configuration of the wheelchair suspension of FIG. 9.

FIGS. 9, 10, and 11 illustrate embodiments of a wheelchair suspension 900 where a front caster pivot arm 906 comprises links of a four bar linkage. In the configurations illustrated by FIGS. 9 and 10, a drive assembly pivot arm 934 and the front caster pivot arm 906 are in a crossed configuration. In the configuration illustrated by FIG. 11, the drive assembly pivot arm 934 and the front caster pivot arm 906 are not in a crossed configuration.

The wheelchair suspensions 900 illustrated by FIGS. 9, 10, and 11 each include a frame 902, a drive assembly 904, a front caster pivot arm 906, and a rear caster 908. The drive assembly 904 is pivotally mounted to the frame 902 at a drive assembly pivot axis 910. The front caster pivot arm 906 comprises an upper link 906*a* and a lower link 906*b*. The upper link 906*a* is pivotally coupled to a caster support member 911 at a pivotal connection 980 and is pivotally connected to the frame 902 at a pivotal connection 981. The lower link 906*b* is pivotally coupled to the caster support member 911 at a pivotal connection 982 and is pivotally connected to the frame 902 at a pivotal connection 983.

The caster support member 911 may be any structure that allows links 906*a*, 906*b* to be coupled to the caster 920. The links 906*a*, 906*b*, the frame 902, and the caster support member 911 form a four-bar linkage. The pivotal connections 980, 981, 982, 983 can be positioned at a wide variety of different locations on the frame 902 and the caster support member 911 and the length of the links 906 can be selected to define the motion of the caster 920 as the front caster pivot arm 906 is pivoted. In the example illustrated by FIG. 9, the front caster pivot arm 906 retracts the front caster 920 or pivots the wheel of the front caster toward the frame as the pivot arm 906 is lifted and extends the front caster 920 or pivots the wheel of the front caster 920 away from the frame as the front caster pivot arm is lowered. In the example illustrated by FIG. 10, the four-bar linkage defines a parallelogram. As such, the orientation of the front caster 920 does not change as the pivot arm pivots.

In the configurations illustrated by FIGS. 9 and 10, the drive assembly pivot axis 910 is below the pivotal connections 981, 983 of the front caster pivot arm links and a drive axle 914 and is in front of at least one of the pivotal connections 981, 983 of the front caster pivot arm 906. The drive assembly pivot arm 934 and the front caster pivot arm 906 are in a crossed configuration when viewed from the side. The front caster pivot arm 906 and the drive assembly pivot arm 934 may be laterally offset, or may be bent to accommodate the crossed configuration. By arranging the front caster pivot arm 906 and the drive assembly pivot arm 934 in the crossed configuration, the length of the front caster pivot arm 906 and/or the drive assembly pivot arm 934 can be increased. In the configuration illustrated by FIG. 11, the drive assembly pivot axis 910 is above the pivotal connections 981, 983 of the front caster pivot arm links, but below the drive axle 914. The drive assembly pivot arm 934 and the front caster pivot arm 906 do not cross.

The drive assembly 904 and the front caster pivot arm 906 can be coupled in any manner that transfers at least a portion of motion of the drive assembly in at least one direction to the pivot arm 906. In the embodiments illustrated by FIGS. 9, 10, and 11, the front caster pivot arm 906 is coupled to the drive assembly 904 by a link 918 that is pivotally connected to the drive assembly 904 and the upper link 906*a* of the front caster pivot arm 906. The link could also be connected to the drive assembly 904 and the lower link 906*b* of the front caster pivot arm 106. The link 918 can be a fixed length link, a rigid link, a flexible link and/or may be a variable length link. The link 918 transfers motion of the drive assembly 904 to the front caster pivot arm. Torque applied by the drive assembly 904 urges the front caster pivot arm 906 and the front caster 920 upward with respect to a support surface 119.

Figure 12:
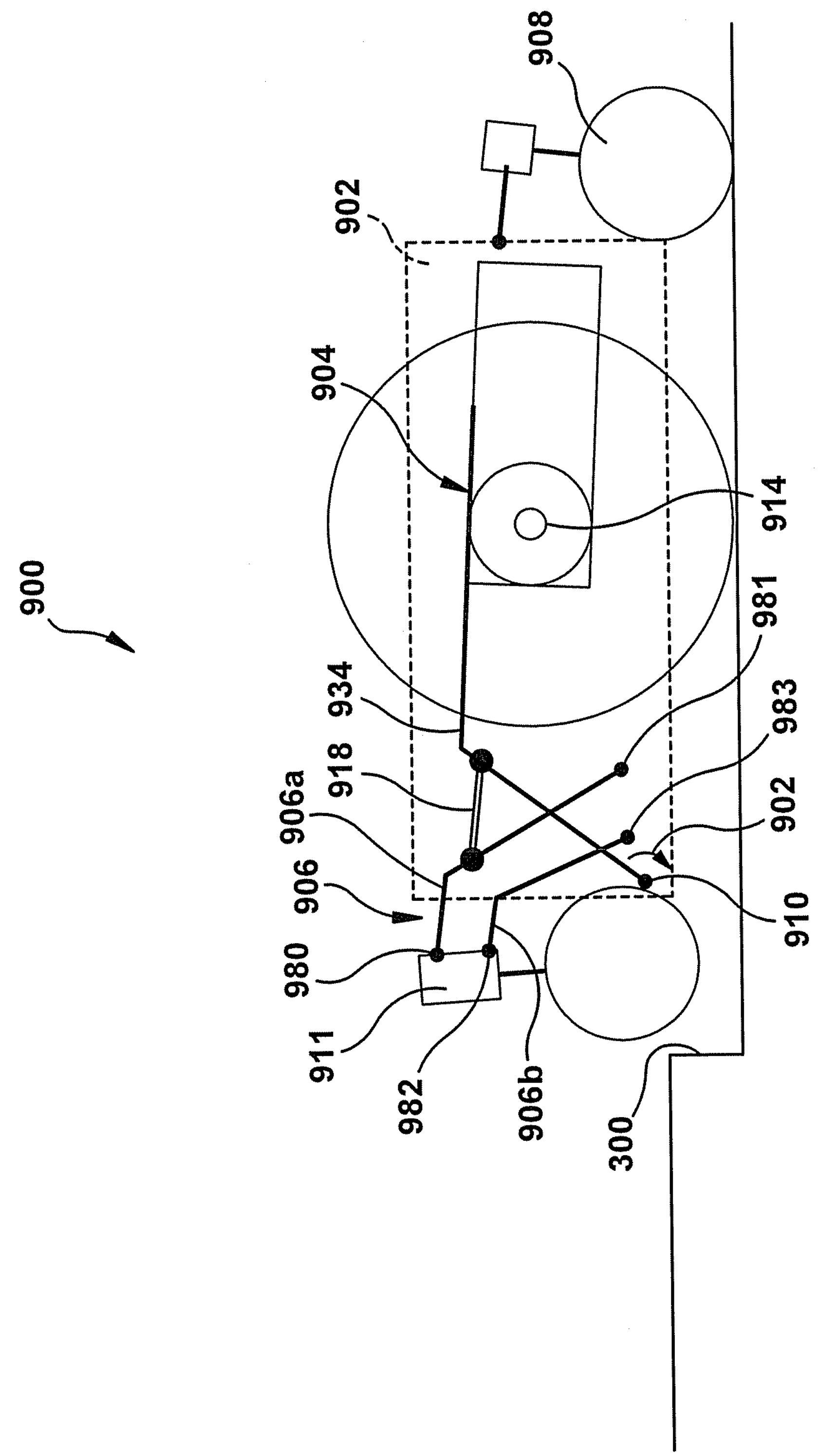
FIG. 12 is a side view of the wheelchair suspension of FIG. 9 traversing a raised obstacle.
Figure 13:
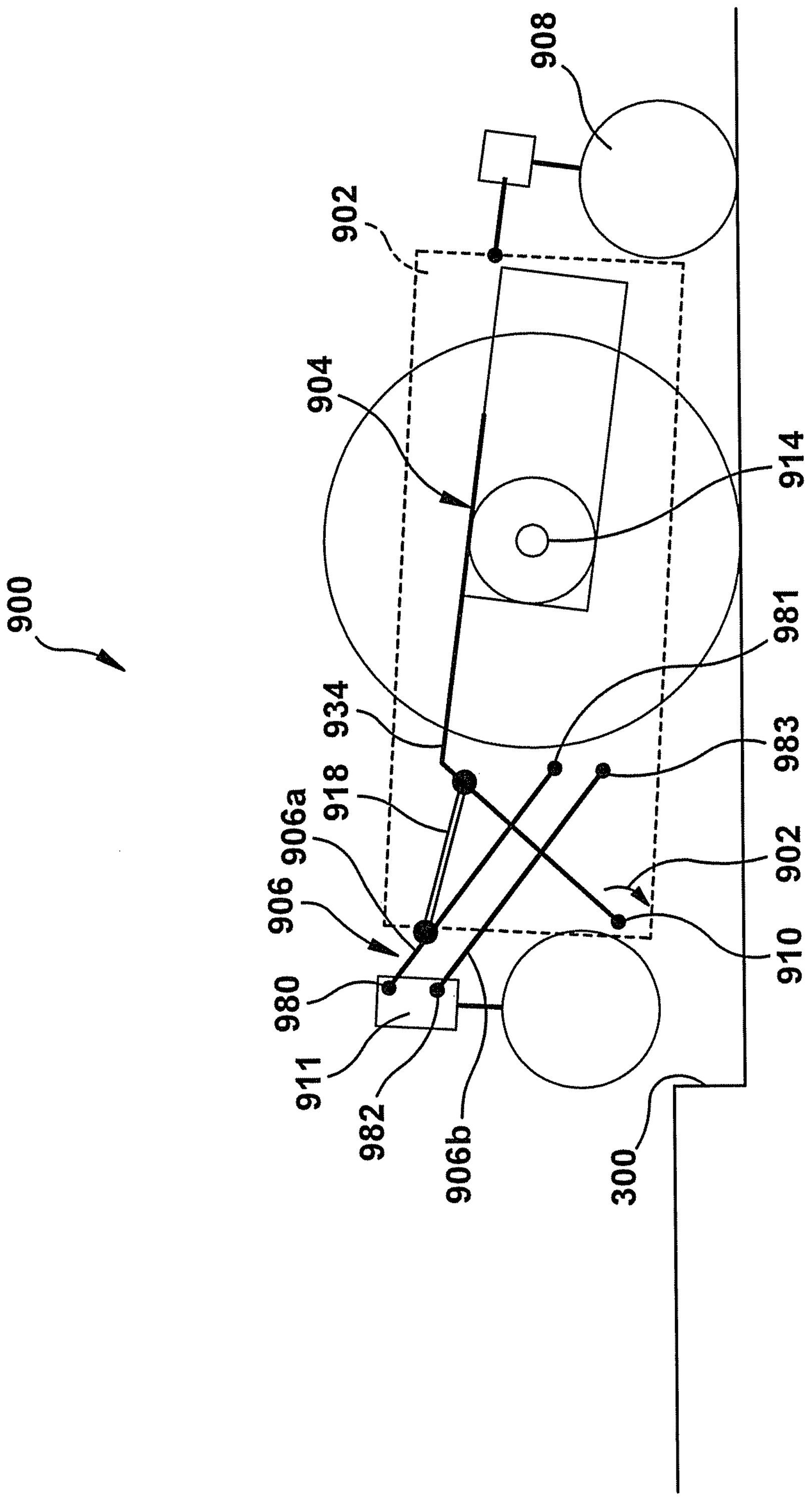
FIG. 13 is a side view of the wheelchair suspension of FIG. 10 traversing a raised obstacle.
Figure 14:
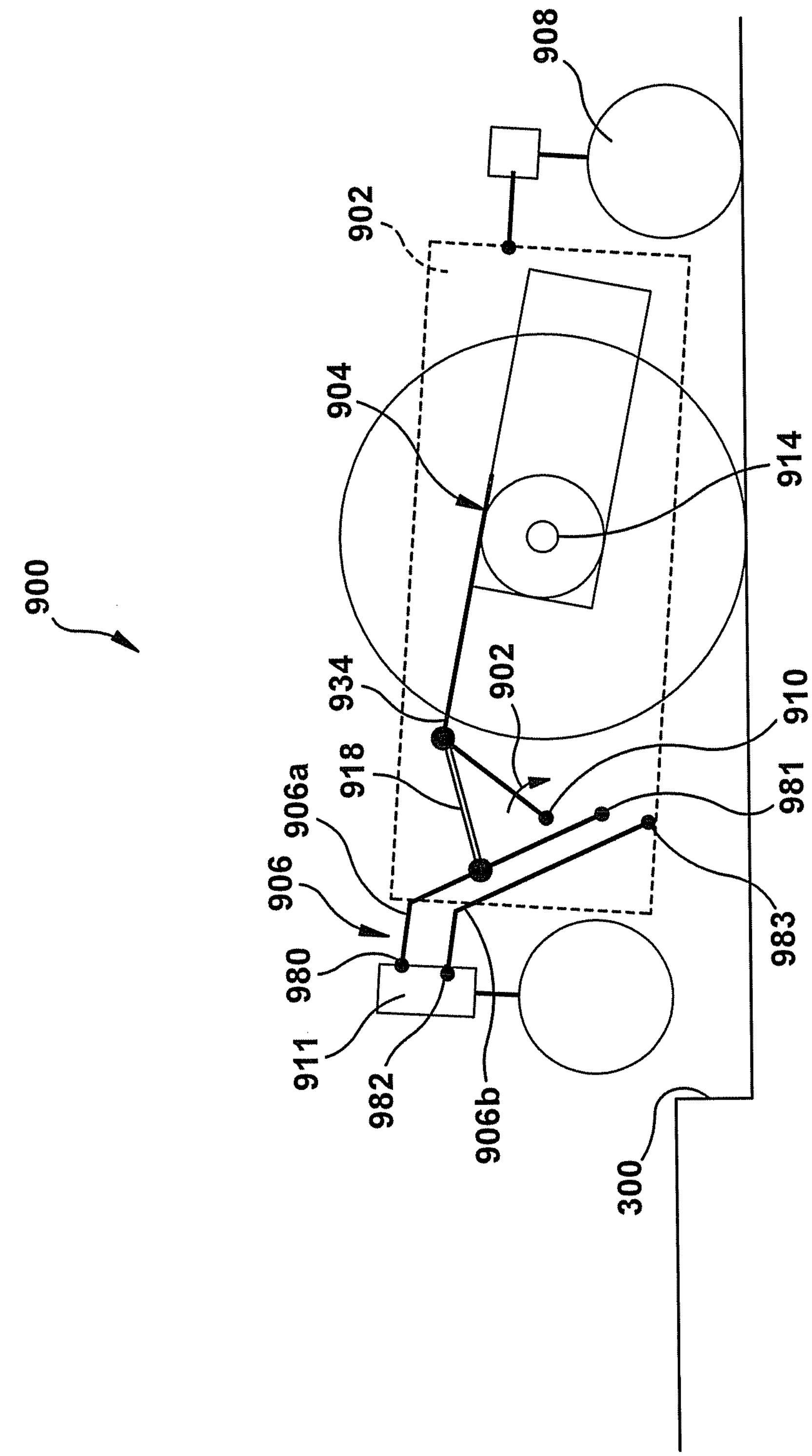
FIG. 14 is a side view of the wheelchair suspension of FIG. 11 traversing a raised obstacle.

FIGS. 12, 13, and 14 are elevational views of the suspensions 900 of FIGS. 9, 10 and 11 traversing over an obstacle 300 by ascending the obstacle. The drive assembly 904 pivots as indicated by arrow 902 around pivot axis 910. The drive assembly pivot arm 934 pulls the link 918, which pulls the front caster pivot arm 906. The front caster pivot arm 906 urges the front caster 920 upward and toward the frame 902. This causes front caster 920 to rise above obstacle 300 or urges the front caster upward and toward the frame 920 to assist the front caster over the obstacle 300.

Figure 15:
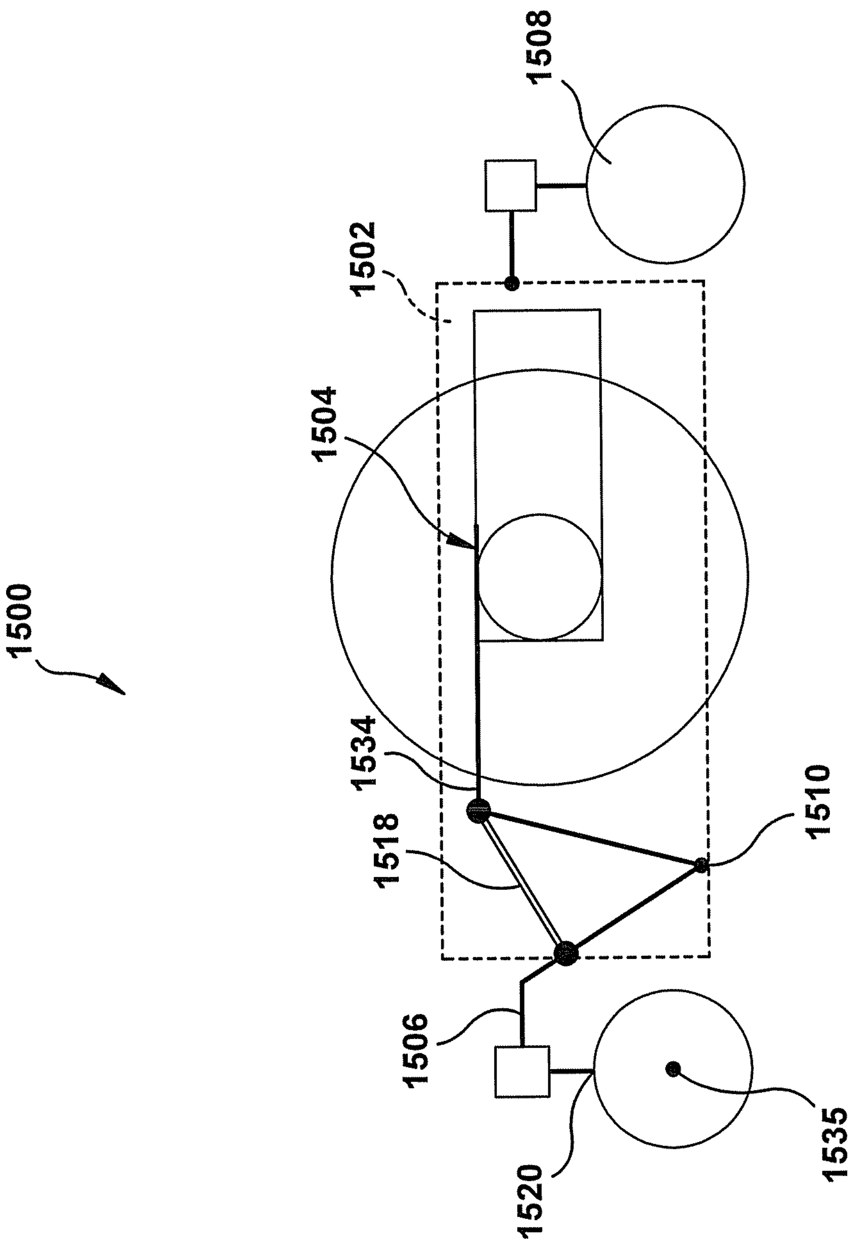
FIG. 15 is a side view of an embodiment of a wheelchair suspension.

FIG. 15 illustrates an embodiment of a wheelchair suspension 1500 where a front caster pivot arm 1506 and a drive assembly pivot arm 1534 pivot about a common axis 1510. The wheelchair suspension 1500 illustrated by FIG. 15 includes a frame 1502, a drive assembly 1504, a front caster pivot arm 1506, and a rear caster 1508. The drive assembly 1504 and the front caster pivot arm 1506 are pivotally mounted to the frame 1502 at the common pivot axis 1510. In the configuration illustrated by FIG. 15, the common pivot axis 1510 is below both an axle 1535 of the caster and a drive axle 1514 of the drive assembly 1504. In another embodiment, the common pivot axis 1510 is above the caster axle 1535, but below the drive axle 1514.

The drive assembly 1504 and the front caster pivot arm 1506 can be coupled in any manner. In the embodiment illustrated by FIG. 15, the front caster pivot arm 1506 is coupled to the drive assembly 1504 by a link 1518 that is pivotally connected to the drive assembly 1504 and the front caster pivot arm 1506. The link 1518 can be a fixed length link, a rigid link, a flexible link and/or may be a variable length link. The link 1518 transfers motion of the drive assembly 1504 to the front caster pivot arm. Torque applied by the drive assembly 1504 urges the front caster pivot arm 1506 and the front caster 1520 upward with respect to a support surface 119.

Figure 16:
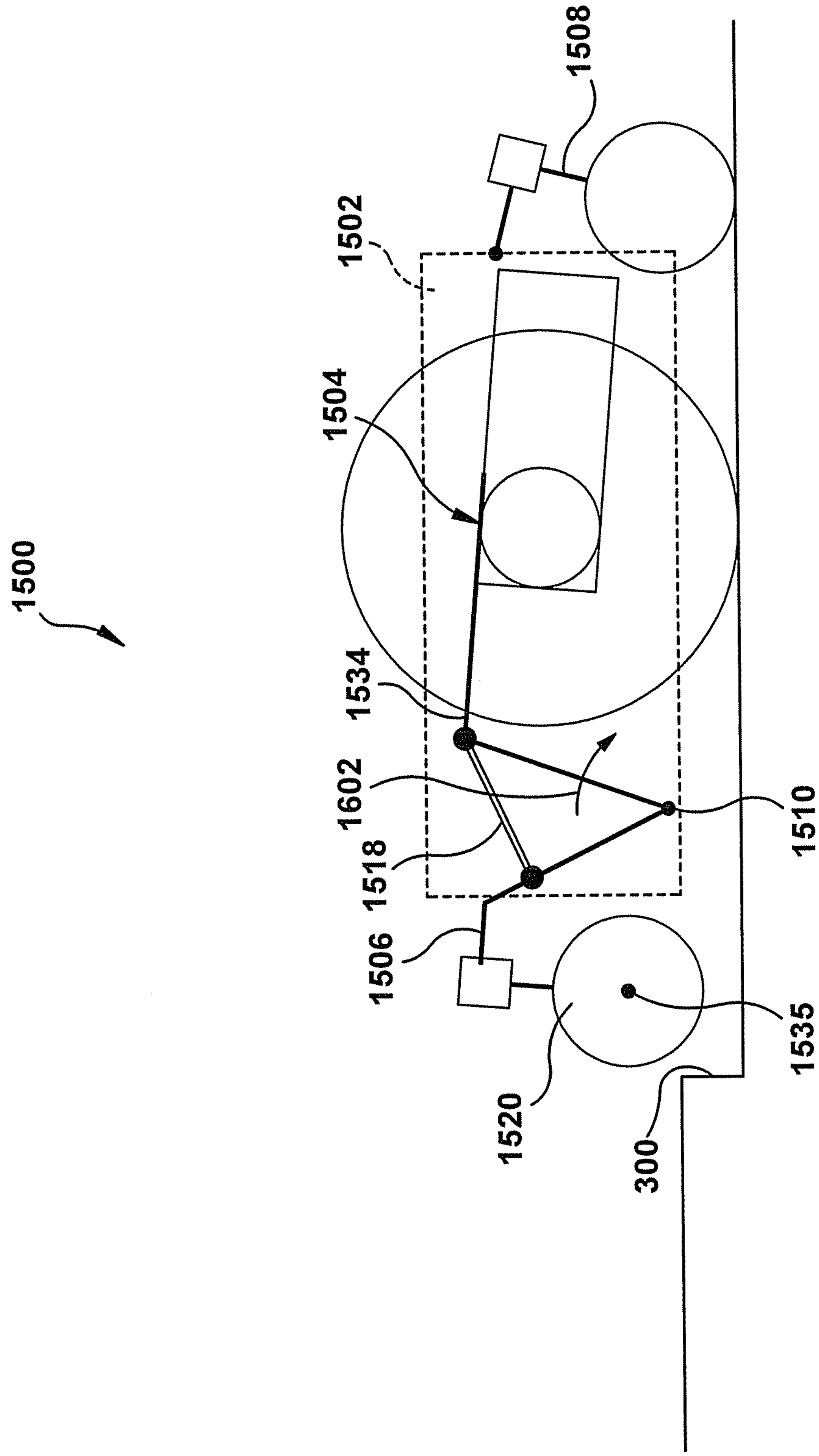
FIG. 16 is a side view of the wheelchair suspension of FIG. 15 traversing a raised obstacle.

FIG. 16 is an elevational view of the suspension 1500 traversing over an obstacle 300 by ascending the obstacle. The drive assembly 1504 pivots as indicated by arrow 1602 around pivot axis 1510. The drive assembly pivot arm 1534 pulls the link 1518, which pulls the front caster pivot arm 1506 to urge the front caster 1520 upward. This causes front caster 1520 to rise above obstacle 300 or urges the front caster upward to assist the front caster over the obstacle 300.

Figure 17:
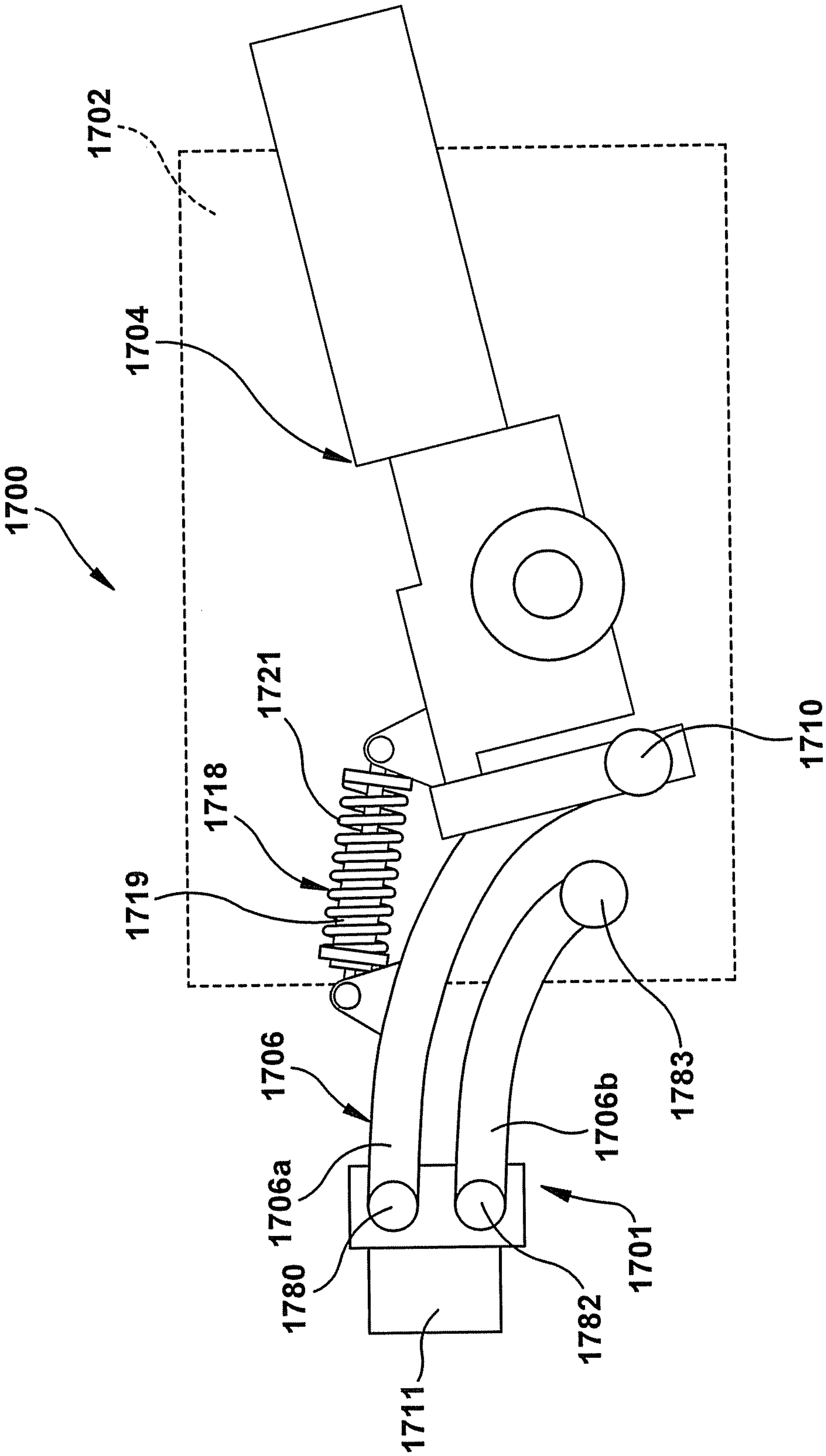
FIG. 17 is a side view of an embodiment of a wheelchair suspension.
Figure 18:
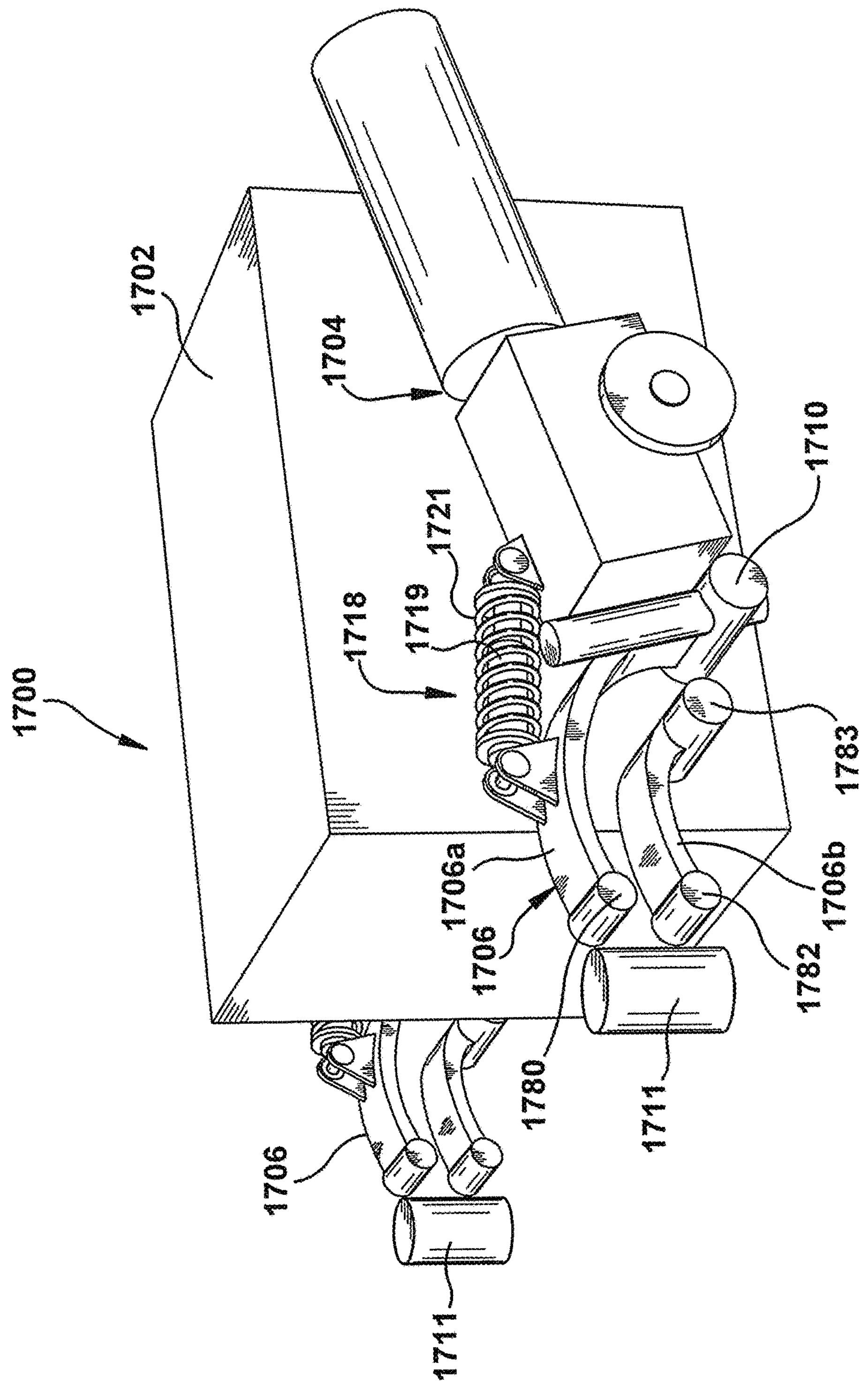
FIG. 18 is a perspective view of the wheelchair suspension of FIG. 17.

FIGS. 17 and 18 illustrate an embodiment of a wheelchair suspension 1700 where the a front caster pivot arm 1706 comprises links of a four bar linkage 1701 and a drive assembly 1704 and one of the links of front caster pivot arm 1706 pivot about a common axis 1710. The wheelchair suspension 1700 illustrated by FIGS. 17 and 18 includes a frame 1702, a drive assembly 1704, a front caster pivot arm 1706, and may include a rear caster (not shown). The drive assembly 1704 is pivotally mounted to the frame 1702 the common pivot axis. The front caster pivot arm 1706 comprises an upper link **1706*a* and a lower link 1706*b*. The upper link 1706*a* is pivotally coupled to a caster support member 1711 at a pivotal connection 1780 and is pivotally connected to the frame 1702 at the drive assembly pivot axis 1710. The lower link 1706*b* is pivotally coupled to the caster support member 1711 at a pivotal connection 1782 and is pivotally connected to the frame 1702 at a pivotal connection 1783. The links 1706*a*, 1706*b*, the frame 1702, and the caster support member 1711 form a four-bar linkage. In the example illustrated by FIGS. 17 and 18, the front caster pivot arm 1706 retracts the front caster 1720 as the pivot arm 1706 is lifted and extends the front caster 1720 as the front caster pivot arm 1706** is lowered.

In the embodiment illustrated by FIGS. 17 and 18, the front caster pivot arm 1706 is coupled to the drive assembly 1704 by a link 1718 that is pivotally connected to the drive assembly 1704 and the upper link **1706*a* of the front caster pivot arm 1706. The illustrated link 1718 is a coil over shock arrangement that comprises a variable length shock absorber 1719 with a spring or coil 1721 disposed around the shock absorber. The shock absorber 1719 absorbs shock that results from impacts sustained by the front caster or the drive wheel. The coil 1721 biases the shock absorber to an extended position. The link 1718 transfers motion of the drive assembly 1704 to the front caster pivot arm. Torque applied by the drive assembly 1704 urges the front caster pivot arm 706 and the front caster 1720 upward with respect to a support surface 119**.

Figure 19:
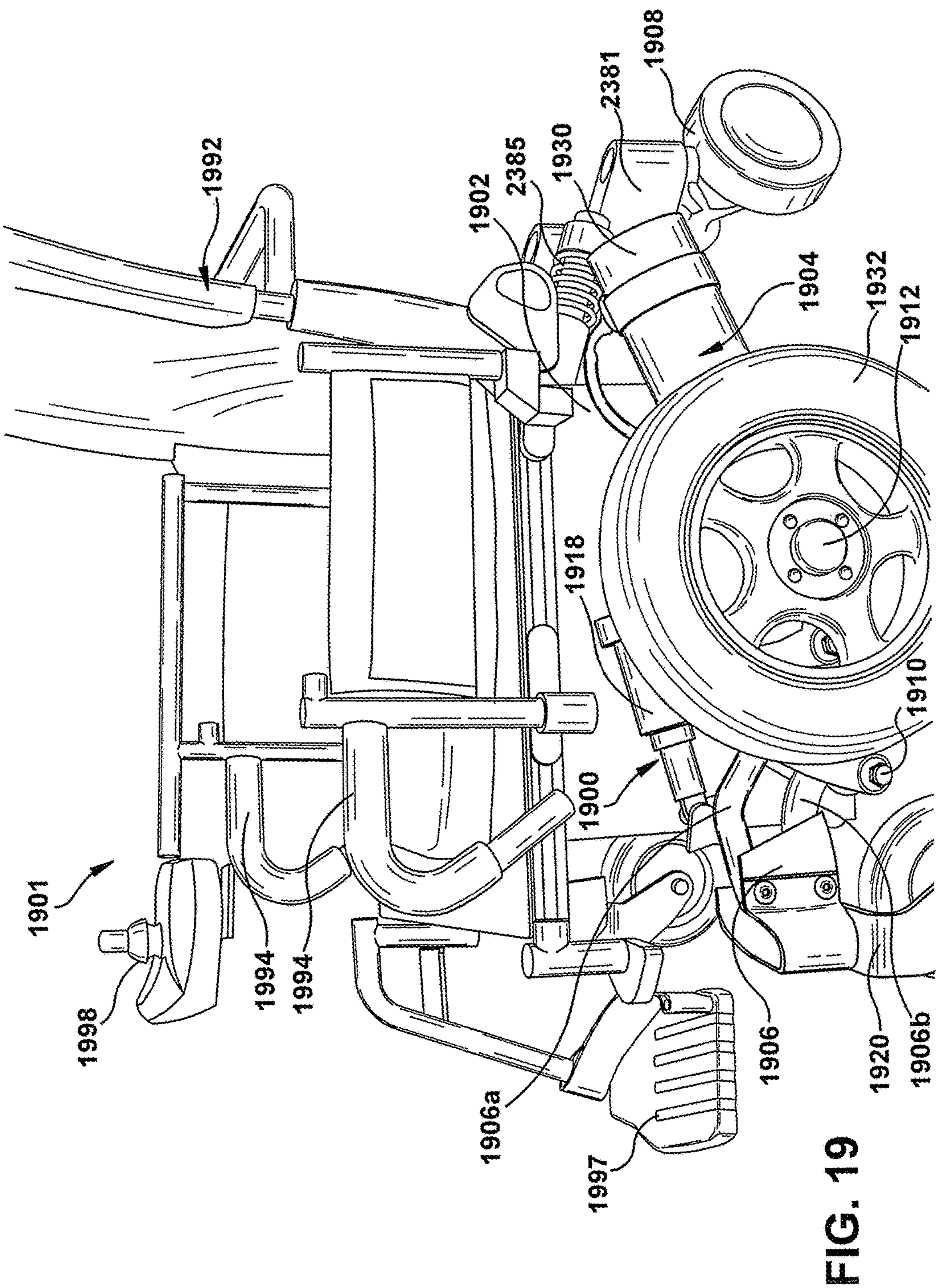
FIG. 19 is a perspective view of a wheelchair.
Figure 20:
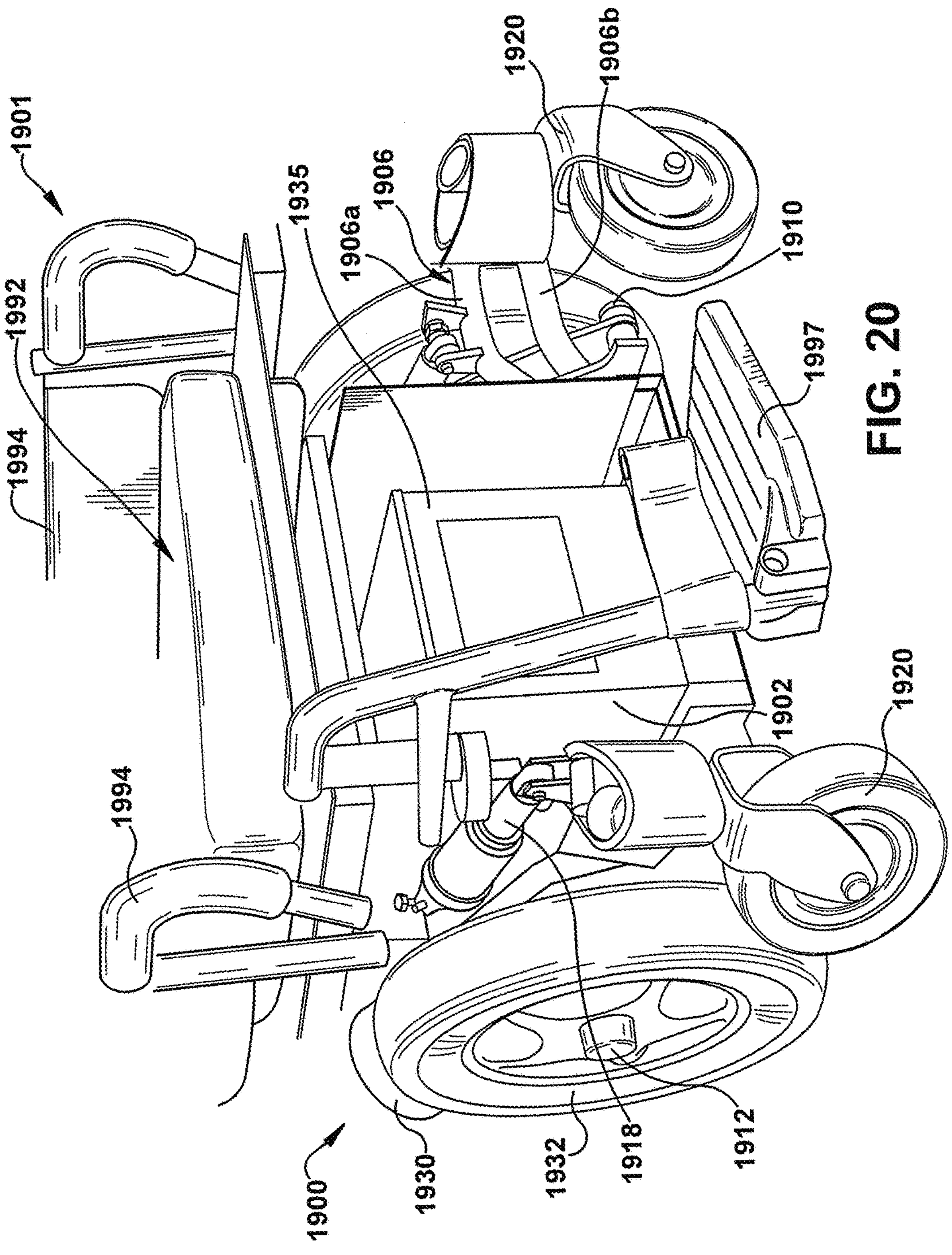
FIG. 20 is a second perspective view of the wheelchair of FIG. 19.

FIGS. 19 and 20 are perspective views of a wheelchair 1901 that includes a suspension 1900. The wheelchair 1901 is preferably a mid-wheel drive or rear-wheel drive wheelchair, but may be any type of wheelchair. As shown, the wheelchair 1901 has a chair 1992 having arm supports 1994. A control device such as, for example, a joystick controller 1998 (FIG. 1A) is attached to the chair 1992 for controlling any power-related aspects of the wheelchair 1901. Projecting forward from the chair 1992 is a footrest 1997 for supporting the feet of the wheelchair's user.

Figure 21:
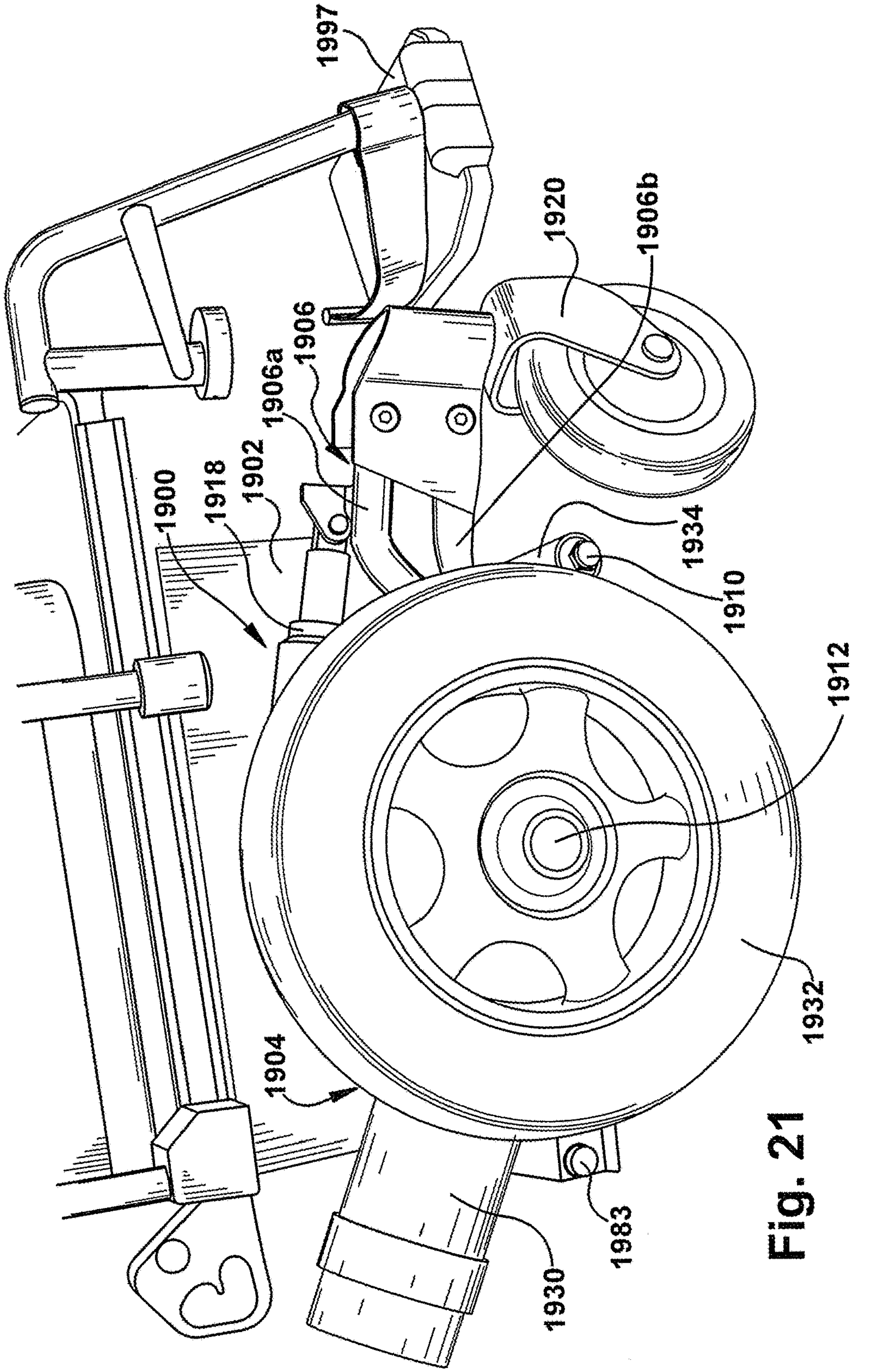
FIG. 21 is an enlarged side view of the wheelchair of FIG. 19 showing suspension components of the wheelchair.
Figure 22:
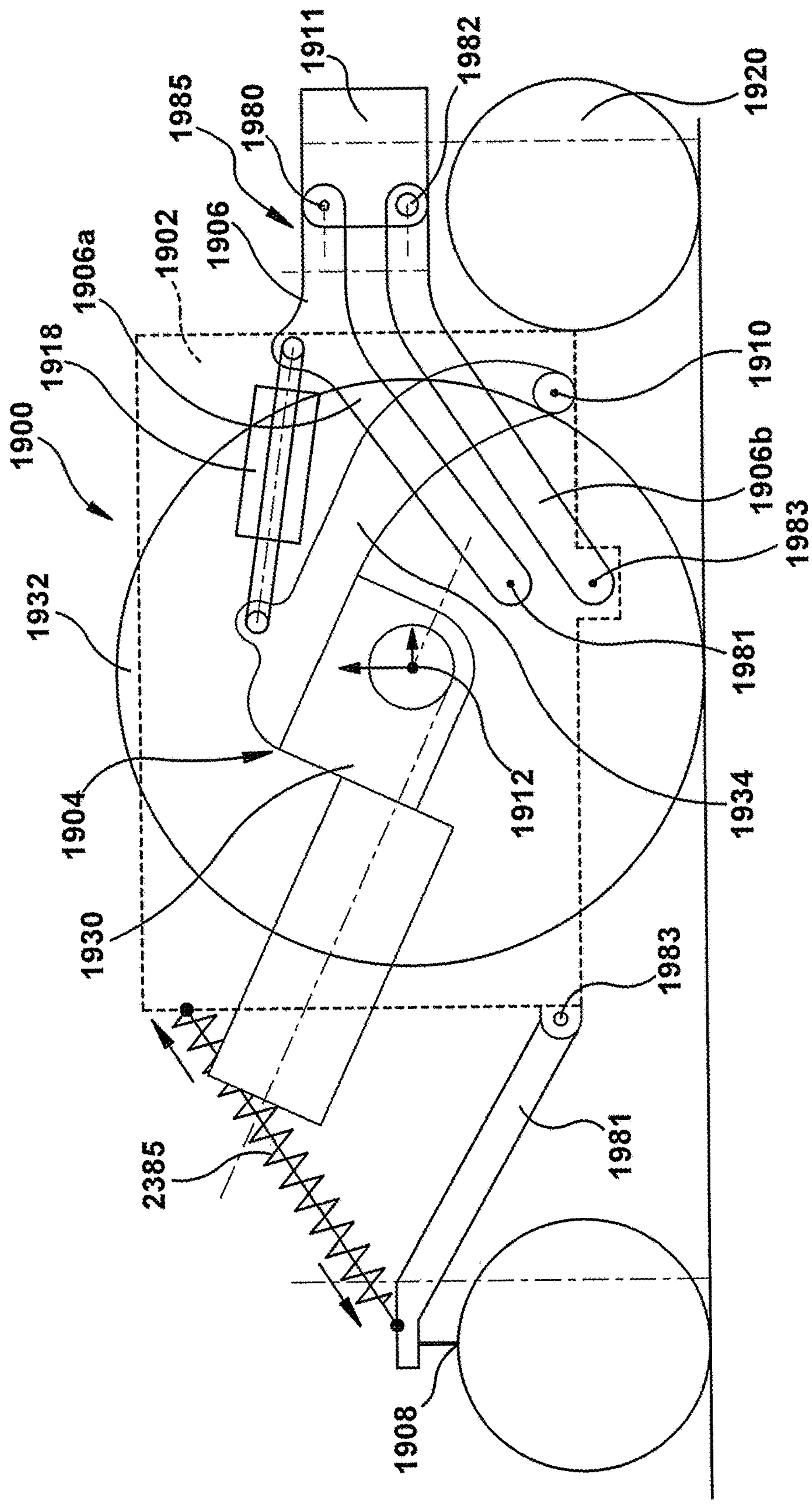
FIG. 22 is a view similar to FIG. 26 with a drive wheel shown transparently to more clearly illustrate operation of the suspension components.

The wheelchair 1901 may include the suspension illustrated in FIGS. 19-23, any of the suspension configurations described above, or any combination of the components of the suspension configurations described herein. Referring to FIGS. 21 and 22, the illustrated suspension 1900 includes a frame 1902, a drive assembly 1904, a front caster pivot arm 1906, and two rear casters 1908. The drive assembly 1904 is pivotally mounted to the frame 1902 at a drive assembly pivot axis 1910.

Each drive assembly 1904 includes a motor drive 1930, a drive wheel 1932, and a pivot arm 1934. The motor drive 1930 may comprise a motor/gear box combination, a brushless, gearless motor, or any other known arrangement for driving the drive wheel 1932. The motor drive 1930 is powered by one or more batteries 1935 (FIG. 20) to drive the drive wheel 1932 about a the axis of rotation 1912. Referring to FIG. 22, the illustrated pivot arm 1934 comprises a steel plate that is fixed to the motor drive 1930. The pivot arm 1934 is pivotally coupled to the frame at the drive assembly pivot axis 1910. Referring to FIG. 22, the pivot arm 1934 extends forward and downward from the motor drive to the drive assembly pivot axis 110. The pivot axis 1910 of the drive assembly pivot arm 1934 is below the drive wheel axis of rotation 1912

Referring to FIG. 22, the front caster pivot arm 1906 comprises an upper link **1906*a* and a lower link 1906*b*. The upper link 906*a* is pivotally coupled to a caster support member 1911 at a pivotal connection 1980 and is pivotally connected to the frame 1902 at a pivotal connection 1981. The lower link 1906*b* is pivotally coupled to the caster support member 1911 at a pivotal connection 1982 and is pivotally connected to the frame 1902 at a pivotal connection 1983. In the embodiment illustrated by FIGS. 21 and 22, the pivotal connection 1983 is at or near the lowest point of the frame 1902. The links 1906*a*, 1906*b*, the frame 1902, and the caster support member 1911 form a four-bar linkage 1985 (See FIG. 22). In the configuration illustrated by FIGS. 21 and 22, the drive assembly pivot axis 1910 is at or near the lowest point of the frame 1902 and is in front of the pivotal connections 1981, 1983 of the front caster pivot arm 1906. The drive assembly pivot arm 1934 and the front caster pivot arm 1906** are in a crossed configuration.

In the embodiment illustrated by FIGS. 21 and 22, a shock absorber link 1918 is pivotally connected to the drive assembly 1904 and the front caster pivot arm 1906. The shock absorber link 1918 transfers motion of the drive assembly 1904 to the front caster pivot arm 1906. The shock absorber link 1918 is a variable length link, though it can also be a fixed length link. When the drive assembly 1904 is accelerated, the drive assembly pivot arm 1934 pulls the shock absorber link 1918 to extend the link to its maximum length or a length where it urges the front caster pivot arm 1906 to pivot. Once extended, the link 1918 pulls or urges the front caster pivot arm 1906 to pivot upward. This causes front caster 1920 to rise or urges the front caster 1920 upward. When the front caster 1920 engages an obstacle, the shock absorber link 1918 compresses to absorb shock from the impact between the front caster 1920 and the obstacle. When the drive wheel 1932 comes into contact with an obstacle, the shock absorber link 1918 compresses to absorb shock that results from the impact between the drive wheel and the obstacle.

Figure 23:
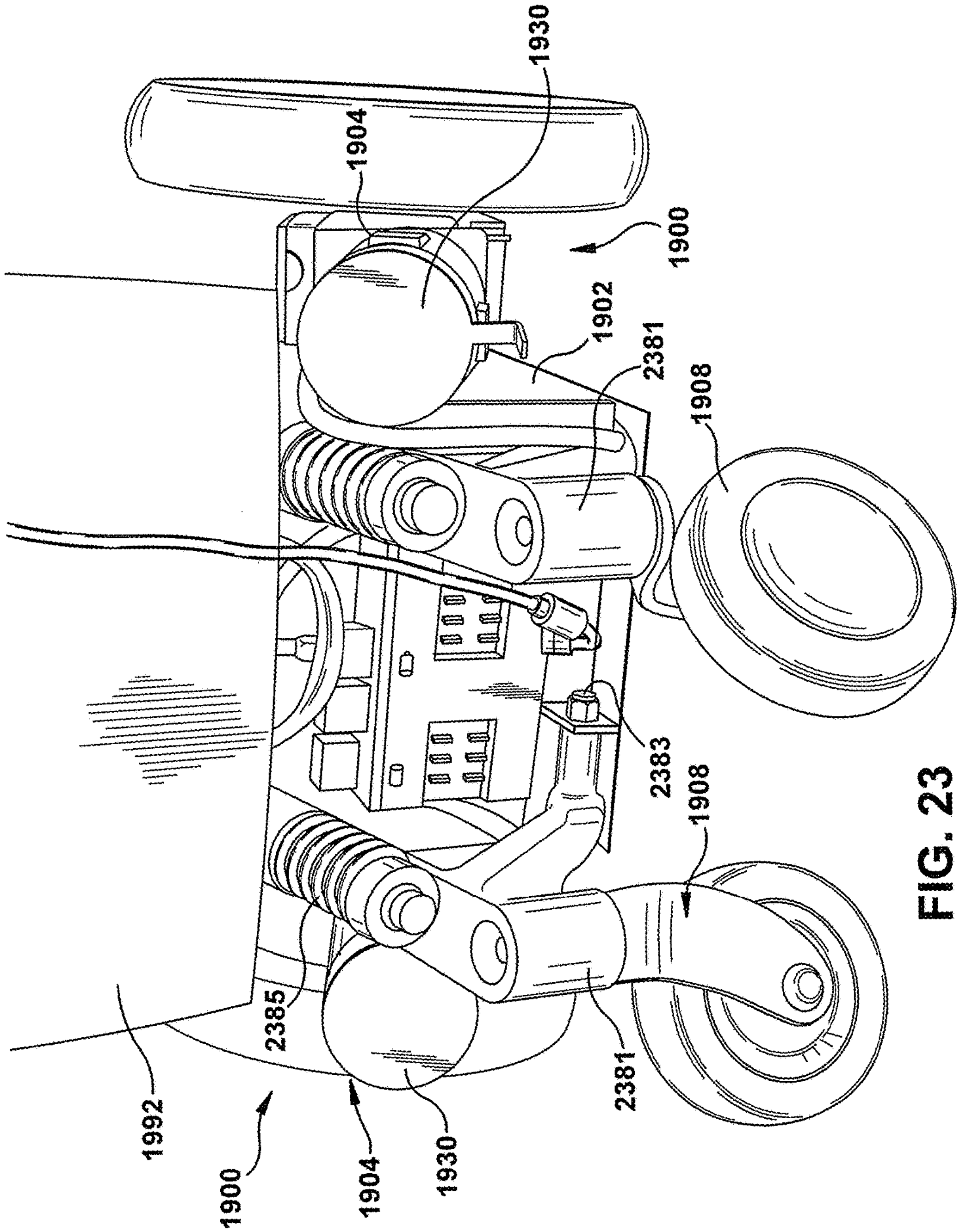
FIG. 23 is an enlarged side view of the of the wheelchair of FIG. 19 showing rear casters.

Referring to FIG. 23, first and second rear casters 1908 are independently, pivotally coupled to the frame 1902. Each rear caster 1908 is coupled to a pivot arm 2381 that is pivotally connected to the frame 1906 at a pivot axis 2383. A rear caster spring 2385 acts between the frame 1902 and the rear caster pivot arm 2381. The rear caster spring 2385 biases the rear caster 1908 into engagement with the ground.

Figure 24A:
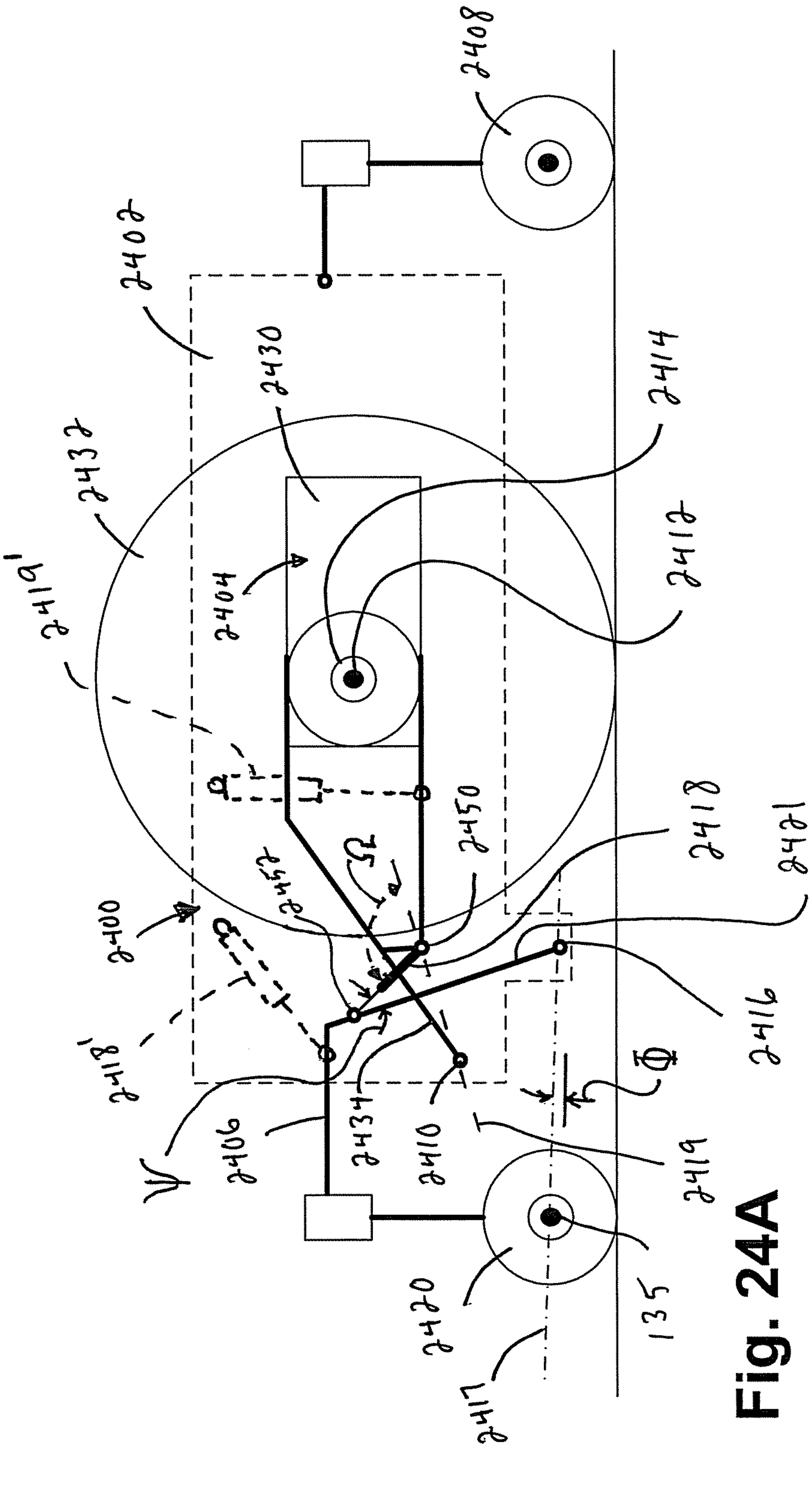
FIG. 24A is a side view of another embodiment of a wheelchair suspension.

FIG. 24A illustrates another embodiment of a wheelchair suspension 2400 that is similar to the embodiment illustrated by FIGS. 5 and 6. In the example illustrated by FIG. 24A, the position of the link 2418 is different than the position of the link 518. As will be described in more detail below, in an exemplary embodiment where the link 518 or 2418 includes a spring and/or a damper, the positioning of the link 518 or 2418 can be adjusted to change the distribution of spring and/or damping force between the drive wheel and the front caster.

In the example illustrated by FIG. 24A, the wheelchair suspension 2400 includes a frame 2402, a drive assembly 2404, a front caster pivot arm 2406, and a rear caster 2408. The drive assembly 2404 is pivotally mounted to the frame 2402 at a drive assembly pivot axis 2410. In the embodiment illustrated by FIG. 24A, the drive assembly pivot axis 2410 of the drive assembly 2404 is below an axis of rotation 2412 of a drive axle 2414 of the drive assembly 2404 and is in front of a pivot axis 2416 of the front caster pivot arm 2406. In the illustrated embodiment, the pivot axis 2416 is lower than the axle 135 of the front caster 2420. As such, an angle 1 is defined between a line 2417 that extends through the pivot axis 2416 and the axle 135 and a horizontal support surface.

A drive assembly pivot arm 2434 and the front caster pivot arm 2406 are in a crossed configuration when viewed from the side as shown in FIG. 24A. The front caster pivot arm 2406 and the drive assembly pivot arm 2434 may be laterally offset as shown in the example of FIG. 6, or may be bent or formed to accommodate the crossed configuration. By arranging the front caster pivot arm 2406 and the drive assembly pivot arm 2434 in the crossed configuration, the length of the front caster pivot arm 2406 and/or the drive assembly pivot arm 2434 can be increased as compared to a suspension where the front caster pivot arm and the drive assembly pivot arm do not cross.

The front caster pivot arm 2406 is coupled to the drive assembly 2404 in the example illustrated by FIG. 24A. For example, the front caster pivot arm 2406 and the drive assembly 2404 can be coupled in any manner that transfers at least a portion of the motion of the drive assembly in at least one direction to the front caster pivot arm. In the embodiment illustrated by FIG. 24A, the link 2418 is pivotally connected to the drive assembly 2404 and the front caster pivot arm 2406. The link 2418 may be configured to transfer motion of the drive assembly 2404 to the front caster pivot arm 2406 and/or to transfer motion of the front caster pivot arm 2406 to the drive assembly 2404. For example, the link 2414 may be configured such that torque applied by the drive assembly 2404 urges the front caster pivot arm 2406 and the front caster 2420 upward with respect to a support surface 119. In another example, the link 2418 may be configured such that pivoting of the front caster pivot arm 2406 with respect to the frame 2402 due to upward movement of the front caster 2420 causes pivoting of the drive assembly 2404 with respect to the frame 2402.

In the embodiment illustrated by FIG. 24A, each drive assembly 2404 (one is disposed on each side of the frame 2402) includes a motor drive 2430, a drive wheel 2432, and the pivot arm 2434. The motor drive 2430 drives the drive wheel 2432 about the axis of rotation 2412. In the embodiment illustrated by FIG. 24A, the pivot arm 2434 extends forward and downward from the motor drive to the drive assembly pivot axis 2410.

In one embodiment, one or more optional additional links 2418' may be coupled between the frame 2402 and the front caster pivot arm 2406 or the frame and the drive assembly 2404 (See FIG. 24A). For example, an additional link 2418' may be used to bias the front caster 2420 into engagement with the support surface 119, to damp vibration from the front caster traveling over rough terrain, and/or to provide a stability control function to the front caster pivot arm 2404. In one exemplary embodiment, the additional link 2418' does not apply a spring or biasing force until the front caster 2420 has moved a predetermined distance away from the support surface 119. For example, the additional link 2418' may be configured to apply no biasing force to the front caster pivot arm when the suspension 2400 is in a normal operating position, on a flat, horizontal support surface 119. As the front caster pivot arm 2406 moves upward from the normal position, the additional link 2418' begins to apply a downward biasing force at some point. The stability control function provided by the additional link(s) 2418' may be any of the stability control methods and configurations described below in the "Stability Control" section.

An additional link 2419' may be also used to bias the drive wheel of the drive assembly 2404 into engagement with the support surface 119 and/or to damp vibration from the drive wheel traveling over rough terrain (See FIG. 24A). The optional additional link 2419' may have any of the features of the other links disclosed herein and/or components used in the stability control systems disclosed herein.

The front caster pivot arm 2406 may be a substantially rigid member. In one embodiment, the front caster pivot arm 2406 is flexible to provide inherent shock absorbing properties in the front caster pivot arm. The pivot arm 2406 may be made from a wide variety of materials, including, but not limited to, metals and plastics. The front caster pivot arm 2406 is pivotally mounted to the frame 2402 at the pivot axis 2416. The pivot axis 2416 of the front caster pivot arm is rearward of the drive assembly pivot axis 2410 and below the axis of rotation 2412 of the drive wheel and below the axis of rotation 2435 of the wheel of the front caster 2420 in the embodiment illustrated by FIG. 24A.

In the embodiment illustrated by FIG. 24A, the link 2418 is connected to the drive assembly pivot arm 2434 at a pivotal connection 2450. The link 2418 is connected to the front caster pivot arm 2406 at a pivotal connection 2452. The link 2418 can take a wide variety of different forms. For example, the link may be rigid, flexible, or extendible in length. Any link 2418 that transfers at least some portion of motion and/or force in at least one direction of the drive assembly 2404 to the front caster pivot arm and/or that transfers at least some portion of motion and/or force in at least one direction of the front caster pivot arm 2406 to the drive assembly can be used.

The pivotal connections 2450 and 2452 can be at any location of the drive assembly pivot arm 2434 and the front caster pivot arm 2406 respectively. In an exemplary embodiment where the link 2418 includes a force applying device, such as a spring and/or a damper (shock absorber), the positioning of the pivotal connections 2450 and 2452 on the drive assembly and the front caster pivot arm can be selected to select the distribution of spring and/or damping force between the drive wheel 2432 and the front caster 2420. The orientation of the link 2418 effects spring and/or damping force applied to the drive wheel assembly pivot arm 2434 and the front caster pivot arm 2406.

Positioning the link 2418 to be more normal (i.e. closer to perpendicular) to a line 2419 that extends through the pivotal connection 2450 and the drive assembly pivot axis 2410 tends to increase the force from the link 2418 that is applied to the drive assembly pivot arm 2434. Positioning the link 2418 to be more parallel to the line 2419 that extends through the pivotal connection 2450 and the drive assembly pivot axis 2410 tends to decrease the force from the link 2418 that is applied to the drive assembly pivot arm 2434. Similarly, positioning the link 2418 to be more normal (i.e. closer to perpendicular) to a line 2421 (lower portion of the illustrated pivot arm 2406) that extends through the pivotal connection 2452 and the front caster pivot arm pivot axis 2416 tends to increase the force from the link 2418 that is applied to the front caster pivot arm 2406. Positioning the link 2418 to be more parallel to the line 2421 that extends through the pivotal connection 2452 and the front caster pivot arm pivot axis 2416 tends to decrease the force from the link 2418 that is applied to the front caster pivot arm 2406.

In the example illustrated by FIG. 24A, the link 2418 is positioned to be nearly normal to the line 2419. For example, an angle Ω between the link 2418 and the line 2419 may be between 60 and 120 degrees, between 70 and 110 degrees, between 80 and 100 degrees, between 85 and 90 degrees, or about 90 degrees. In the example illustrated by FIG. 24A, the link 2418 is positioned to be nearly parallel to the line 2421. For example, the link 2418 may be disposed on either side of the line 2421 and an angle between the link 2418 and the line 2421 may be between 0 and 30 degrees, between 0 and 20 degrees, between 0 and 10 degrees, between 0 and 5 degrees, or about 0 degrees.

Figure 24B:
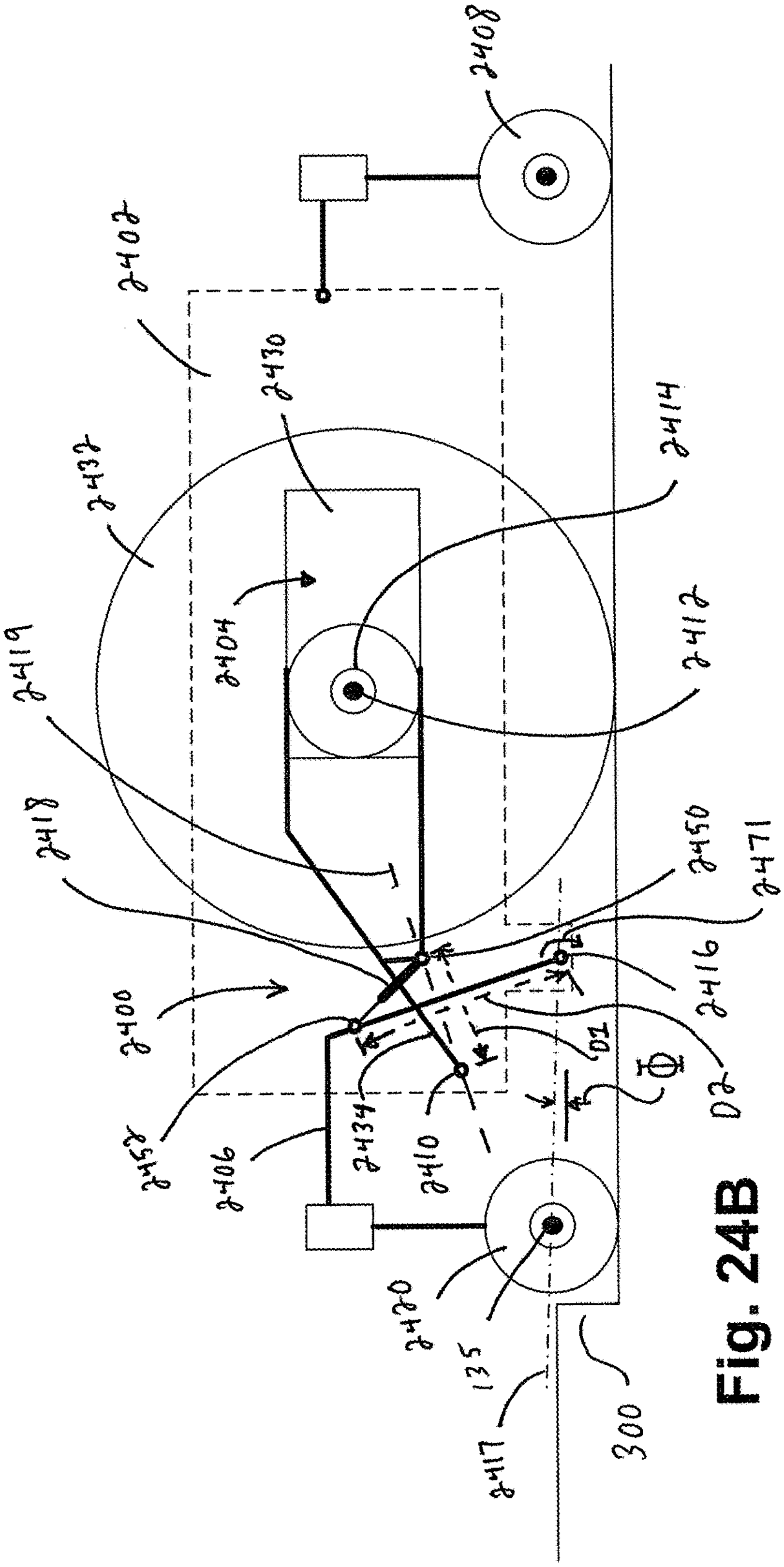
FIG. 24B is a side view of the wheelchair suspension of FIG. 24A approaching a raised obstacle.

In one exemplary embodiment, the force distribution of spring and/or damping force between the drive wheel 2432 and the front caster 2420 can be adjusted by adjusting a ratio of distance D1 (FIG. 24B) between the pivotal connection 2450 to the drive assembly pivot axis 2410 to the distance D2 (FIG. 24B between the pivotal connection 2452 to the front caster pivot arm pivot axis 2416. Positioning the pivotal connection 2450 farther away from the drive assembly pivot axis 2410 increases the moment about the pivot axis 2410 that results from the force applied by the link 2418, and thus increases the force that is applied to the drive wheel 2432. Positioning the pivotal connection 2450 closer to the drive assembly pivot axis 2410 decreases the moment about the pivot axis 2410 that results from the force applied by the link 2418, and thus reduces the force that is applied to the drive wheel 2432. Positioning the pivotal connection 2452 farther away from the front caster pivot arm pivot axis 2416 increases the moment about the pivot axis 2416 that results from the force applied by the link 2418, and thus increases the force that is applied to the front caster 2420. Positioning the pivotal connection 2452 closer to the front caster pivot arm pivot axis 2416 decreases the moment about the pivot axis 2416 that results from the force applied by the link 2418, and thus decreases the force that is applied to the front caster 2420. In one exemplary embodiment, the ratio of D1 to D2 is 0.5 to 1.5; 0.75 to 1.25; 0.9 to 1.1, or about 1.

In one exemplary embodiment, the positioning of the pivotal connections 2450 and 2452 on the drive assembly and the front caster pivot arm are selected to apply a majority of the spring and/or damping force to the drive wheel 2432 with a minority of the force applied to the front caster 2420. By applying the majority of the force to the drive wheel 2432 traction between the drive wheel and the support surface and the ease with which the front caster can climb an obstacle are enhanced. For example, between 60 and 90%, between 60 and 80%, between 60 and 70%, or about 65% of the spring and/or damping force is applied to the drive wheel 2432.

FIG. 24B is an elevational view of the suspension 2400 approaching an obstacle 300. Due to the angle Φ, a moment (indicated by arrow 2471) about the pivot axis 2416 is produced when the front caster 2420 impacts the obstacle 300. This moment 2471 causes the front caster pivot arm to pivot upward, which increases the moment 2471.

Figure 24C:
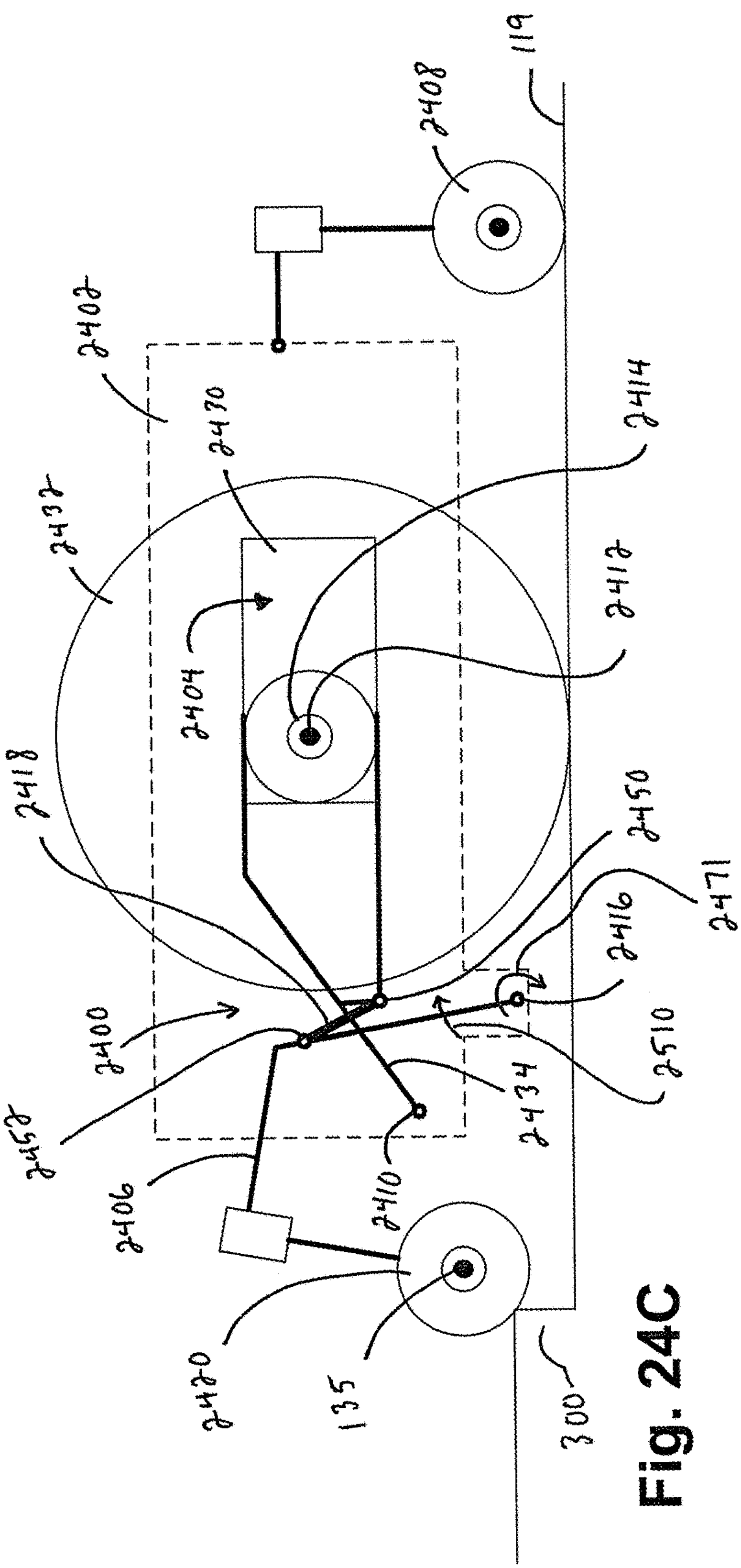
FIG. 24C is a side view of the wheelchair suspension of FIG. 24A traversing a raised obstacle with a front caster engaging the obstacle.

Referring to FIG. 24C, continued movement of the suspension 2400 toward the obstacle causes the front caster pivot arm 2416 to continue to pivot and move the front caster 2420 upward. In an exemplary embodiment, the link 2418 is a variable length motion transfer member, such as a spring, a shock absorber, or a combination of a spring and a shock absorber. In the illustrated embodiment, the length of the link 2418 is reduced as the front caster pivot arm 2416 pivots the front caster upward. In an exemplary embodiment, the drive wheel assembly pivot arm 2434 does not substantially pivot as the link 2418 is shortening and the front caster 2420 is ascending the obstacle 300. That is, the front caster pivot arm 2416 and the drive wheel assembly pivot arm are substantially independent as the front caster 2420 is ascending the obstacle 300. Since the drive wheel assembly pivot arm 2434 is not pivoting, the frame 2402 does not tilt or does not substantially tilt as the front caster 2420 is ascending the obstacle 300.

Referring to FIG. 24C, when the front caster 2420 engages the obstacle 300, the front caster pivot arm 2406 pivots as indicated by arrow 2510 and the link 2418 compresses to absorb shock that results from the impact between the front caster 2420 and the obstacle 300. In an exemplary embodiment, the link 2418 is configured to shorten to a minimum length as the front caster 2420 is traversing the obstacle. For example, the link 2418 may shorten to its minimum length when the front caster is 2-4 inches from the support surface 119, 2.5 to 3.5 inches from the support surface, or about 3 inches from the support surface.

Figure 24D:
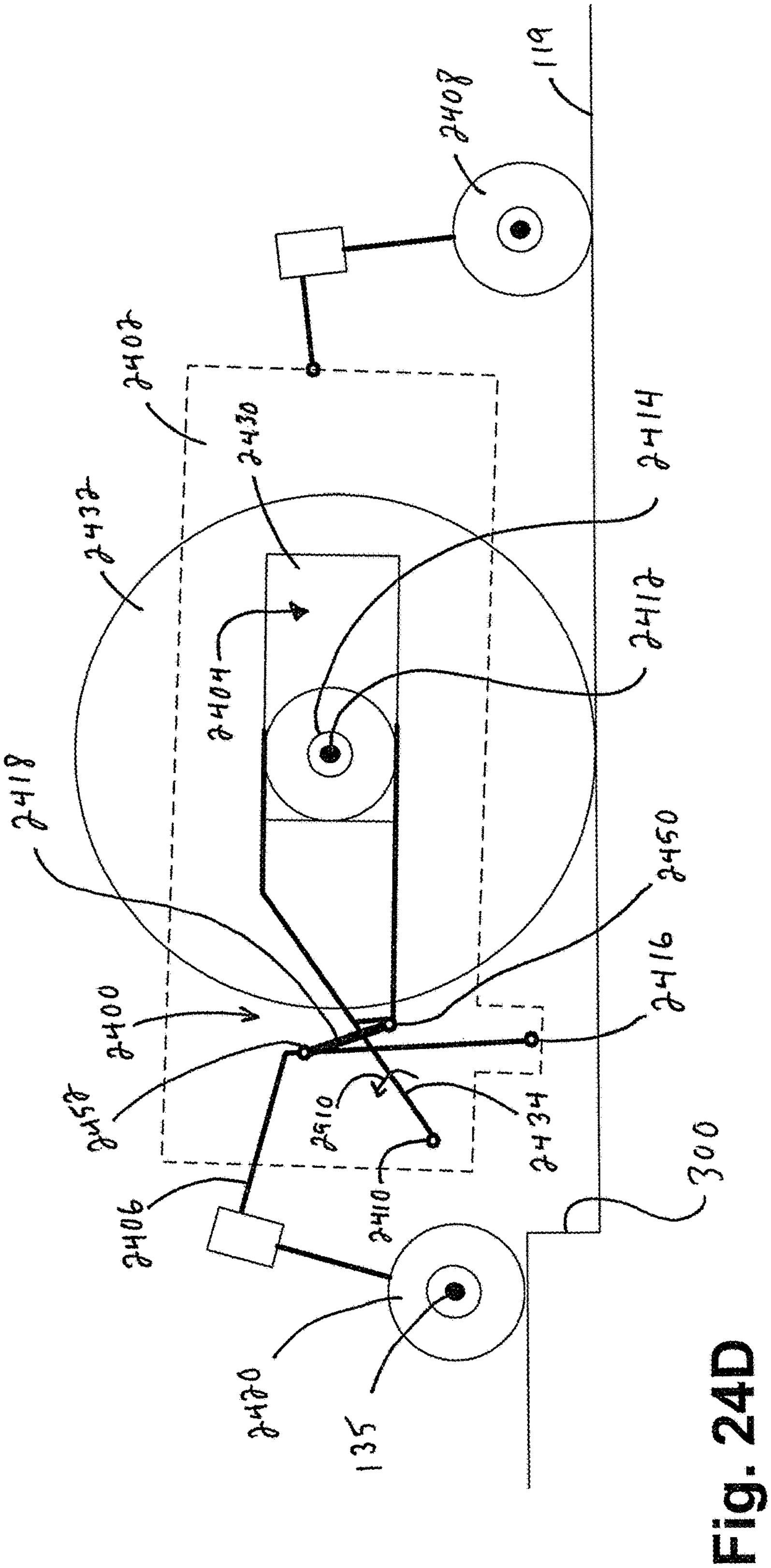
FIG. 24D is a side view of the wheelchair suspension of FIG. 24A traversing a raised obstacle with a front caster on top of the obstacle.

Referring to FIGS. 24C and 24D, when the link 2418 shortens to its minimum length, the drive wheel assembly pivot arm 2434 becomes coupled to the front caster pivot arm 2416. Further upward movement of the front caster 2420 causes the front caster pivot arm 2416 to pivot further, which causes the drive wheel assembly pivot arm 2434 to also pivot with respect to the frame 2402 as the suspension continues to traverse the obstacle.

As described above, an exemplary embodiment of the suspension 2400 transitions from a first condition where the front caster pivot arm 2416 and the drive wheel assembly pivot arm are substantially independent to a condition where the front caster pivot arm 2416 and the drive wheel assembly pivot arm are coupled as the front caster 2420 is ascending the obstacle 300. This transition may be instantaneous, such as when the link reaches its minimum length. Or, the transition from independent to coupled may be gradual. For example, the link 2418 may include a spring. As the length of the link 2418 shortens, the spring force applied between the front caster pivot arm 2416 and the drive wheel assembly pivot arm 2434 increases. As the spring force increases, pivotal movement of the front caster pivot arm 2416 with respect to the frame 2402 will begin to cause the drive wheel assembly pivot arm 2434 to pivot with respect to the frame. As the spring force increases, more of the movement of the front caster pivot arm 2416 is transferred to the drive assembly pivot arm 2434. In one exemplary embodiment, the link 2418 is shortened to a minimum length or the link is shortened to a point where the spring force is high enough that the link substantially functions as a fixed length link.

Figure 24E:
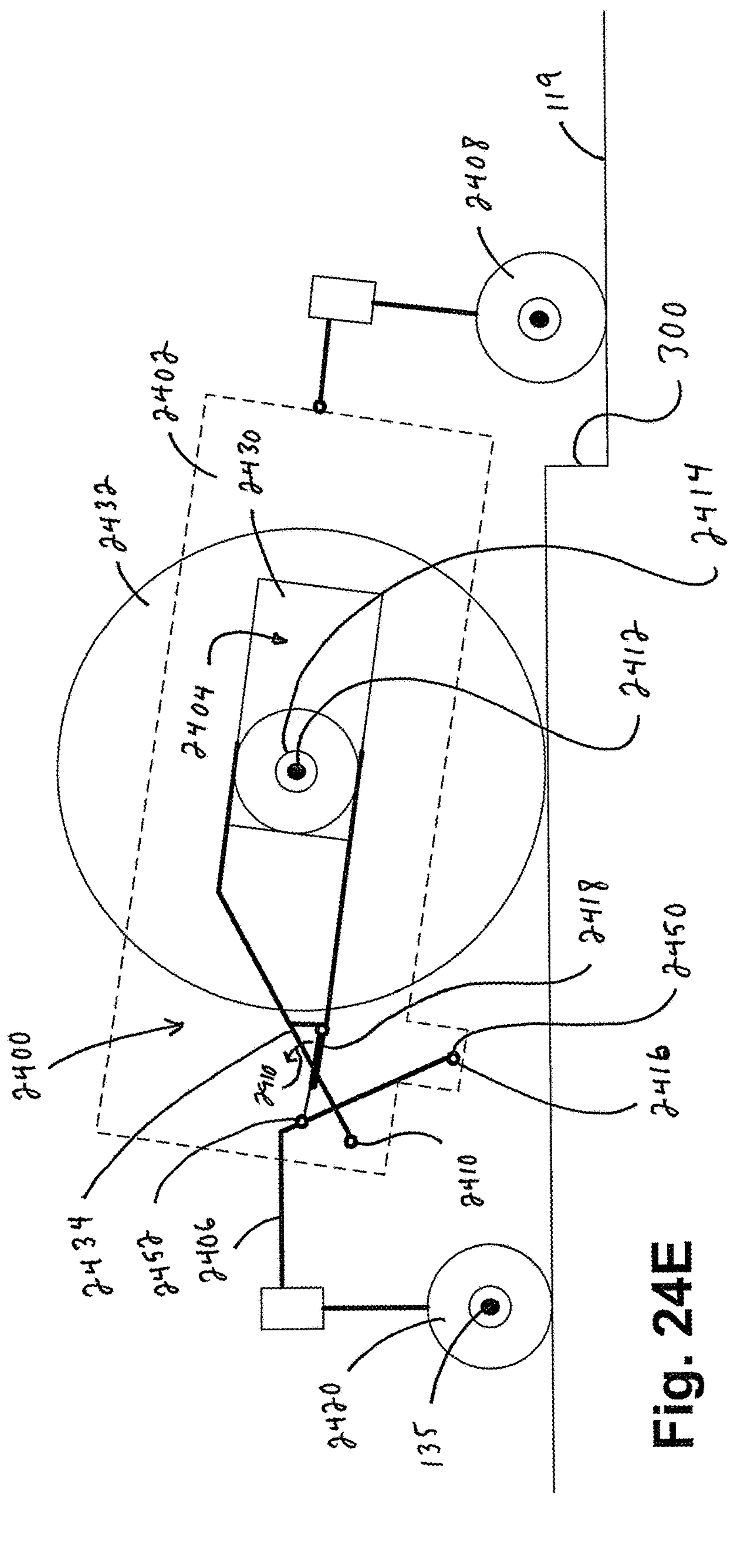
FIG. 24E is a side view of the wheelchair suspension of FIG. 24A traversing a raised obstacle with a front caster and a drive wheel on top of the obstacle.

Illustrated in FIGS. 24D and 24E are side elevational views of the suspension 2400 with the drive wheel 2432 traversing the obstacle 300. Once the front caster 2420 is on the obstacle 300, the link 2418 may lengthen. As such, the suspension 2400 transitions back to the condition where the front caster pivot arm 2416 and the drive wheel assembly pivot arm are substantially independent. When the drive wheel 2432 comes into contact with obstacle 300, the drive assembly 2404 pivots in the direction indicated by arrow 2910 around pivot axis 2410 to soften the impact from the obstacle 300 that is transferred to the frame 2402. During such pivotal movement of the drive assembly 2404, the link 2418 compresses to allow pivoting of the drive assembly 2404 with respect to the front caster pivot arm. Compressing of the link 2418 absorbs shock that results from the impact between the drive wheel 2432 and the obstacle 300.

Figure 24F:
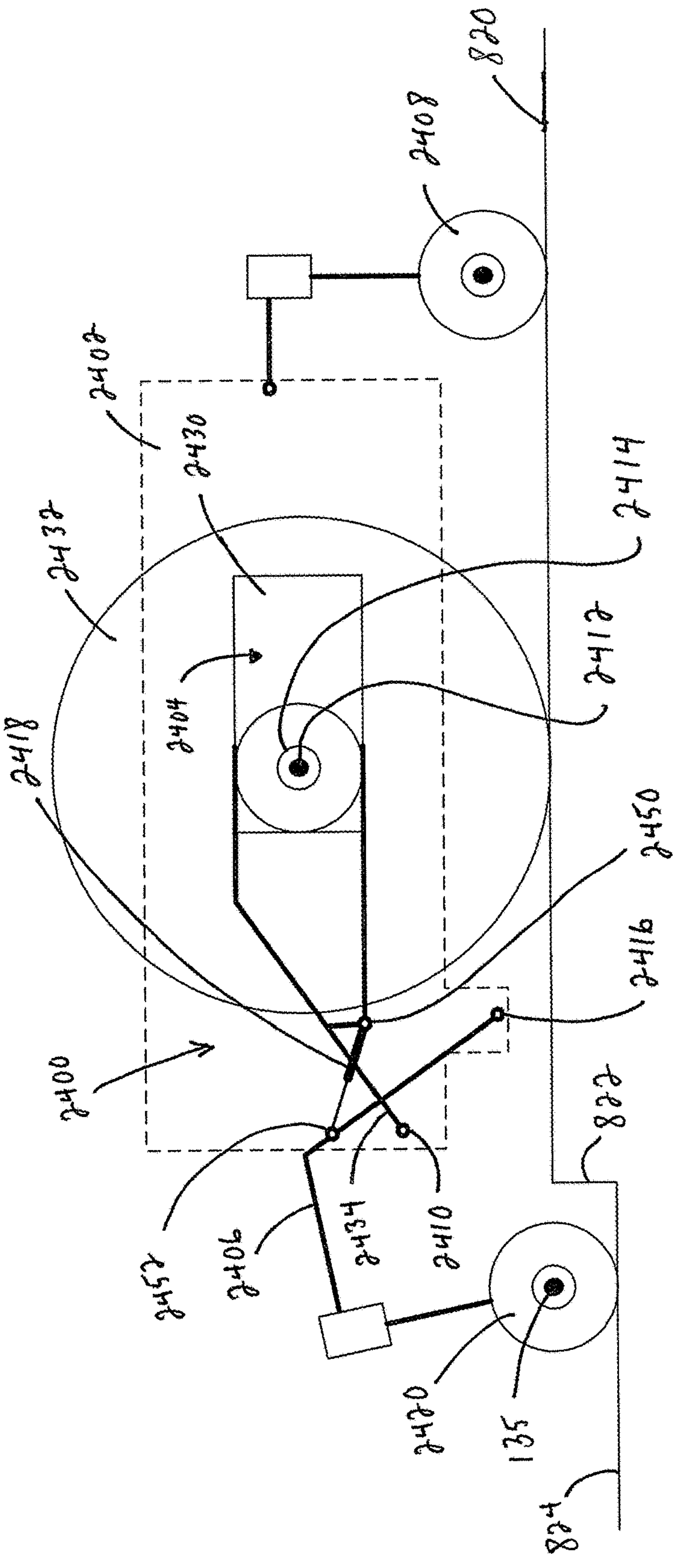
FIG. 24F is a side view of the wheelchair suspension of FIG. 24A descending an obstacle with a front caster stepping down to a lower surface.
Figure 24G:
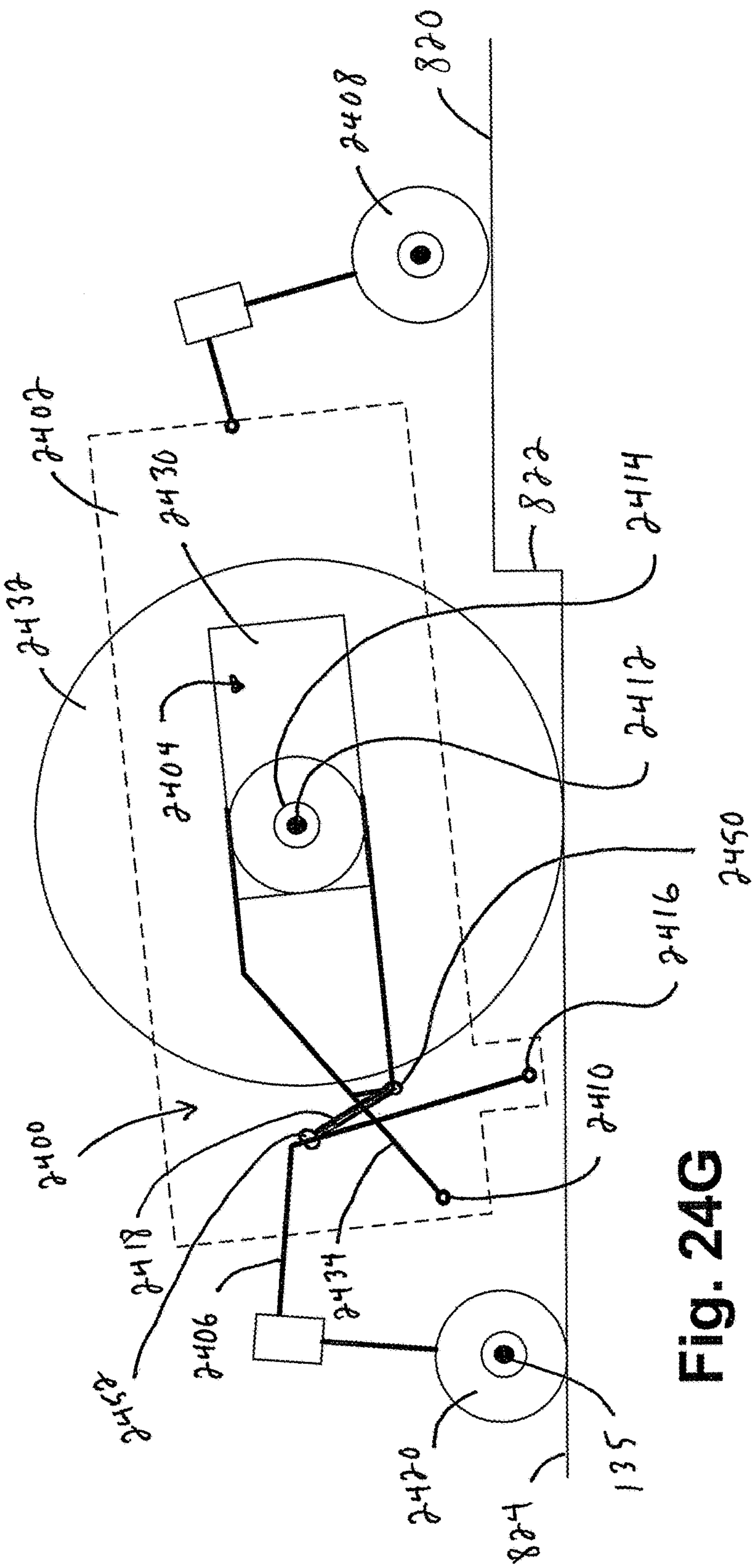
FIG. 24G is a side view of the wheelchair suspension of FIG. 24A descending an obstacle with a front caster and a drive wheel on a lower surface.

FIGS. 24F and 24G illustrates an embodiment of the suspension 2400 descending from an elevated surface 820 with a step 822 to a lower surface 824. When the front caster 2420 reaches the step 822, the front caster 2420 and the front caster pivot arm 2406 begin to move downward. The weight of the front caster pivot arm 2406 and front caster 2420, in addition to any weight supported by the front caster 2420 and any spring included in the link 2418, causes the link 2418 to extend the link to its maximum length or until the front caster 2420 engages the lower surface 824. By allowing the front caster 2420 to drop down and/or engage the lower surface 2424 before the drive wheel reaches the step, the front caster 2420 and the link 2418 can absorb shock that results from the drive wheel 2432 moving from the upper surface 820 to the lower surface 824.

Figure 25A:
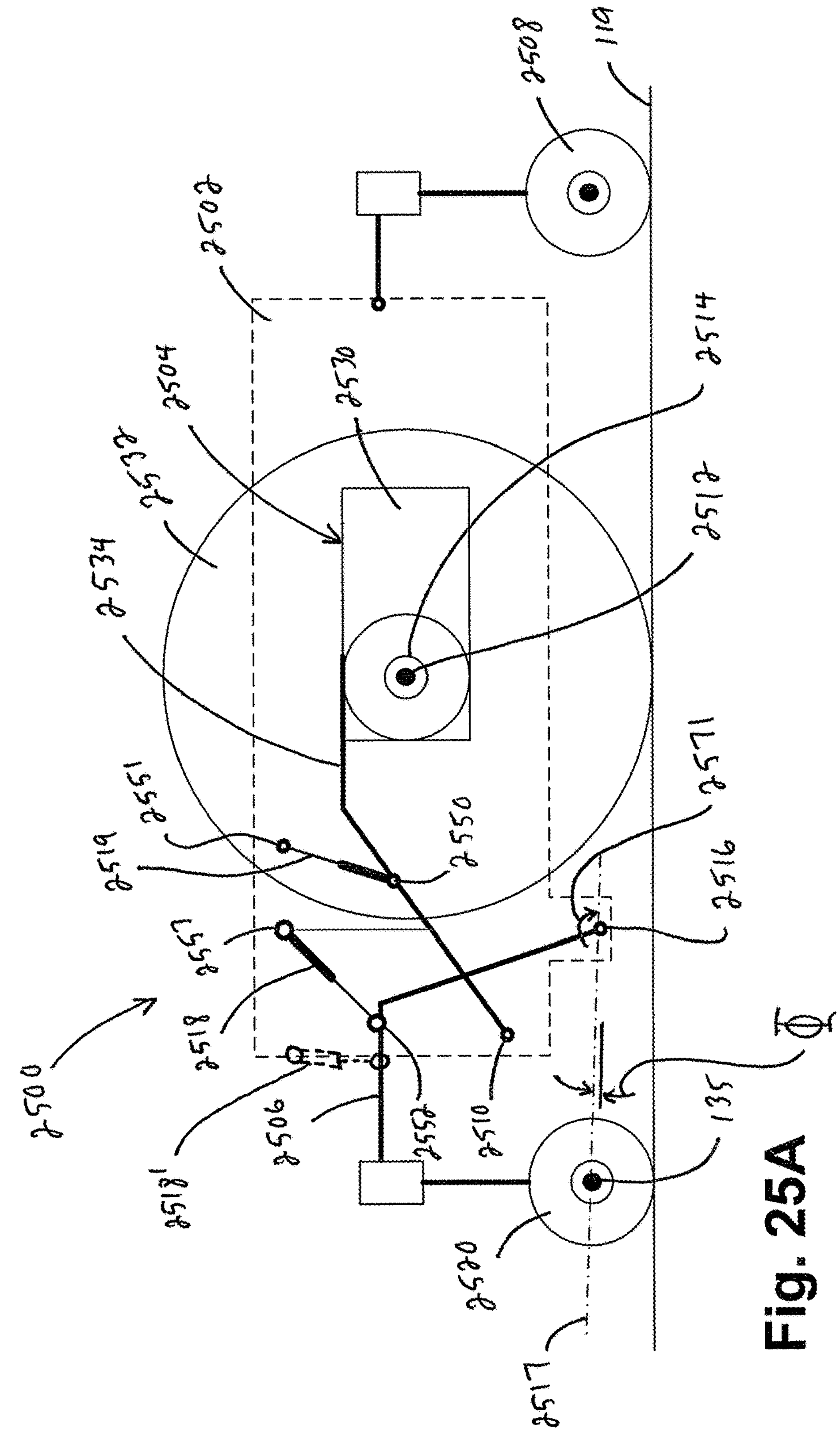
FIG. 25A is a side view of another embodiment of a wheelchair suspension.

FIG. 25A illustrates another embodiment of a wheelchair suspension 2500 that is similar to the embodiment illustrated by FIG. 24A. In the example illustrated by FIG. 25A, the front caster pivot arm 2506 and the drive assembly pivot arm 2534 are independently suspended, instead of being coupled by a link, such as the link 2418 in the FIG. 24A embodiment.

In the example illustrated by FIG. 25A, the wheelchair suspension 2500 includes a frame 2502, a drive assembly 2504, a front caster pivot arm 2506, and a rear caster 2508. The drive assembly 2504 is pivotally mounted to the frame 2502 at a drive assembly pivot axis 2510. In the embodiment illustrated by FIG. 25A, the drive assembly pivot axis 2510 of the drive assembly 2504 is below an axis of rotation 2512 of a drive axle 2514 of the drive assembly 2504 and is in front of a pivot axis 2516 of the front caster pivot arm 2506. In the illustrated embodiment, the pivot axis 2516 is lower than the axle 135 of the front caster 2520. As such, an angle Φ is defined between a line 2517 that extends through the pivot axis 2516 and the axle 135 and a horizontal support surface 119.

The drive assembly pivot arm 2534 and the front caster pivot arm 2506 are in a crossed configuration when viewed from the side as shown in FIG. 25A. The front caster pivot arm 2506 and the drive assembly pivot arm 2534 may be laterally offset as shown in the example of FIG. 6, or may be bent or formed to accommodate the crossed configuration. By arranging the front caster pivot arm 2506 and the drive assembly pivot arm 2534 in the crossed configuration, the length of the front caster pivot arm 2506 and/or the drive assembly pivot arm 2534 can be increased as compared to a suspension where the front caster pivot arm and the drive assembly pivot arm do not cross.

The front caster pivot arm 2506 is not coupled to the drive assembly 2504 in the example illustrated by FIG. 25A. In the embodiment illustrated by FIG. 25A, a link 2519 is pivotally connected to the drive assembly 2504 and the frame 2502 and a link 2518 is pivotally connected to the front caster pivot arm 2406 and the frame 2502.

In the embodiment illustrated by FIG. 25A, each drive assembly 2504 (one is disposed on each side of the frame 2502) includes a motor drive 2530, a drive wheel 2532, and the pivot arm 2534. The motor drive 2530 drives the drive wheel 2532 about the axis of rotation 2512. In the embodiment illustrated by FIG. 25A, the pivot arm 2534 extends forward and downward from the motor drive to the drive assembly pivot axis 2510.

In one embodiment, one or more optional additional links may be coupled between the frame 2502 and the front caster pivot arm 2506 and/or the frame and the drive assembly 2504. For example, the link 2518 and/or an additional link 2518' may be used to provide a stability control function to the front caster pivot arm 2504. In one exemplary embodiment, the additional link 2518' does not apply a spring or biasing force until the front caster 2520 has moved a predetermined distance away from the support surface 119. For example, the additional link 2518' may be configured to apply no biasing force to the front caster pivot arm when the suspension 2500 is in a normal operating position, on a flat, horizontal support surface 119. As the front caster pivot arm 2506 moves upward from the normal position, the additional link 2518' begins to apply a downward biasing force at some point. The stability control function provided by the link 2518 and/or the optional additional link(s) 2518' may be any of the stability control methods and configurations described below in the "Stability Control" section.

The front caster pivot arm 2506 may be a substantially rigid member. In one embodiment, the front caster pivot arm 2506 is flexible to provide inherent shock absorbing properties in the front caster pivot arm. The pivot arm 2506 may be made from a wide variety of materials, including, but not limited to, metals and plastics. The front caster pivot arm 2506 is pivotally mounted to the frame 2502 at the pivot axis 2516. The pivot axis 2516 of the front caster pivot arm is rearward of the drive assembly pivot axis 2510 and below the axis of rotation 2512 of the drive wheel and below the axis of rotation 135 of the wheel of the front caster 2520 in the embodiment illustrated by FIG. 25A.

In the embodiment illustrated by FIG. 25A, the link 2518 is connected to the front caster pivot arm 2506 at a pivotal connection 2552 and to the frame at a pivotal connection 2553. The link 2519 is connected to the drive assembly pivot arm 2534 at a pivotal connection 2550 and to the frame 2502 at a pivotal connection 2551. The links 2518 and 2519 can take a wide variety of different forms. For example, the links 2518, 2519 may be flexible and/or extendible in length.

Figure 25B:
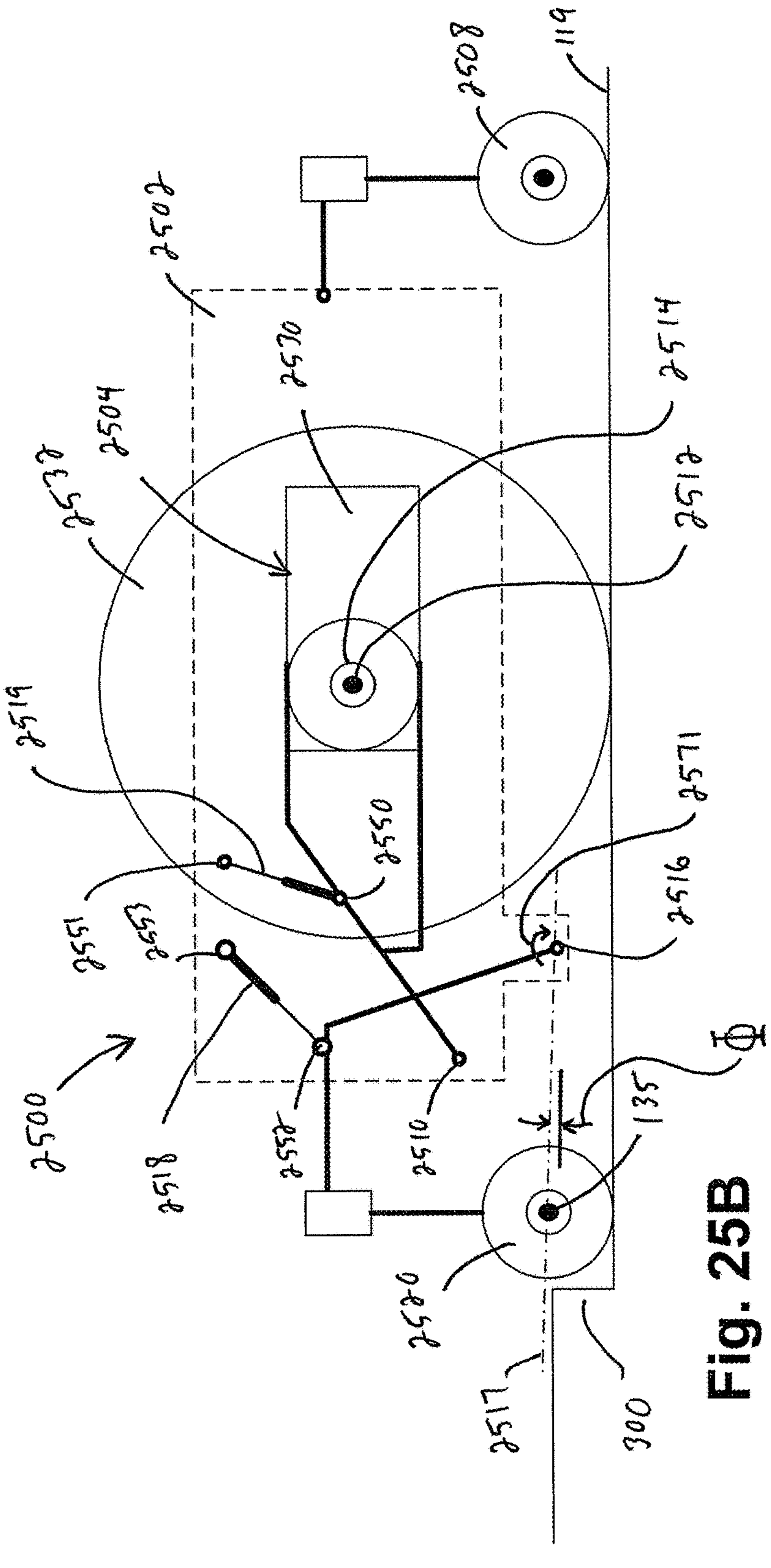
FIG. 25B is a side view of the wheelchair suspension of FIG. 25A approaching a raised obstacle.

FIG. 25B is an elevational view of the suspension 2500 approaching an obstacle 300. Due to the angle Φ, a moment (indicated by arrow 2571) about the pivot axis 2516 is produced when the front caster 2520 impacts the obstacle 300. This moment 2571 causes the front caster pivot arm to pivot upward, which increases the moment 2571.

Figure 25C:
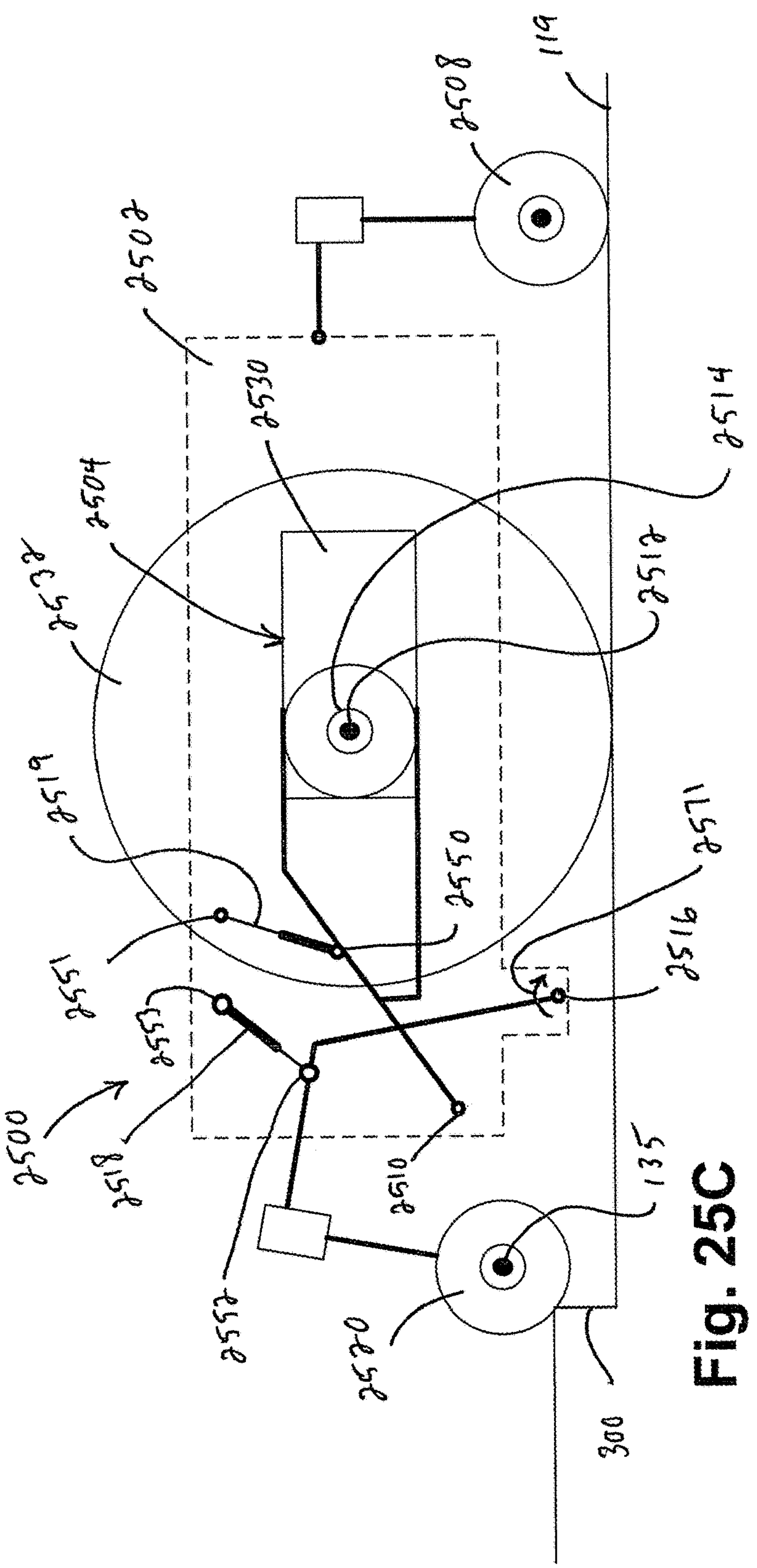
FIG. 25C is a side view of the wheelchair suspension of FIG. 25A traversing a raised obstacle with a front caster engaging the obstacle.
Figure 25D:
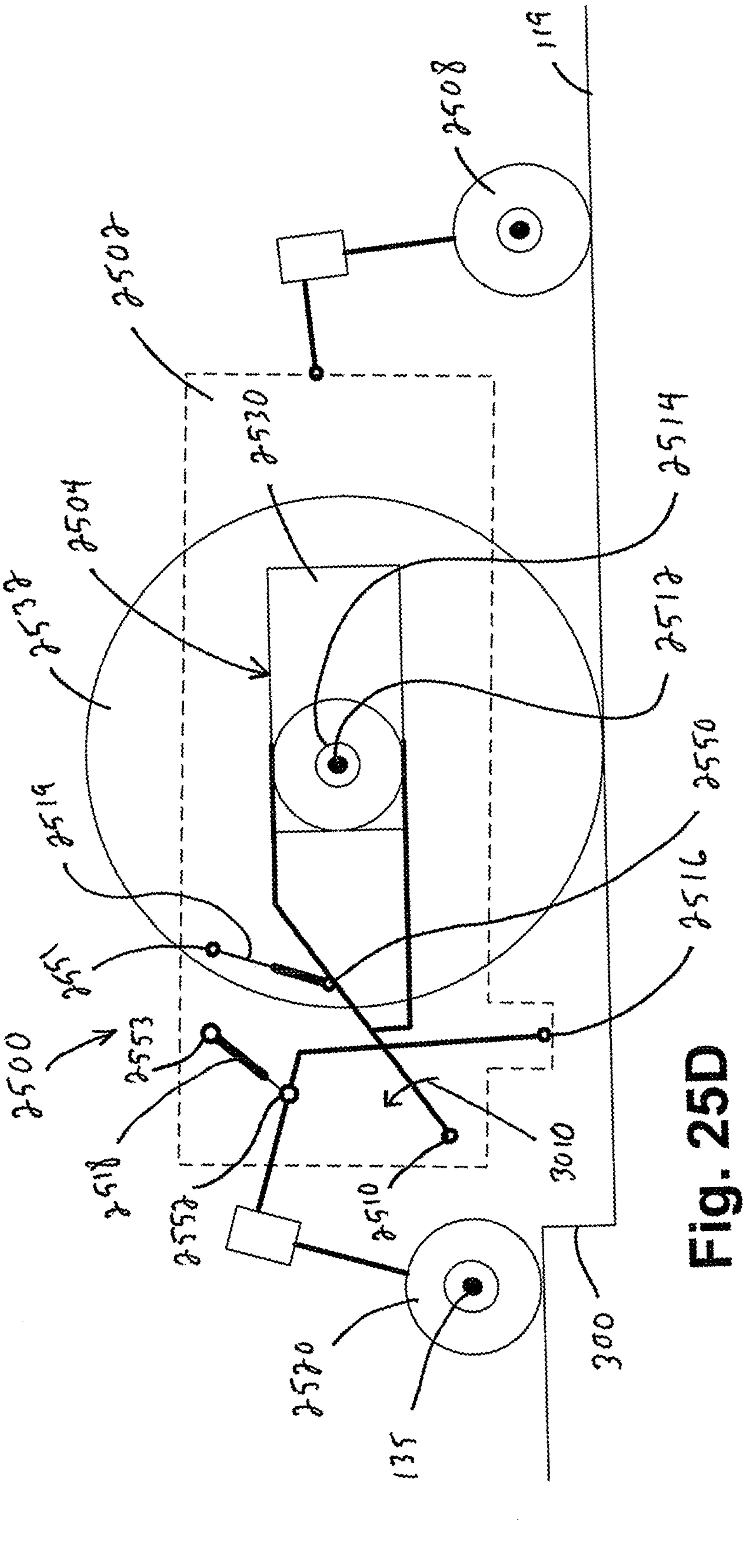
FIG. 25D is a side view of the wheelchair suspension of FIG. 25A traversing a raised obstacle with a front caster on top of the obstacle.

Referring to FIG. 25C, continued movement of the suspension 2500 toward the obstacle causes the front caster pivot arm 2516 to continue to pivot and move the front caster 2520 upward. In an exemplary embodiment, the link 2518 is a variable length motion transfer member, such as a spring, a shock absorber, or a combination of a spring and a shock absorber. In the illustrated embodiment, the length of the link 2518 is reduced as the front caster pivot arm 2516 pivots the front caster 2520 upward. In an exemplary embodiment, the drive wheel assembly pivot arm 2534 does not substantially pivot as the front caster 2520 is ascending the obstacle 300. The front caster pivot arm 2516 and the drive wheel assembly pivot arm are independent. The frame 2502 does not tilt or does not substantially tilt as the front caster 2520 is ascending the obstacle 300. Referring to FIG. 25D, when the front caster 2520 engages the obstacle 300, the front caster pivot arm 2506 pivots upward and the link 2518 compresses to absorb shock that results from the impact between the front caster 2520 and the obstacle 300.

Figure 25E:
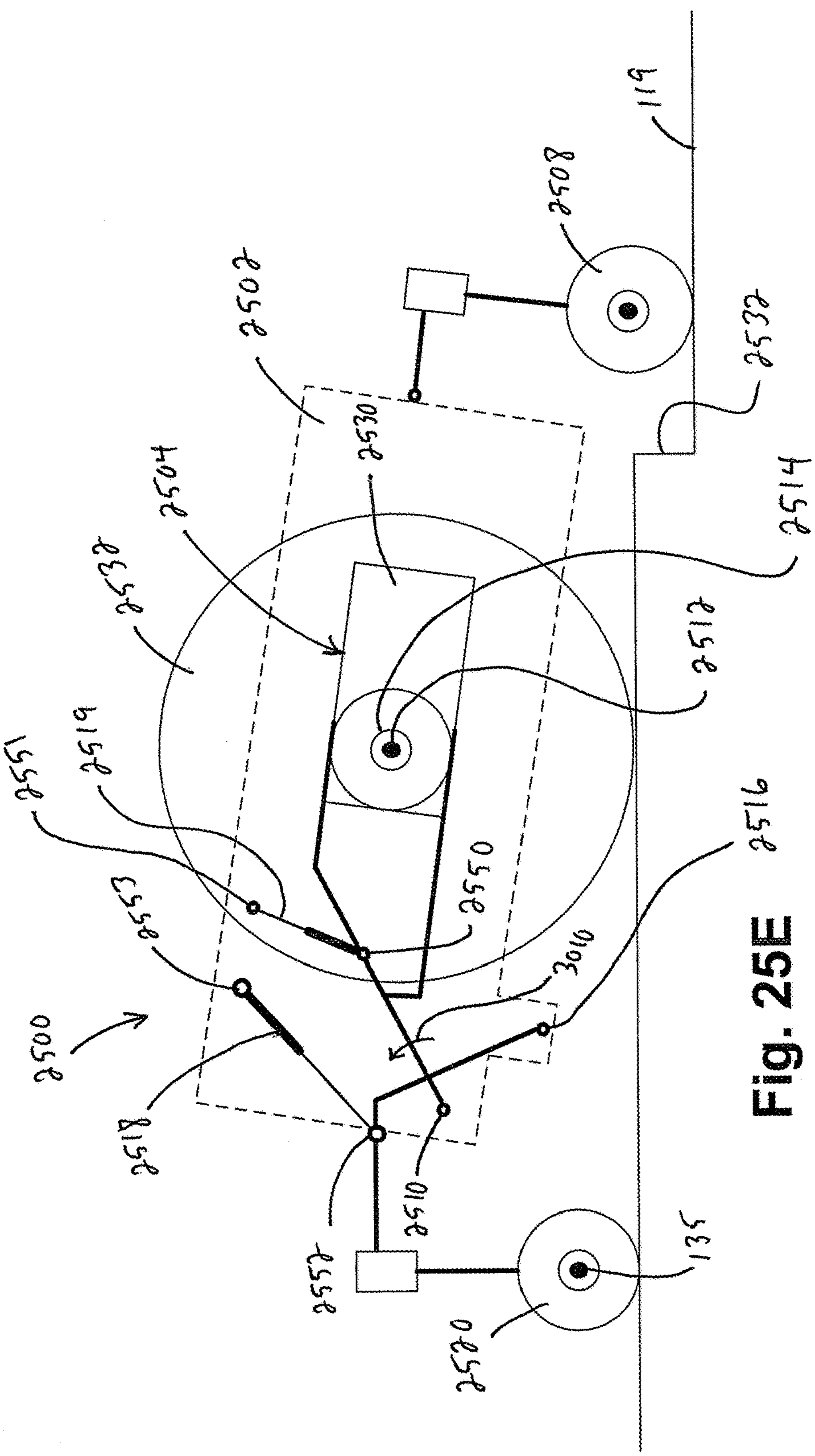
FIG. 25E is a side view of the wheelchair suspension of FIG. 25A traversing a raised obstacle with a front caster and a drive wheel on top of the obstacle.

Illustrated in FIGS. 25D and 25E are side elevational views of the suspension 2500 with the drive wheel 2532 traversing the obstacle 300. Once the front caster 2520 is on the obstacle 300, the link 2518 may lengthen. When the drive wheel 2532 comes into contact with obstacle 300, the drive assembly 2504 pivots in the direction indicated by arrow 3010 around pivot axis 2510 to soften the impact from the obstacle 300 that is transferred to the frame 2502. During such pivotal movement of the drive assembly 2504, the link 2519 compresses to allow pivoting of the drive assembly 2504 with respect to the front caster pivot arm. Compressing of the link 2519 absorbs shock that results from the impact between the drive wheel 2532 and the obstacle 300.

Figure 25F:
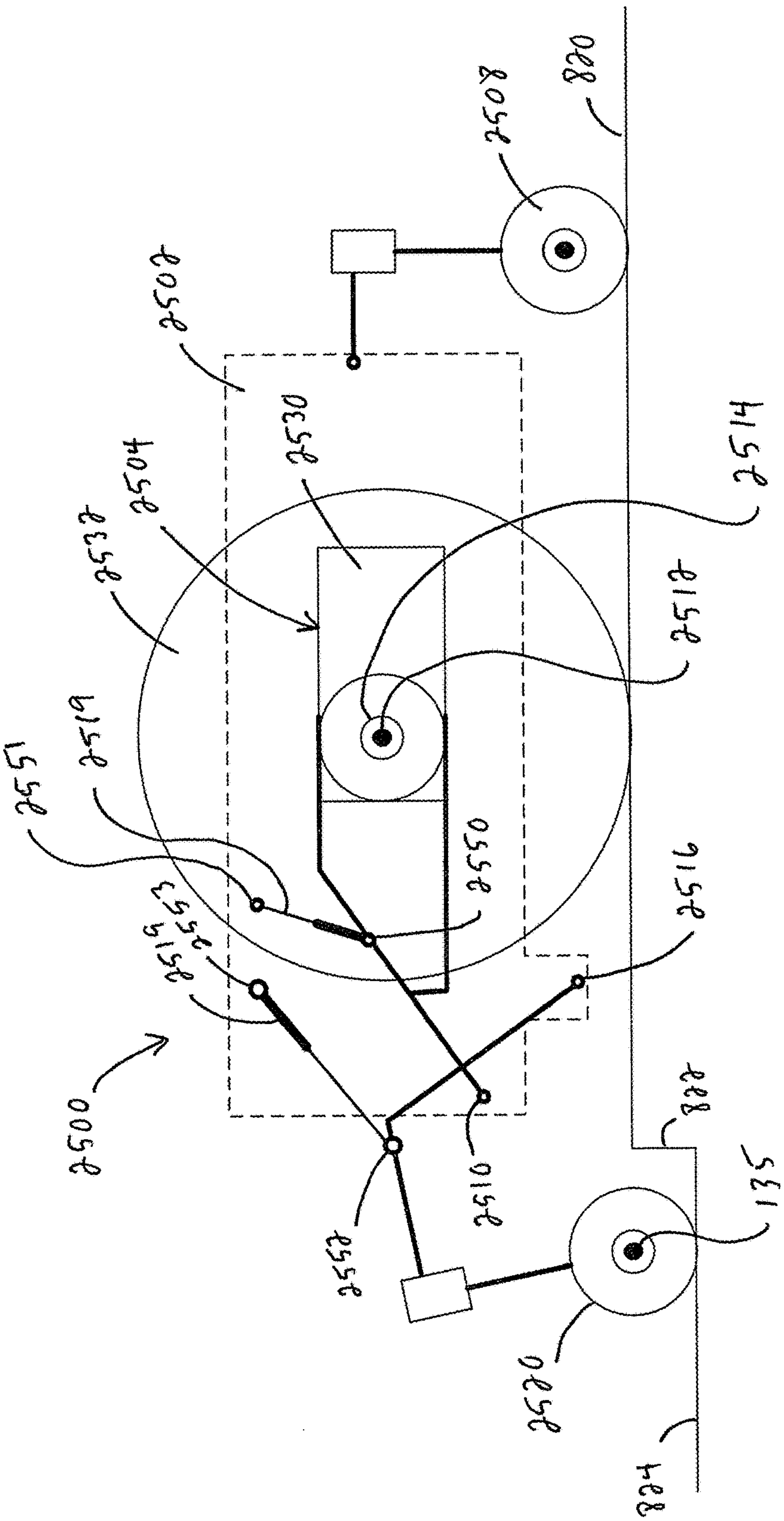
FIG. 25F is a side view of the wheelchair suspension of FIG. 25A descending an obstacle with a front caster stepping down to a lower surface.
Figure 25G:
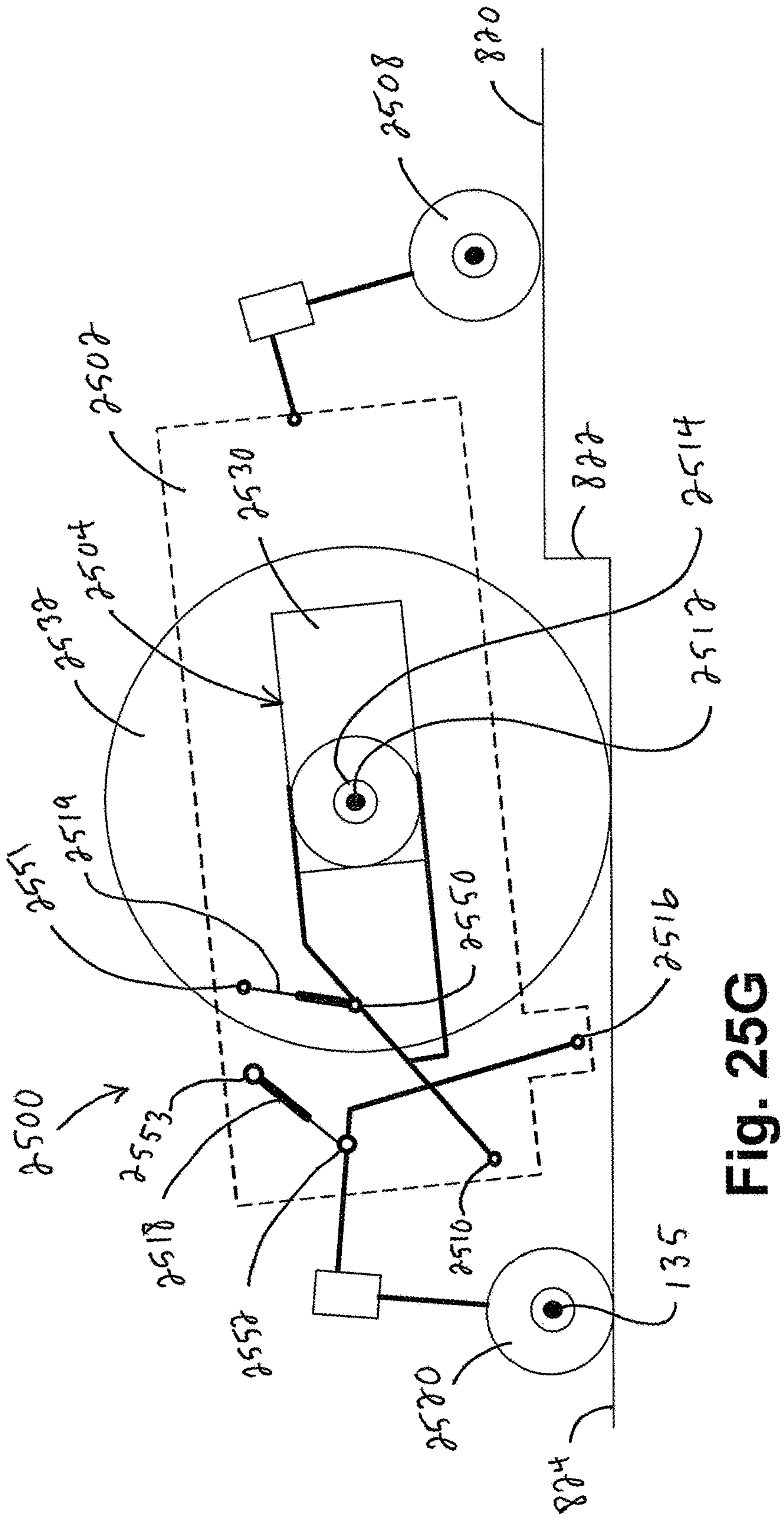
FIG. 25G is a side view of the wheelchair suspension of FIG. 25A descending an obstacle with a front caster and a drive wheel on a lower surface.

FIGS. 25F and 25G illustrates an embodiment of the suspension 2500 descending from an elevated surface 820 with a step 822 to a lower surface 824. When the front caster 2520 reaches the step 822, the front caster 2520 and the front caster pivot arm 2506 begin to move downward. The weight of the front caster pivot arm 2506 and front caster 2520, in addition to any weight supported by the front caster 2520 and any spring included in the link 2518, causes the link 2518 to extend the link to its maximum length or until the front caster 2520 engages the lower surface 824. By allowing the front caster 2520 to drop down and/or engage the lower surface 824 before the drive wheel reaches the step, the front caster 2520 and the link 2518 can absorb some of the shock that results from the drive wheel 2532 moving from the upper surface 820 to the lower surface 824. When the drive wheel moves downward off of the step 822 the link 2519 absorbs shock from the drive wheel 2532 moving from the upper surface 820 to the lower surface 824.

Figure 26A:
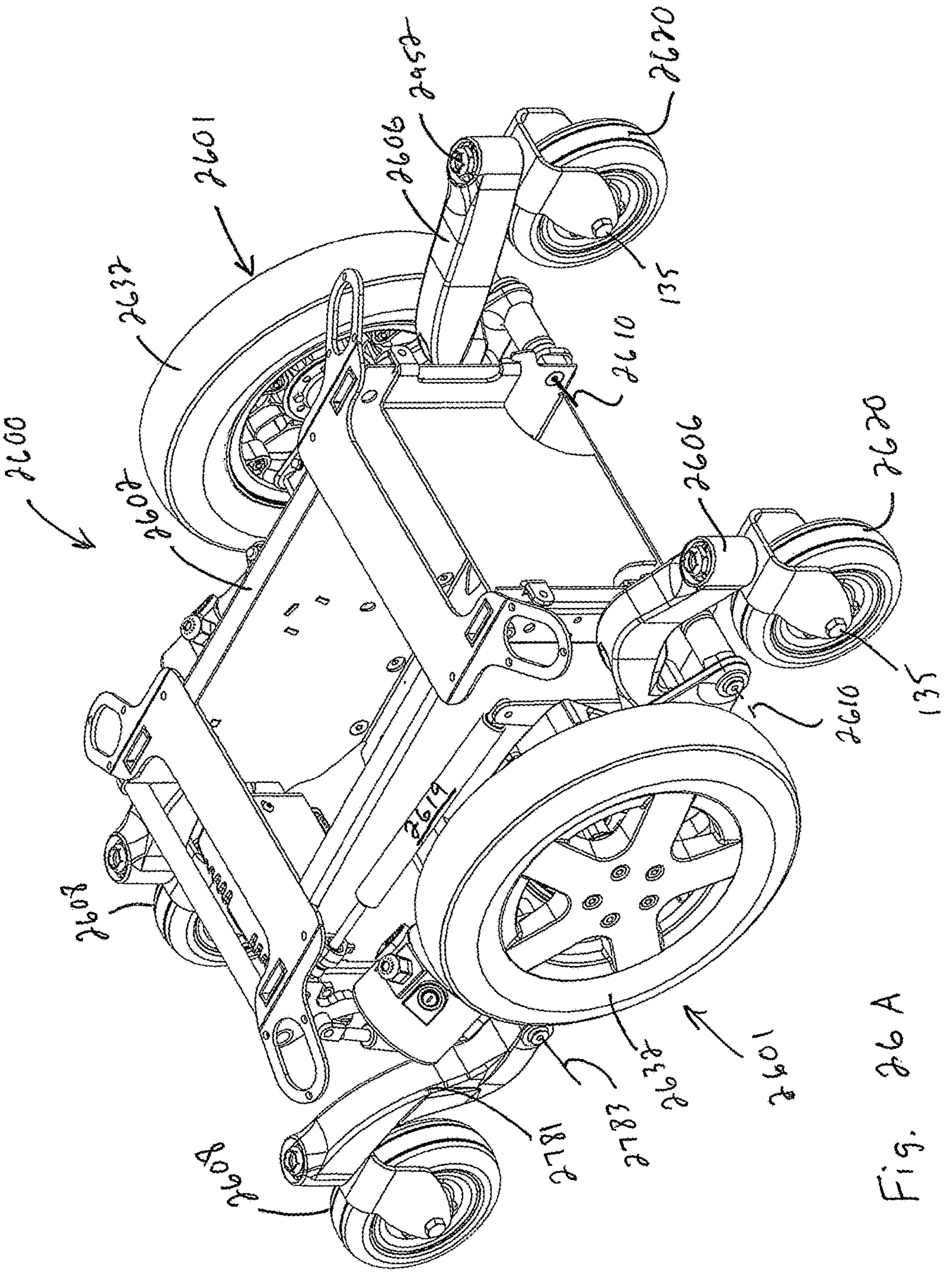
FIG. 26A is a perspective view of an exemplary embodiment of a wheelchair chassis.
Figure 26B:
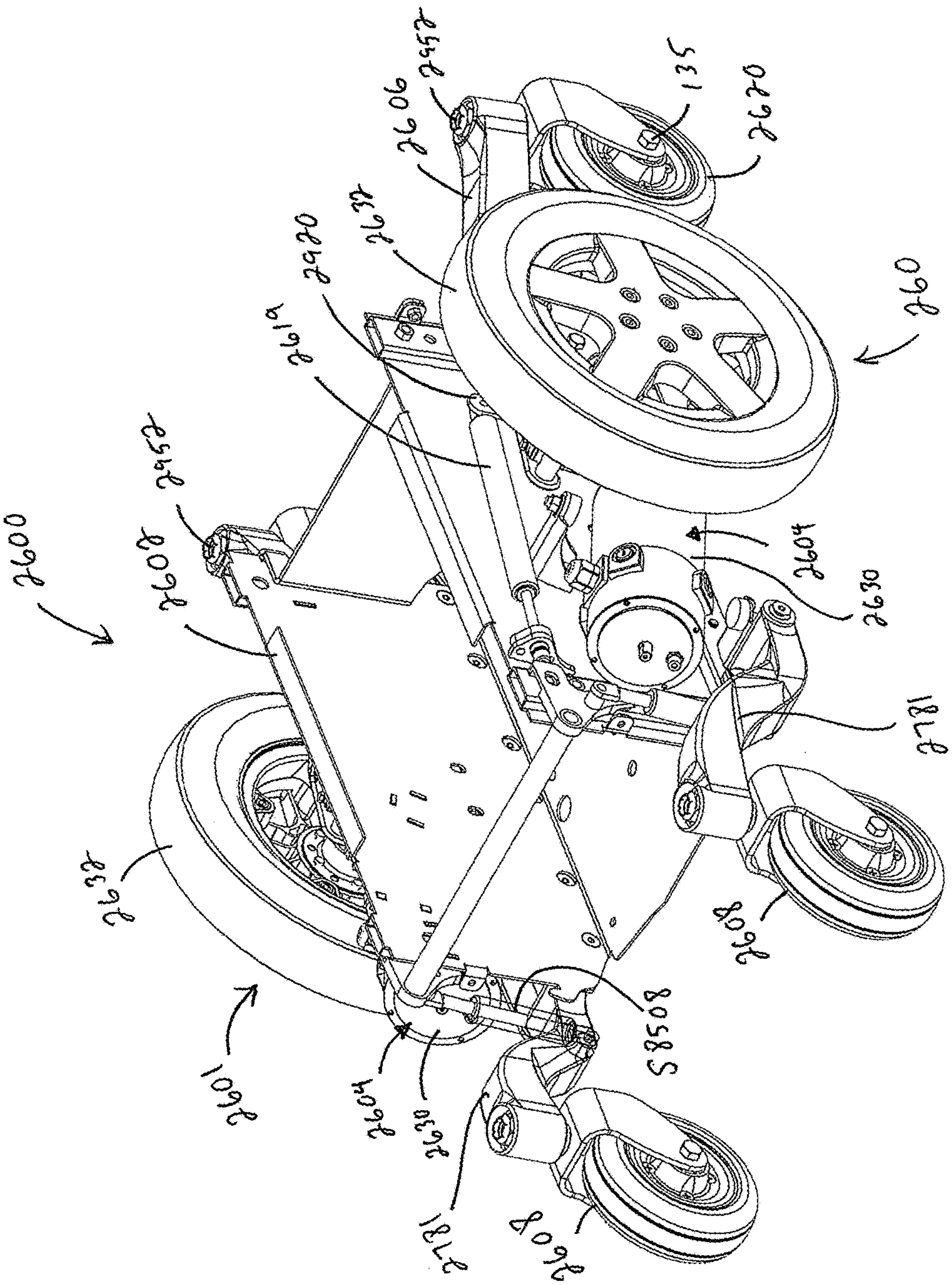
FIG. 26B is another perspective view of the wheelchair chassis shown in FIG. 26A.
Figure 26C:
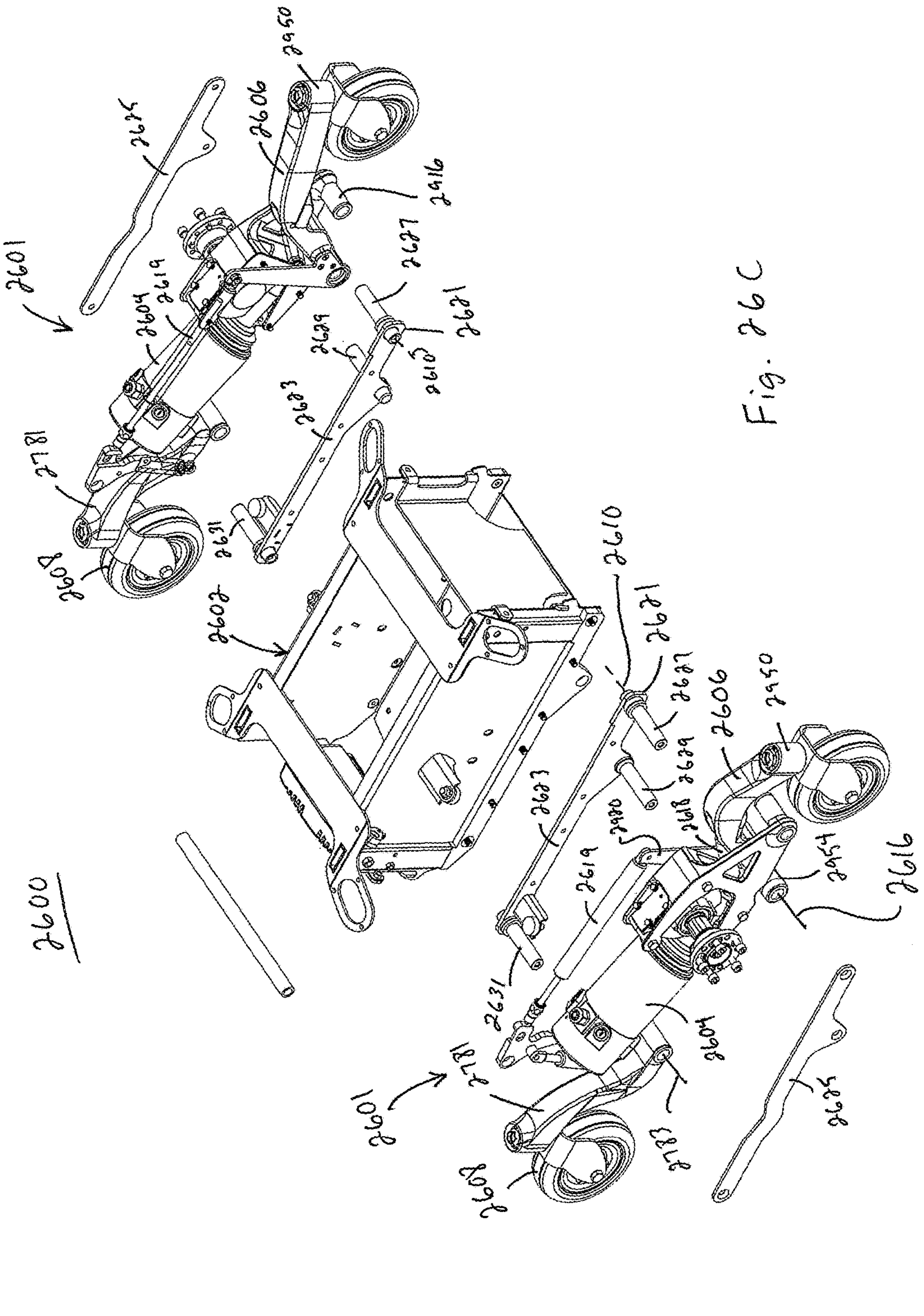
FIG. 26C is an exploded perspective view of the wheelchair chassis shown in FIG. 26A.

FIGS. 26A-26C illustrates an exemplary embodiment of a wheelchair chassis 2600 that includes a suspension assembly and a stability control assembly. The suspension assembly may take a wide variety of different forms, including, but not limited to any of the suspensions disclosed herein or combinations or subcombinations of the components of the suspensions disclosed herein. The stability control assembly may take a wide variety of different forms, including, but not limited to any of the stability control assemblies disclosed herein or combinations or subcombinations of the components of the stability control assemblies disclosed herein and/or in US Published Application Publication Pub. Nos. 2010/0004820 and 2010/0084209 which are incorporated herein by reference in their entirety.

In the example illustrated by FIG. 26A-26C, the wheelchair chassis 2600 includes a frame 2602, and a pair of suspension and stability control assemblies 2601. One suspension and stability control assembly 2601 is mounted on each side of the frame 2602. In one exemplary embodiment, each suspension and stability control assembly 2601 can be pre-assembled as a subassembly and then each can be assembled with the frame 2602 as a unit.

Figure 33:
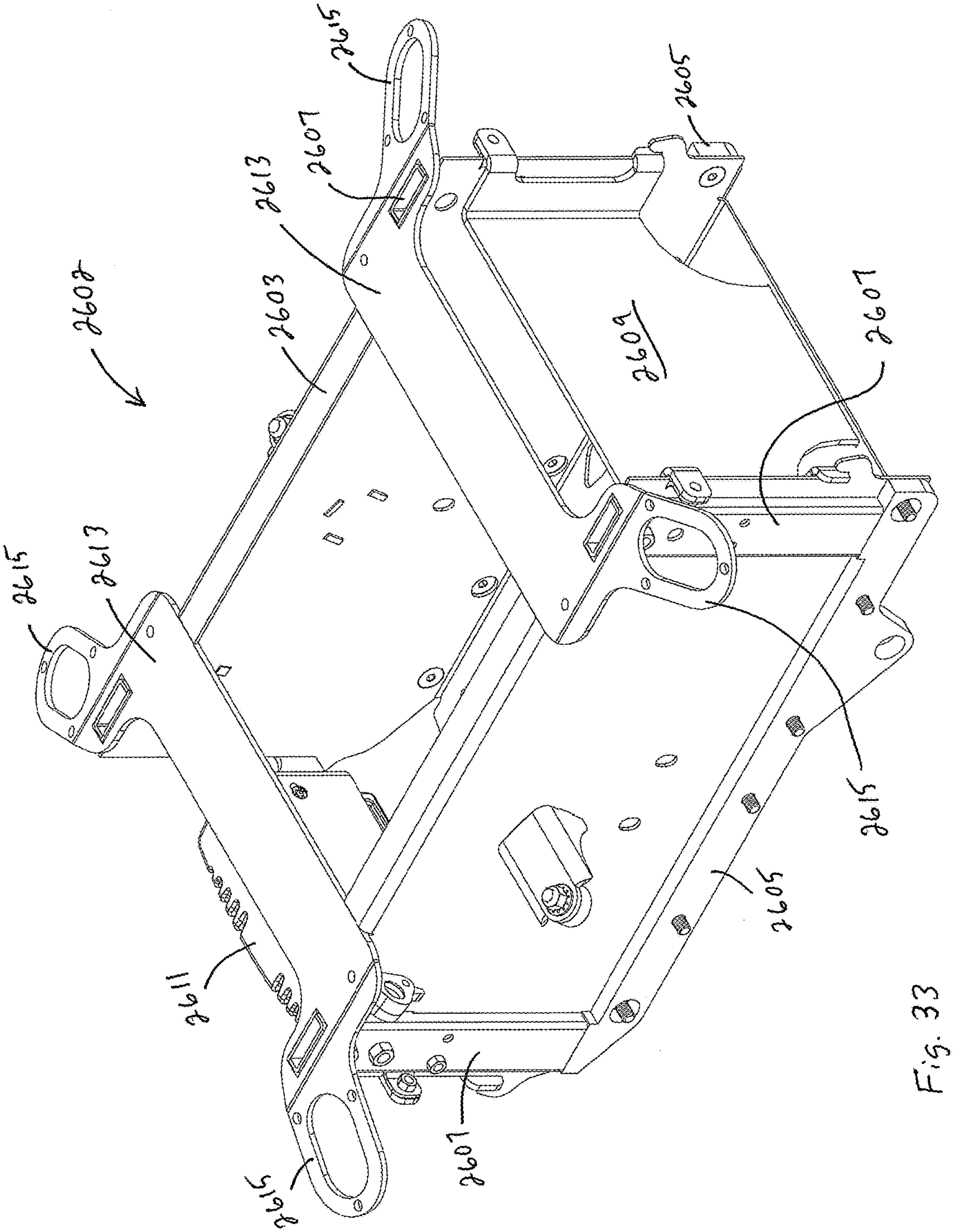
FIG. 33 is a perspective view of an exemplary embodiment of a wheelchair frame assembly.

The frame 2602 can take a wide variety of different forms. In the exemplary embodiment illustrated by FIG. 33, the frame 2602 comprises a sheet metal box 2603 that is reinforced by rails 2605 that extend along the bottom of the box 2603 and rails 2607 that extend upward from the rails 2605 at the corners of the box. A removable front cover 2609 is attached to the front of the box. The front cover 2609 can be removed to access batteries (not shown) that are disposed inside the box 2603. A control unit 2611 is connected to the back of the frame 2602. Reinforcement plates 2613 are disposed on the top of the box 2603 at the front and back of the box. The illustrated reinforcement plates 2613 include rings 2615 for securing the wheelchair, when the wheelchair is transported in a vehicle.

Figure 27:
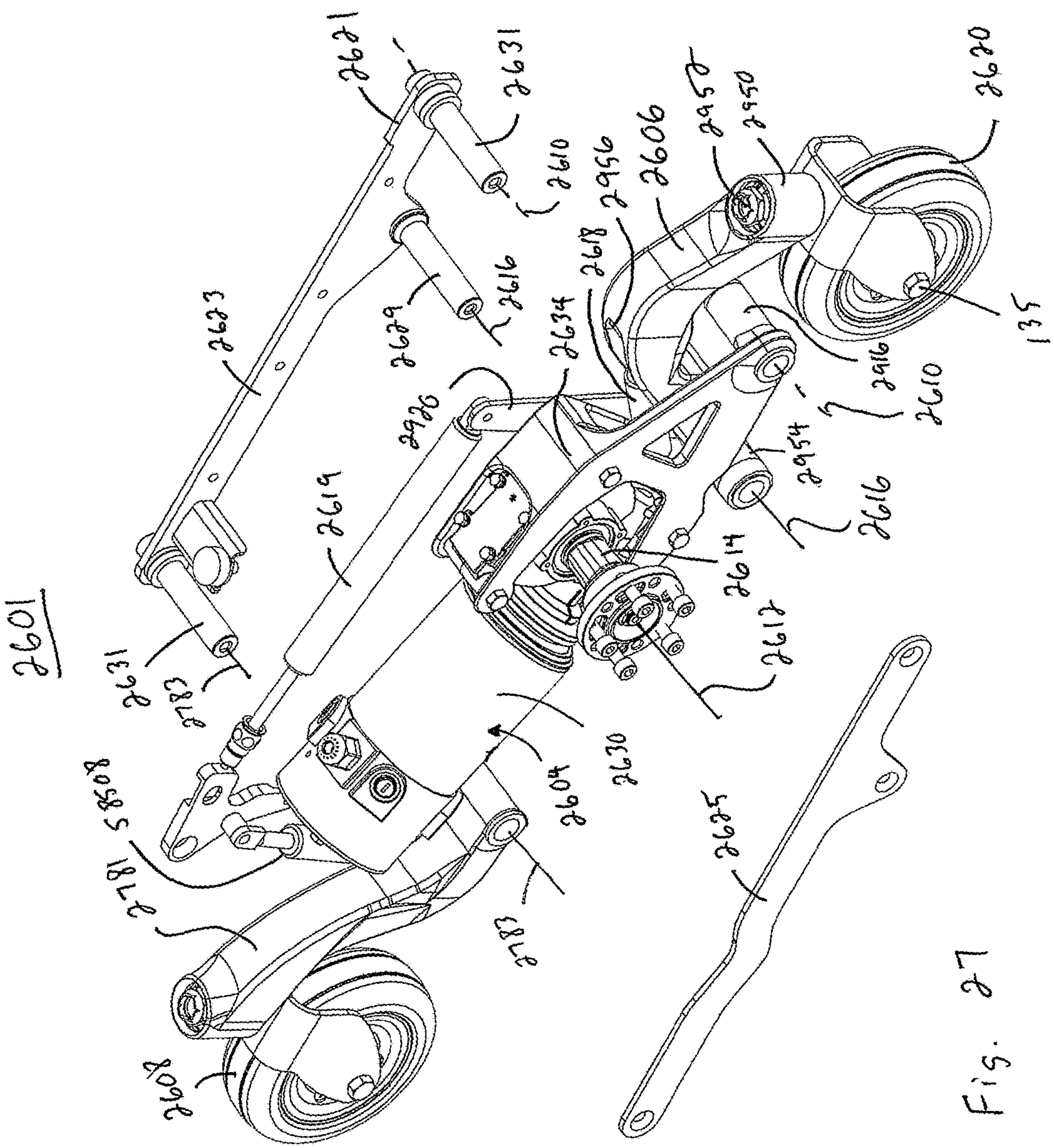
FIG. 27 is a perspective view of an exemplary embodiment of a suspension assembly and a mounting arrangement for the suspension assembly.

Referring to FIG. 27, each suspension and stability control assembly 2601 includes a drive assembly 2604, a front caster pivot arm 2606, a rear caster 2608, and a support assembly 2621. The support assembly 2621 is connected to the frame 2602 to connect the suspension and stability control assembly 2601 to the frame 2602. One suspension and stability control assembly 2601 is illustrated by FIG. 27, with the other being a mirror image. In the illustrated embodiment, the drive assembly 2604, the front caster pivot arm 2606, and the rear caster 2608 are mounted to the support assembly 2621. The support assembly 2621 can take a wide variety of different forms. In the illustrated embodiment, the support assembly 2621 comprises a pair of plates 2623, 2625 and pivot pins 2627, 2629, 2631.

Figure 30A:
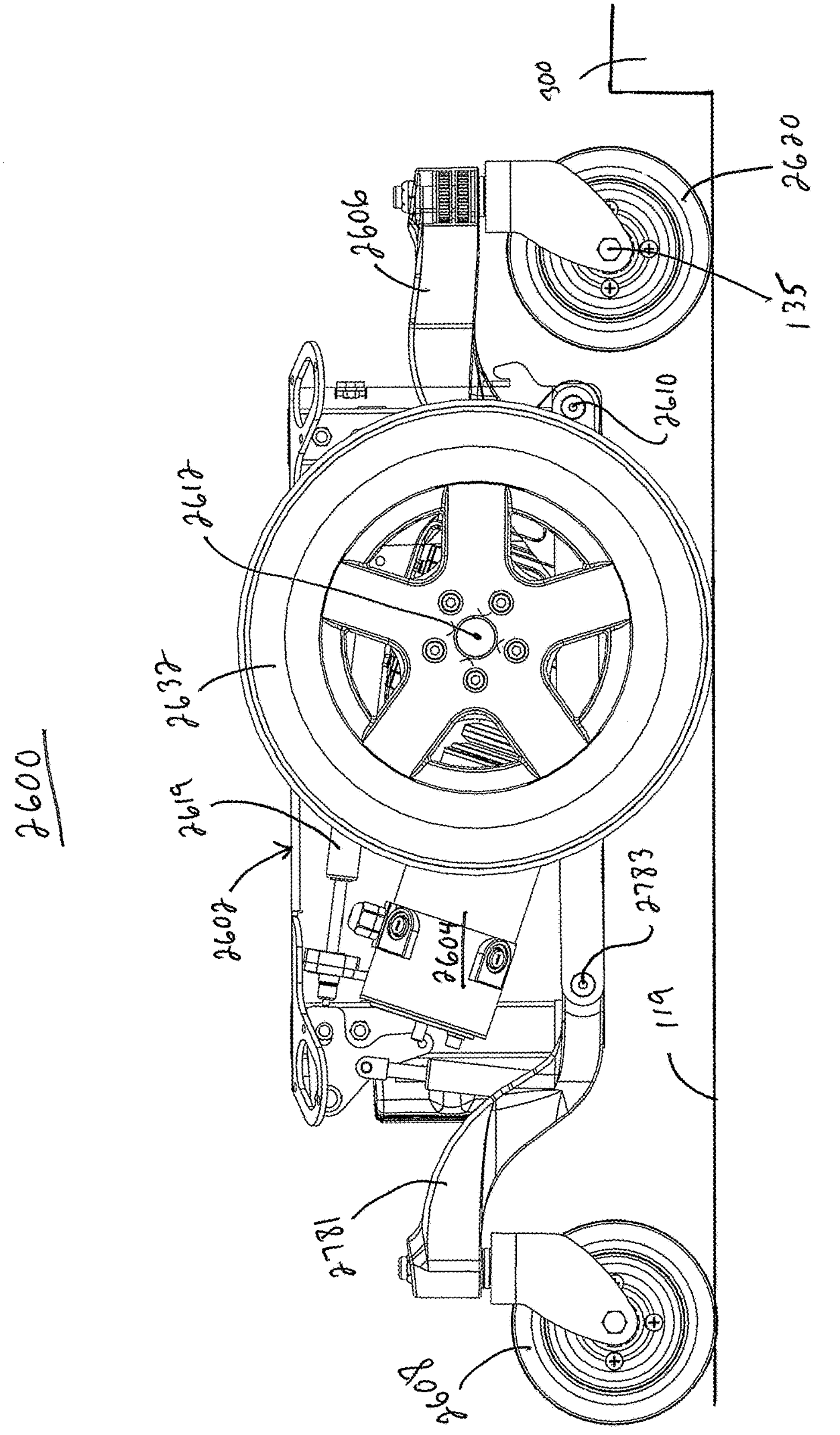
FIG. 30A is a side view of the wheelchair chassis illustrated by FIG. 26A on a substantially flat, horizontal surface.
Figure 30B:
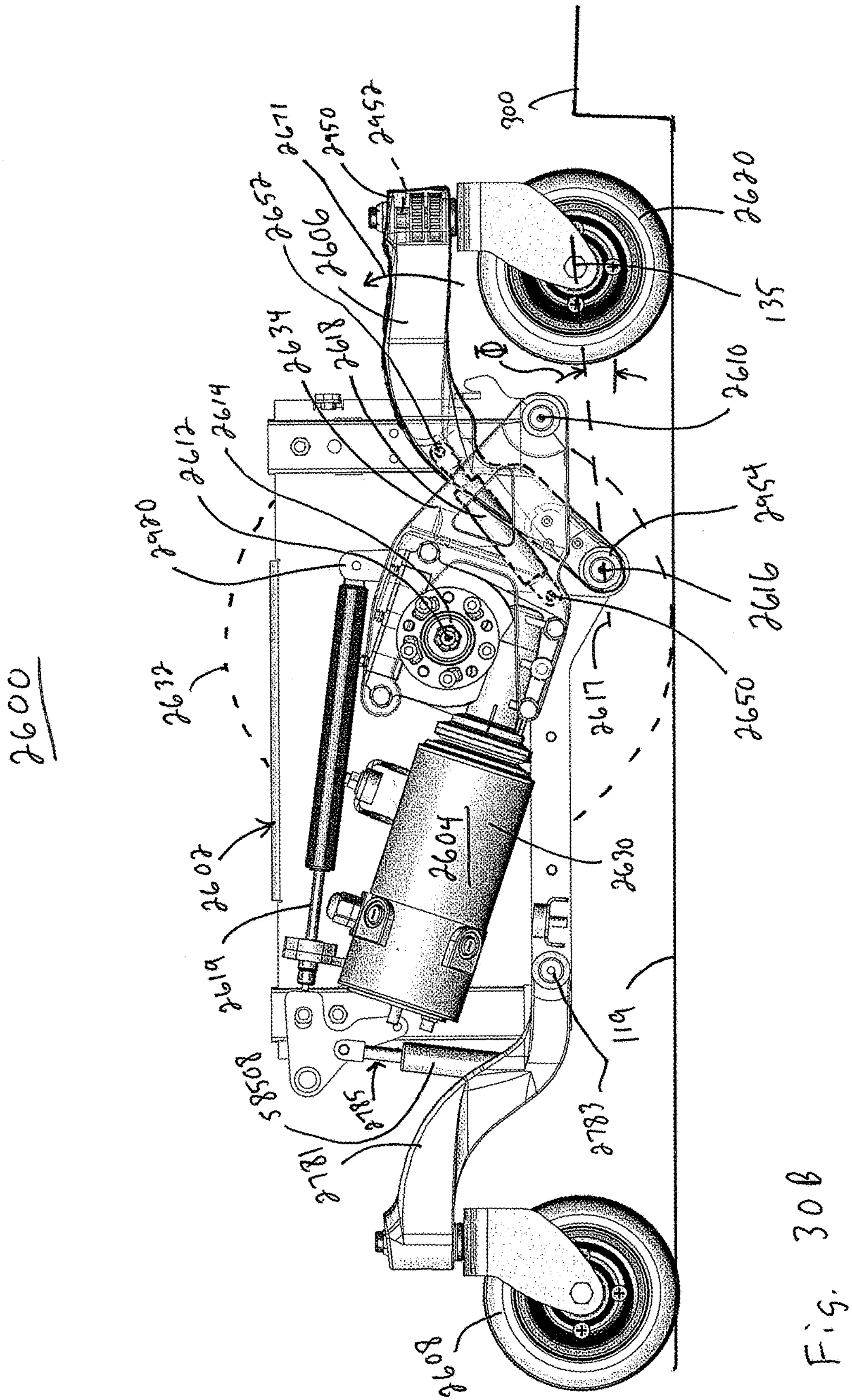
FIG. 30B is a view similar to the view of FIG. 30A with a drive wheel removed.
Figure 30C:
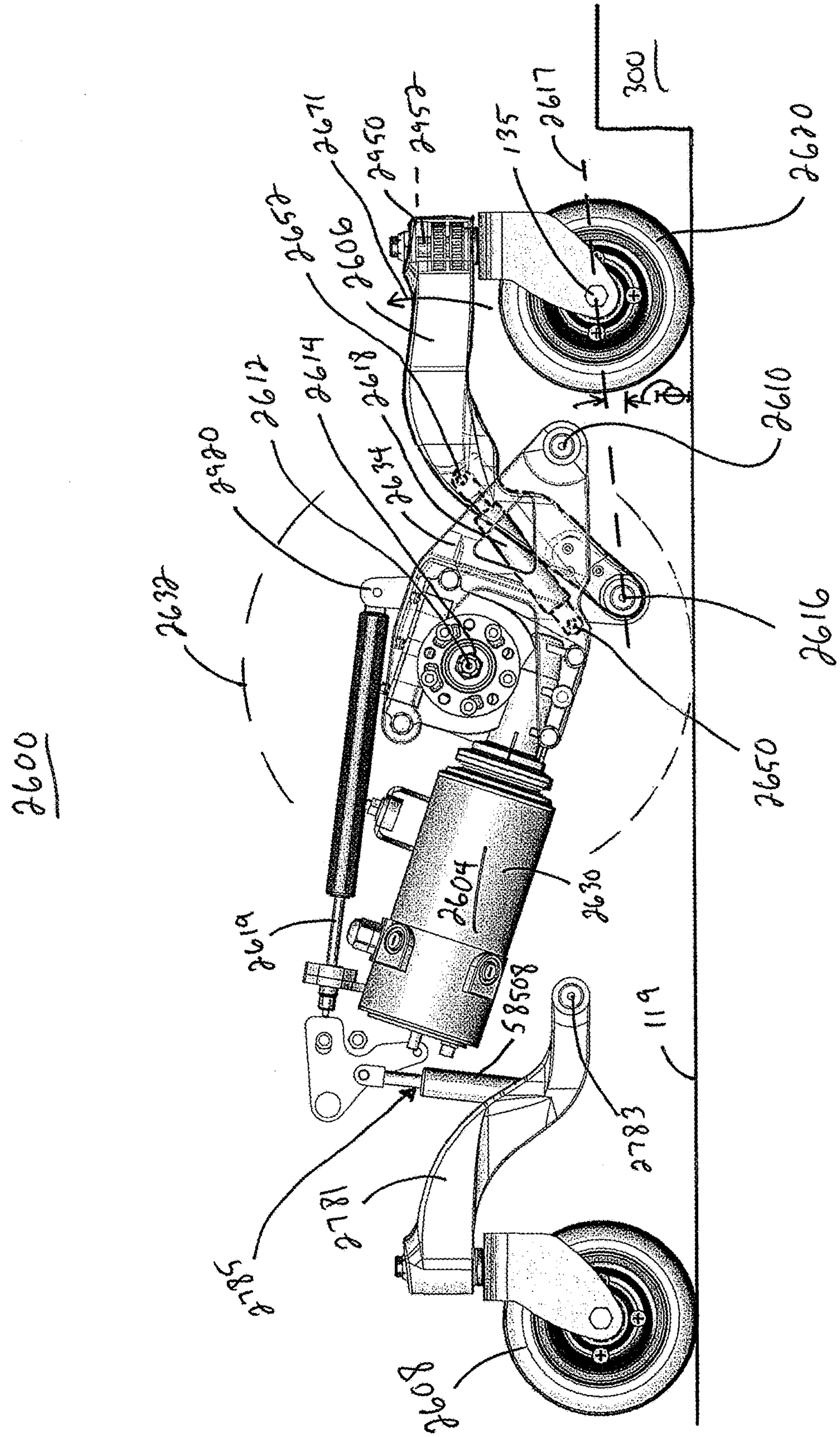
FIG. 30C is a view similar to the view of FIG. 30B with a frame removed.
Figure 30D:
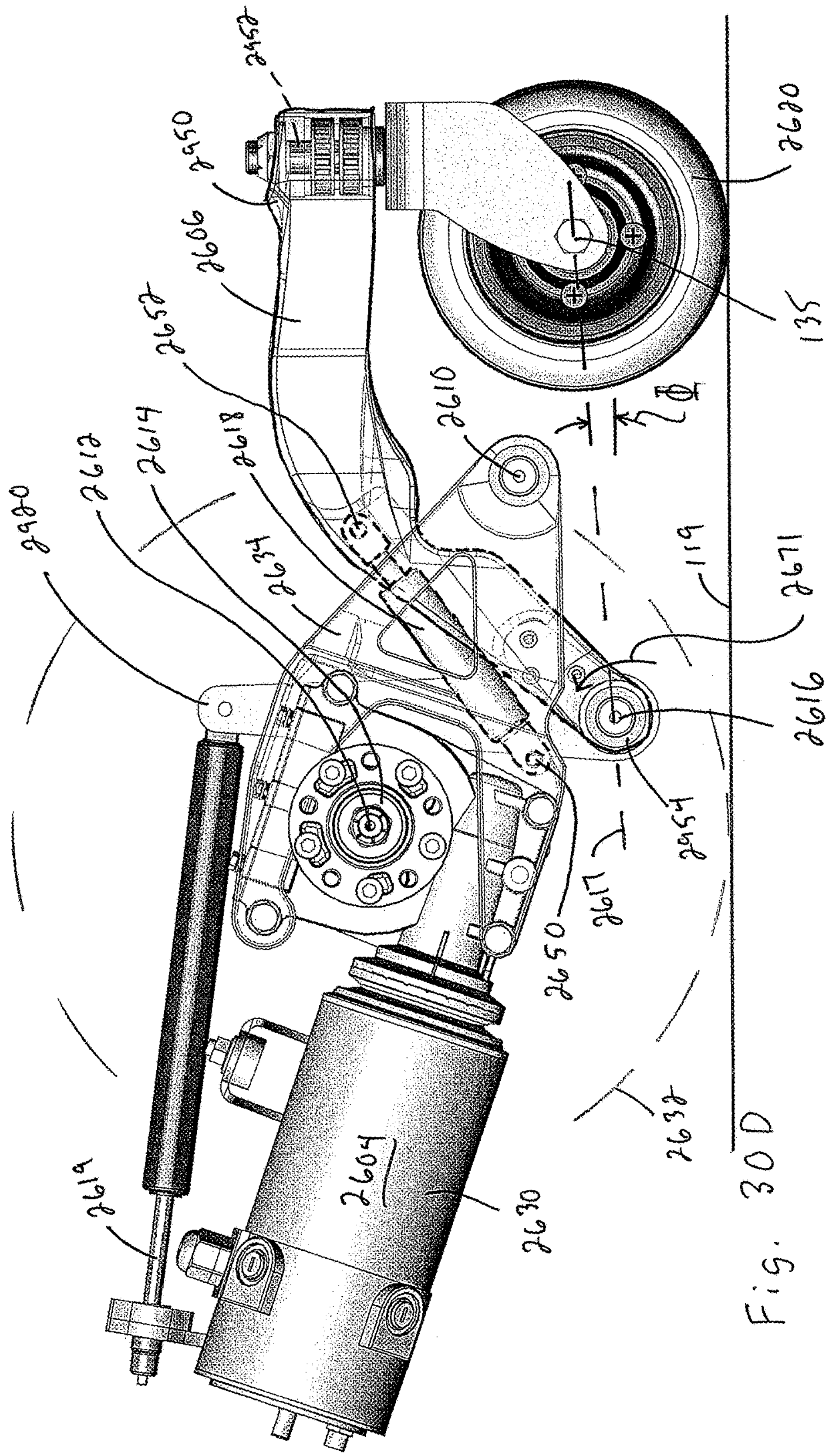
FIG. 30D is a view similar to the view of FIG. 30C with a rear caster assembly and stability control system trigger removed.

The drive assembly 2604 is pivotally mounted to the support assembly 2602 on the pivot pin 2627 to define a drive assembly pivot axis 2610. Referring to FIG. 30B, the drive assembly pivot axis 2610 of the drive assembly 2604 is below an axis of rotation 2612 of a drive axle 2614 of the drive assembly 2604 and is in front of a pivot axis 2616 of the front caster pivot arm 2606. In the illustrated embodiment, the pivot axis 2616 is lower than an axle 135 of the front caster 2620 (See FIG. 30D). As such, an angle 1 is defined between a line 2617 that extends through the pivot axis 2616 and the axle 135 and a horizontal support surface 119.

A drive assembly pivot arm 2634 and the front caster pivot arm 2606 are in a crossed configuration when viewed from the side as shown in FIG. 30B. Referring to FIGS. 29A-29H, the front caster pivot arm 2606 and the drive assembly pivot arm 2634 are nested together to minimize the amount of lateral space needed for the suspension assembly. By arranging the front caster pivot arm 2606 and the drive assembly pivot arm 2634 in the crossed configuration, the length of the front caster pivot arm 2606 and the drive assembly pivot arm 2634 is increased as compared to a suspension where the front caster pivot arm and the drive assembly pivot arm do not cross.

The front caster pivot arm 2606 is coupled to the drive assembly 2604. In the illustrated example, the front caster pivot arm 2606 and the drive assembly 2604 are coupled by a link 2618 (See FIG. 30B). The link 2618 is pivotally connected to the drive assembly 2604 and the front caster pivot arm 2606. The link 2618 may be configured to transfer motion of the drive assembly 2604 to the front caster pivot arm 2606 and/or to transfer motion of the front caster pivot arm 2606 to the drive assembly 2604. For example, the link 2618 may be configured such that torque applied by the drive assembly 2604 urges the front caster pivot arm 2606 and the front caster 2620 upward with respect to a support surface 119. However, in another exemplary embodiment, the link 2618 is extendable to a sufficiently long length that prevents the drive assembly 2604 from pulling the front caster pivot arm 2606 upward. The link 2618 may be configured such that pivoting of the front caster pivot arm 2606 with respect to the frame 2602 due to upward movement of the front caster 2620 causes pivoting of the drive assembly 2604 with respect to the frame 2602. However, in another exemplary embodiment, the link 2618 is compressible to sufficiently short length that prevents the front caster pivot arm 2606 from pushing the drive assembly 2604 upward.

In the embodiment illustrated by FIG. 30B, each drive assembly 2604 includes a motor drive 2630, a drive wheel 2632, and the pivot arm 2634. The motor drive 2630 drives the drive wheel 2632 about the axis of rotation 2612. In the embodiment illustrated by FIG. 30B, the pivot arm 2634 extends forward from the motor drive to the drive assembly pivot axis 2610. The drive assembly pivot arm 2634 may take a wide variety of different forms. In the embodiment illustrated by FIGS. 29A-29H, the drive assembly pivot arm 2634 includes a pair of spaced apart mounting plates 2910, 2912 that are connected together by lateral portions 2914. A pivot sleeve 2916 is connected to the mounting plate 2910. The motor drive 2630 is connected between the mounting plates 2910, 2912. The link 2618 is disposed between the mounting plates 2910, 2912. A pivot connection 2650 for the link 2618 is defined by one or both of the mounting plates 2910, 2912 (See FIGS. 29H and 30D).

In an exemplary embodiment, a stability system link 2619 is coupled between the frame 2602 and the front caster pivot arm 2606. In the illustrated embodiment, the stability system link 2619 is connected to a bracket 2920 that is fixedly connected to the front caster pivot arm 2606 (See FIG. 29E). In an exemplary embodiment, the stability system link is be used to bias the front caster 2620 downward depending on the position of the front caster, to damp vibration from the front caster traveling over rough terrain, and to provide a stability control function to the front caster pivot arm 2604. In one exemplary embodiment, the additional link 2619 does not apply a spring or biasing force until the front caster 2620 has moved a predetermined distance away from the support surface 119. For example, the additional link 2619 may be configured to apply no biasing force to the front caster pivot arm when the chassis 2600 is in a normal operating position, on a flat, horizontal support surface 119. As the front caster pivot arm 2606 moves upward from the normal position, the additional link 2619 begins to apply a downward biasing force at some point. The stability control function provided by the additional link 2619 may be any of the stability control methods and configurations described below in the "Stability Control" section.

In the illustrated embodiment, the front caster pivot arm 2606 is pivotally mounted to the pivot pin 2629 of the support assembly 2621 to define the pivot axis 2616. The pivot axis 2616 of the front caster pivot arm is rearward of the drive assembly pivot axis 2610 and below the axis of rotation 2612 of the drive wheel and below the axis of rotation 135 of the wheel of the front caster 2620 in the embodiment illustrated by FIG. 30B.

The pivot arm 2606 may take a wide variety of different forms and may be made from a wide variety of materials, including, but not limited to, metals and plastics. In the illustrated embodiment, the front caster pivot arm 2606 is a substantially rigid member. Referring to FIGS. 29A-29H, the illustrated pivot arm 2606 includes a sleeve 2950 for mounting a shaft 2952 (See FIG. 30D) of a front caster 2620. The pivot arm 2605 includes a sleeve 2954 for pivotal mounting on the pivot pin 2629. The pivot arm includes a channel or cutout 2956. The link 2618 is disposed in the channel or cutout 2956. A pivotal connection 2652 is disposed at an upper end of the channel or cutout 2956 (See FIG. 29H).

In the embodiment illustrated by FIGS. 29A-29H, the link 2618 is connected to the drive assembly pivot arm 2634 at the pivotal connection 2650. The link 2618 is connected to the front caster pivot arm 2606 at the pivotal connection 2652 such that the link 2618 is positioned between an inner wall 2907 and an outer wall 2909 of the front caster pivot arm 2606. The link 2618 can take a wide variety of different forms. For example, the link may be rigid, flexible, or extendible in length. Any link 2618 that transfers at least some portion of motion and/or force in at least one direction of the drive assembly 2604 to the front caster pivot arm 2606 and/or that transfers at least some portion of motion and/or force in at least one direction of the front caster pivot arm 2606 to the drive assembly can be used.

In an exemplary embodiment, the link 2618 includes a spring and a shock absorber. In the illustrated example, the pivotal connections 2650 and 2652 are positioned on the drive assembly and the front caster pivot arm such that a majority of the force (biasing and shock absorbing) applied by the link 2618 is applied to the drive wheel. By applying the majority of the force to the drive wheel 2632, traction between the drive wheel and the support surface and the ease with which the front caster can climb an obstacle are enhanced. For example, between 60 and 90%, between 60 and 80%, between 60 and 70%, or about 65% of the spring and/or damping force is applied to the drive wheel 2432. In the example illustrated by FIG. 29H, the link 2618 is positioned to be nearly normal to a line 2619 through the pivot axis 2610 and the pivot axis 2650. For example, an angle Ω between the link 2618 and the line 2619 may be between 60 and 120 degrees, between 70 and 110 degrees, between 80 and 100 degrees, between 85 and 90 degrees, or about 90 degrees when the suspension is on a flat, horizontal support surface. In the example illustrated by FIG. 29H, the link 2618 is positioned to be nearly parallel to the line 2621 through the pivot axis 2616 and the pivot axis 2652. For example, the link 2618 may be disposed on either side of the line and an angle Ψ between the link 2618 and the line 2621 may be between 0 and 30 degrees, between 0 and 20 degrees, between 0 and 10 degrees, between 0 and 5 degrees, or about 0 degrees when the suspension is on a flat, horizontal support surface. A distance D1 is defined from the pivotal connection 2650 to the drive assembly pivot axis 2610. A distance D2 is defined from the pivotal connection 2652 to the front caster pivot arm pivot axis 2616. A ratio of D1/D2 may be 0.5 to 1.5; 0.75 to 1.25; 0.9 to 1.1, or about 1 in an exemplary embodiment.

Figure 28:
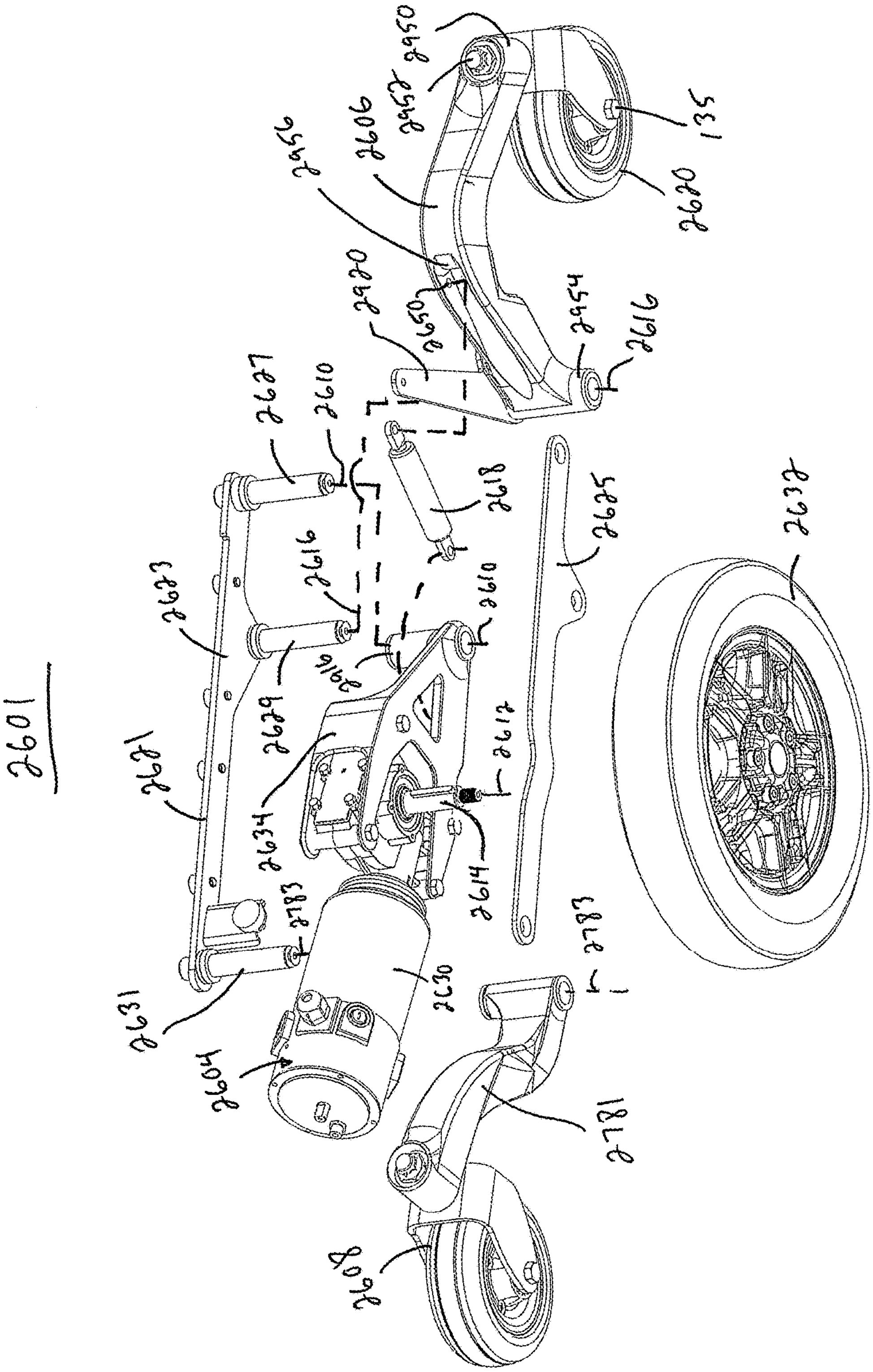
FIG. 28 is an exploded perspective view of the suspension assembly and the mounting arrangement for the suspension assembly illustrated by FIG. 27.
Figure 29A:
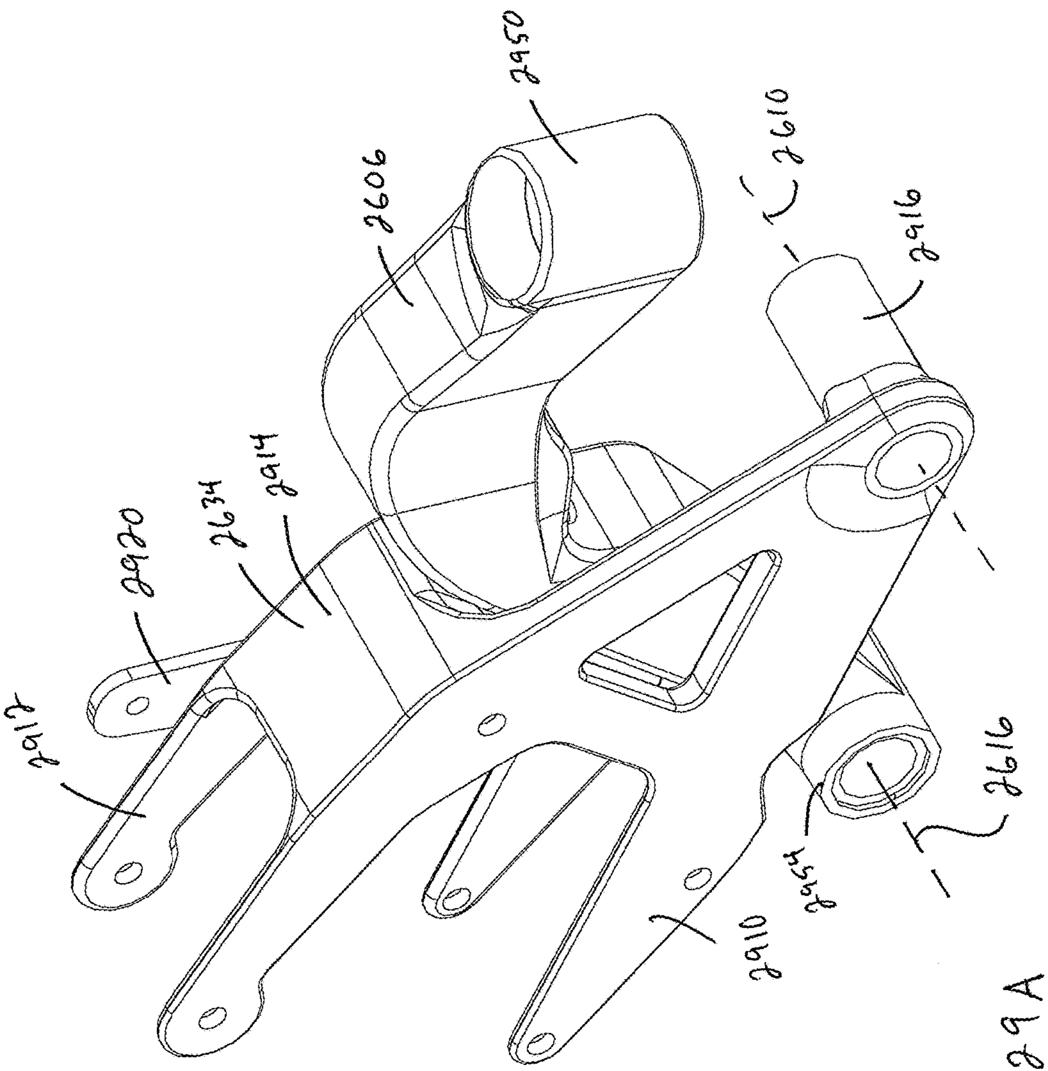
FIG. 29A is a perspective view of an exemplary embodiment of a front caster pivot arm and a drive assembly pivot arm.
Figure 29B:
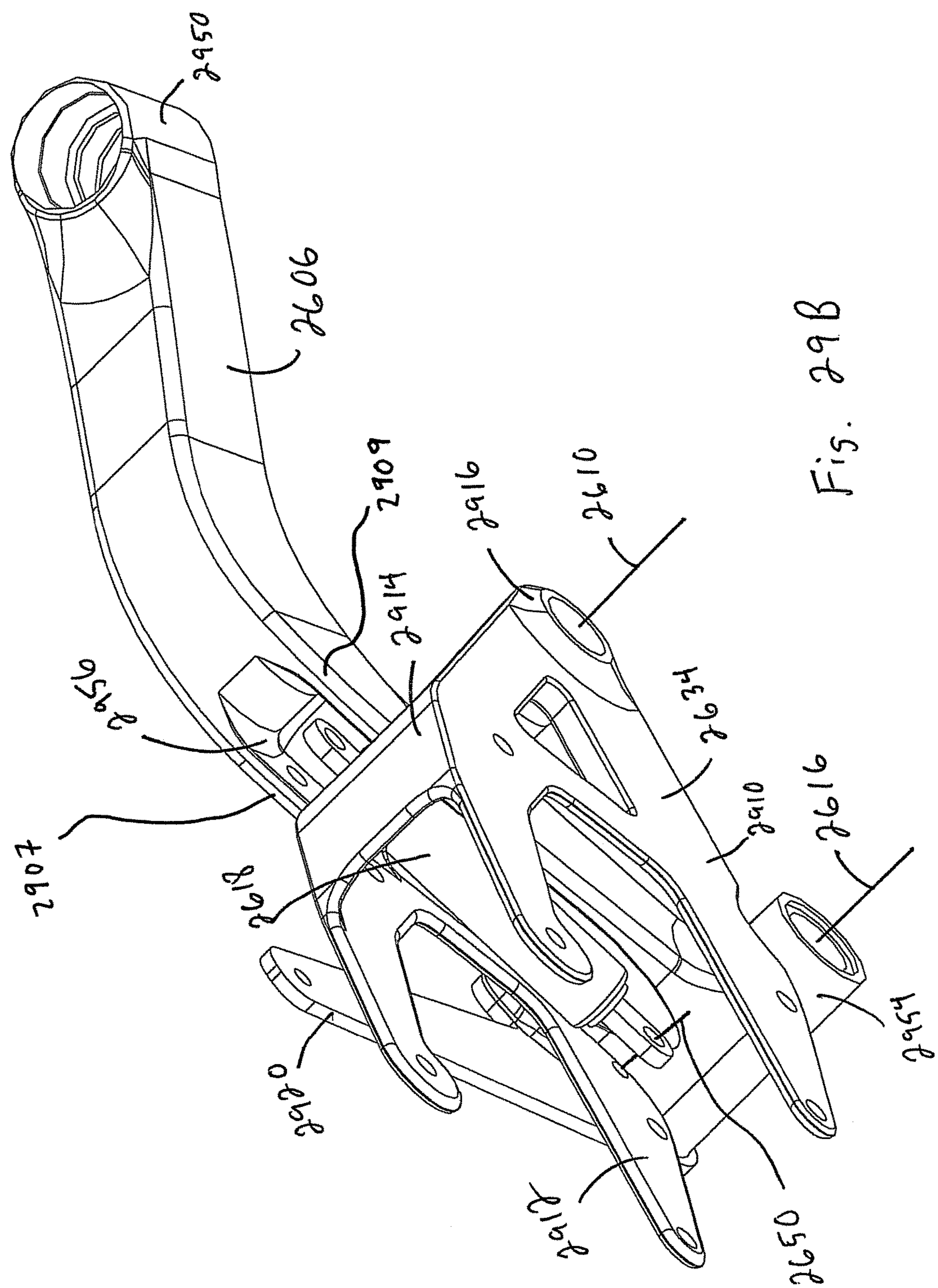
FIG. 29B is another perspective view of the front caster pivot arm and the drive assembly pivot arm illustrated by FIG. 29A.
Figure 29C:
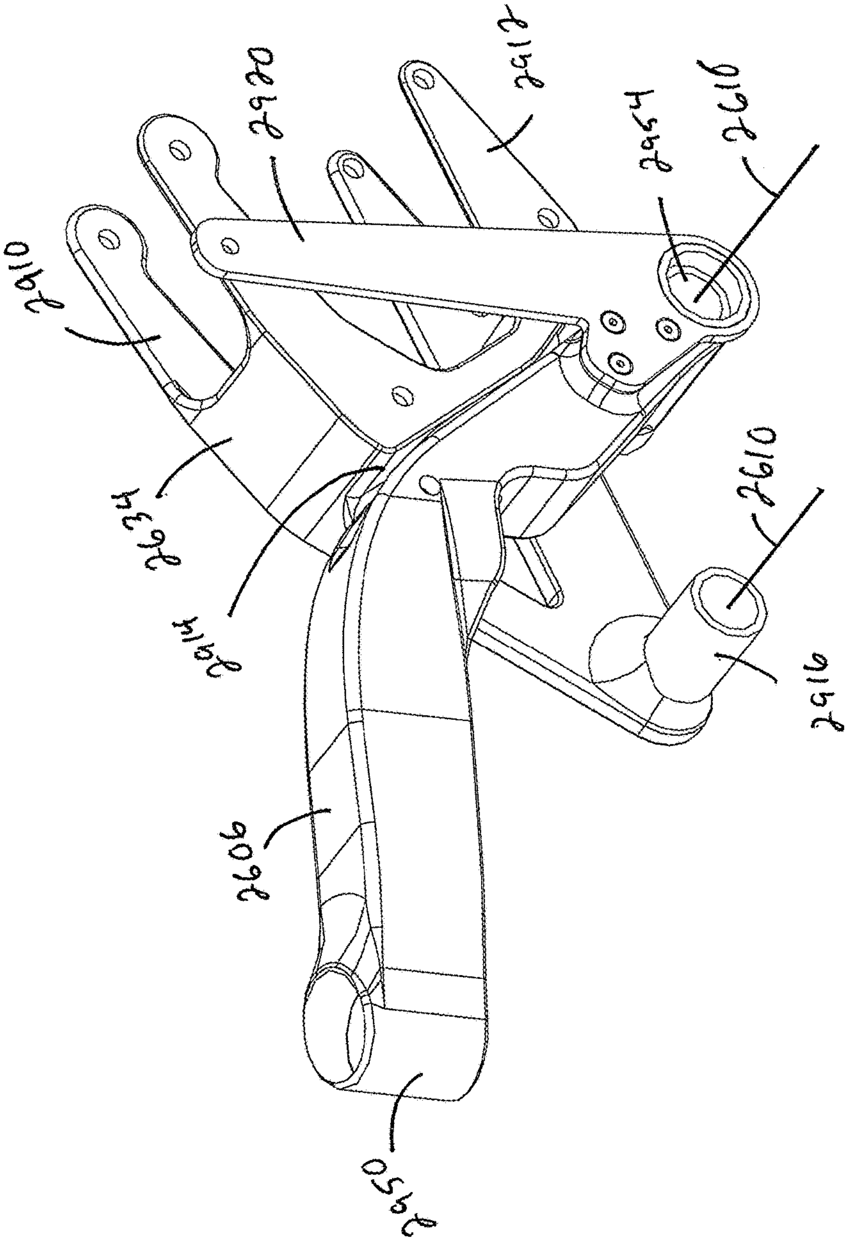
FIG. 29C is another perspective view of the front caster pivot arm and the drive assembly pivot arm illustrated by FIG. 29A.
Figure 29D:
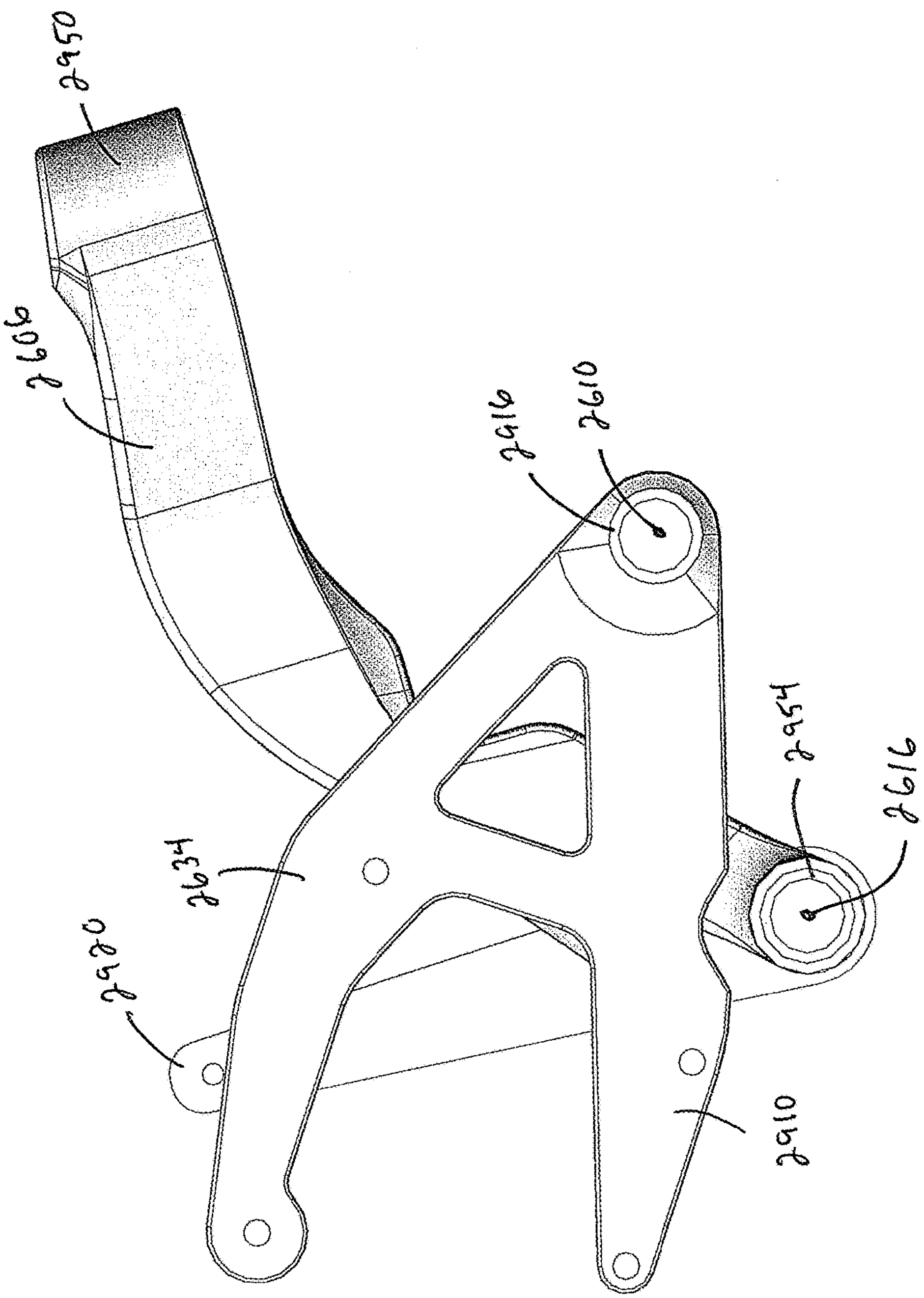
FIG. 29D is a side view of the front caster pivot arm and the drive assembly pivot arm illustrated by FIG. 29A.
Figure 29E:
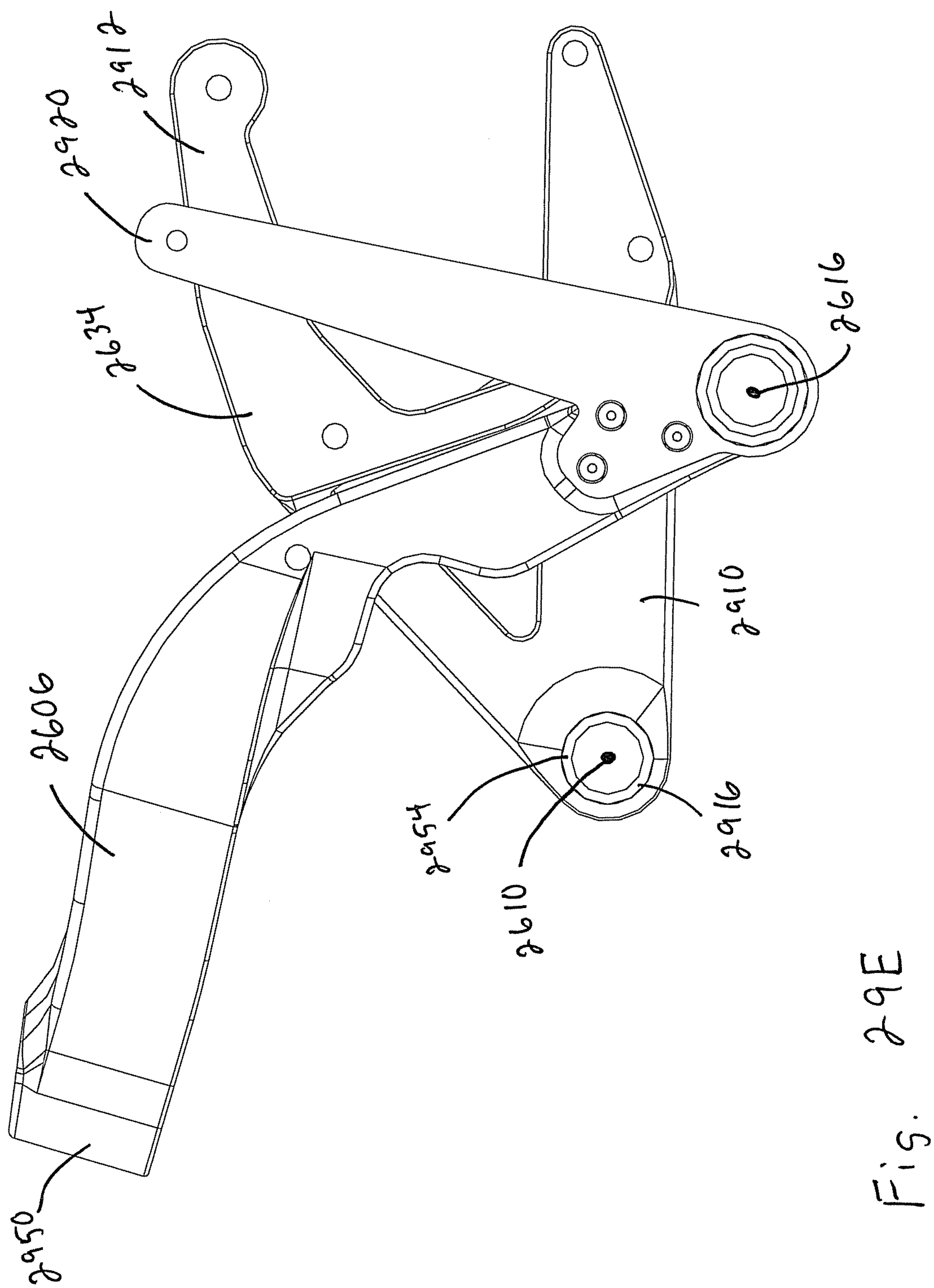
FIG. 29E is a side view of the front caster pivot arm and the drive assembly pivot arm illustrated by FIG. 29A.
Figure 29:
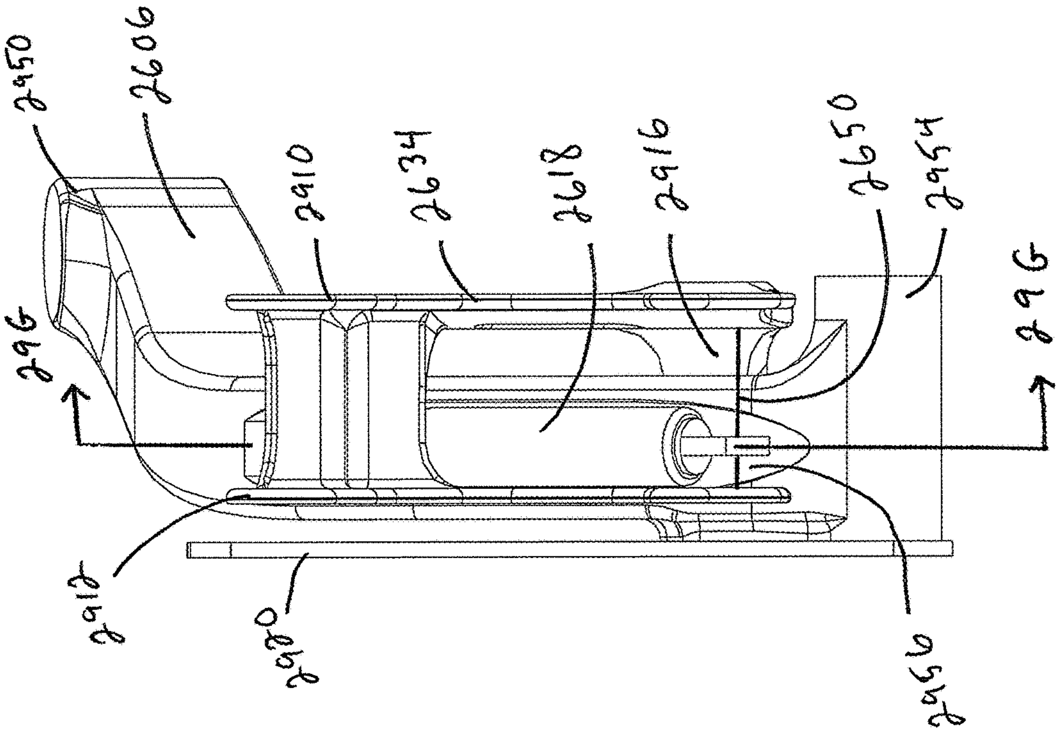
FIG. 29F is a rear view of the front caster pivot arm and the drive assembly pivot arm illustrated by FIG. 29A.
FIG. 29G is a perspective sectional view taken along the plane indicated by lines 29G-29G in FIG. 29F.
FIG. 29H is a sectional view taken along the plane indicated by lines 29G-29G in FIG. 29F.
Figure 29G:
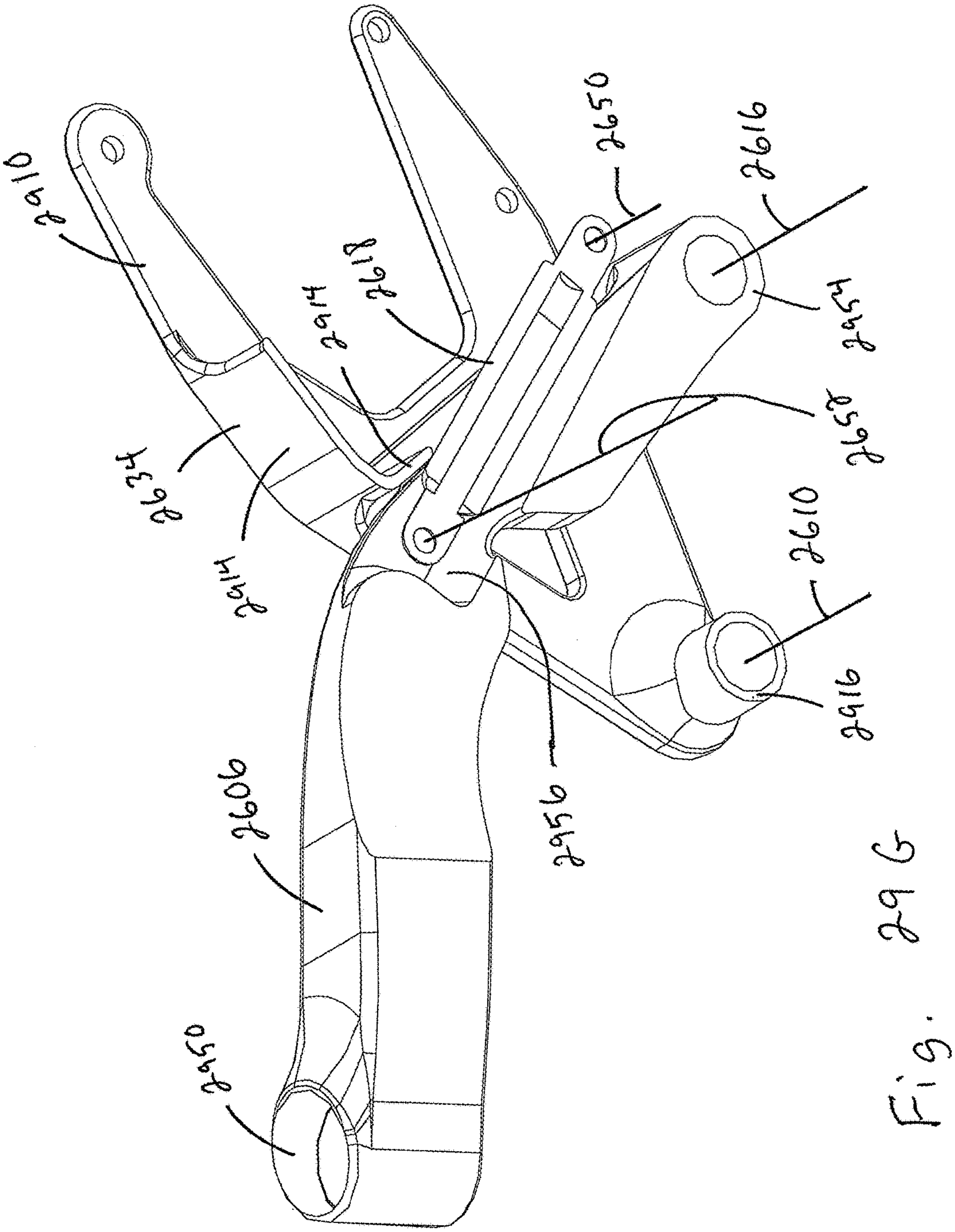
Figure 29H:
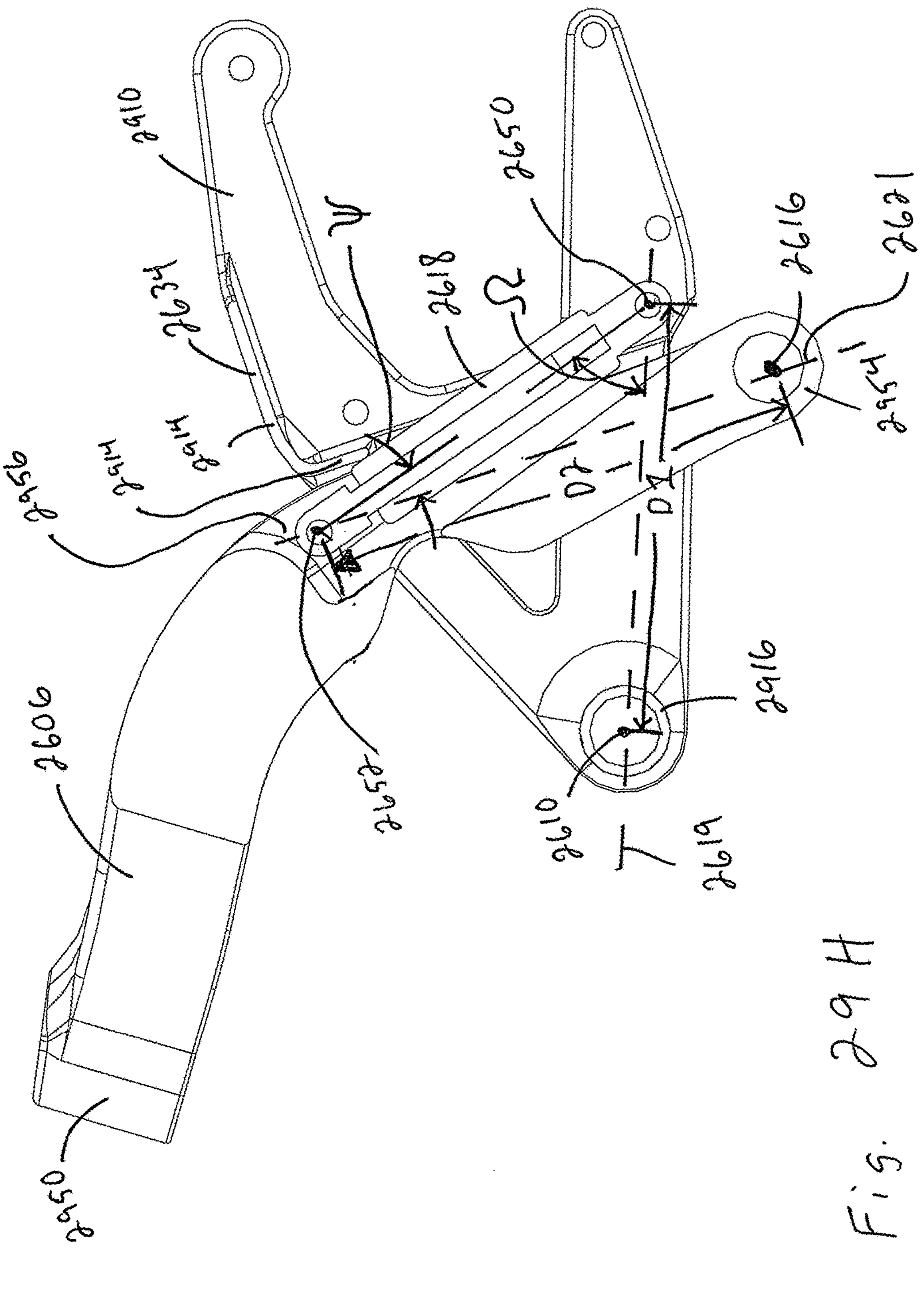

Referring to FIG. 28, the rear casters 2608 is independently, pivotally coupled the support assembly 2621. A pivot arm 2781 is pivotally connected to the to the pivot pin 2631 of the support assembly 2621 to define a pivot axis 2783. A rear caster linkage 2785 connects the rear caster pivot arm 2781 to the frame 2602. In an exemplary embodiment, the rear caster linkage 2785 includes an extendable and retractable link S8508 that biases the rear caster 2608 into engagement with the ground and absorbs shock when the chassis 2600 travels over rough terrain. In an exemplary embodiment, the rear caster linkage 2785 acts as a trigger for the stabilization system. The action of the rear caster linkage 2785 to selectively trigger the stabilization actuator is disclosed in detail below in the "Stabilization System" section where the embodiment of FIG. 84A is described.

FIGS. 30A-30D illustrate the chassis 2600 approaching an obstacle 300.

FIGS. 31A-31D illustrate the chassis 2600 with the front casters 2620 on top of the obstacle 300. When the chassis 2600 approaches the obstacle 300 and the front caster 2620 comes into contact with the obstacle, a moment (indicated by arrow 2671) about the pivot axis 2616 is produced due to the angle Φ (See FIG. 30D). This moment 2671 causes the front caster pivot arm to pivot upward, which increases the moment 2671. Continued movement of the suspension 2600 toward the obstacle causes the front caster pivot arm 2616 to continue to pivot and move the front caster 2620 upward. The length of the link 2618 is reduced as the front caster pivot arm 2616 pivots the front caster upward. In an exemplary embodiment, the drive wheel assembly pivot arm 2634 does not substantially pivot as the link 2618 is shortening and the front caster 2620 is ascending the obstacle 300 (See FIG. 31B). That is, the front caster pivot arm 2616 and the drive wheel assembly pivot arm 2634 are substantially independent as the front caster 2620 is ascending the obstacle 300. Since the drive wheel assembly pivot arm 2634 does not pivot, the frame 2602 does not tilt or does not substantially tilt as the front caster 2620 is ascending the obstacle 300.

Figure 31A:
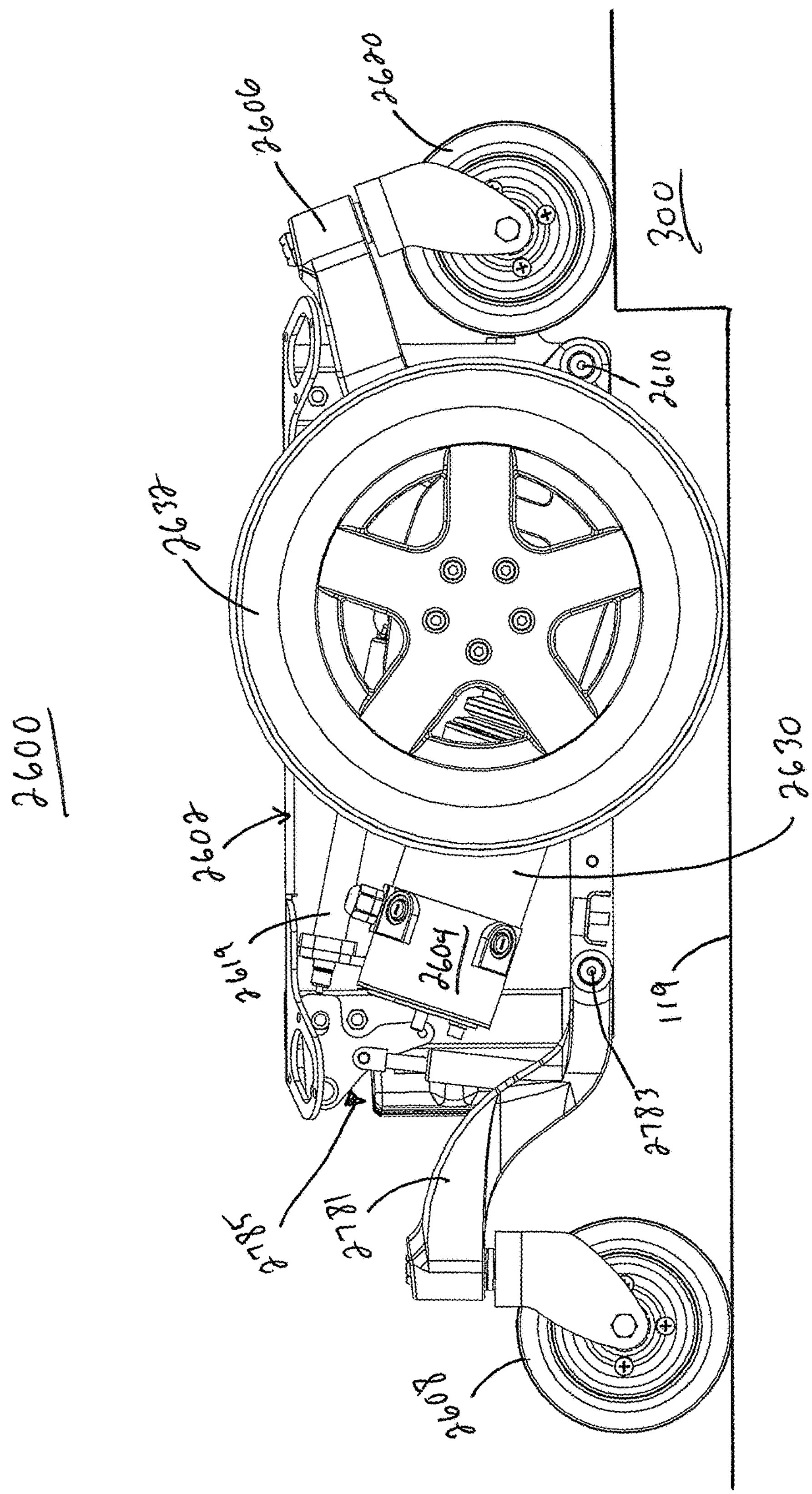
FIG. 31A is a side view of the wheelchair chassis illustrated by FIG. 26A traversing a raised obstacle.
Figure 31B:
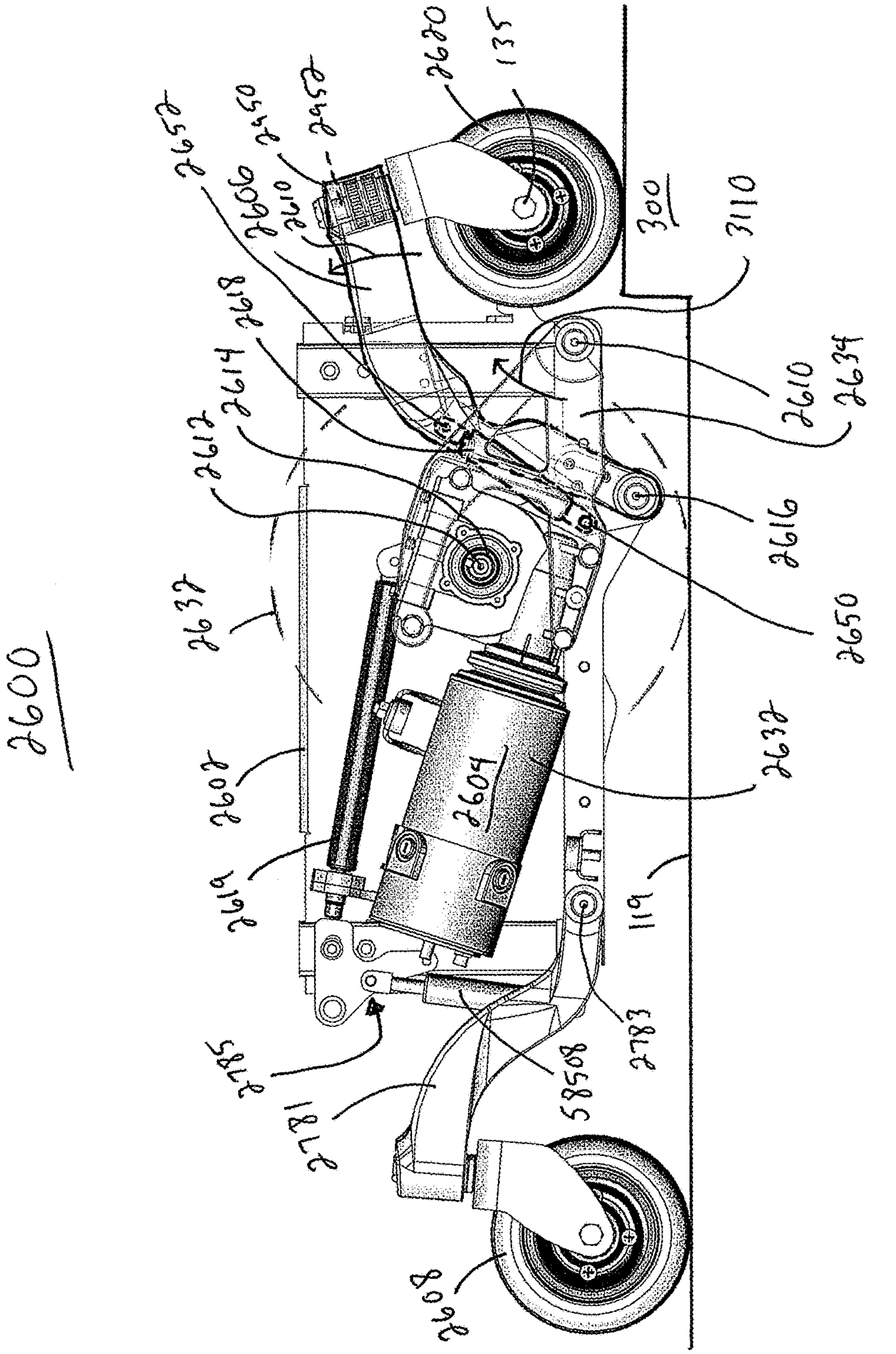
FIG. 31B is a view similar to the view of FIG. 31A with a drive wheel removed.
Figure 31C:
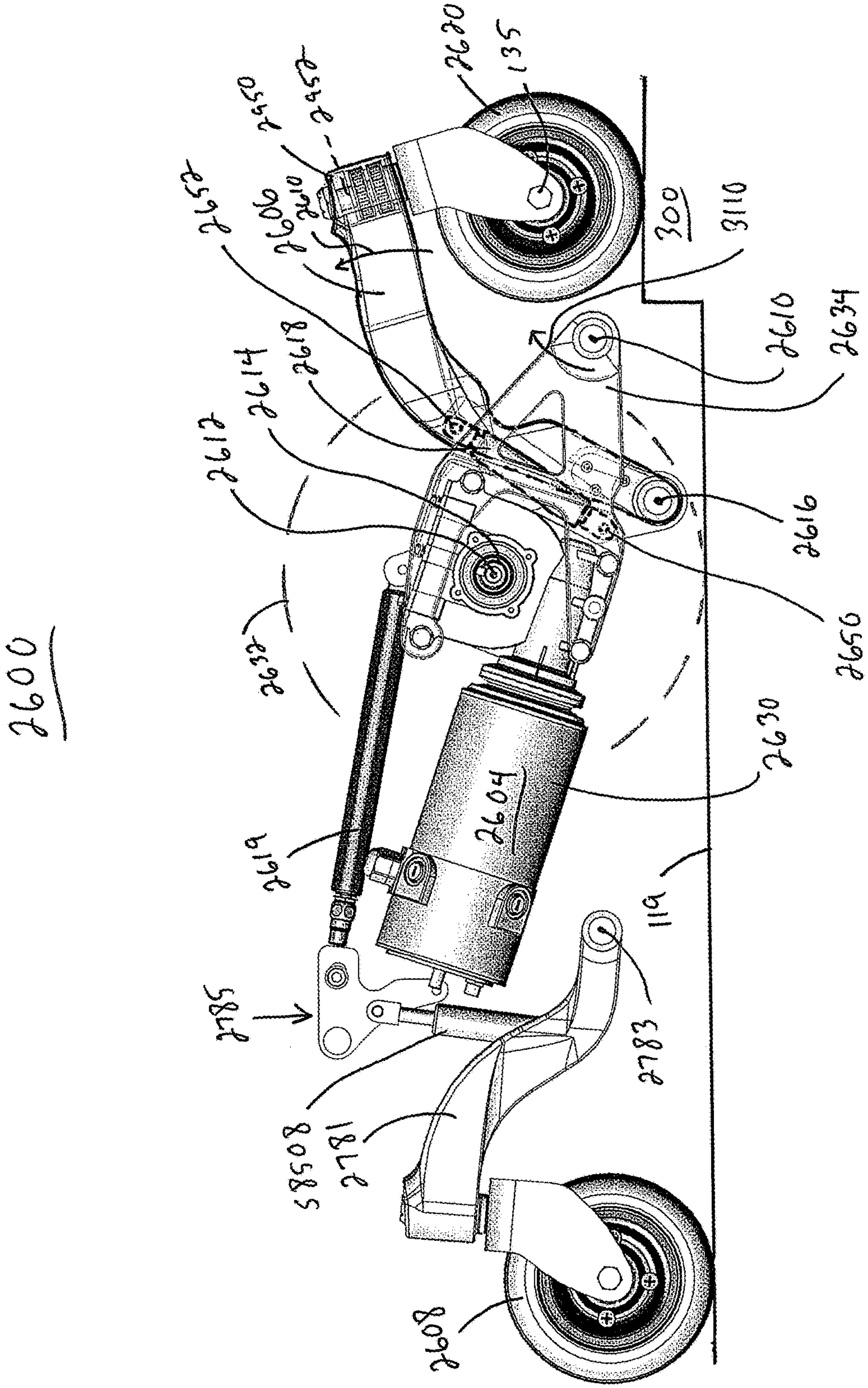
FIG. 31C is a view similar to the view of FIG. 31B with a frame removed.
Figure 31D:
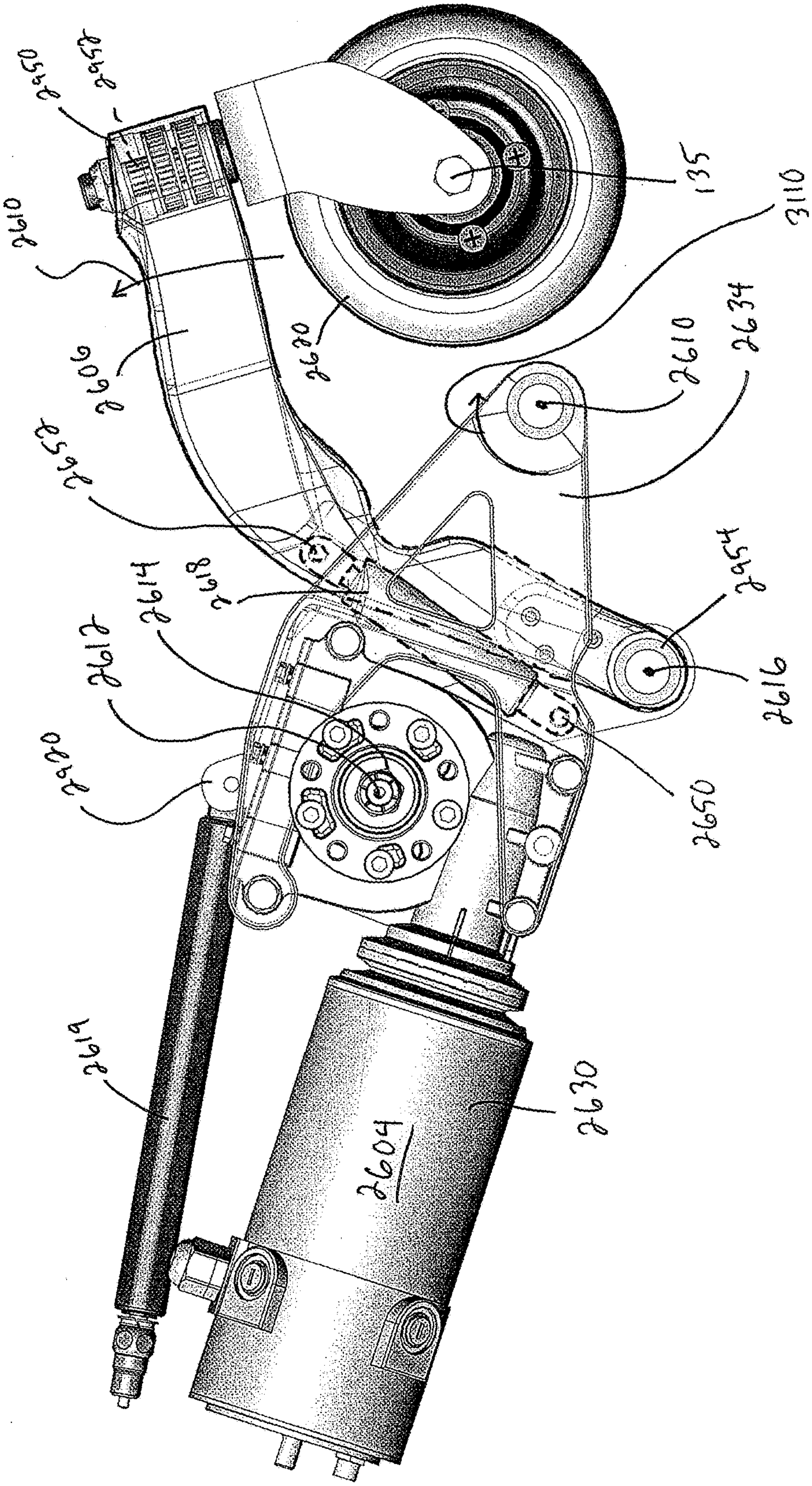
FIG. 31D is a view similar to the view of FIG. 31C with a rear caster assembly and stability control system trigger removed.
Figure 32A:
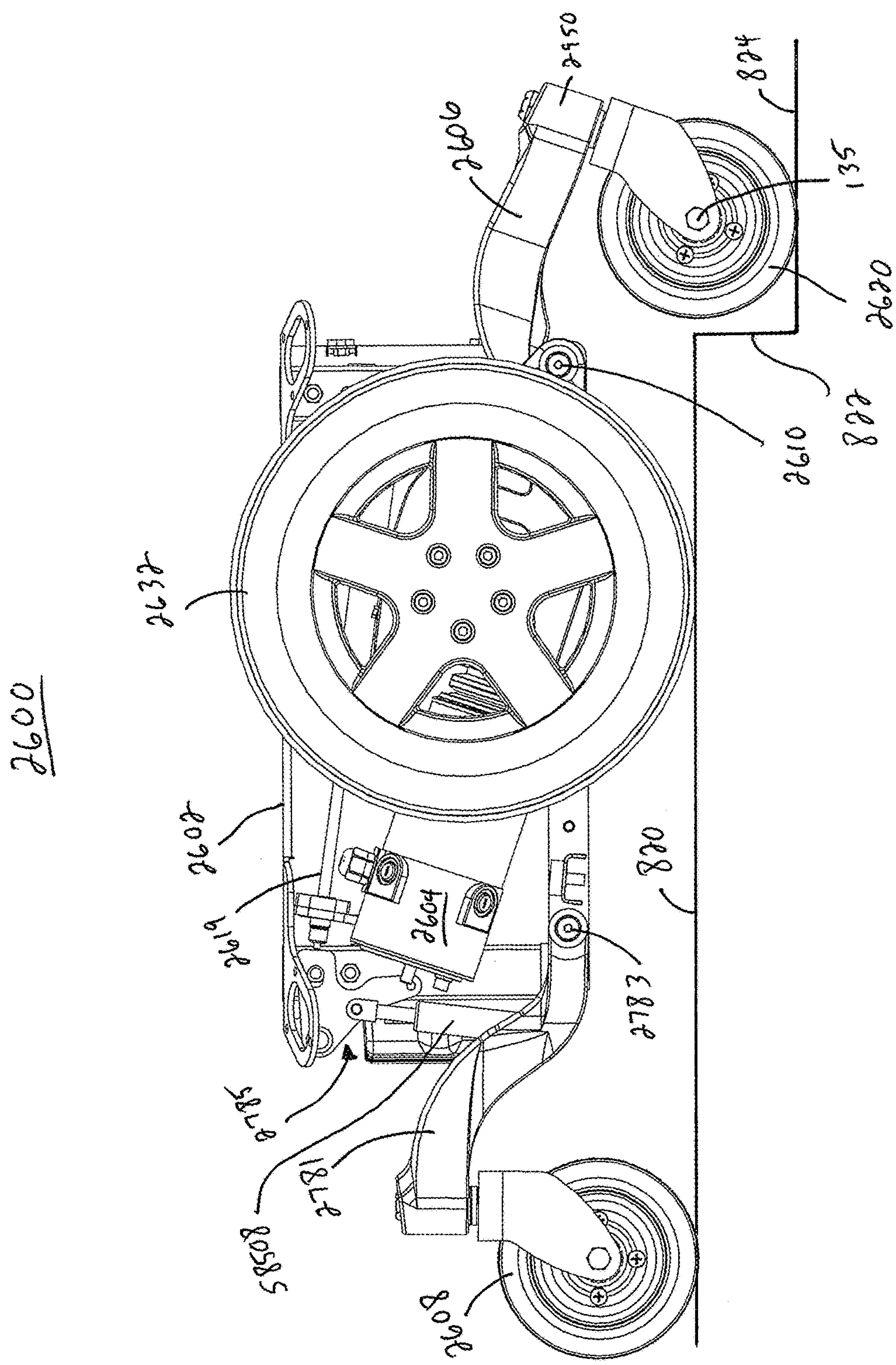
FIG. 32A is a side view of the wheelchair chassis illustrated by FIG. 26A descending a lowered obstacle.
Figure 32B:
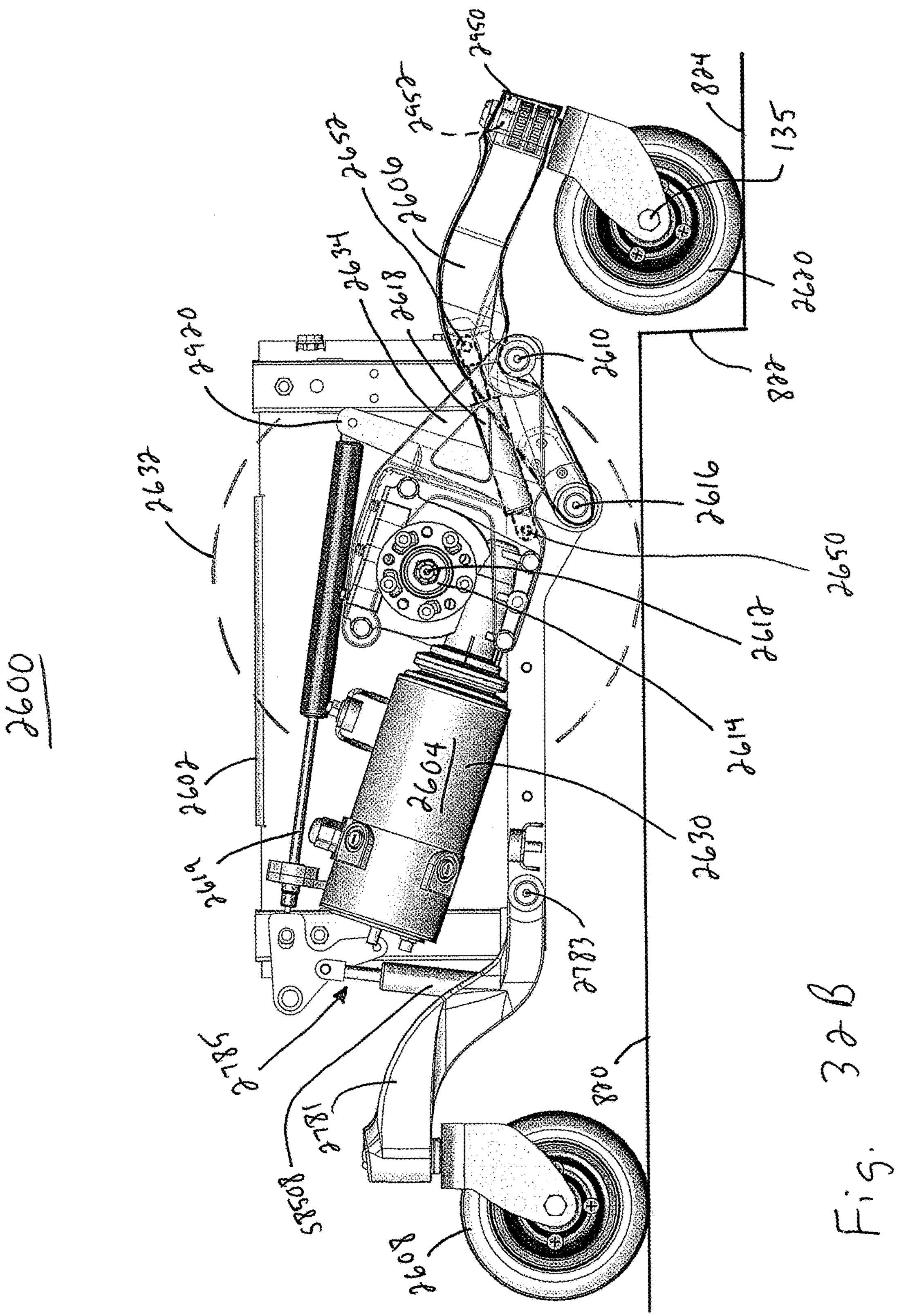
FIG. 32B is a view similar to the view of FIG. 32A with a drive wheel removed.
Figure 32C:
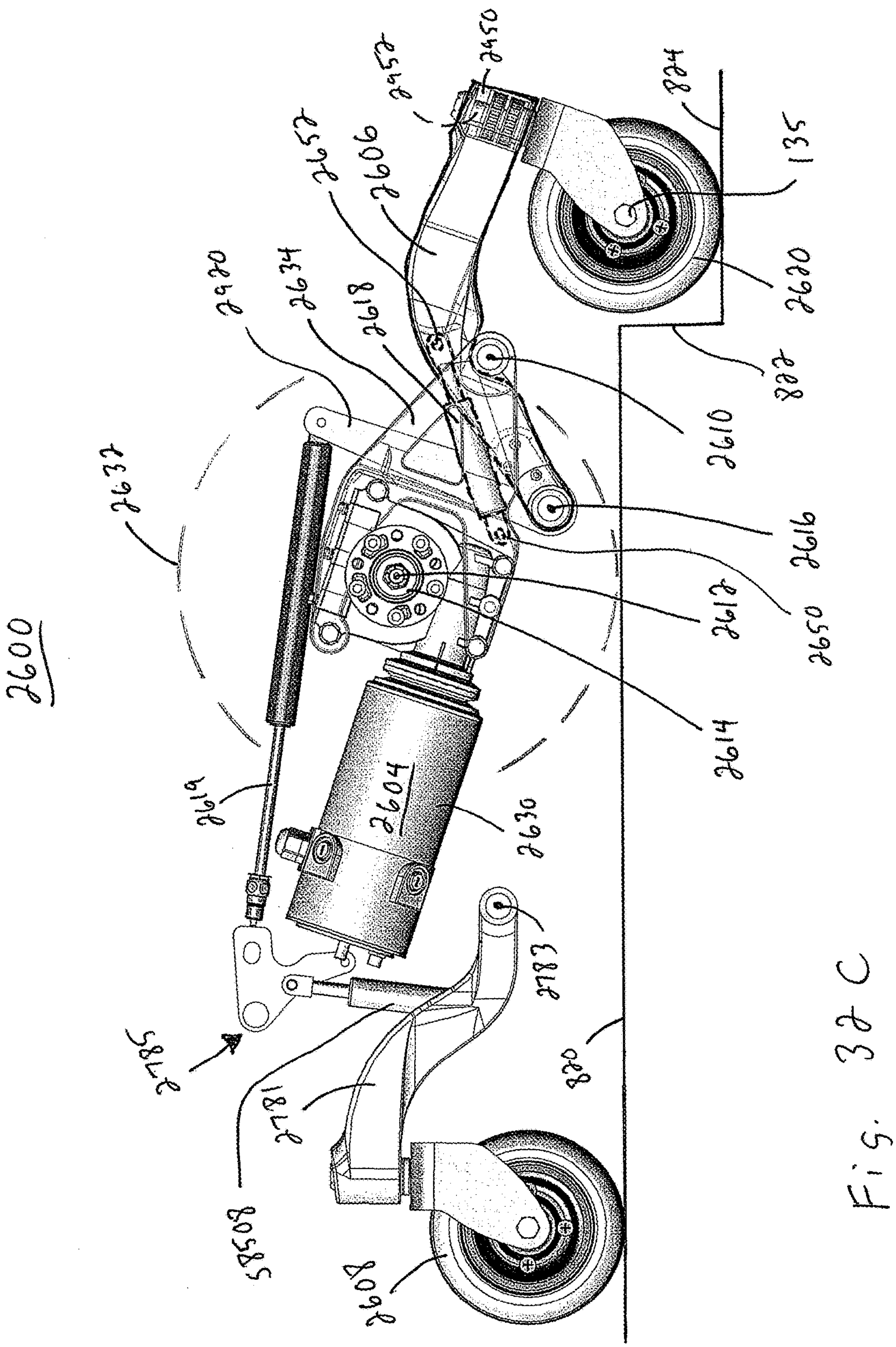
FIG. 32C is a view similar to the view of FIG. 32B with a frame removed.
Figure 32D:
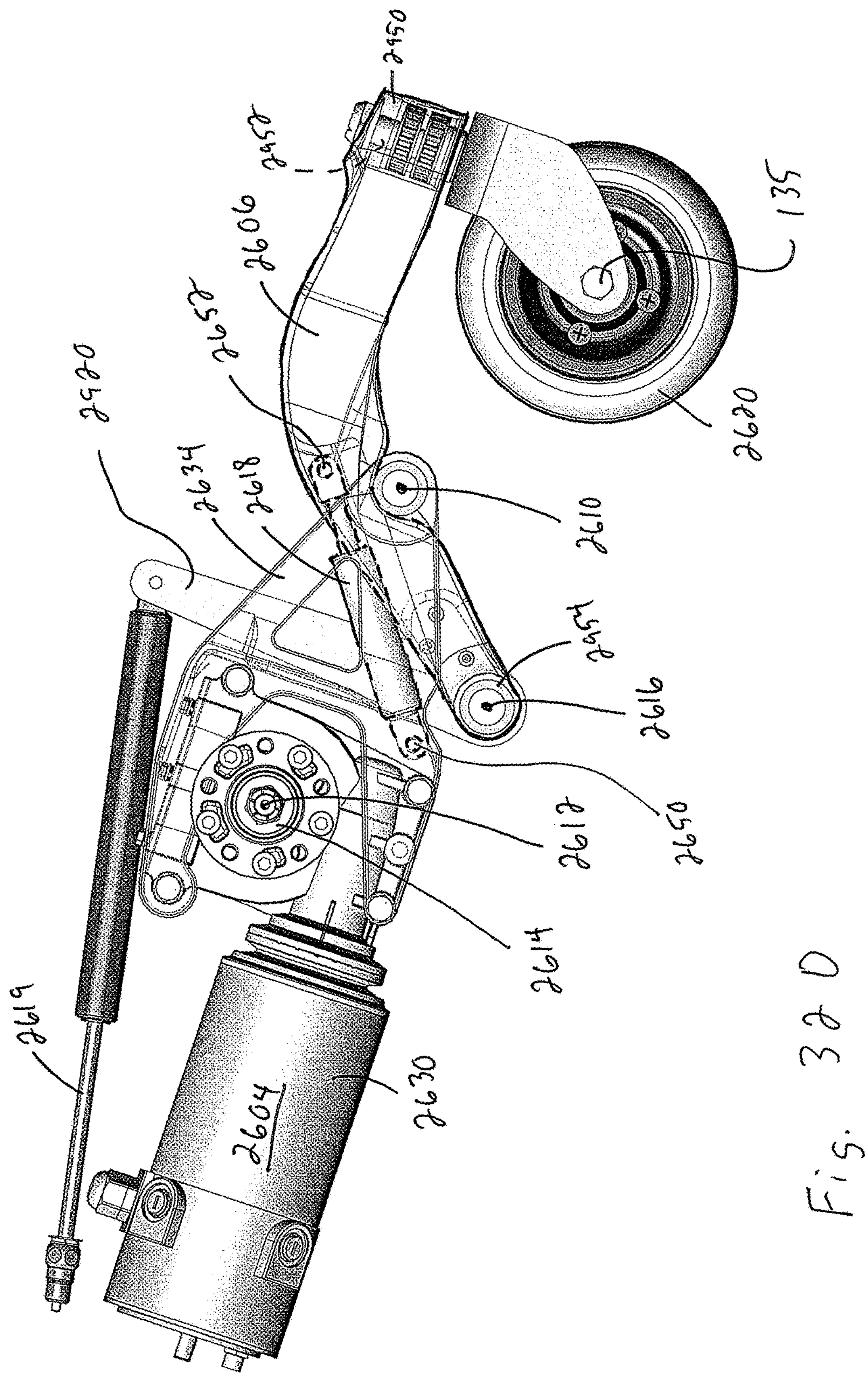
FIG. 32D is a view similar to the view of FIG. 32C with a rear caster assembly and stability control system trigger removed.

When the front caster 2620 engages the obstacle 300, the front caster pivot arm 2606 pivots as indicated by arrow 2610 and the links 2618, 2619 compress to absorb shock that results from the impact between the front caster 2620 and the obstacle 300 (See FIG. 31C). In an exemplary embodiment, the link 2618 is configured to shorten to a minimum length as the front caster 2620 is traversing the obstacle. For example, the link 2618 may shorten to its minimum length when the front caster is 2-4 inches from the support surface 119, 2.5 to 3.5 inches from the support surface, or about 3 inches from the support surface.

When the link 2618 shortens to its minimum length, the drive wheel assembly pivot arm 2634 becomes coupled to the front caster pivot arm 2616. Further upward movement of the front caster 2620 causes the front caster pivot arm 2616 to pivot further, which causes the drive wheel assembly pivot arm 2634 to also pivot with respect to the frame 2602 as the suspension continues to traverse the obstacle.

As described above, an exemplary embodiment of the suspension 2600 transitions from a first condition where the front caster pivot arm 2616 and the drive wheel assembly pivot arm are substantially independent to a condition where the front caster pivot arm 2616 and the drive wheel assembly pivot arm are coupled as the front caster 2620 is ascending the obstacle 300. This transition may be instantaneous, such as when the link reaches its minimum length. Or, the transition from independent to coupled may be gradual. For example, the link 2618 includes a spring. As the length of the link 2618 shortens, the spring force applied between the front caster pivot arm 2616 and the drive wheel assembly pivot arm 2634 increases. As the spring force increases, pivotal movement of the front caster pivot arm 2616 with respect to the frame 2602 will begin to cause the drive wheel assembly pivot arm 2634 to pivot with respect to the frame. As the spring force increases, more of the movement of the front caster pivot arm 2616 is transferred to the drive assembly pivot arm 2634. In one exemplary embodiment, the link 2618 is shortened to a minimum length or the link is shortened to a point where the spring force is high enough that the link substantially functions as a fixed length link.

Once the front caster 2620 is on the obstacle 300, the link 2618 may lengthen. As such, the suspension 2600 transitions back to the condition where the front caster pivot arm 2616 and the drive wheel assembly pivot arm 2634 are substantially independent. When the drive wheel 2632 comes into contact with obstacle 300, the drive assembly 2604 pivots in the direction indicated by arrow 3110 around pivot axis 2610 to soften the impact from the obstacle 300 that is transferred to the frame 2402 (See FIG. 31C). During such pivotal movement of the drive assembly 2604, the link 2618 compresses to allow pivoting of the drive assembly 2604 with respect to the front caster pivot arm. Compressing of the link 2618 absorbs shock that results from the impact between the drive wheel 2632 and the obstacle 300.

FIGS. 32A-32D illustrate the chassis 2600 descending from an elevated surface 820 with a step 822 to a lower surface 824. When the front caster 2620 reaches the step 822, the front caster 2620 and the front caster pivot arm 2606 begin to move downward. The weight of the front caster pivot arm 2606 and front caster 2620, in addition to any weight supported by the front caster 2620 and the springs included in the links 2618, 2619, causes the links 2618, 2619 to extend to their maximum lengths or until the front caster 2620 engages the lower surface 824. By allowing the front caster 2620 to drop down and/or engage the lower surface 2624 before the drive wheel reaches the step, the front caster 2620 and the links 2618, 2619 absorb shock that results from the drive wheel 2632 moving from the upper surface 820 to the lower surface 824.

Stability Control System

Generally, the control system includes a trigger or sensor for sensing when conditions exist that may cause the vehicle to exhibit a tipping behavior, which can be either forward or rearward, and a stabilizing member or assembly that stabilizes the suspension system to prevent any further tipping behavior. The trigger or sensor also senses when the vehicle is no longer subject to conditions that may cause it to exhibit a tipping behavior and causes the stabilizing member or assembly to no longer inhibit movement of the suspension system. A variety of different control system features are disclosed in the context of the following exemplary embodiments. The individual features of the following embodiments may be used alone or in combination with features of other embodiments.

One feature of some control system embodiments disclosed herein is that upward movement of one front caster is inhibited to prevent tipping only if upward movement of the other front caster is also inhibited. Another feature of some control system embodiments disclosed herein is that the relative positions of two rear casters are sensed to determine a tipping behavior. For example, a tipping behavior may be indicated only when both rear casters move downward relative to a frame.

Figure 34C:
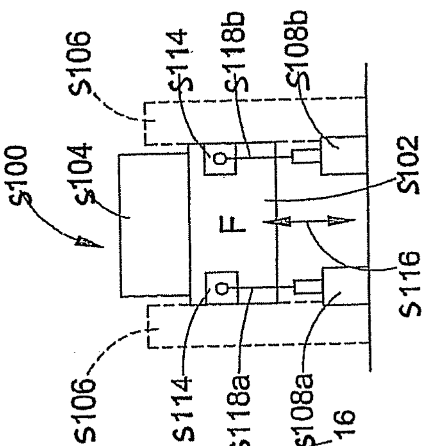
FIG. 34C is a view taken along lines 34C-34C in FIG. 34B, illustrating a front of the mid-wheel drive wheelchair.
Figure 34B:
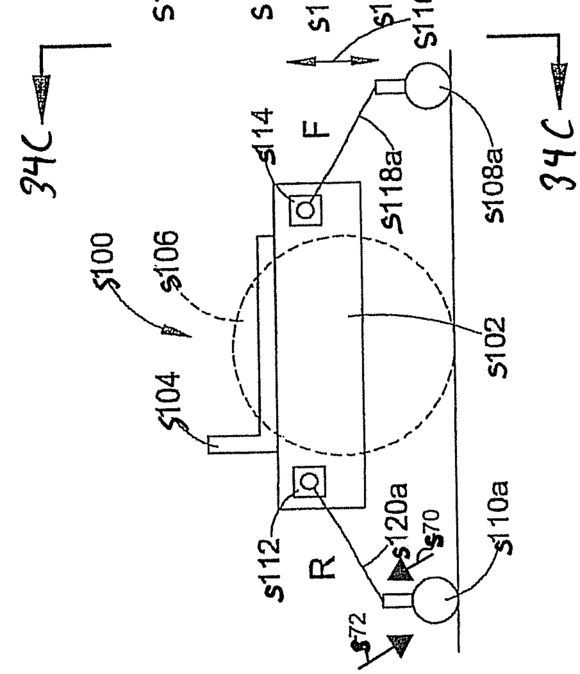
FIG. 34B is a view taken along lines 34B-34B in FIG. 34A, illustrating a side of the mid-wheel drive wheelchair.
Figure 34A:
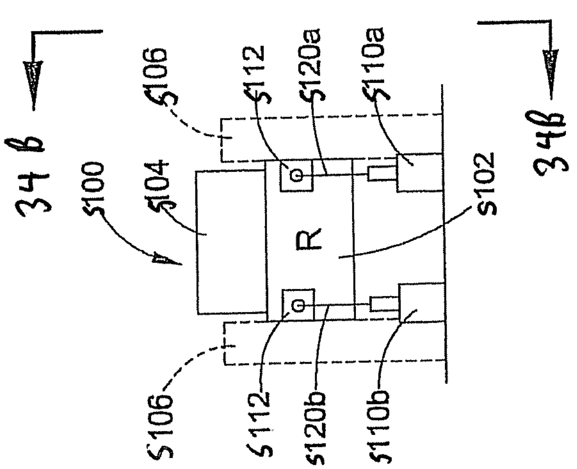
FIG. 34A is an illustration of a rear of an embodiment of a mid-wheel drive wheelchair.

FIGS. 34A, 34B, and 34C schematically illustrate a mid-wheel drive wheelchair S100 that includes a tip or stability control system that comprises one or more sensors S112 and one or more stabilizing members or assemblies S114. The control system S100 can also be applied to a wide variety of other vehicles, including but not limited to, rear drive wheel chairs, front drive wheel chairs, scooters, and other personal mobility vehicles. The wheelchair S100 includes a frame S102, a seat S104 supported by the frame, first and second drive wheels S106 that support the frame, first and second front casters S108*a*, S108*b*, first and second rear casters S110*a*, S110*b*, one or more sensors S112, and one or more stabilizing members or assemblies S114. In this application, the term "frame" refers to any component or combination of components that are configured for mounting of a drive assembly and a caster pivot arm. The first and second front casters S108*a*, S108*b* are coupled to the frame S102 such that the front casters are moveable upwardly and downwardly with respect to the frame as indicated by double arrow S116. In the example illustrated by FIGS. 34A, 34B, and 34C, the front casters are independently coupled to the frame S102 by separate pivot arms S118*a*, S118*b*. In another embodiment, the pivot arms S118*a*, S118*b* are coupled such that movement of one pivot arm is transferred to the other pivot arm. For example, a torsion bar (not shown) may couple the pivot arms S108*a*, S108*b*. The first and second rear casters S110*a*, S110*b* are coupled to the frame S102 such that the rear casters are moveable upwardly and downwardly with respect to the frame. In the example illustrated by FIGS. 34A, 34B, and 34C, the rear casters are independently coupled to the frame S102 by separate rear caster pivot arms S120*a*, S120*b*. In another embodiment, the rear caster pivot arms S120*a*, S120*b* are coupled such that movement of one pivot arm is transferred to the other pivot arm (See the embodiment of FIG. 56 for example).

One stabilizing member S114 is coupled to each front caster pivot arms S118*a*, S118*b* and to the frame S102. However, any number of stabilizing members S114 can be used, may take any form, and may be coupled to the front caster pivot arm and the frame in any manner that allows the stabilizing member or members to inhibit movement of one or more of the front caster pivot arms with respect to the frame in at least one direction. Examples of stabilizing members that may be used include, but are not limited to, the stabilizing members disclosed herein and the locking members disclosed in U.S. Pat. No. 6,851,711 to Goertzen et al, United States Patent Application Publication No. 2004/0150204, and United States Patent Application Publication No. 2005/0151360 to Bertrand et al., which are all incorporated herein by reference in their entireties.

One trigger or sensor S112 is coupled to each of the rear caster pivot arms S120*a*, S120*b* in the example illustrated by FIGS. 34A, 34B, and 34C. However, any number of triggers or sensors S112 can be used, may take any form and may be positioned in any way that allows tipping of the frame S102 to be sensed. Examples of triggers or sensors that may be used include, but are not limited to, the triggers or sensors disclosed herein and the triggers or sensors disclosed in U.S. Pat. No. 6,851,711 to Goertzen et al, United States Patent Application Publication No. 2004/0150204, and United States Patent Application Publication No. 2005/0151360 to Bertrand et al. Tipping may be sensed in ways that are unrelated to movement of the rear casters relative to the frame. Examples of ways a tipping behavior may be sensed include, but are not limited to, the ways tipping is sensed in U.S. Pat. No. 6,851,711 to Goertzen et al, United States Patent Application Publication No. 2004/0150204, and United States Patent Application Publication No. 2005/0151360 to Bertrand et al.

Figure 35:
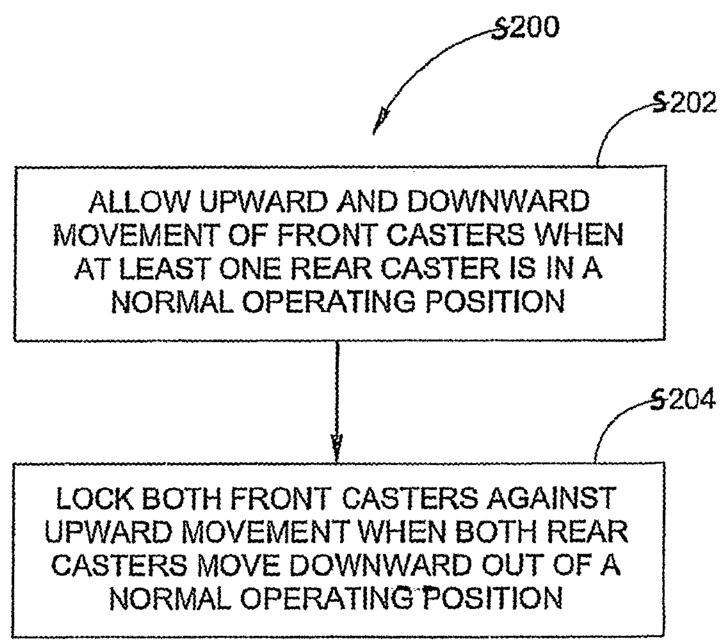
FIG. 35 is a flow chart that illustrates an embodiment of a method of controlling tipping of a mid-wheel drive wheelchair frame.

FIG. 35 is a flow chart that illustrates an embodiment of a method S200 of stabilizing a mid-wheel drive wheelchair frame. In the method, upward and downward movement of the front casters S108*a*, S108*b* is allowed (block S202) when at least one rear caster S110*a*, S110*b* is in a normal operating position. When both of the rear casters S110*a*, S110*b* move out of a normal operating position, the front casters S108*a*, S108*b* are locked (block S204) against at least upward movement relative to the frame. The front casters S108*a*, S108*b* may be locked against both upward and downward movement or only against upward movement.

Normal operating positions of the rear casters S110*a* and S110*b* include the positions of the rear casters when the wheelchair is stationary on level ground (referred to herein as the stationary, level ground position). Normal operating positions of the rear casters S110*a* and S110*b* also include any position of the rear casters relative to the frame where the rear caster(s) are rotated as indicated by arrow S70 in FIG. 34B. Normal operating positions of the rear casters S110*a*, S110*b* also include any positions where the rear caster(s) are rotated relative to the frame S102 as indicated by arrow S72 by less than a predetermined distance or angle below the stationary, level ground position. In the exemplary embodiment, the predetermined distance or angle from the stationary, level ground position in the direction indicated by arrow S72 corresponds to a distance or angle that is indicative of a tipping behavior of the wheelchair. For example, movement of the rear caster(s) relative to the frame in the direction indicated by arrow S72 that is greater than ½ inch may be indicative of tipping of the wheelchair and out of the normal operating position of the rear casters. However, the normal operating position of the rear casters S110*a* and S110*b* will vary from one wheelchair to another.

FIGS. 34, 36 and 37 illustrate a wheelchair S100 with a stabilizing assembly S114 that inhibits upward movement of the first and second front casters S108*a*, S108*b* with respect to the wheelchair frame S102 based on movement of first and second rear casters S110*a*, S110*b* with respect to the wheelchair frame. Referring to FIGS. 34A, 34B and 34C, the stabilizing assembly S114 allows upward and downward movement (as indicated by double arrow S116) of the first and second front casters S108*a*, S108*b* relative to the frame S102 when the first and second rear casters S110*a*, S110*b* are in normal operating positions relative to the frame.

Figures 36A, 36B, 36C:
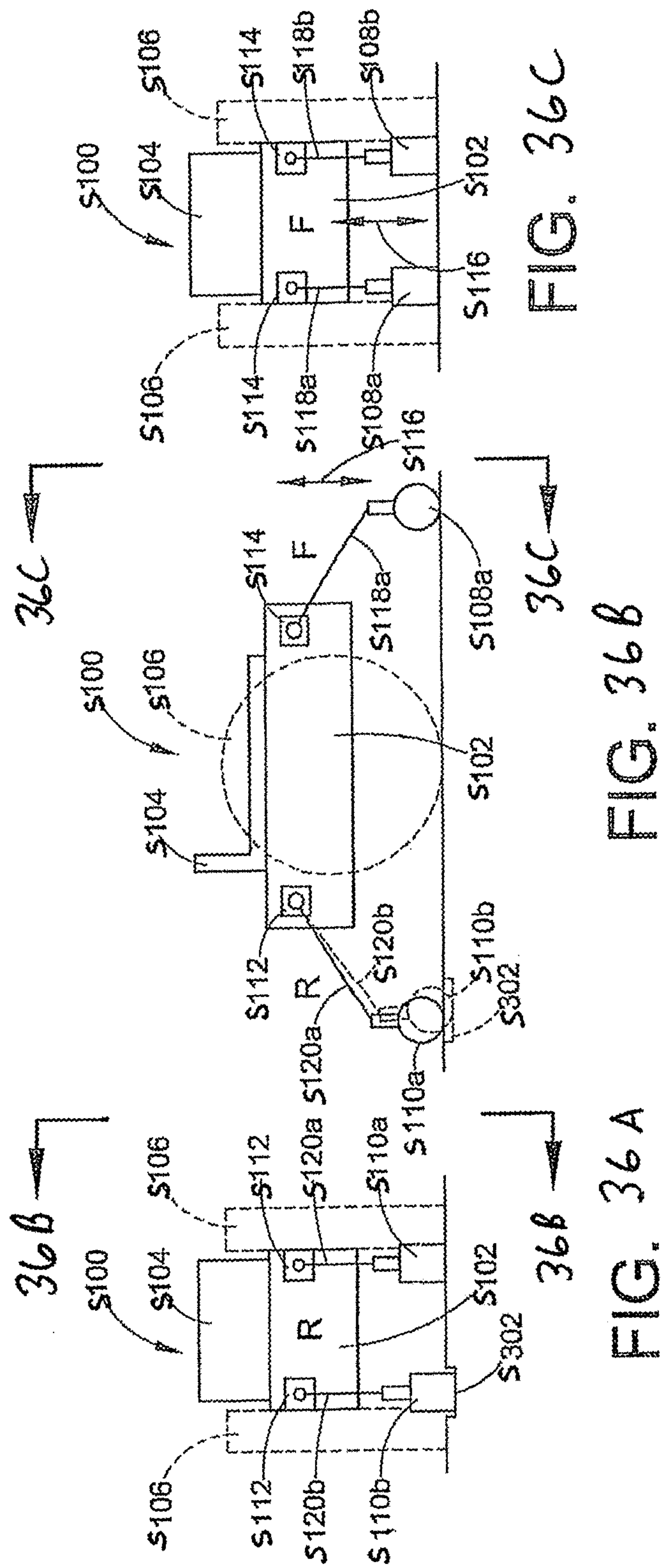
FIGS. 36A-36C illustrate the wheelchair of FIGS. 34A-34C, where one rear caster has moved downward relative to a frame.

FIGS. 36A, 36B, and 36C illustrate the wheelchair S100 where the rear caster S110*a* is in a normal operating position and the rear caster S110*b* has dropped below the range of normal operating positions. This condition may occur when one of the rear casters falls into a depression S302 as illustrated by FIGS. 36A, 36B, and 36C. This condition may also occur when the wheelchair travels laterally along an inclined surface. When the rear caster S110*a* is in a normal operating position and the rear caster S110*b* has dropped below the range of normal operating positions, both of the stabilizing members S114 continue to allow upward and downward movement of the first and second front casters S108*a*, S108*b* relative to the frame S102.

Figure 37C:
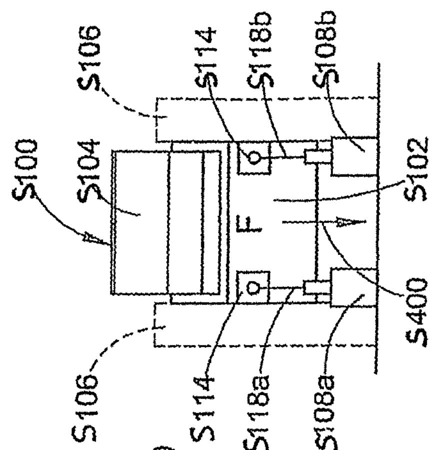
FIGS. 37A-37C illustrate the wheelchair of FIGS. 34A-34C, where the wheelchair is exhibiting a tipping behavior.
Figure 37B:
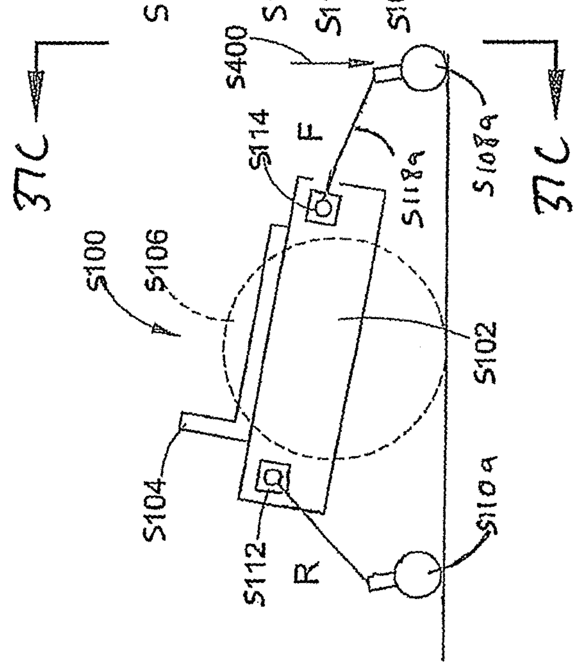
Figure 37A:
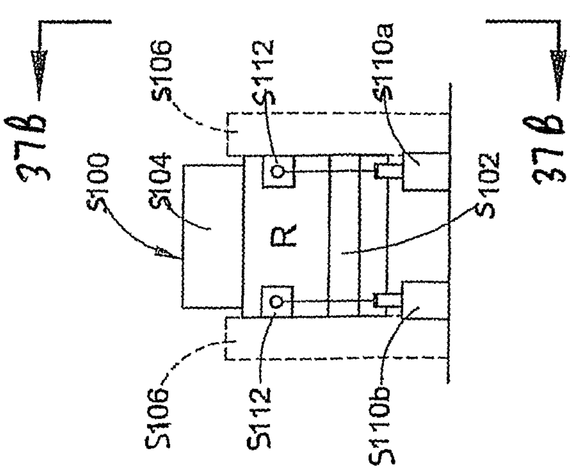

FIGS. 37A, 37B, and 37C illustrate the wheelchair S100 exhibiting a tipping behavior. The frame S102 of the wheelchair S100 is pitched forward toward the front casters S108*a*, S108*b*. As a result, the rear casters S110*a*, S110*b* move downward relative to the frame S102 to maintain contact with the ground. This downward movement positions both of the rear casters S110*a*, S110*b* below the range of normal operating positions relative to the frame S102. The sensors or triggers S112 sense that the rear casters S110*a*, S110*b* are both below the range of normal operating positions and cause the stabilizing members S114 to engage. In the example illustrated by FIGS. 37A, 37B and 37C, engagement of the stabilizing assemblies locks the first and second front casters S108*a*, S108*b* against upward movement relative to the frame, but allow the front casters to move downward as indicated by arrow S400 when the stabilizing assembly is engaged. In another embodiment, the stabilizing assembly S114 locks the front caster pivot arms against both upward and downward movement with respect to the pivot arm when engaged. In another embodiment, engagement of the stabilizing assemblies S114 greatly increase the amount of force required to move the front casters upward with respect to the frame. In another embodiment, engagement of the stabilizing assemblies S114 causes the stabilizing assemblies to apply additional force to move the front casters downward relative to the frame and return the frame to a normal operating position. When one or more of the rear casters return to a normal operating position relative to the frame, the sensors or triggers S112 disengage the stabilizing assembly to allow upward and downward movement of the first and second front casters relative to the frame.

Figure 38:
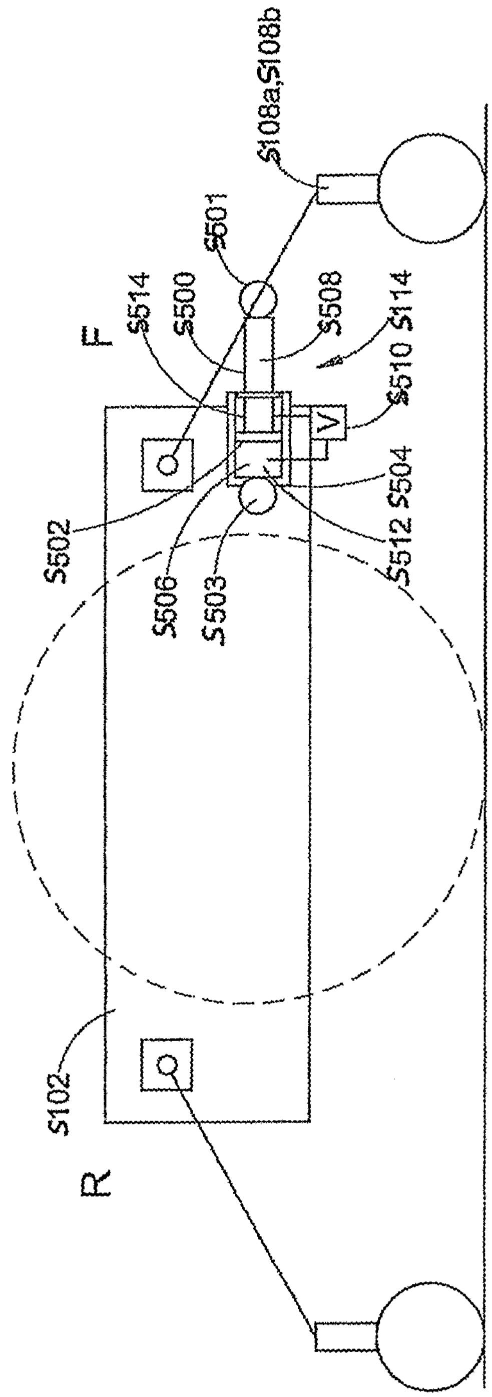
FIG. 38 is an illustration of an embodiment of a wheelchair with a fluid cylinder stabilizing assembly.

The stabilizing member, stabilizing members, or stabilizing assembly S114 or assemblies can take a wide variety of different forms. For example, the stabilizing assembly S114 may be a fluid cylinder S500 as illustrated by FIG. 38. One fluid cylinder S500 may be coupled between each front caster S108*a*, S108*b* at connection S501 and the frame S102 at connection 503, or a single fluid cylinder may be coupled between the front casters and the frame. As used herein, "coupled" refers to both direct coupling of two or more components or the indirect coupling of components such as through one or more intermediary components or structures. The fluid cylinder S500 includes a piston S502, a housing S504 that defines a piston chamber S506, a rod S508, and a valve S510. The rod S508 extends into the housing S504 and is connected to the piston. The piston S502 divides the chamber S506 into two compartments S512, S514. The valve S510 selectively allows fluid to flow between the two compartments when the valve is open and prevents flow between the two compartments when the valve is closed. As such, the rod S508 can move into and out of the housing 504 when the valve S510 is open and the position of the piston S502 and the rod is substantially fixed when the valve is closed. When the valve S510 is open, the movement of the fluid between the chambers S512, S514 and through the valve S510 provides a damping effect. As such, the cylinder S500 acts as a shock absorber when the valve is open and damps upward and downward movement of the front caster. In one embodiment, when the valve is "closed" fluid is allowed flow from the compartment S512 to the compartment S514, but not from the compartment S514 to the compartment S512. As such, the rod S508 may be moved into the housing S504, but not out the housing when the valve S510 is closed. When the valve S510 is closed, the cylinder S500 damps downward movement of the front caster and inhibits upward movement of the front caster. One acceptable fluid cylinder that may be used is model number Koa8kx-2-06-304/000N from Easylift.

Figure 39:
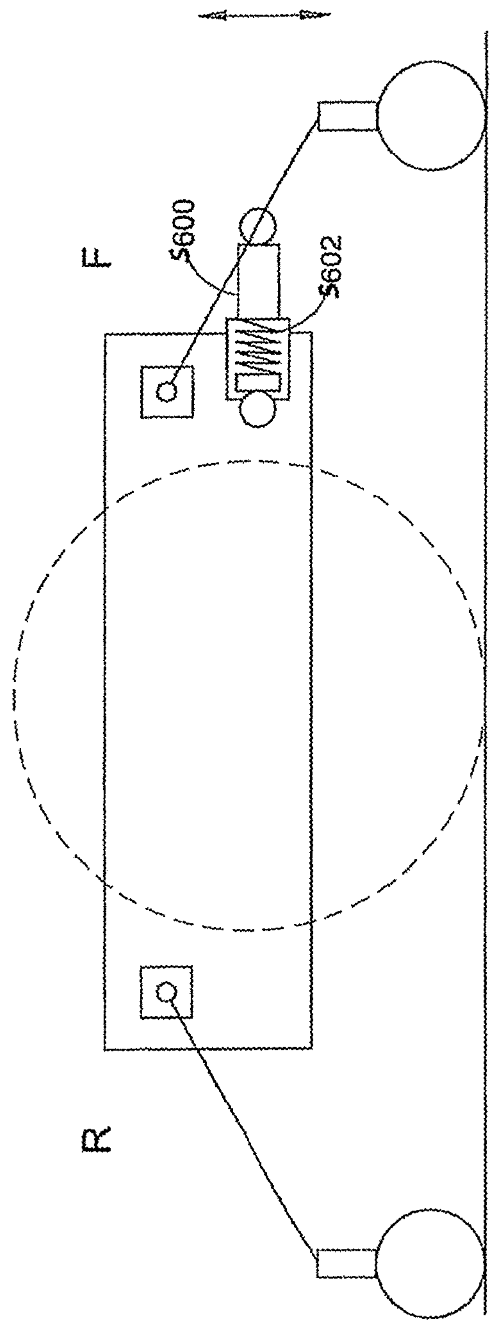
FIG. 39 is an illustration of an embodiment of a wheelchair with a fluid cylinder with spring return stabilizing assembly.

FIG. 39 illustrates a cylinder S600 that is similar to the cylinder S500 illustrated in FIG. 38, but includes a spring S602 that biases or returns the rod S508 to a retracted position. In an embodiment where the valve prevents fluid flow between the compartments S512, S514 when the valve is closed, the actuator S600 biases the front caster toward contact with the ground only when the valve S510 is open. In an embodiment where the valve allows flow from the compartment S512 to the compartment S514, but not from the compartment S514 to the compartment S512 when the valve is closed, the actuator S600 biases the front caster toward contact with the ground when the valve S510 is open or closed. One acceptable fluid cylinder with a spring return that may be used is model number k0m2pm2-060-345-002/50N from Easylift.

The stabilizing cylinders S500, S600 illustrated by FIGS. 38 and 39 are two examples of the wide variety of different stabilizing assemblies S114 that can be used. Any arrangement capable of inhibiting upward and/or downward movement of a front caster relative to a frame can be used. As noted above, any of the arrangements for inhibiting movement of a front caster with respect to a frame disclosed in U.S. Pat. No. 6,851,711 to Goertzen et al., United States Patent Application Publication No.: 2004/0150204 to Goertzen et al., and United States Patent Application Publication No.: 2005/0151360 to Bertrand et al. can be used.

Figure 40A:
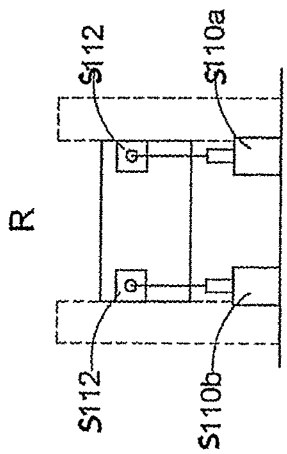
FIGS. 40A-40C illustrate an embodiment of a mid-wheel drive wheelchair that is similar to the wheelchair shown in FIGS. 34A-34C where two stabilizing members are linked.
Figure 40B:
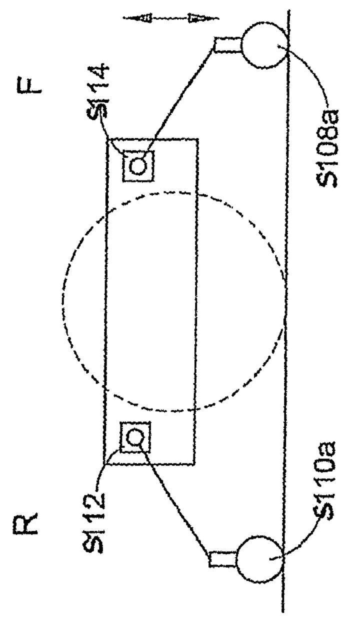
Figure 40C:
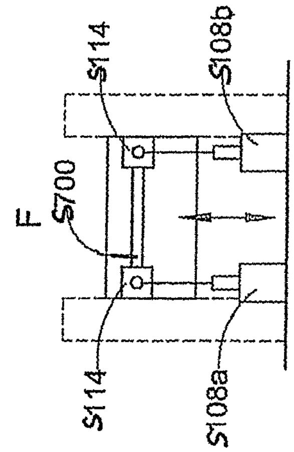

Stabilizing members or assemblies S114 and triggers or sensors S112 may be arranged in a wide variety of different ways to inhibit further tipping when both rear casters S110*a*, S110*b* drop below the range of normal operating positions. Referring to FIGS. 40A, 40B, and 40C a trigger or sensor S112 is coupled to each rear caster S110*a*, S110*b*. A stabilizing member or assembly S114 is coupled to each front caster S108*a*, S108*b*. The stabilizing assemblies S114 are linked by a coupling S700, such that each stabilizing member or assembly S114 will not engage unless the other stabilizing assembly also engages. The coupling S700 may take a wide variety of different forms. For example, the coupling S700 may be a mechanical linkage, and electronic linkage, an electromechanical linkage or a pneumatic or hydraulic linkage. The stabilizing members or assemblies S114 may be mechanically linked by wire, a rod or a clutch mechanism, electromechanically linked by a pair of solenoid actuators that are in electronic communication. When the stabilizing assemblies S114 are fluid actuators, the stabilizing assemblies may be pneumatically or hydraulically linked by conduits and valves that connect the chambers of the fluid actuators. For example, fluid devices from Easylift may be linked in this manner.

Figure 41C:
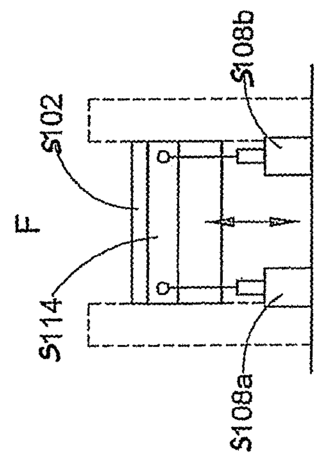
FIGS. 41A-41C illustrate an embodiment of a mid-wheel drive wheelchair that is similar to the wheelchair shown in FIGS. 34A-34C that includes a single stabilizing member or assembly.
Figure 41B:
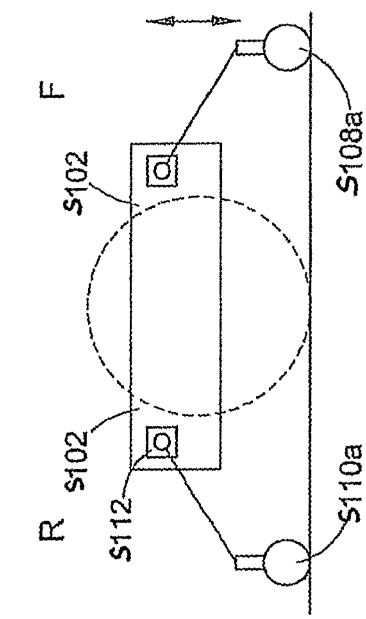
Figure 41A:
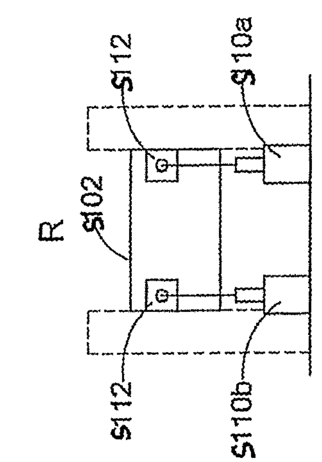

In the example illustrated by FIGS. 41A, 41B, and 41C a trigger or sensor S112 is coupled to each rear caster S110*a*, S110*b* and a single stabilizing assembly S114 is coupled to both of the front casters S108*a*, S108*b*. The stabilizing member or assembly S114 is in communication with both triggers or sensors S112, such that the stabilizing assembly S114 will not engage unless both of the triggers or sensors S112 sense a condition that indicates a tipping behavior of the frame S102, such as downward movement of both rear casters S110*a*, S110*b* relative to the frame S102. The single stabilizing assembly S114 may be arranged to permit independent upward and downward movement of the front casters S108*a*, S108*b*.

Figure 42A:
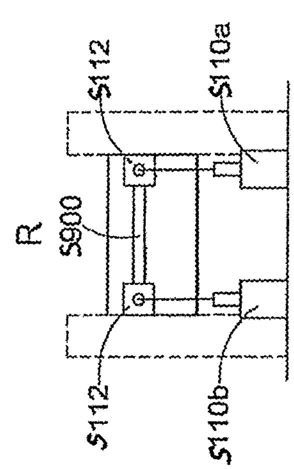
FIGS. 42A-42C illustrate an embodiment of a mid-wheel drive wheelchair that is similar to the wheelchair shown in FIGS. 34A-34C where two triggers or sensors are linked.
Figure 42B:
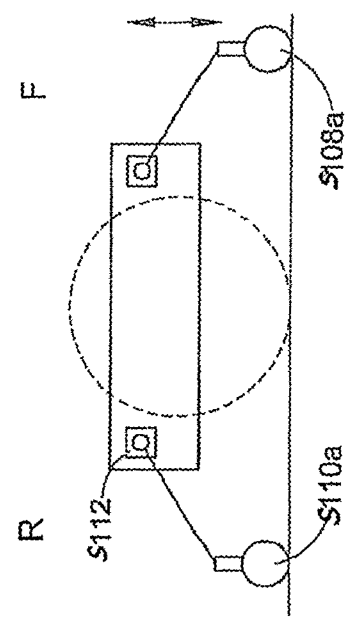
Figure 42C:
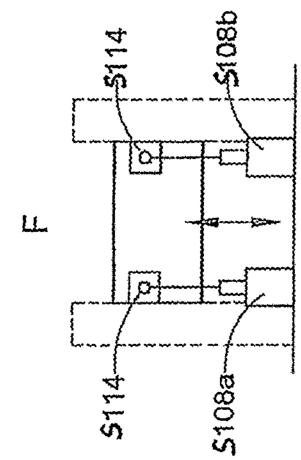

In the examples illustrated by FIGS. 42A, 42B and 42C, a trigger or sensor S112 is coupled to each rear caster S110*a*, S110*b* and a stabilizing assembly S114 is coupled to each front caster S108*a*, S108*b*. The triggers or sensors S112 are linked by a coupling 900, such that each sensor or trigger will not cause engagement of its respective stabilizing assembly S114 unless both of the sensors or triggers sense a tipping behavior of the wheelchair. The coupling S900 may take a wide variety of different forms. For example, the coupling S900 may be a mechanical linkage, and electronic linkage, an electromechanical linkage or a pneumatic or hydraulic linkage. The triggers or sensors S112 may be mechanically linked by wire or a rod, electromechanically linked by a pair of solenoid actuators that are in electronic communication, and/or pneumatically or hydraulically linked by a pair of fluid actuators that are in fluid communication.

Figure 43A:
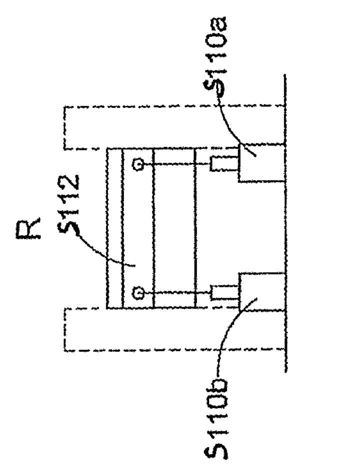
FIGS. 43A-43C illustrate an embodiment of a mid-wheel drive wheelchair that is similar to the wheelchair shown in FIGS. 34A-34C that includes a single trigger or sensor.
Figure 43B:
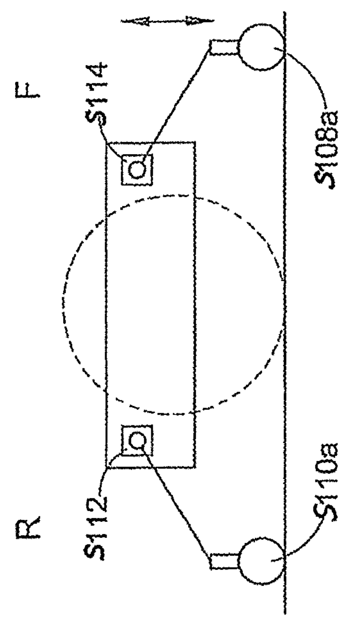
Figure 43C:
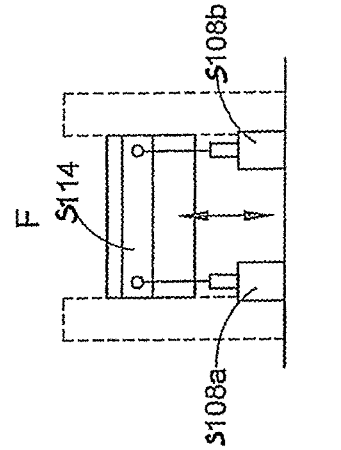

In the example illustrated by FIGS. 43A, 43B, and 43C a single trigger or sensor S112 is coupled to both rear casters S110$a$, S110 and a single stabilizing assembly S114 is coupled to both of the front casters S108$a$, S108$b$. The single stabilizing assembly S114 is controlled by the single trigger or sensor S112. In one embodiment, the single trigger or sensor S112 will not detect a tipping behavior unless both rear casters fall below their range of normal operating positions. The single trigger or sensor S112 causes the single stabilizing assembly S114 to engage when a tipping behavior is sensed. The single stabilizing assembly S114 may be arranged to permit independent upward and downward movement of the front casters S108$a$, S108$b$ when disengaged and independent downward movement of the front casters when engaged.

FIGS. 44, 45 and 46 illustrate a wheelchair S1100 with a rear caster position sensing linkage S1101 that allows a single trigger or sensor S112 to determine when both of the rear casters S110$a$, S110$b$ have dropped below their normal operating positions with respect to the frame S102. The linkage S1101 and sensor S112 can be used to control a pair of stabilizing members S114 as illustrated, or a single stabilizing member (see FIG. 43). The linkage S1101 is pivotally connected to the frame at pivot point S1102. The linkage S1101 includes a rear caster pivot arm sensing portion S1104 and a sensor activating portion S1106. The rear caster pivot arm sensing portion S1104 and a sensor activating portion S1106 are pivotable around the pivot point S1102. The sensing portion S1104 is in connection with the rear caster pivot arms S120$a$, S120$b$. The sensor activating portion S1106 is in communication with the trigger or sensor S112.

Figure 44C:
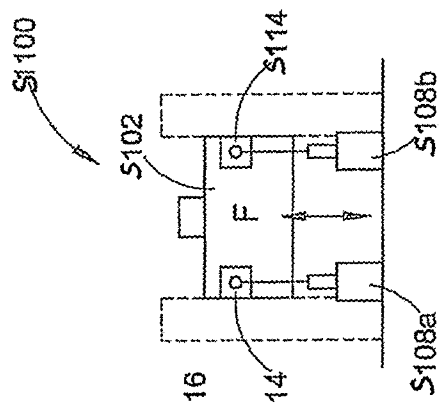
FIGS. 44A-44C illustrate an embodiment of a mid-wheel drive wheelchair that is similar to the wheelchair shown in FIGS. 34A-34C that includes a rear caster position sensing linkage coupled to a single trigger or sensor that indicates when both rear casters drop relative to a frame.
Figure 44B:
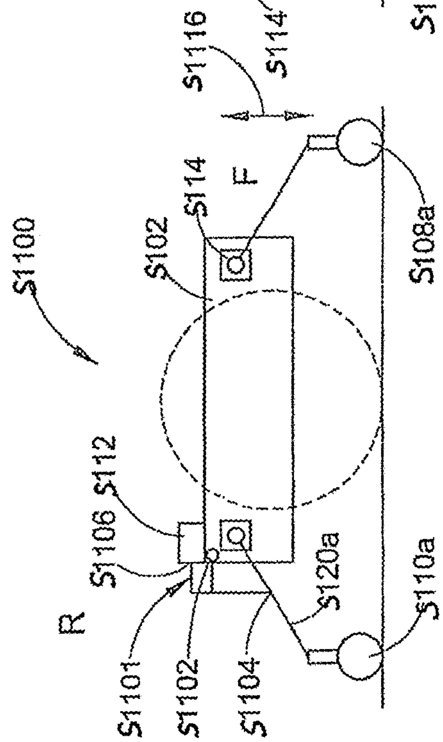
Figure 44A:
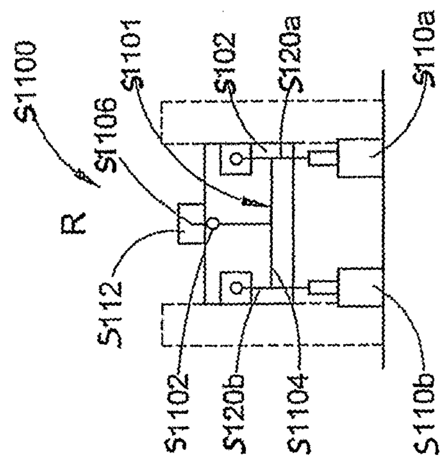

Referring to FIGS. 44A, 44B and 44C, when the first and second rear casters S108$a$, S108$b$ are in normal operating positions, the first and second rear caster pivot arms S120$a$, S120$b$ maintain the rear caster pivot arm sensing portion S1104 and the sensor activating portion S1106 in a first or disengaged position shown in FIGS. 44A, 44B, and 44C. When the sensor activating portion S1106 is in the first position, the sensor S112 controls the stabilizing assembly S114 to allow upward and downward movement (as indicated by double arrow S1116) of the first and second front casters S108$a$, S108$b$ relative to the frame S102. In the example illustrated by FIGS. 44A, 44B, and 44C, the sensor activating portion S1106 is in engagement or close to the sensor in the first or disengaged position. In another embodiment, the sensor activating portion S1106 is spaced apart from the sensor in the first position or disengaged position.

Figure 45C:
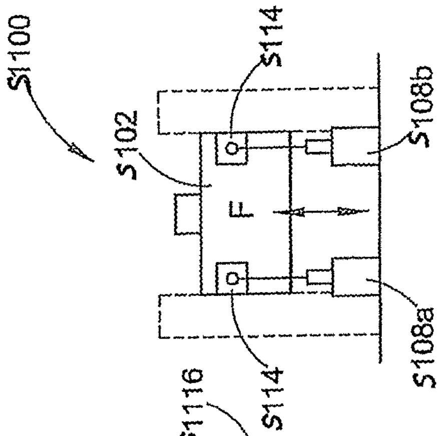
FIGS. 45A-45C illustrate the wheelchair of FIGS. 44A-44C, where one rear caster has moved downward relative to a frame.
Figure 45B:
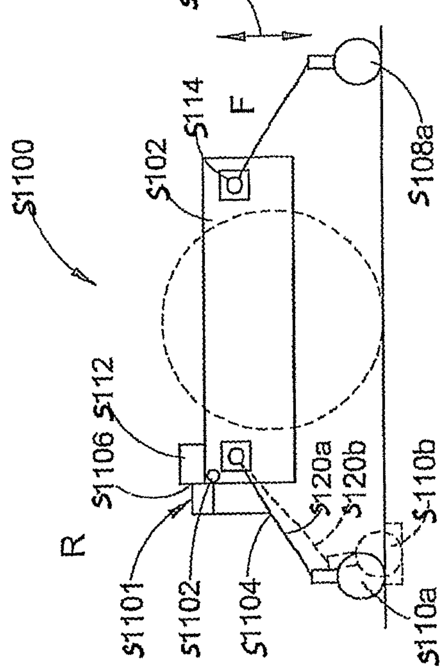
Figure 45A:
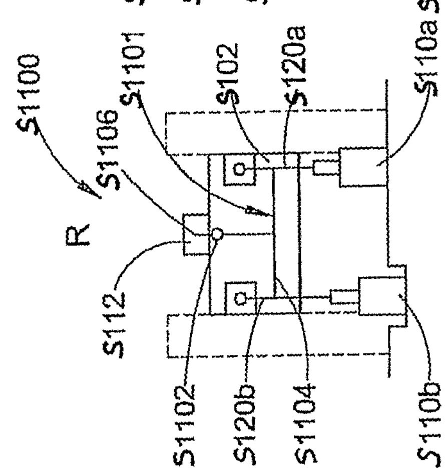

FIGS. 45A, 45B, and 45C illustrate the wheelchair S1100 where the rear caster S110$a$ is in a normal operating position and the rear caster S110$b$ has dropped below the range of normal operating positions. When the rear caster S110$a$ is in a normal operating position and the rear caster S110$b$ has dropped below the range of normal operating positions, the first rear caster pivot arms S120$a$ maintains the rear caster pivot arm sensing portion S1104 and the sensor activating portion S1106 in the first or disengaged position.

Figures 46A, 46B, 46C:
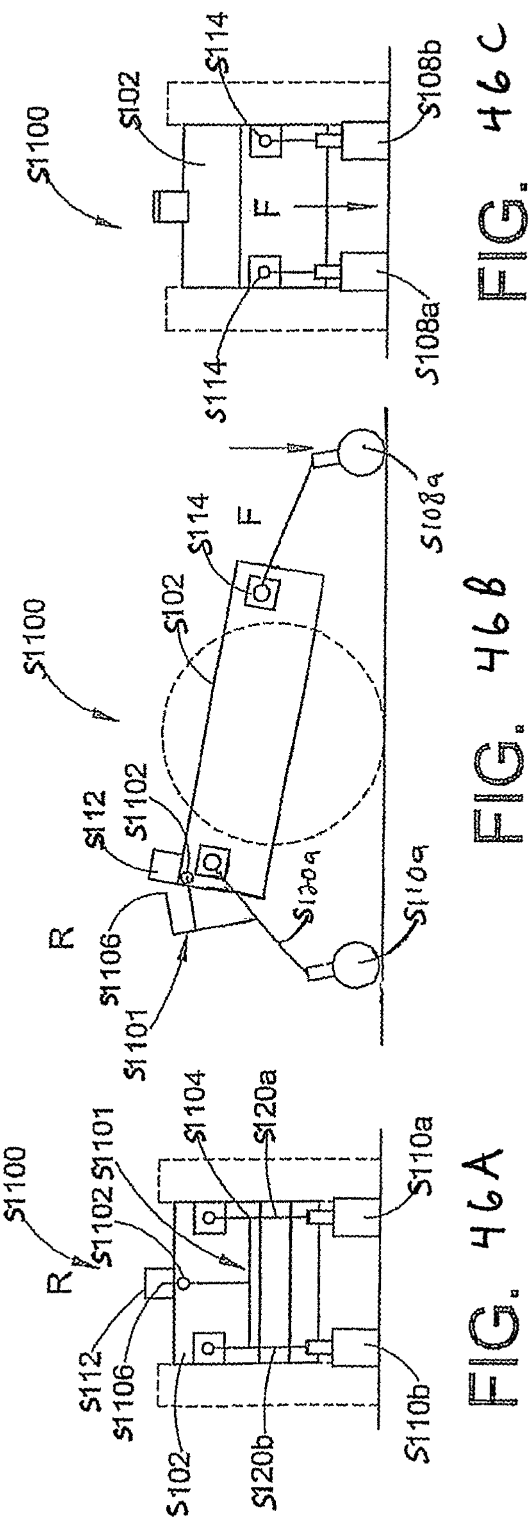
FIGS. 46A-46C illustrate the wheelchair of FIGS. 44A-44C, where the wheelchair is exhibiting a tipping behavior.

FIGS. 46A, 46B, and 46C illustrate the wheelchair S100 exhibiting a tipping behavior. The frame S102 of the wheelchair S100 is pitched forward toward the front casters S108$a$, S108$b$. As a result, the rear casters S110$a$, S110$b$ move downward relative to the frame S102 to maintain contact with the ground. This downward movement positions both of the rear casters S110$a$, S110$b$ below the range of normal operating positions with respect to the frame. When the first and second rear casters S108$a$, S108$b$ fall below their ranges of normal operating positions, the rear caster pivot arm sensing portion S1104 and the sensor activating portion S1106 pivot to a second or engaged position shown in FIGS. 46A, 46B, and 46C. When the sensor activating portion S1106 is in the second or engaged position, the sensor S112 controls the stabilizing assembly S114 to inhibit at least upward movement of the first and second front casters S108$a$, S108$b$ relative to the frame S102. In the example illustrated by FIGS. 46A, 46B, and 46C, the sensor activating portion S1106 is spaced apart from the sensor in the second or engaged position. In another embodiment, the sensor activating portion S1106 is in contact or close to the sensor in the second or engaged position. When one or more of the rear casters return to a normal operating position relative to the frame, the linkage S1101 is moved back to the disengaged position and the sensor or trigger S114 causes the stabilizing assembly to disengage and allow upward and downward movement of the front casters relative to the frame.

FIGS. 47, 48 and 49 illustrate a wheelchair S1400 with a rear caster position sensing linkage S1401 that actuates a pair of triggers or sensors S112 when both of the rear casters S110$a$, S110$b$ have dropped below their normal operating positions with respect to the frame S102 and does not actuate either of the triggers or sensors S112 when one or more of the rear casters S110$a$, S110$b$ are in their normal operating position with respect to the frame S102. The linkage S1401 and sensors S112 can be used to control a pair of stabilizing members S114 as illustrated, or a single stabilizing member (see FIG. 41). The linkage S1401 is pivotally connected to the frame at pivot point S1402. The linkage S1401 includes a rear caster pivot arm sensing portion S1404 and a sensor activating portion S1406. The rear caster pivot arm sensing portion S1404 and a sensor activating portion S1406 are pivotable around the pivot point S1402. The sensing portion S1404 is coupled to the rear caster pivot arms S120$a$, S120$b$. The sensor activating portion S1406 is in communication with both of the triggers or sensors S112.

Figures 47A, 47B, 47C:
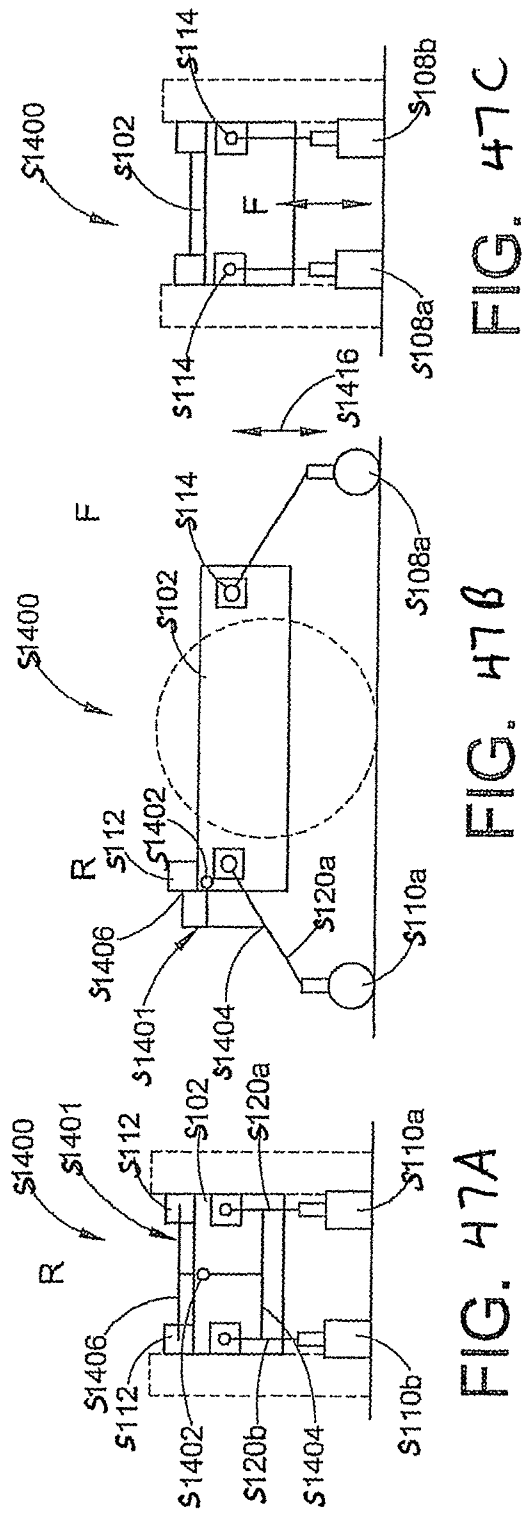
FIGS. 47A-47C illustrate an embodiment of a mid-wheel drive wheelchair that is similar to the wheelchair shown in FIGS. 34A-34C that includes a rear caster position sensing linkage coupled to a pair of triggers or sensor that indicates when both rear casters drop relative to a frame.

Referring to FIGS. 47A, 47B and 47C, when the first and second rear casters S108$a$, S108$b$ are in normal operating positions, the first and second rear caster pivot arms S120$a$, S120$b$ maintain the rear caster pivot arm sensing portion S1404 and the sensor activating portion S1406 in a first or engaged position shown in FIGS. 47A, 47B, and 47C. When the sensor activating portion S1406 is in the first position, the sensor activating portion S1406 maintains both sensors S112 in a first state. In the first state, the two sensors S112 control the stabilizing assemblies S114 to allow upward and downward movement (as indicated by double arrow S1416) of the first and second front casters S108$a$, S108$b$ relative to the frame S102.

Figure 48A:
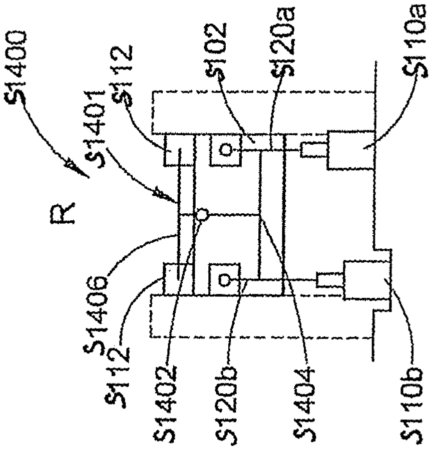
FIGS. 48A-48C illustrate the wheelchair of FIGS. 47A-47C, where one rear caster has moved downward relative to a frame.
Figure 48B:
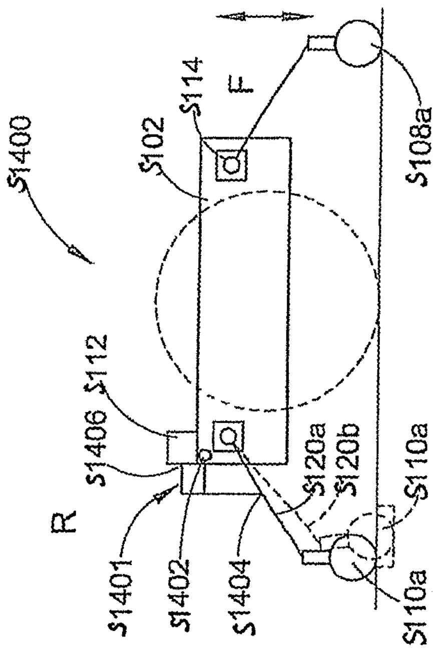
Figure 48C:
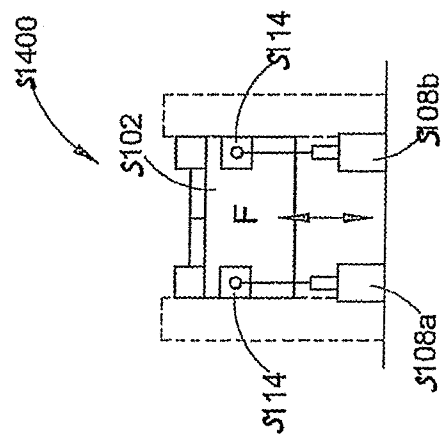

FIGS. 48A, 48B, and 48C illustrate the wheelchair S1400 where the rear caster S110$a$ is in a normal operating position and the rear caster S110$b$ has dropped below the range of normal operating positions. When the rear caster S110$a$ is in a normal operating position and the rear caster S110$b$ has dropped below the range of normal operating positions, the first rear caster pivot arm S120$a$ maintains the rear caster pivot arm sensing portion S1404 and the sensor activating portion S1106 in the first or disengaged position.

Figures 49A, 49B, 49C:
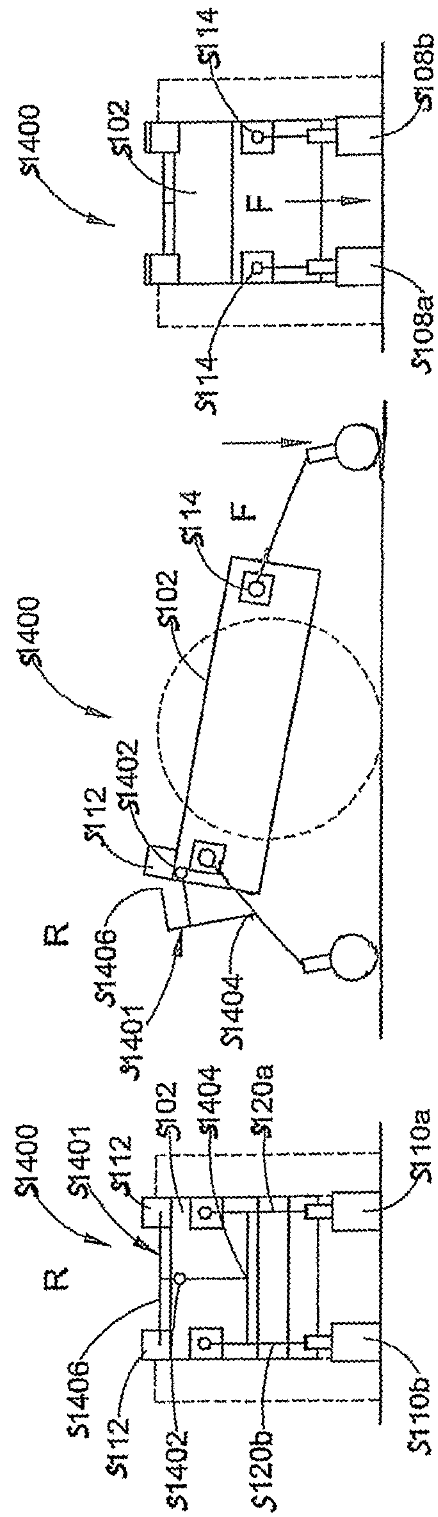
FIGS. 49A-49C illustrate the wheelchair of FIGS. 47A-47C, where the wheelchair is exhibiting a tipping behavior.

FIGS. 49A, 49B, and 49C illustrate the wheelchair S1400 exhibiting a tipping behavior. The rear casters S110$a$, S110$b$ move downward, below the range of normal operating positions relative to the frame. When the first and second rear casters S108$a$, S108$b$ fall below their ranges of normal operating positions, the rear caster pivot arm sensing portion S1404 and the sensor activating portion S1406 move to a second or engaged position shown in FIGS. 49A, 49B, and 49C. When the sensor activating portion S1406 is in the second or engaged position, the sensor activating portion S1406 places both sensors S112 in a second state. In the second state, the sensors S112 control the stabilizing assemblies S114 to inhibit at least upward movement of the first and second front casters S108*a*, S108*b* relative to the frame S102. When one or more of the rear casters return to a normal operating position relative to the frame, the linkage S1401 is moved back to the disengaged position and both sensors or triggers S114 cause the stabilizing assemblies S114 to disengage and allow upward and downward movement of the front casters relative to the frame.

Figures 50A, 50B, 50C:
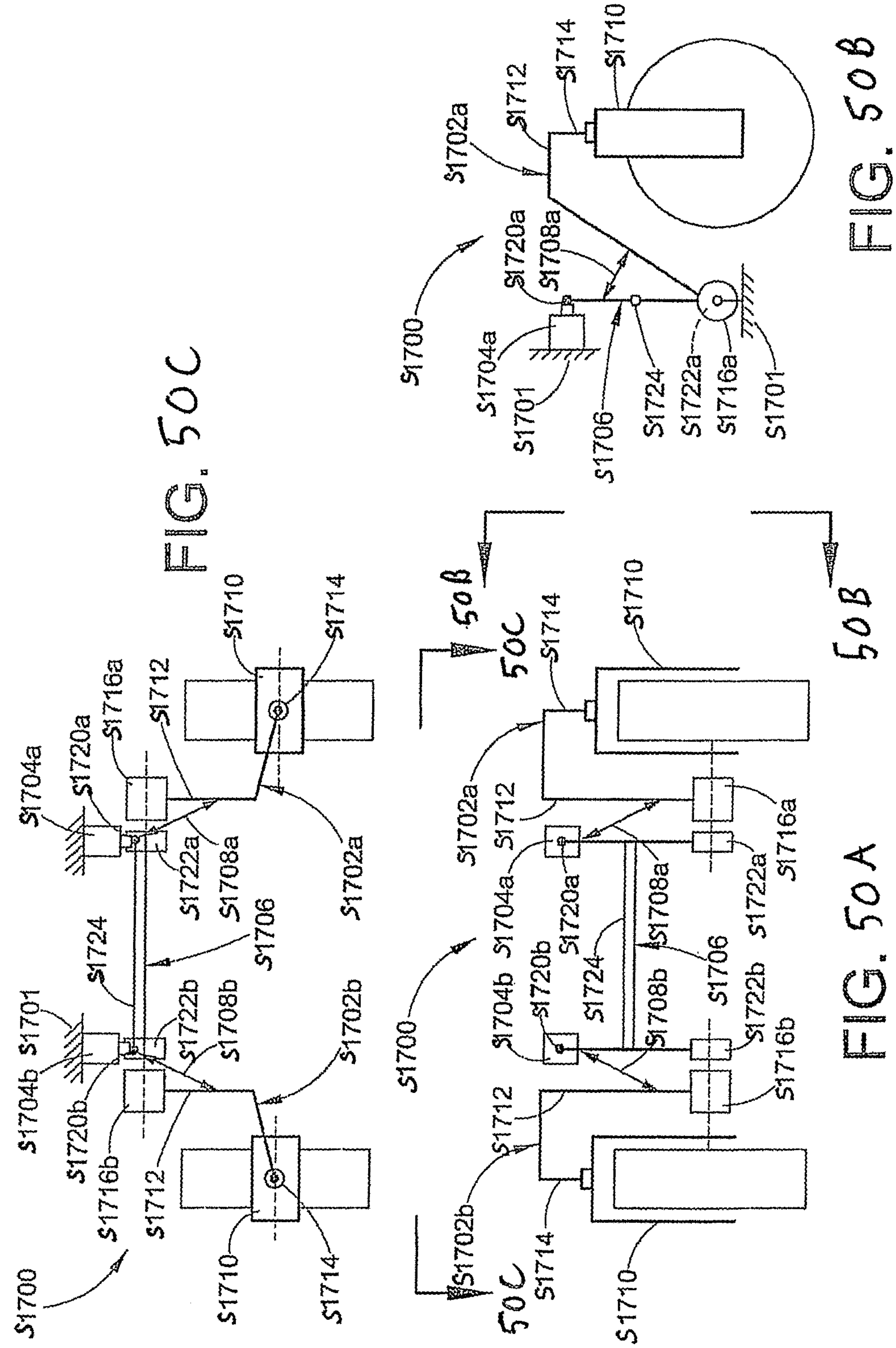
FIG. 50A illustrates a rear view of an embodiment of a rear caster suspension with a rear caster position sensing arrangement.
FIG. 50B is a view taken along lines 50B-50B in FIG. 50A, illustrating a side view of the rear caster suspension and rear caster position sensing arrangement.
FIG. 50C is a view taken along lines 50C-50C in FIG. 50A, illustrating a top view of the rear caster suspension and rear caster position sensing arrangement.

FIGS. 50, 52 and 52 illustrate an embodiment of a rear caster suspension S1700 with a rear caster position sensing arrangement S1706. The rear caster suspension S1700 includes a pair of rear caster assemblies S1702*a*, S1702*b*, a pair of sensors or triggers S1704*a*, S1704*b*, the rear caster position sensing arrangement S1706, and a pair of biasing members S1708*a*, S1708*b*, such as springs or other resilient members. The rear caster position sensing arrangement S1706 is in communication with both rear caster assemblies S1702*a*, S1702*b*. When one or both of the rear casters S1702*a*, S1702*b* are in a normal operating position, the rear caster position sensing arrangement communicates this condition to both sensors or triggers S1704*a*, S1704*b*. When both of the rear casters S1704*a*, S1704*b* fall below their normal operating positions, the rear castor position sensing arrangement communicates this condition to both sensors or triggers S104*a* and S104*b*. As a result, both sensors or triggers S1704*a*, S1704*b* are placed in an engaged state when both rear casters S1702*a*, S1702*b* fall below their normal operating positions and both sensors or triggers S1704*a*, S1704*b* are placed in a disengaged state when one or both of the rear casters are in a normal operating position. The conditions of the rear casters can be communicated by the rear caster position sensing arrangement in a wide variety of different ways. For example, the rear caster position sensing arrangement may be a mechanical linkage or assembly that communicates the condition of the rear casters to the sensors, as illustrated by FIGS. 50A-50C.

In the example illustrated by FIGS. 50, 51 and 52, compression springs are schematically represented. However, extension springs can be used, or the biasing members can take some other form. Each rear caster assembly S1702 includes a caster S1710 and a pivot arm S1712. The castor S1710 is rotatable about an axis S1714 with respect to the pivot arm S1712. The pivot arms S1712 are coupled to a wheelchair frame S1701 (See FIG. 50B) at pivots S1716*a*, S1716*b*. The sensors or triggers S1704*a*, S1704*b* are supported by the wheelchair frame S1701.

The illustrated rear caster position sensing arrangement S1706 includes a pair of spaced apart trigger actuating members S1720*a*, S1720*b* that are coupled to the wheelchair frame S1701 at pivots S1722*a*, S1722*b*. The trigger actuating members S1720*a*, S1720*b* are connected together by a bar S1724. The biasing members S1708*a*, S1708*b* are interposed between the rear caster assemblies S1702*a*, S1702*b* and the trigger actuating members S1720*a*, S1720*b*.

The rear caster suspension S1700 and rear caster position sensing arrangement S1706 can be included on any type of wheelchair to sense a tipping behavior and control one or more stabilizing members or a stabilizing assembly to inhibit further tipping. Referring to FIGS. 50A, 50B and 50C, when the rear caster assemblies S1702*a*, S1702*b* are in normal operating positions relative to the frame, S1701, the biasing members S1708*a*, S1708*b* are compressed between the trigger actuating members S1720*a*, S1720*b* and the rear caster pivot arms S1712*a*, S1712*b*. The biasing members S1708*a*, S1708*b* force the trigger actuating members S1708*a*, S1708*b* into engagement with the sensors or triggers S1704*a*, S1704*b* to place both of the sensors in a depressed or disengaged state.

Figure 51A:
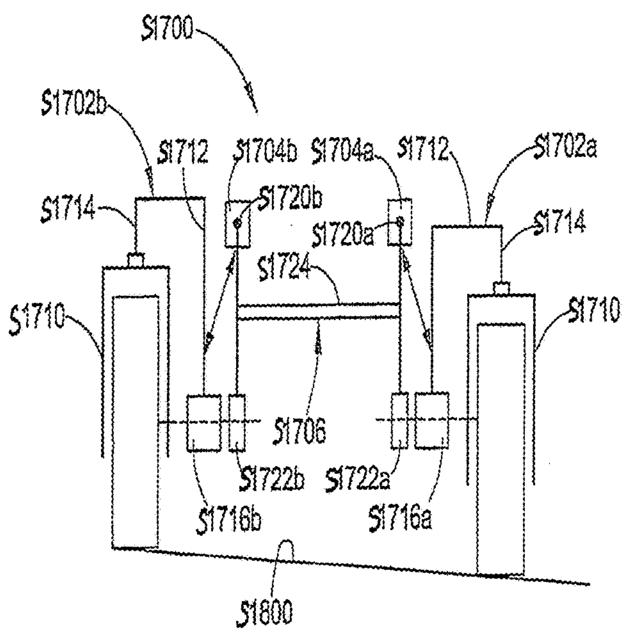
FIGS. 51A and 51B illustrate the rear caster suspension and rear caster position sensing arrangement of FIGS. 50A-50C, where one rear caster has moved downward.
Figure 51B:
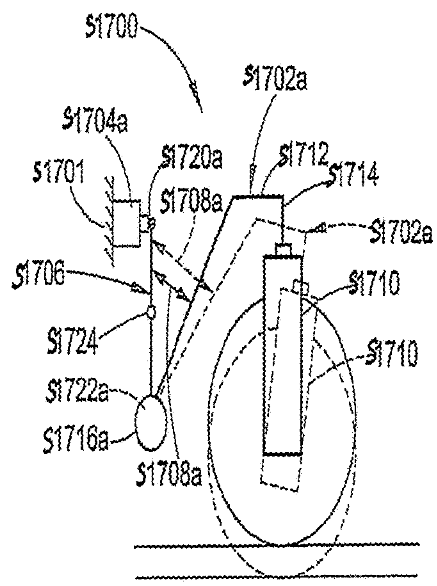

FIGS. 51A and 51B illustrate the rear caster suspension S1700 and rear caster position sensing arrangement S1706 where the rear caster assembly S1702*b* is in a normal operating position and the rear caster assembly S1702*a* has dropped below the range of normal operating positions. This condition may occur when the wheelchair travels laterally along an inclined surface S1800. This condition may also occur when one of the rear casters falls into a depression (see FIGS. 6A, 36B, and 36C). When the rear caster assembly S1702*b* is in a normal operating position and the rear caster assembly S1702*a* has dropped below the range of normal operating positions, the biasing member S1708*b* remains compressed between the trigger actuating member S1720*b* and the rear caster pivot arms S1712*b*, while the biasing member S1708*a* extends to a relaxed state (See FIG. 51B). The biasing member S1708*b* forces the trigger actuating member S1720*b* into engagement with the sensor or trigger S1704*b*. The bar S1724 that connects the trigger actuating member S1720*a* to the trigger actuating member S1720*b* holds the trigger actuating member S1720*a* in engagement with the sensor or trigger S1704*a*. The trigger actuating members S1720*a*, S1720*b* place both of the sensors in a depressed or disengaged state when the rear casters are in the positions shown in FIGS. 51A and 51B.

Figure 52B:
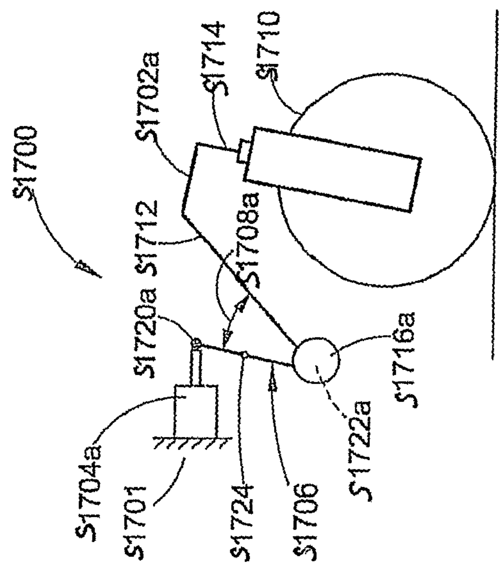
FIGS. 52A and 52B illustrate the rear caster suspension and rear caster position sensing arrangement of FIGS. 50A-50C, where both rear casters have moved downward.
Figure 52A:
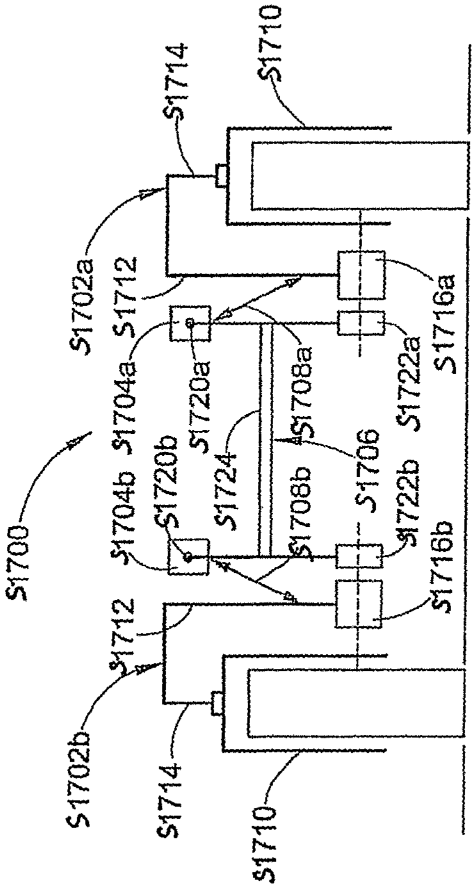

FIGS. 52A and 52B illustrate the rear caster suspension S1700 and rear caster position sensing arrangement S1706 where the rear caster assemblies S1702*a*, S1702 have both dropped below the range of normal operating positions. This condition may occur when the wheelchair exhibits a tipping behavior. When both of the rear caster assemblies S1702*a*, S1702*b* have dropped below the range of normal operating positions, the biasing members S1708*a*, S1708*b* both extend to a relaxed state and may pull the trigger actuating members S1708*a*, S1708*b* out of engagement with the sensors or triggers S1704*a*, S1704*b* to place the sensors or triggers in an engaged state. When one or more of the caster assemblies S1702*a*, S1702*b* return to a normal operating position with respect to the frame S1701, both sensors or triggers are returned to the disengaged state.

Figures 53A, 53B, 53C:
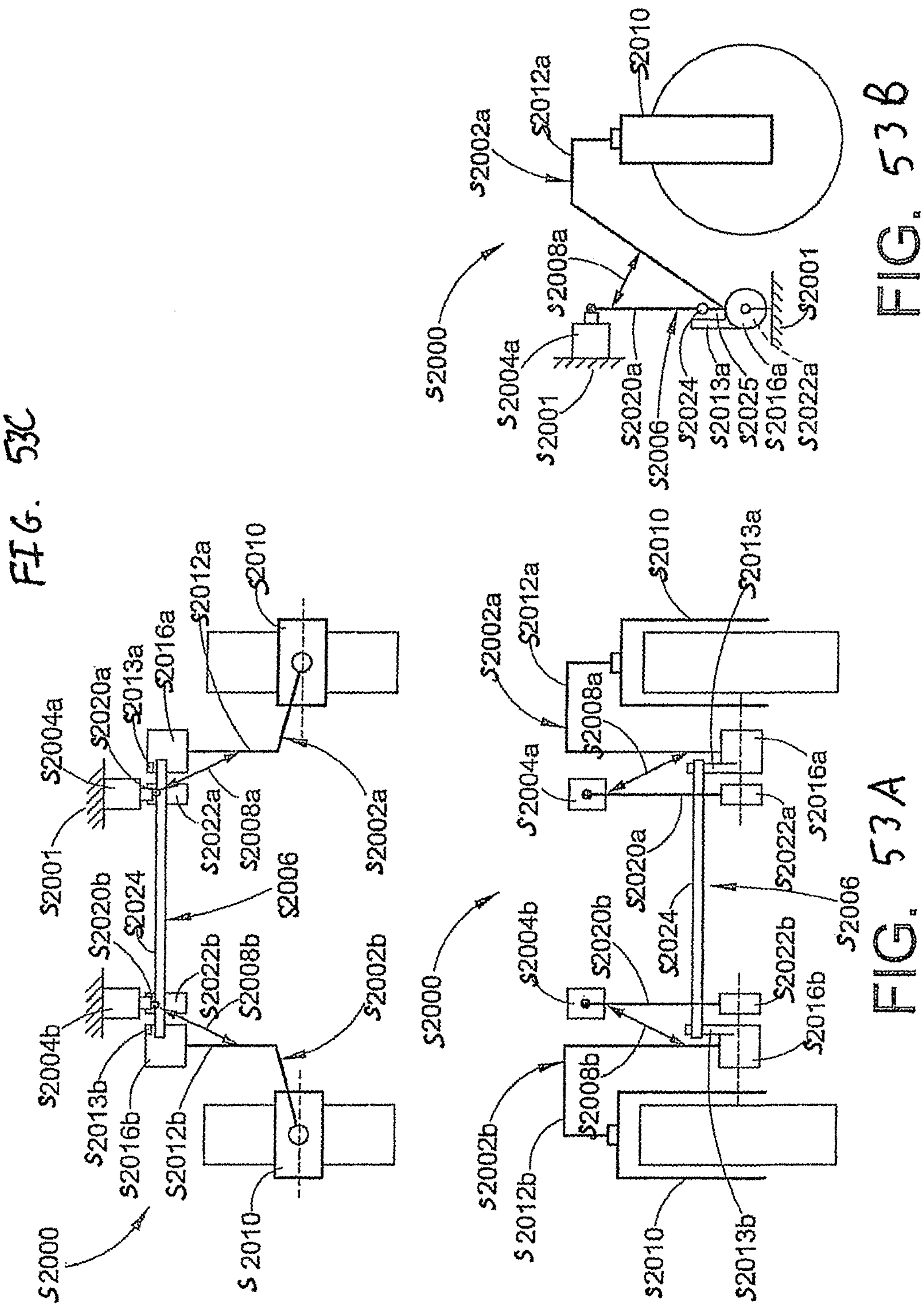
FIGS. 53A-53C illustrate an embodiment of a rear caster suspension and rear caster position sensing arrangement that is similar to the rear caster suspension and rear caster position sensing arrangement shown in FIGS. 50A-50C where movement of a first rear caster pivot arm depends on a position of a second rear caster pivot arm.
Figure 53:
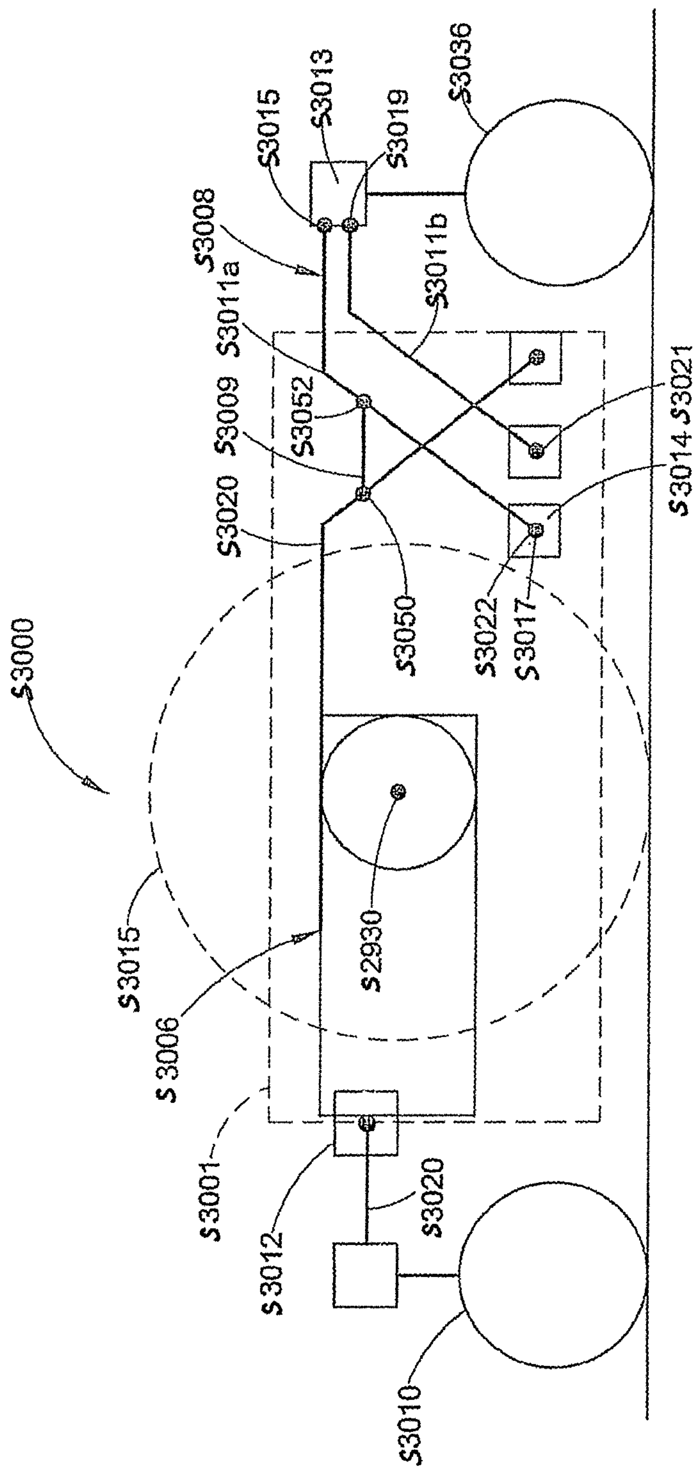

FIGS. 53, 54 and 55 illustrate an embodiment of a rear caster suspension S2000 and rear caster position sensing arrangement S2006 where movement of one caster assembly S2002*a* is limited, depending on the position of the second caster assembly S2002*b*. The rear caster suspension includes a pair of rear caster assemblies S2002*a*, S2002*b*, a pair of sensors or triggers S2004*a*, S2004*b*, the rear caster position sensing arrangement S2006, and a pair of biasing members S2008*a*, S2008*b*, such as springs or other resilient members. In the example illustrated by FIGS. 53, 54 and 55, compression springs are schematically represented. However, extension springs can be used, or the biasing members can take some other form. Each rear caster assembly S2002 includes a caster S2010, a pivot arm S2012*a*, S2012*b*, and a stop member S2013*a*, S2013*b* attached to the pivot arm. The pivot arms S2012 are coupled to a wheelchair frame S2001 at pivots S2016*a*, S2016*b* (See FIG. 53B). The stop members S2013*a*, S2013*b* rotate with the pivot arms S2012*a*, S2012*b* about the pivots S2016*a*, S2016*b*. The sensors or triggers S2004*a*, S2004*b* are supported by the wheelchair frame S2001.

The illustrated rear caster position sensing arrangement S2006 includes a pair of spaced apart trigger actuating members S2020*a*, S2020*b* that are coupled to the wheelchair frame S2001 at pivots S2022*a*, S2022*b*. The elongated members S2020*a*, S2020*b* are connected together by a bar S2024. The bar S2024 extends past the pivots S2022*a*, S2022*b* for selective engagement with the stop members S2013*a*, S2013*b*. The biasing members S2008*a*, S2008*b* are interposed between the rear caster assemblies S2002*a*, S2002*b* and the trigger actuating members S2020*a*, S2020*b*.

The rear caster suspension S2000 and rear caster position sensing arrangement S2006 operate to place the sensors in the disengaged and engaged states based on the positions of the rear caster assemblies S2002*a*, S2002*b*. The rear caster suspension S2000 and rear caster position sensing arrangement S2006 limit the relative positions of the rear caster assemblies S2002*a*, S2002*b*. In one embodiment, the suspension arrangement S2000 does not include a rear caster position sensing arrangement, and the sensors S2004*a*, S2004*b* are omitted. In this embodiment, the elongated members S2020*a*, S2020*b* may be modified accordingly or replaced with a different arrangement for coupling the biasing members S2008*a*, S2008*b* to the bar S2024.

Referring to FIGS. 53A, 53B and 53C, when one or both of the rear caster assemblies S2002*a*, S2002*b* are in normal operating positions relative to the frame S2001, the biasing members S2008*a*, S2008*b* hold the trigger actuating members S2020*a*, S2020*b* against the sensors or triggers S2004*a*, S2004*b* (or some other stop if the sensors are omitted). The trigger actuating members S2020*a*, S2020*b* position the bar S2024 with respect to the stop members S2013. As long as the force applied by one or more of the biasing members S2008*a*, S2008*b* is sufficient to maintain the trigger actuating members S2020*a*, S2020*b* against the sensors or triggers S2004*a*, S2004*b*, the position of the bar S2024 is fixed. When there is a gap S2025 (FIG. 53B) between the bar S2024 and the stop members S2013*a*, S2013*b*, the caster assemblies S2002 are free to move upwardly and downwardly with respect to one another.

Figure 54B:
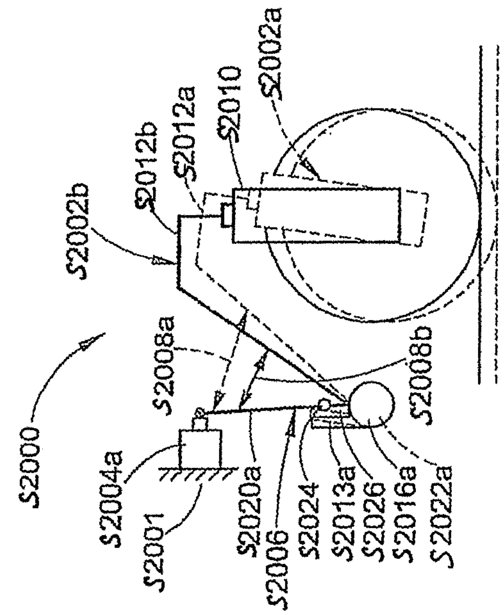
FIGS. 54A and 54B illustrate the rear caster suspension and rear caster position sensing arrangement of FIGS. 53A-53C, where one rear caster has moved downward.
Figure 54A:
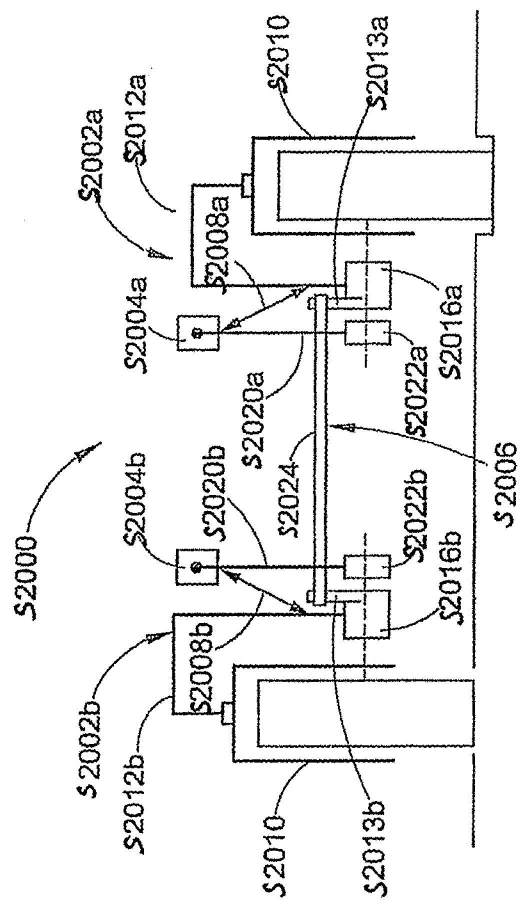
Figure 55B:
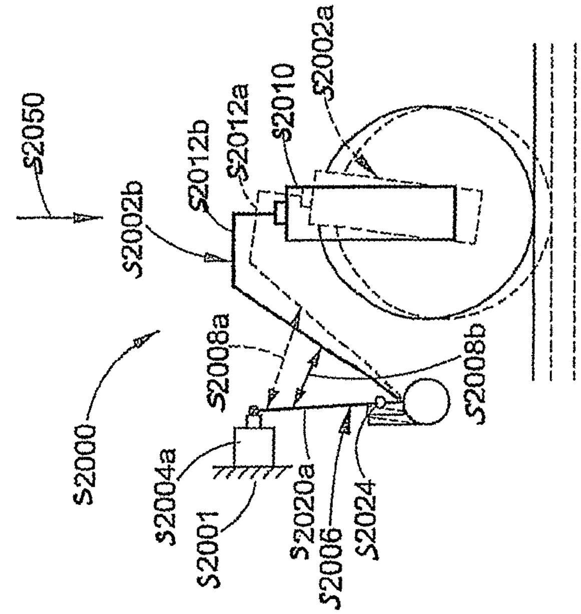
FIGS. 55A and 55B illustrate the rear caster suspension and rear caster position sensing arrangement of FIGS. 53A-53C, where further downward movement of one rear caster is inhibited by a second rear caster.
Figure 55A:
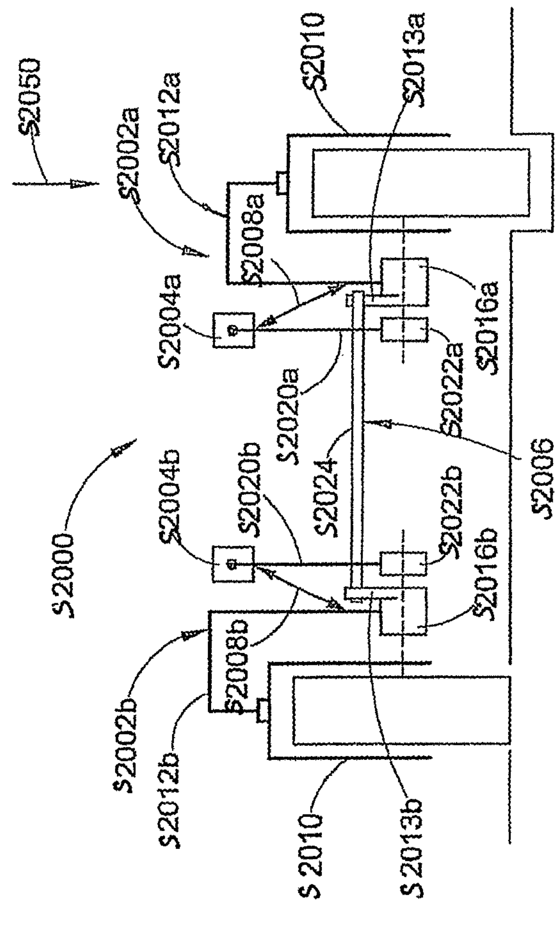

FIGS. 54A and 54B illustrate the situation where the rear caster assembly S2002*b* drops, such that the stop member S2013*b* rotates into contact with the bar S2024. When the stop member S2013*b* engages the bar S2024, further movement of the rear caster assembly S2002*b* is inhibited by the bar. Referring to FIGS. 55A and 55B, the bar S2024 prevents the caster assembly S2002*a* from falling into a deep depression. The rear caster assembly S2002*a* can be moved downward by applying a downward force indicated by arrow S2050 in FIGS. 55A and 55B. The force is applied by the stop member S2013*b*, to the bar S2024, and to the trigger actuating member S2020*b*. If the force applied to trigger actuating member S2020*a* is sufficient to compress the biasing member S2008*b*, the trigger actuating member S2020*b* moves toward the rear caster pivot arm S2012*b*. As a result, the elongated members S2020*a*, S2020*b* may move away from the triggers or sensors S2004*a*, S2004*b*. When both rear casters S1010 fall away from the frame S2001, the sensors S2004*a*, S2004*b* are placed in the engaged state in the same manner as described with respect to the rear caster suspension and trigger arrangement S1700. When one or both of the rear casters are in a normal operating position, the sensors S2004*a*, S2004*b* are placed in a disengaged state in the same manner as described with respect to the rear caster suspension and trigger arrangement S1700.

FIGS. 56 and 57 illustrate another embodiment of a rear caster suspension S2300 with a rear caster position sensing arrangement S2306. The rear caster suspension includes a rear caster assembly S2302, a pair of sensors or triggers S2304*a*, S2304*b*, the rear caster position sensing arrangement S2306, and a biasing member S2308, such as a spring. In the example illustrated by FIGS. 56 and 57, a compression spring is schematically represented. However, an extension spring can be used, or the biasing member can take some other form.

The rear caster assembly S2302 includes a pair of casters S2310*a*, S2310*b* and a pivot arm S2312. The pivot arm S2312 includes a first member S2313 coupled to a wheelchair frame S2301 at a pivot S2316 (See FIG. 56B) and a second member S2315 connected to the first member S2313, such that the pivot arm S2312 has a generally "T-shaped" configuration. The castors S2310*a*, S2310*b* are connected to ends of the second member S2315 and are rotatable with respect to the pivot arm S2312.

The sensors or triggers S2304*a*, S2304*b* are supported by the wheelchair frame S2301. The illustrated rear caster position sensing arrangement S2306 includes a pair of spaced apart elongated members S2319*a*, S2319*b* (See FIG. 56A) that support a trigger actuating member S2320 and are coupled to the wheelchair frame S2301 at pivots S2322*a*, S2322*b*. The rear caster position sensing arrangement S2306 could also be configured to include only one member (or any other number of members) member that supports the rear caster position sensing arrangement S2306. The biasing member S2308 is interposed between the rear caster assembly S2302 and the trigger actuating member S2320.

Figures 56A, 56B, 56C:
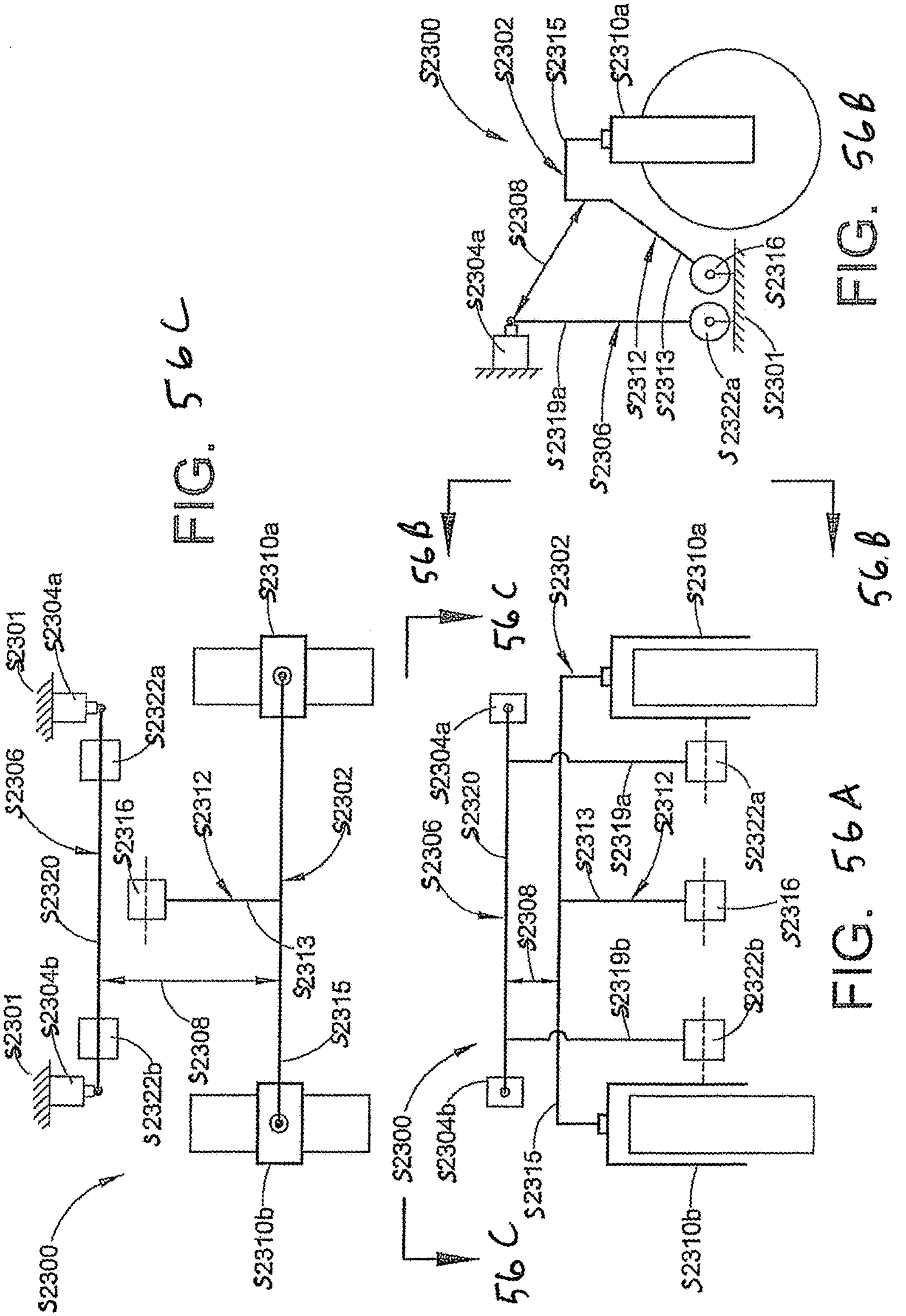
FIG. 56A illustrates a rear of an embodiment of a rear caster suspension and rear caster position sensing arrangement.
FIG. 56B is a view taken along lines 56B-56B in FIG. 56A, illustrating a side of the rear caster suspension and rear caster position sensing arrangement.
FIG. 56C is a view taken along lines 56C-56C in FIG. 56A, illustrating a top of the rear caster suspension and rear caster position sensing arrangement.

The rear caster suspension S2300 with the rear caster position sensing arrangement S2306 can be included on any type of wheelchair to sense a tipping behavior and control one or more stabilizing members or stabilizing assemblies. Referring to FIGS. 56A, 56B and 56C, when the rear caster assembly S2302 is in a normal operating position relative to the frame S2301, the biasing member S2308 is compressed between the trigger actuating member S2320 and the rear caster pivot arm S2312. The biasing members S2308 force the trigger actuating member S2308 into engagement with both of the sensors or triggers S2304*a*, S2304*b* to place both of the sensors in a depressed or disengaged state.

FIGS. 57A, 57B and 57C illustrate the rear caster suspension S2300 and the rear caster position sensing arrangement S2306 where one of the rear casters S2310*a* of the rear caster assembly S2302*a* encounters a depression in the support surface. Since both rear casters S2310*a*, S2310*b* are coupled to a common pivot arm, the rear caster S2310*a* does not drop into the depression. The biasing member S2308 remains compressed between the trigger actuating member S2320 and the rear caster pivot arms S2312*a*. The biasing member S2308 forces the trigger actuating member S1708 into engagement with the sensors or triggers S2304*a*, S2304*b*. When the rear caster assembly S2302 drops below the range of normal operating positions, the biasing member S2308 extends to a relaxed state and may pull the trigger actuating member S2308 out of engagement with the sensors or triggers S1704*a*, S1704*b* to place the sensors or triggers in an engaged state.

Figure 58A:
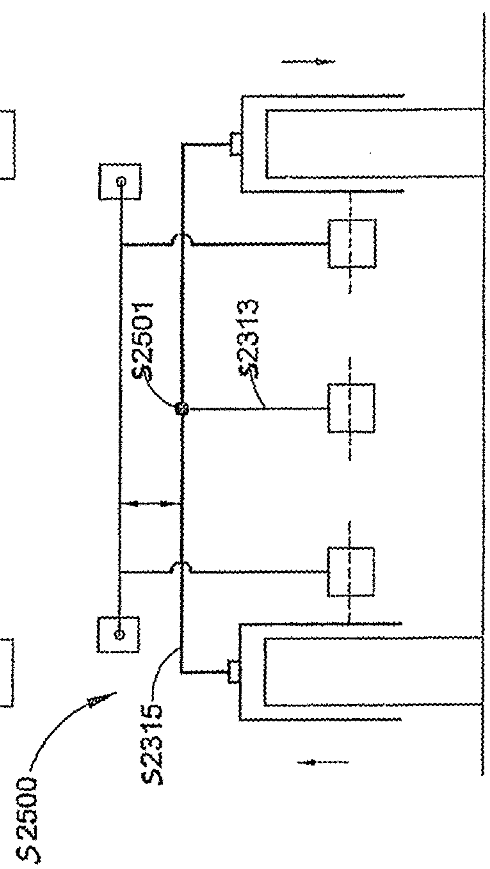
FIGS. 58A-58C illustrate an embodiment of a rear caster suspension and rear caster position sensing arrangement that is similar to the rear caster suspension and rear caster position sensing arrangement of FIGS. 56A-56C, where the rear casters are connected to a pivotable arm.
Figure 58B:
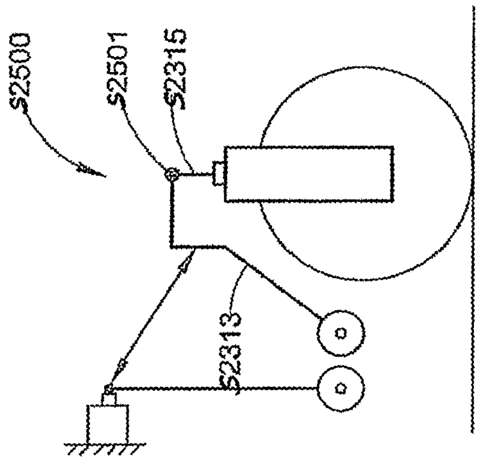
Figure 58C:
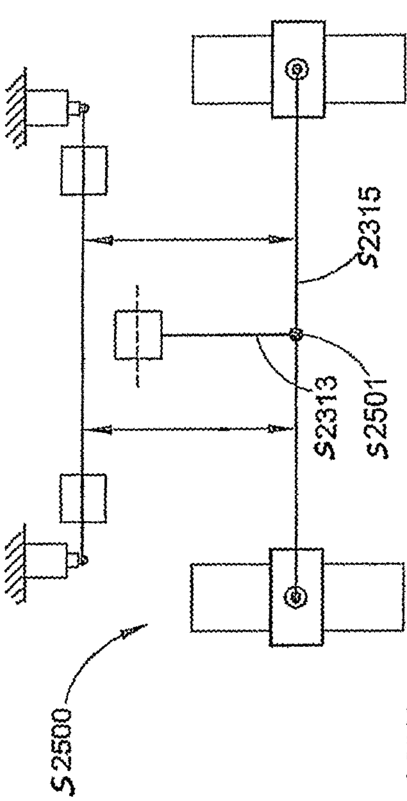

FIGS. 58A, 58B and 58C illustrate a rear caster suspension S2500 that is a variation of the rear caster suspension S2300 where the second member S2315 of the pivot arm is pivotally connected to the first member S2313 by a pivotal connection S2500. The pivotal connection allows the ends of the second member S2315 and the attached rear casters S2310*a*, S2310*b* to move upward and downward with respect to one another. When one rear caster S2310*a* moves down, the other rear caster S2310*b* moves up.

Stability systems can be used on a wide variety of vehicles. When used on wheelchairs, the wheelchairs may include front caster pivot arms of any configuration. The front caster pivot arms may be coupled to drive assemblies or the front caster pivot arms may be independent of the drive assemblies (See FIGS. 34A, 34B, 34C). The front caster pivot arms can be coupled to the drive assemblies in a wide variety of different ways. For example, the front caster pivot arms can be coupled to the drive assembly in any manner that transfers motion of the drive assembly to the front caster pivot arm, including but not limited to, a fixed length link, a variable length link, a flexible link, a chain, a cord, a belt, a wire, a gear train, or any other known structure for transferring motion from one structure to another structure. FIGS. 59-64 illustrate one side of wheelchairs with stability systems and pivot arms that are coupled to a drive assembly. The other side is a mirror image in the exemplary embodiment and is therefore not described in detail.

Figure 59:
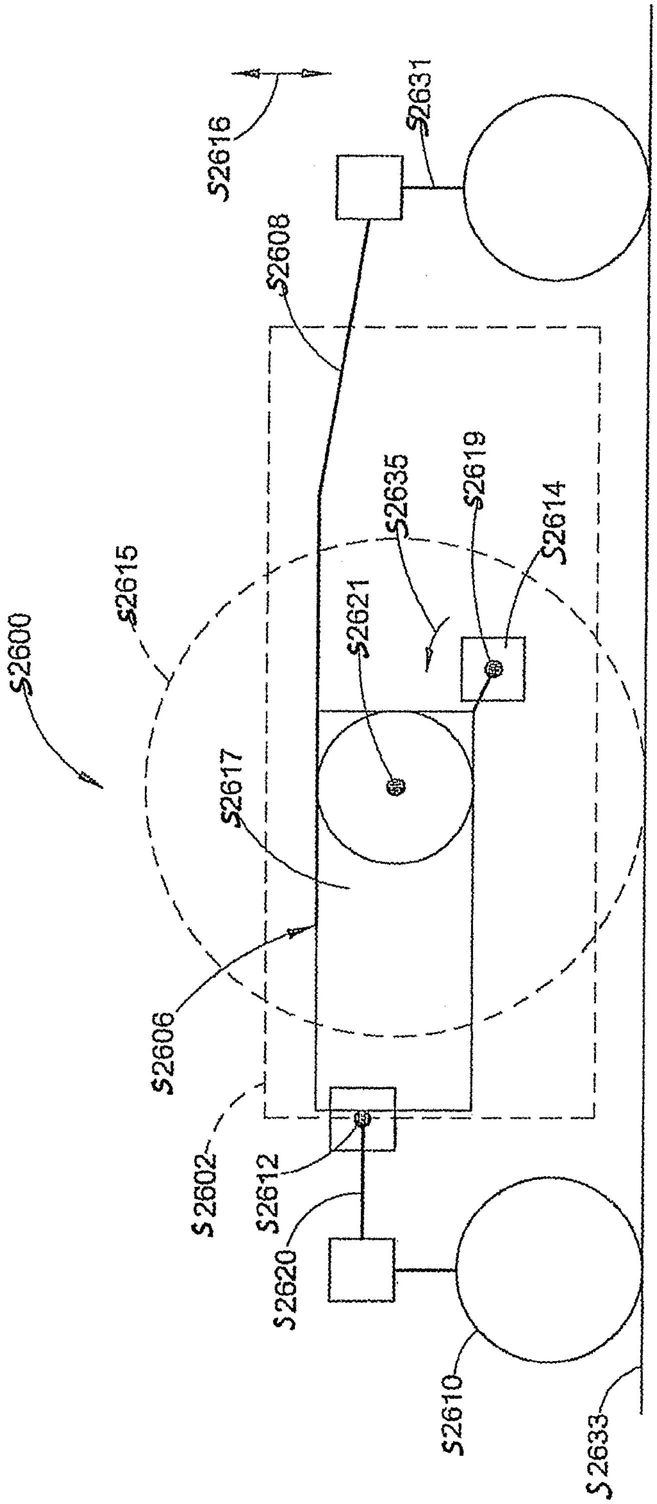
FIG. 59 illustrates an embodiment of a mid-wheel drive wheelchair that includes a tip or stability control system and front caster pivot arm that are coupled to drive assemblies.

FIG. 59 schematically illustrates a mid-wheel drive wheelchair S2600 that includes a tip or stability control system that comprises at least one tip sensor or trigger S2612 and at least one stabilizing member or assembly S2614. The wheelchair S2600 includes front caster pivot arms S2608 that are coupled to drive assemblies S2606. Each drive assembly S2606 includes a drive wheel S2615 and a motor or drive S2617 that propels the drive wheel S2615. The drive S2617 may comprise a motor/gear box combination, a brushless, gearless motor, or any other known arrangement for driving the drive wheel S2615. The drive assembly S2606 is connected to the frame S2602 at a pivotal connection S2619. In the example illustrated by FIG. 59, the pivotal connection S2619 is disposed below a drive axis S2621 of the drive wheel S2615 when the wheelchair S2600 is resting on flat, level ground.

A front caster pivot arm S2608 is connected to each drive assembly S2606. A front caster S2631 is coupled to each front caster pivot arm S2608. The front caster S2631 is movable upwardly and downwardly as indicated by double arrow S2616 by pivotal movement of the drive S2617 about the pivotal connection S2619. Torque applied by the drive assembly S2606 urges the front caster pivot arm S2608 and the front caster S2631 upward with respect to a support surface S2633 as indicated by arrow S2635. In one embodiment, the torque applied by the drive assembly S2606 lifts the front caster S2631 off the support surface S2633. In another embodiment, the torque applied by the drive assembly S2606 urges the front caster S2631 upward, but does not lift the front caster up off of the support surface.

Rear casters S2610 are coupled to the frame S2602 such that the rear casters are moveable upwardly and downwardly with respect to the frame. A stabilizing assembly S2614 is coupled to each front caster pivot arm S2618 and to the frame S2602. However, the stabilizing assembly can take any form that allows the stabilizing assembly to inhibit tipping behavior. One or more triggers or sensors S2612 may be coupled to rear caster pivot arms S2620 to detect a tipping behavior of the wheelchair. However, a trigger or sensor can be arranged in any manner to detect a tipping behavior of the wheelchair and need not be coupled to a rear caster. The trigger or sensor S2612 senses when conditions exist that may cause the vehicle to exhibit a tipping behavior and causes the locking assembly S2614 to engage when a tipping behavior is sensed to prevent any further tipping behavior.

Figure 60:
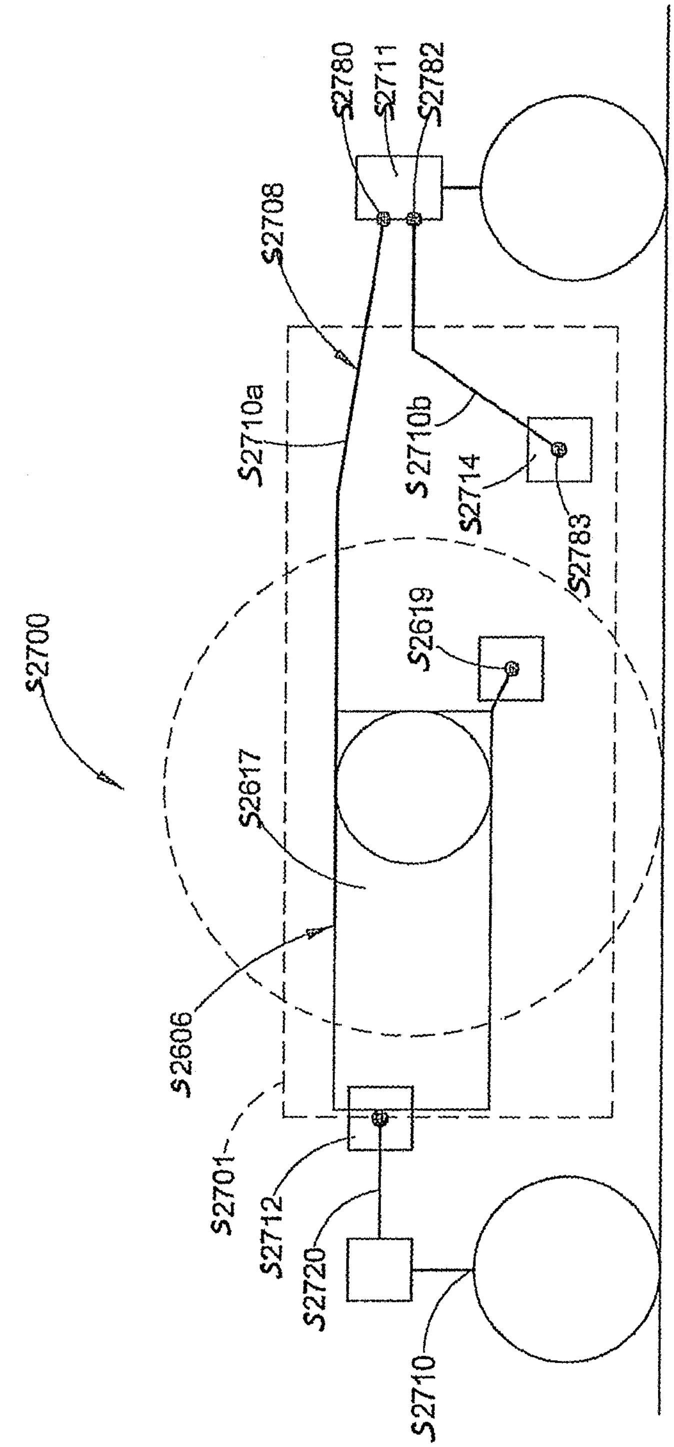
FIG. 60 illustrates an embodiment of a mid-wheel drive wheelchair that includes a tip or stability control system and front caster pivot arms that are coupled to drive assemblies.

FIG. 60 schematically illustrates a mid-wheel drive wheelchair S2700 that includes a tip or stability control system that comprises at least one tip sensor or trigger S2712 and at least one stabilizing member or assembly. The wheelchair S2700 is similar to the wheelchair S2600 of FIG. 59, but each front caster pivot arm S2708 includes upper and lower links S2710*a*, S2710*b* that define a four bar linkage. The upper link S2710*a* is pivotally coupled to a caster support member S2711 at a pivotal connection S2780 and is fixedly connected to the drive S2617. The lower link S2710*b* is pivotally coupled to the caster support member S2711 at a pivotal connection S2782 and is pivotally connected to the frame S2701 at a pivotal connection S2783.

The drive S2617, the links S2710*a*, S2710*b*, the frame S2701, and the caster support member S2711 form a four-bar linkage. The pivotal connections S2619, S2780, S2782, S2783 can be positioned at a wide variety of different locations on the frame S2701 and the caster support member S2711 and the length of the links S2706 can be selected to define the motion of the front caster as the front caster pivot arm S2708 is pivoted.

The rear casters S2710 are coupled to the frame S2701 such that the rear casters are moveable upwardly and downwardly with respect to the frame. A stabilizing assembly S2714 is coupled to each front caster pivot arm S2718 and to the frame S2702. However, the stabilizing assembly can take any form and be coupled in any manner that allows the stabilizing assembly to inhibit tipping behavior. For example, a stabilizing assembly S2714 can be coupled to the drive S2617. One or more triggers or sensors S2712 are coupled to the rear caster pivot arms S2720 to detect a tipping behavior of the wheelchair. However, a trigger or sensor can be arranged in any manner to detect a tipping behavior of the wheelchair and need not be coupled to a rear caster. The trigger or sensor S2712 senses when conditions exist that may cause the vehicle to exhibit a tipping behavior and causes the locking assembly S2714 to engage when a tipping behavior is sensed to prevent any further tipping behavior.

Figure 61:
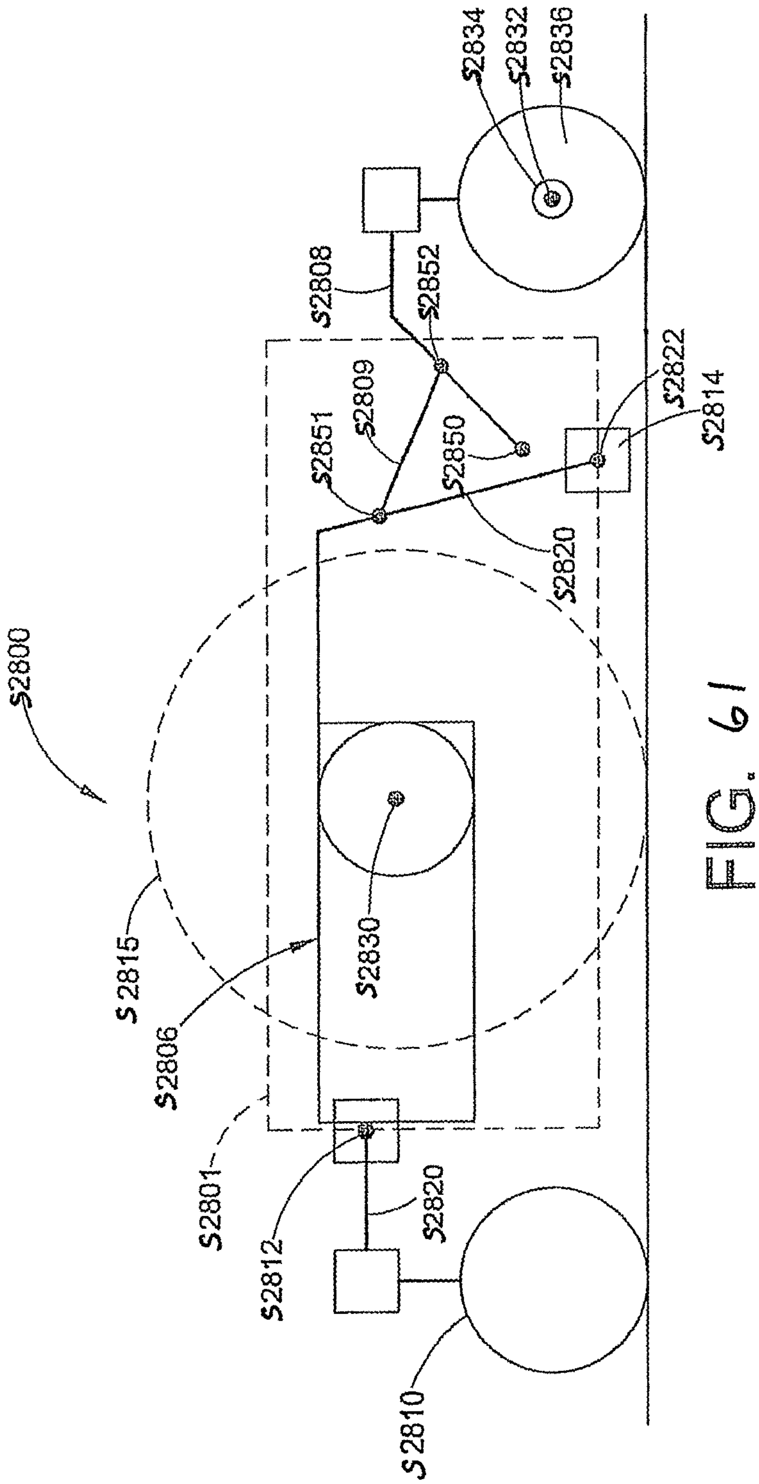
FIG. 61 illustrates an embodiment of a mid-wheel drive wheelchair that includes a tip or stability control system and front caster pivot arms that are coupled to drive assemblies.

FIG. 61 schematically illustrates a mid-wheel drive wheelchair S2800 that includes a tip or stability control system S2802 that comprises at least one tip sensor or trigger S2812 and at least one stabilizing member or assembly. Front caster pivot arms S2808 are coupled to drive assemblies S2806 by a link S2809. The wheelchair S2800 is similar to the wheelchair S2600 of FIG. 59, but the front caster pivot arm S2808 is pivotally coupled to the frame S2801 and is coupled to the drive assembly S2806 by the link S2809. Each drive assembly S2806 is mounted to the frame S2801 by a pivot arm S2820 at a drive assembly pivot axis S2822. The pivot arm S2820 extends forward and downward from the motor drive to the drive assembly pivot axis S2822. The pivot axis S2822 of the drive assembly pivot arm S2820 is below the drive wheel axis of rotation S2830 and the axis S2832 of an axle S2834 that the front caster wheel S2836 rotates around.

In one embodiment, a biasing member, such as a spring may optionally be coupled between the frame S2801 and the front caster pivot arm S2808 and/or the frame and the drive assembly S2806 to bias the front caster into engagement with the support surface S2819 or a biasing member may be included in the stabilizing assembly S2814. The front caster pivot arm S2808 is pivotally mounted to the frame at a pivot axis S2850. The pivot axis S2850 of the front caster pivot arm S2808 is forward of the drive assembly pivot axis S2822 and below the axis of rotation S2830 of the drive wheel.

The link S2809 is connected to the drive assembly pivot arm S2820 at a pivotal connection S2851 and is connected to the front caster pivot arm S2808 at a pivotal connection S2852. The link S2809 can take a wide variety of different forms. For example, the link may be rigid, flexible, or extendible in length. The link need not comprise a linear member for example, the link may be a gear train. The link S2809 may be any mechanical arrangement that transfers at least some portion of motion in at least one direction of the drive assembly S2806 to the front caster pivot arm S2808.

When the drive assembly S2806 is accelerated such that the moment arm generated by drive wheel S2815 is greater then all other moment arms around pivot axis S2822, the drive assembly S2806 pivots and pulls the link S2809. Pulling on the link S2809 causes the front caster pivot arm S2808 to move upward or urges the pivot arm upward. When the link S2809 is a variable length link, such as a spring, a shock absorber, or a shock absorber with a spring return, the drive assembly S2806 pulls the link S2809 to extend the link to its maximum length or a length where the front caster pivot arm S2808 begins to pivot. Once extended, the link S2809 pulls the front caster pivot arm S2808 upward or urges the front caster pivot arm upward.

Rear casters S2810 are coupled to the frame S2801 such that the rear casters are moveable upwardly and downwardly with respect to the frame. A stabilizing assembly S2814 is coupled to each front caster pivot arm S2808 and to the frame S2801, to the drive assembly S2806 and the frame S2801 and/or to the link S2809 and the frame S2801. However, the stabilizing assembly can take any form and be positioned in any manner that allows the stabilizing assembly to inhibit a tipping behavior. One or more triggers or sensors S2812 are coupled to the rear caster pivot arms S2820 to detect a tipping behavior of the wheelchair. However, a trigger or sensor can take any form and be arranged in any manner to detect a tipping behavior of the wheelchair and need not be coupled to a rear caster. The trigger or sensor S2812 senses when conditions exist that may cause the vehicle to exhibit a tipping behavior and causes the locking assembly S2814 to engage when a tipping behavior is sensed to prevent any further tipping behavior.

Figure 62:
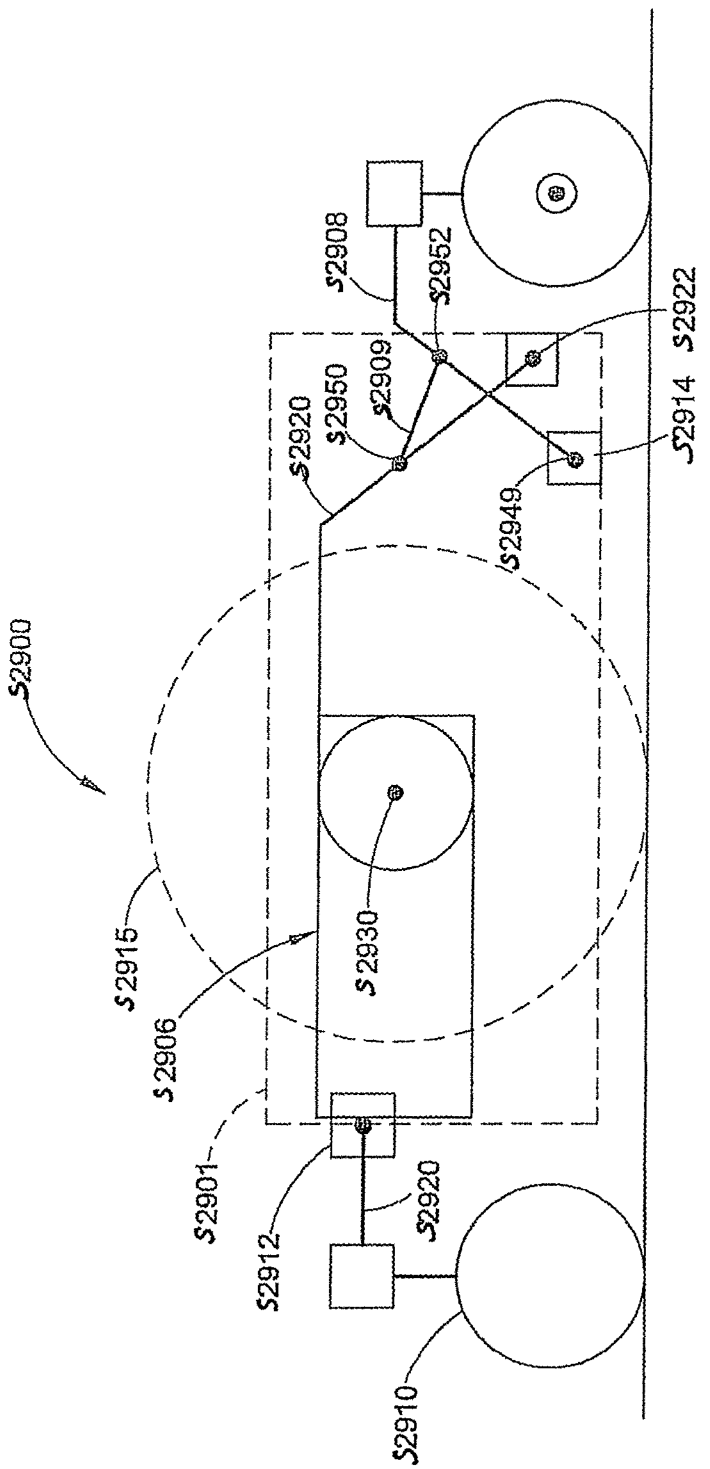
FIG. 62 illustrates an embodiment of a mid-wheel drive wheelchair that includes a tip or stability control system and front caster pivot arms that are coupled to drive assemblies.

FIG. 62 schematically illustrates a mid-wheel drive wheelchair S2900 that includes a tip or stability control system that comprises at least one tip sensor or trigger S2912 and at least one stabilizing member or assembly S2914. Front caster pivot arms S2908 are coupled to drive assemblies S2906 by a link S2909. The wheelchair S2900 is similar to the wheelchair S2800 of FIG. 61, but the front caster pivot arm S2908 and the drive assembly pivot arm S2920 are disposed in a crossed configuration.

Each drive assembly S2906 is mounted to a frame S2901 by a pivot arm S2920 at a drive assembly pivot axis S2922. The pivot arm S2920 extends forward and downward from the motor drive to the drive assembly pivot axis S2922. The pivot axis S2922 of the drive assembly pivot arm S2920 is below the drive wheel axis of rotation S2930. The front caster pivot arm S2908 is pivotally mounted to the frame at a pivot axis S2949. The pivot axis S2949 of the front caster pivot arm S2908 is rearward of the drive assembly pivot axis S2932 and below the axis of rotation S2930 of the drive wheel. As such, the front caster pivot arm S2908 and the drive assembly pivot arm S2920 are in a crossed configuration. The front caster pivot arm S2908 and the drive assembly pivot arm S2920 may be bent or may be offset to accommodate the crossed configuration.

The link S2909 is connected to the drive assembly pivot arm S2920 at a pivotal connection S2950 and is connected to the front caster pivot arm S2908 at a pivotal connection S2952. The link S2909 can take a wide variety of different forms. Any link S2909 that transfers at least some portion of motion in at least one direction of the drive assembly S2906 to the front caster pivot arm S2908 can be used.

When the drive assembly S2906 is accelerated such that the moment arm generated by a drive wheel S2915 is greater then all other moment arms around pivot axis S2922, the drive assembly S2906 pivots and pulls the link S2909. Pulling on the link S2909 causes the front caster pivot arm S2908 to move upward or urges the pivot arm upward.

Rear casters S2910 are coupled to the frame S2901 such that the rear casters are moveable upwardly and downwardly with respect to the frame. A stabilizing assembly S2914 is coupled to each front caster pivot arm S2908 and to the frame S2901, to the drive assembly S2906 and the frame S2901 and/or to the link S2909 and the frame S2901. One or more triggers or sensors S2912 are coupled to rear caster pivot arms S2920 to detect a tipping behavior of the wheelchair. However, a trigger or sensor can take any form and be arranged in any manner to detect a tipping behavior of the wheelchair and need not be coupled to a rear caster. The trigger or sensor S2912 senses when conditions exist that may cause the vehicle to exhibit a tipping behavior and causes the locking assembly S2914 to engage when a tipping behavior is sensed to prevent any further tipping behavior.

FIG. 63 schematically illustrates a mid-wheel drive wheelchair S3000 that includes a tip or stability control system that comprises at least one tip sensor or trigger S3012 and at least one stabilizing member or assembly S2914. Front caster pivot arms S3008 are coupled to drive assemblies S3006 by a link S3009. The wheelchair S3000 is similar to the wheelchair S2900 of FIG. 62, but the front caster pivot arm S3008 comprises an upper link S3011*a* and a lower link S3011*b*.

The upper link S3011*a* is pivotally coupled to a caster support member S3013 at a pivotal connection S3015 and is pivotally connected to the frame S3001 at a pivotal connection S3017. The lower link S3011*b* is pivotally coupled to the caster support member S3013 at a pivotal connection S3019 and is pivotally connected to the frame S3001 at a pivotal connection S3021.

The caster support member S3013 may be any structure that couples the links S3011*a*, S3011*b* to be coupled to a front caster S3036. The links S3011*a*, S3011*b*, the frame S3001, and the caster support member S3013 form a four-bar linkage. The pivotal connections S3015, S3017, S3019, S3021 can be positioned at a wide variety of different locations on the frame S3001 and the caster support member S3013 and the length of the links S3011*a*, S3011*b* can be selected to define the motion of the caster S3036 as the front caster pivot arm S3008 is pivoted. In the example illustrated by FIG. 63, the front caster pivot arm S3008 retracts the front caster S3008 or pivots the wheel of the front caster toward the frame as the pivot arm S3008 is lifted and extends the front caster or pivots the wheel of the front caster away from the frame as the front caster pivot arm is lowered.

Each drive assembly S3006 is mounted to the frame S3001 by a pivot arm S3020 at a drive assembly pivot axis S3022. The pivot arm S3020 extends forward and downward from the motor drive to the drive assembly pivot axis S3022. The pivot axis S3022 of the drive assembly pivot arm S3020 is below the drive wheel axis of rotation S3030 and is in front of the front caster pivot arms S3008. As such, the front caster pivot arm S3008 and the drive assembly pivot arm S3020 are in a crossed configuration. The front caster pivot arm S3008 and the drive assembly pivot arm S3020 may be bent or may be offset to accommodate the crossed configuration.

The link S3009 is connected to the drive assembly pivot arm S3020 at a pivotal connection S3050 and is connected to the front caster pivot arm S3008 at a pivotal connection S3052. The link S3009 can be connected to the upper link S3011*a*, or the lower link S3011*b*. Any link S3009 that transfers at least some portion of motion in at least one direction of the drive assembly S3006 to the front caster pivot arm S3008 can be used.

When the drive assembly S3006 is accelerated the drive assembly S3006 may pivot and pull the link 3009. Pulling on the link S3009 causes the front caster pivot arm S3008 to move upward or urges the pivot arm upward.

Rear casters S3010 are coupled to the frame S3001 such that the rear casters are moveable upwardly and downwardly with respect to the frame. A stabilizing assembly S3014 is coupled to each front caster pivot arm S3008 and to the frame S3001, to the drive assembly S3006 and the frame S3001 and/or to the link S3009 and the frame S3001. One or more triggers or sensors S3012 are coupled to rear caster pivot arms S3020 to detect a tipping behavior of the wheelchair. However, a trigger or sensor can take any form and can be arranged in any manner to detect a tipping behavior of the wheelchair and need not be coupled to a rear caster. The trigger or sensor S3012 senses when conditions exist that may cause the vehicle to exhibit a tipping behavior and causes the locking assembly S3014 to engage when a tipping behavior is sensed to inhibit further tipping behavior.

Figure 64:
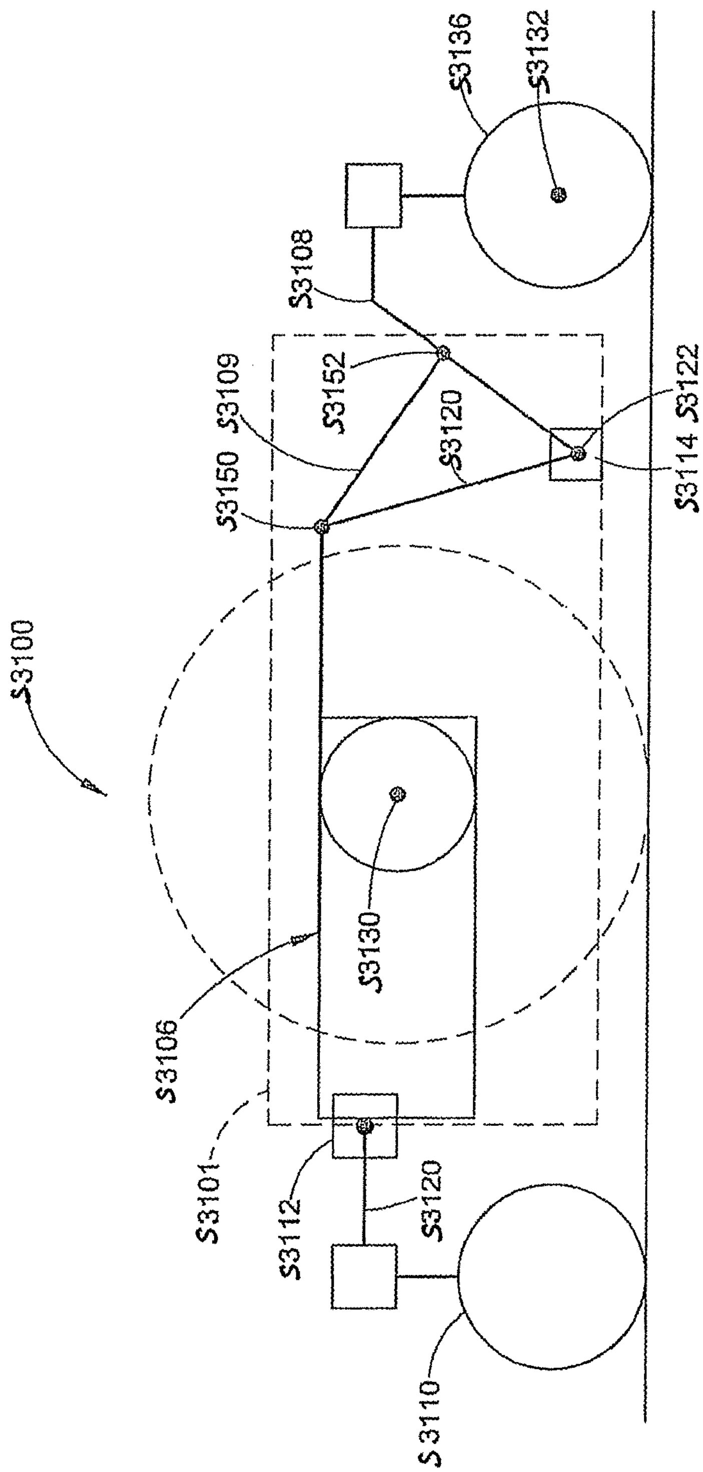
FIG. 64 illustrates an embodiment of a mid-wheel drive wheelchair that includes a tip or stability control system and front caster pivot arms that are coupled to drive assemblies.

FIG. 64 schematically illustrates a mid-wheel drive wheelchair S3100 that includes a tip or stability control system that comprises at least one tip sensor or trigger S3112 and at least one stabilizing or assembly S3114. Front caster pivot arms S3108 are coupled to drive assemblies S3106 by a link S3109. The wheelchair S3100 is similar to the wheelchair S2800 of FIG. 61, but the front caster pivot arm S3108 and the drive assembly S3106 are pivotally coupled to the frame S3101 at a common pivot axis S3122.

Each drive assembly S3106 is mounted to the frame S3101 by a pivot arm S3120. The pivot arm S3120 extends forward and downward from the motor drive to the common pivot axis S3122. The pivot axis S3122 is below the drive wheel axis of rotation S3130 and the axis S3132 that the front caster wheel S3136 rotates around.

The link S3109 is connected to the drive assembly pivot arm S3120 at a pivotal connection S3150 and is connected to the front caster pivot arm S3108 at a pivotal connection S3152. The link S3109 can take a wide variety of different forms. For example, the link may be rigid, flexible, or extendible in length. Any link S3109 that transfers at least some portion of motion in at least one direction of the drive assembly S3106 to the front caster pivot arm S3108 can be used.

When the drive assembly S3106 is accelerated, the drive assembly S3106 may pivot and pull on the link S3109. Pulling on the link S3109 causes the front caster pivot arm S3108 to move upward or urges the pivot arm upward.

Rear casters S3110 are coupled to the frame S3101 such that the rear casters are moveable upwardly and downwardly with respect to the frame. A stabilizing assembly S3114 is coupled to each front caster pivot arm S3108 and to the frame S3101, to the drive assembly S3106 and the frame S3101 and/or to the link S3109 and the frame S3101. However, the stabilizing assembly can take any form and be positioned in any manner that allows the stabilizing assembly to inhibit tipping behavior. One or more triggers or sensors S3112 are coupled to the rear caster pivot arms S3110 to detect a tipping behavior of the wheelchair. However, a trigger or sensor can take any form and be arranged in any manner to detect a tipping behavior of the wheelchair and need not be coupled to a rear caster. The trigger or sensor S3112 senses when conditions exist that may cause the vehicle to exhibit a tipping behavior and causes the locking assembly S3114 to engage when a tipping behavior is sensed to prevent any further tipping behavior.

FIGS. 65-70 illustrate an example of a mid-wheel drive wheelchair S3200 that includes a control system that comprises sensors or triggers S3212*a*, S3212*b* and stabilizing members S3214*a*, S3214*b*. The wheelchair S3200 includes a frame S3202, a seat (not shown) is supported by the frame S3202, first and second drive assemblies S3206*a*, S3206*b*, first and second front caster pivot arms S3218*a*, S3218*b*, first and second front casters S3208*a*, S3208*b*, first and second rear caster pivot arms S3220*a*, S3220*b*, and first and second rear casters S3210*a*, S3210*b*. A rear caster position sensing arrangement S4400 (see FIGS. 77-84) communicates a condition of the rear caster pivot arms S3220*a*, S3220*b* to both of the sensors or triggers S3212*a*, S3212*b*.

Figure 65:
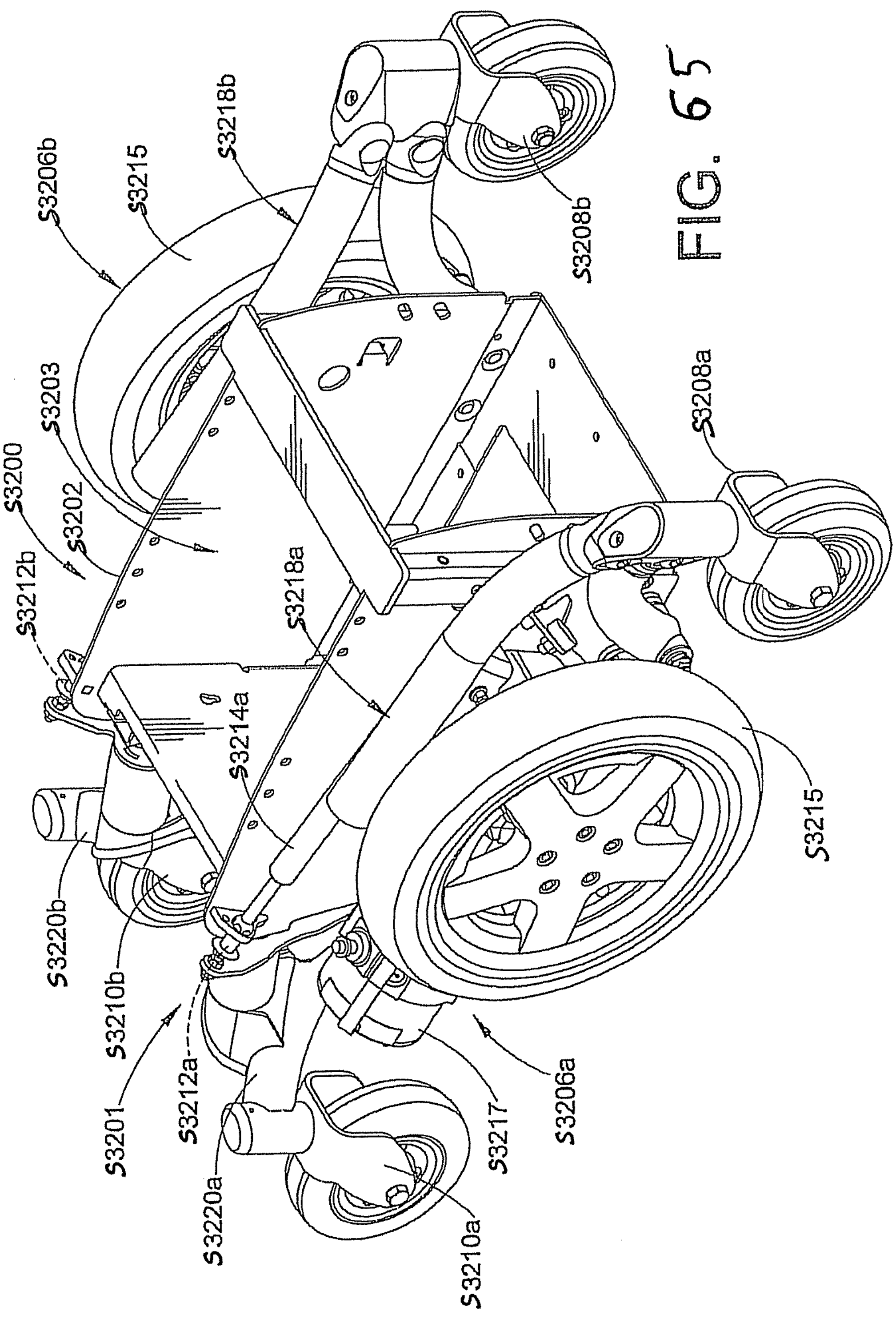
FIG. 65 is a perspective view of an embodiment of a mid-wheel drive wheelchair that includes a tip or stability control system.

Referring to FIG. 65, the illustrated frame S3202 is made from sheetmetal panels, but can be constructed in any manner that is suitable for the application of the wheelchair S3200. The illustrated frame S3202 defines an interior space S3203 for batteries (not shown), wiring (not shown), and other wheelchair components.

Figure 66:
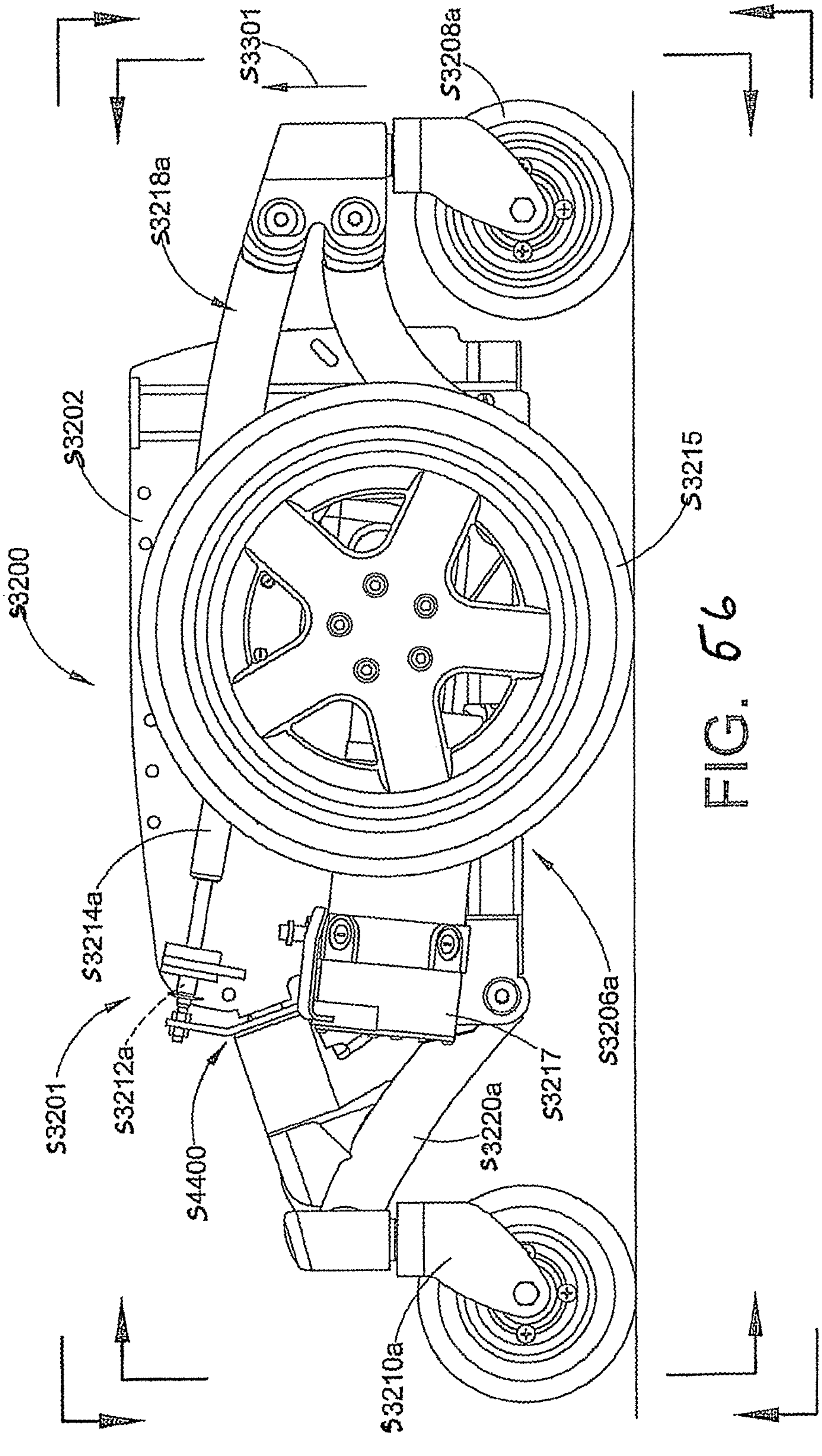
FIG. 66 is a side view of the mid-wheel drive wheelchair of FIG. 65.
Figure 67:
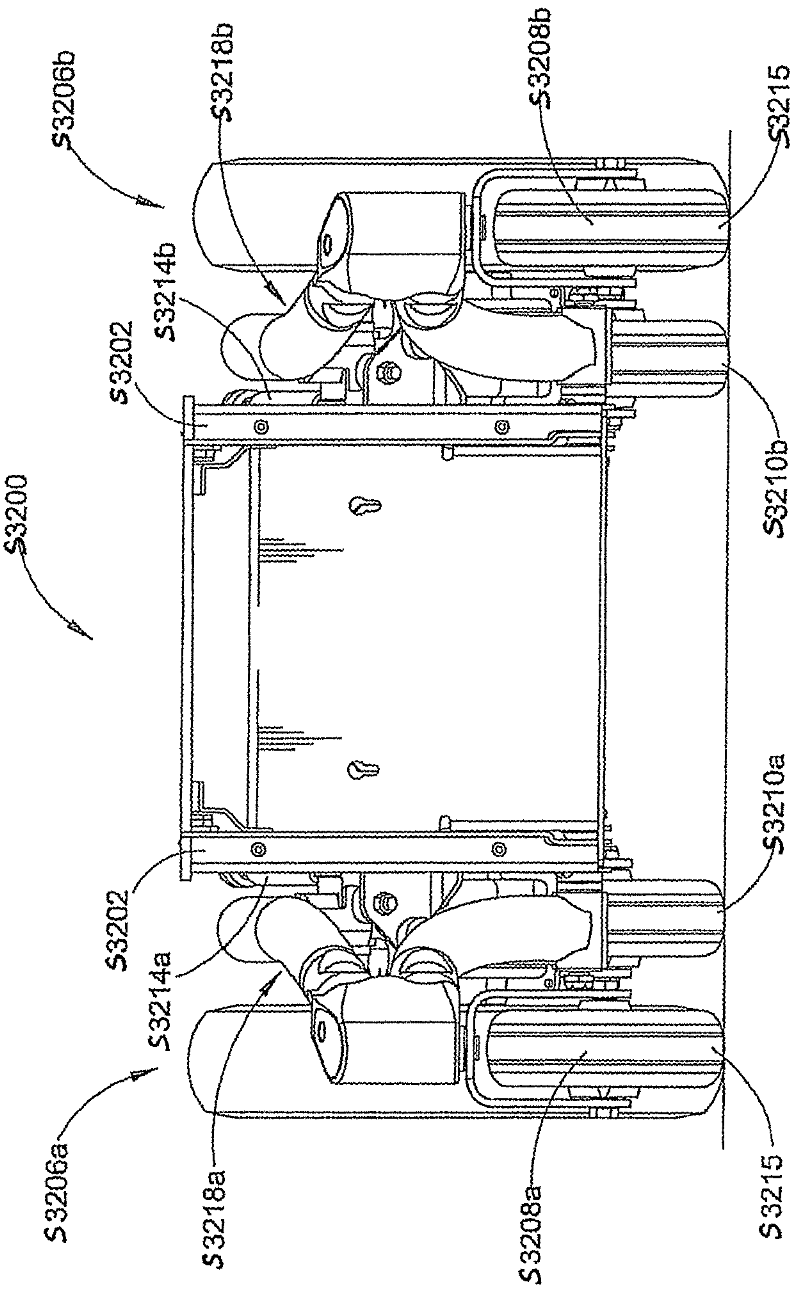
FIG. 67 is a view taken along lines 67-67 in FIG. 66.
Figure 68:
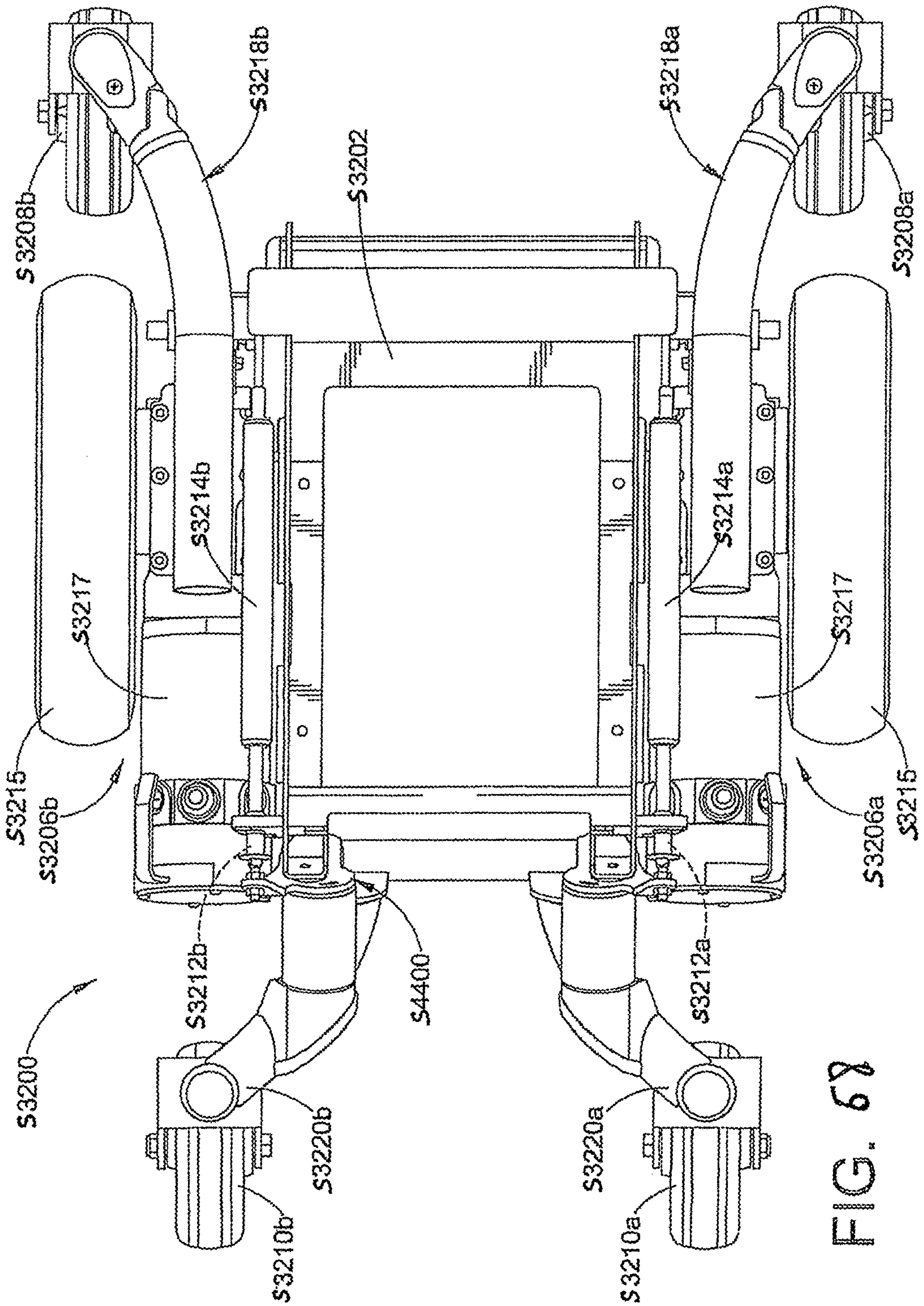
FIG. 68 is a view taken along lines 68-68 in FIG. 66.
Figure 69:
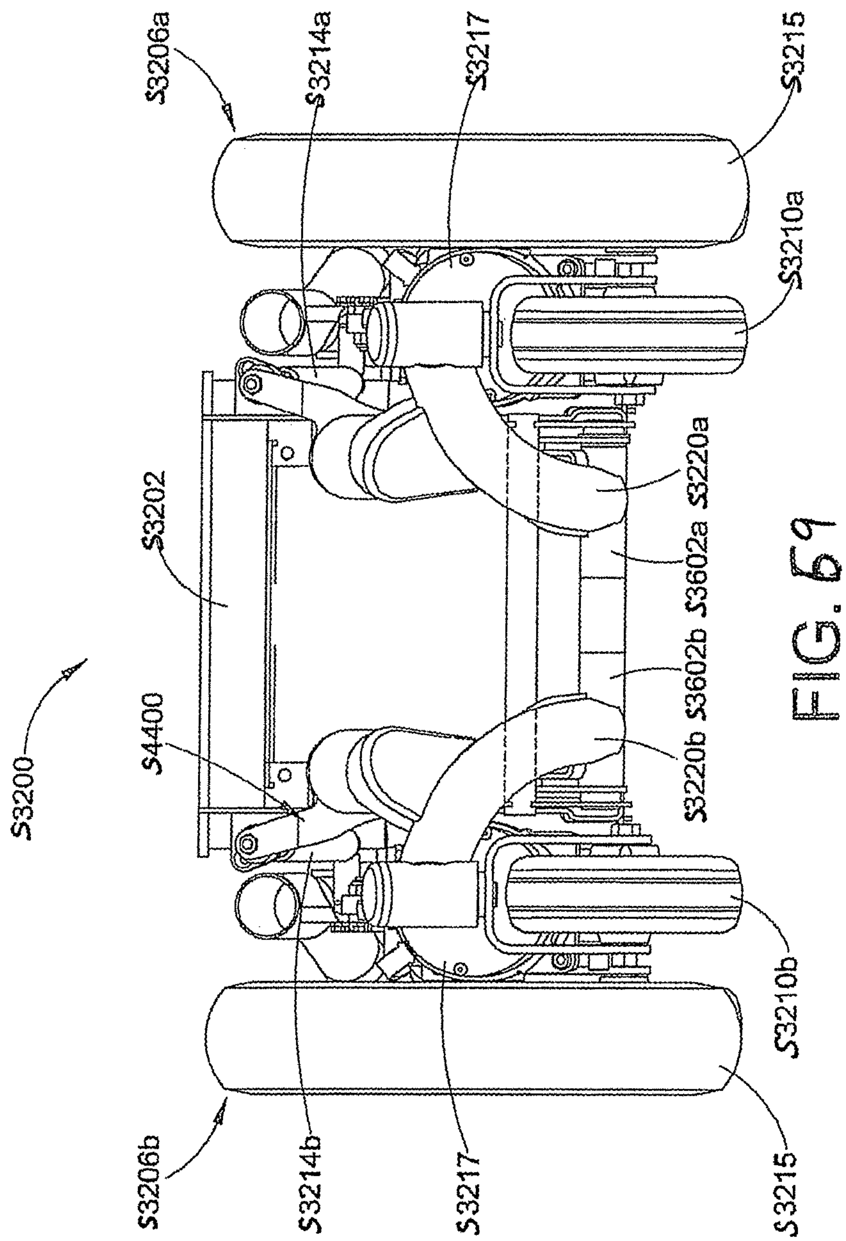
FIG. 69 is a view taken along lines 69-69 in FIG. 66.
Figure 10:
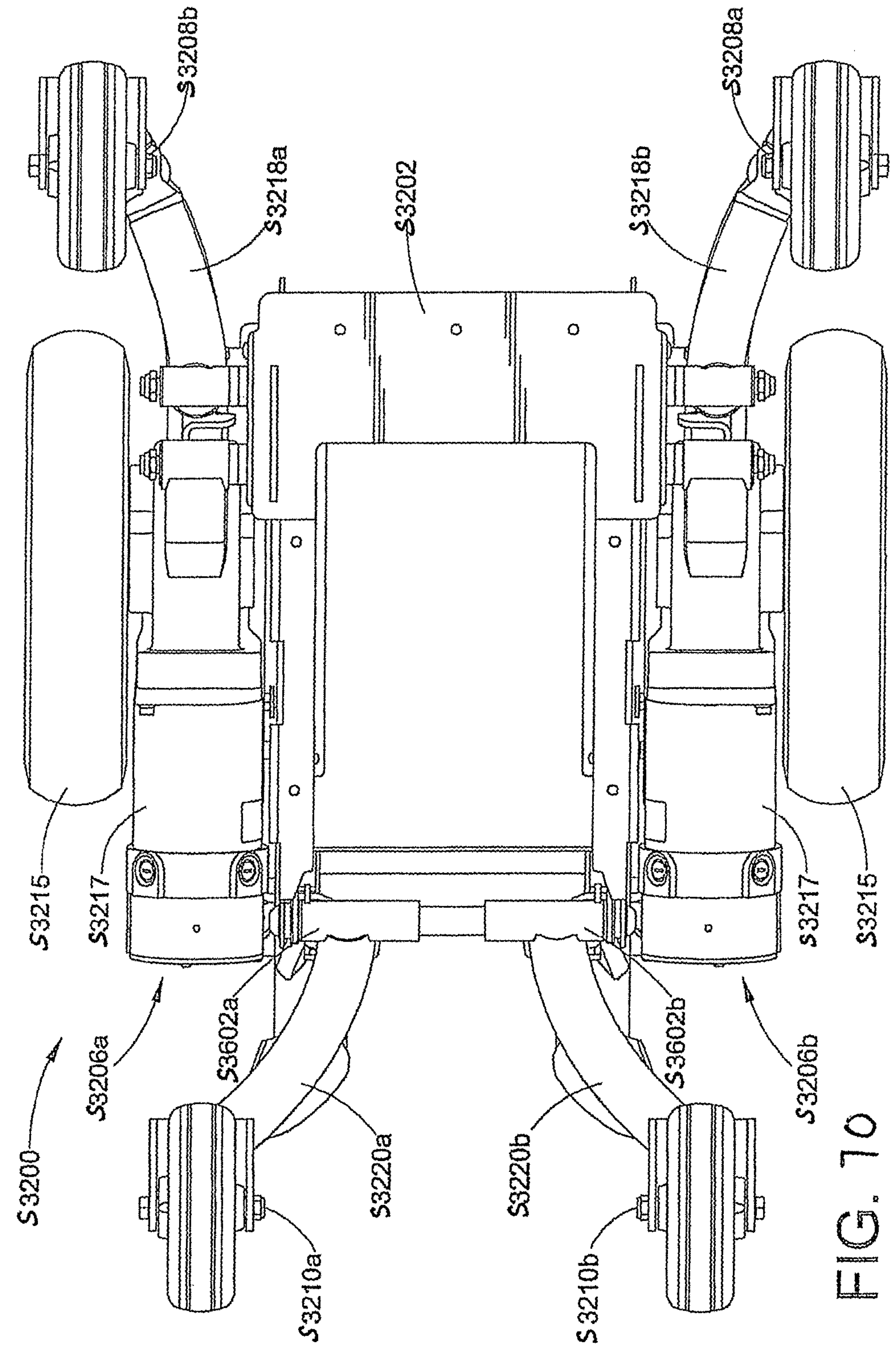
Figure 71:
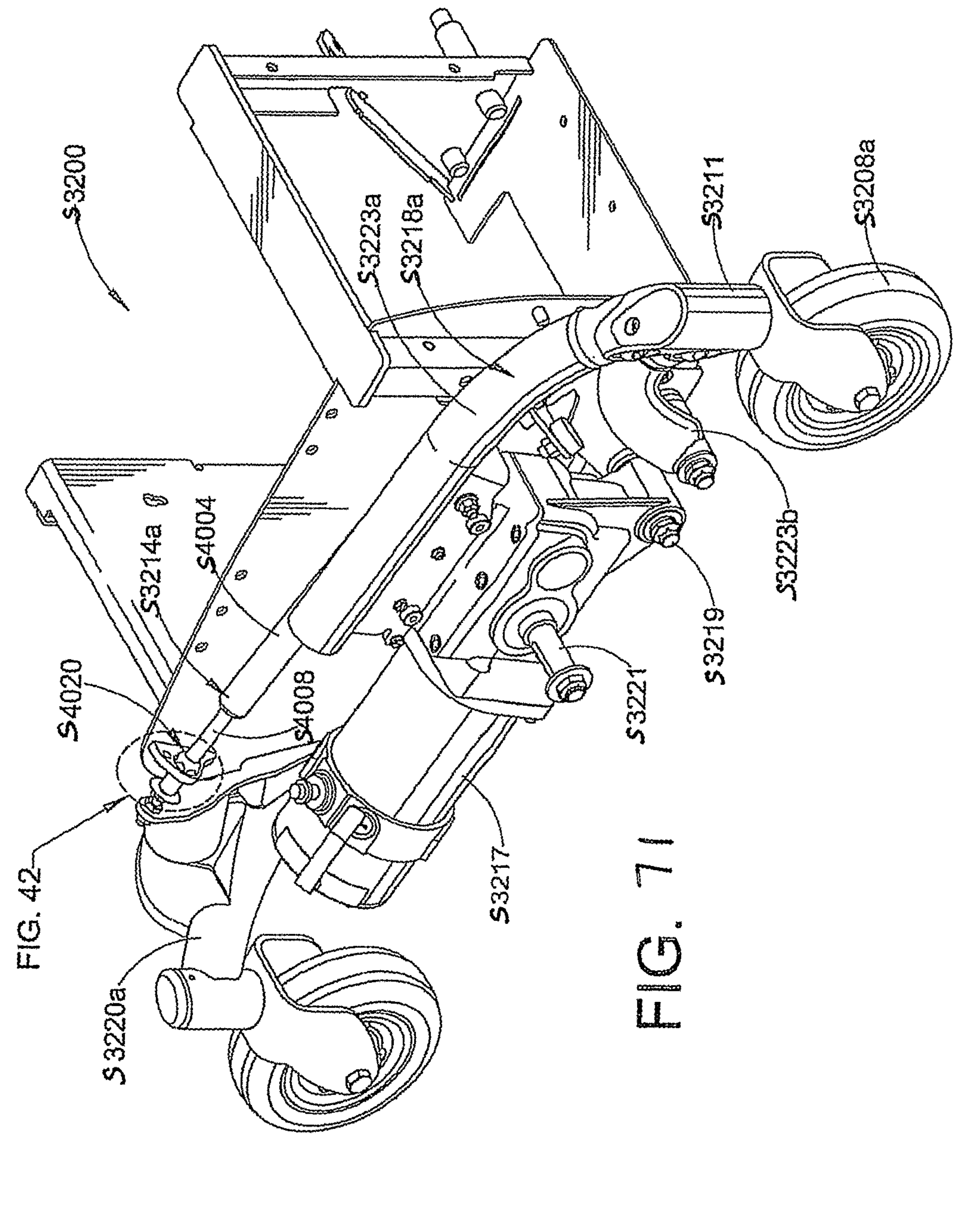
FIG. 71 is a view of the wheelchair of FIG. 65 with components removed.

Referring to FIGS. 65 and 66, each drive assembly S3206*a*, S3206*b* includes a drive wheel S3215 and a motor or drive S3217 that propels the drive wheel S3215. The drive S3217 may comprise a motor/gear box combination, a brushless, gearless motor, or any other known arrangement for driving the drive wheel S3215. The drive 3717 is coupled to the frame S3202 at a pivotal connection S3219. The pivotal connection S3219 is disposed below a drive axis S3221 of the drive wheel S3215 when the wheelchair S3200 is resting on flat, level ground. FIGS. 71-74 show the wheelchair S3200 with many of the components removed to more clearly illustrate the drive S3217, the front pivot caster pivot arm S3218*a*, the rear caster pivot arm S3220*a*, and the stabilizing member S3214*a* mounted on one side of the frame S3202. The component mounting on the other side of the frame S3202 may be a mirror image, and is therefore not described in detail.

Figure 72:
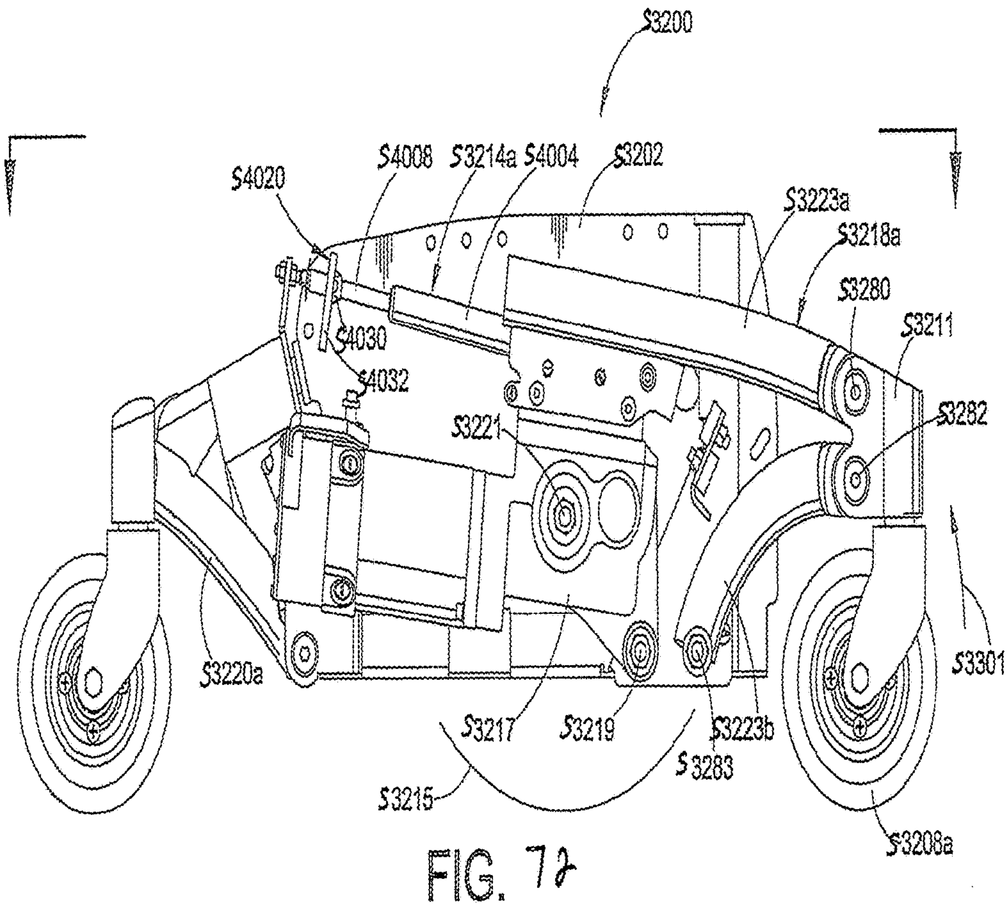
FIG. 72 is a side view of the mid-wheel drive wheelchair with components removed of FIG. 71.

Referring to FIG. 72, each front caster pivot arm S3218*a*, S3218*b* includes upper and lower links S3223*a*, S3223*b* that define a four bar linkage. The upper link S3223*a* is pivotally coupled to a caster support member S3211 at a pivotal connection S3280 and is fixedly connected to the drive S3217. The lower link S3223*b* is pivotally coupled to the caster support member S3211 at a pivotal connection S3282 and is pivotally connected to the frame S3202 at a pivotal connection S3283. The drive S3217, the links S3223*a*, S3223*b*, the frame S3202, and the caster support member S3211 form a four-bar linkage.

The front caster S3208*a* is coupled to the caster support member S3211. The front caster pivot arms S3218*a*, S3218*b* are independently pivotable upwardly and downwardly on the opposite sides of the frame to move the front casters S3208*a*, S3208*b* upwardly and downwardly with respect to the frame S3202.

Referring to FIGS. 66 and 72, when the drive assembly S3206*a* is accelerated such that the moment arm generated by drive wheel S3215 is greater then all other moment arms around pivot axis S3219, the drive assembly S3206 pivots about pivot axis S3219 to move the front caster pivot arm S3218 upward or urges the pivot arm upward as indicated by arrow S3301. Resulting upward tendencies of the front caster S3208*a* helps the wheelchair S3200 to traverse obstacles. In the exemplary embodiment, the drive assembly S3206*b* operates in the same manner or a similar manner to move or urge the front caster S3208*b* upward.

Figure 73:
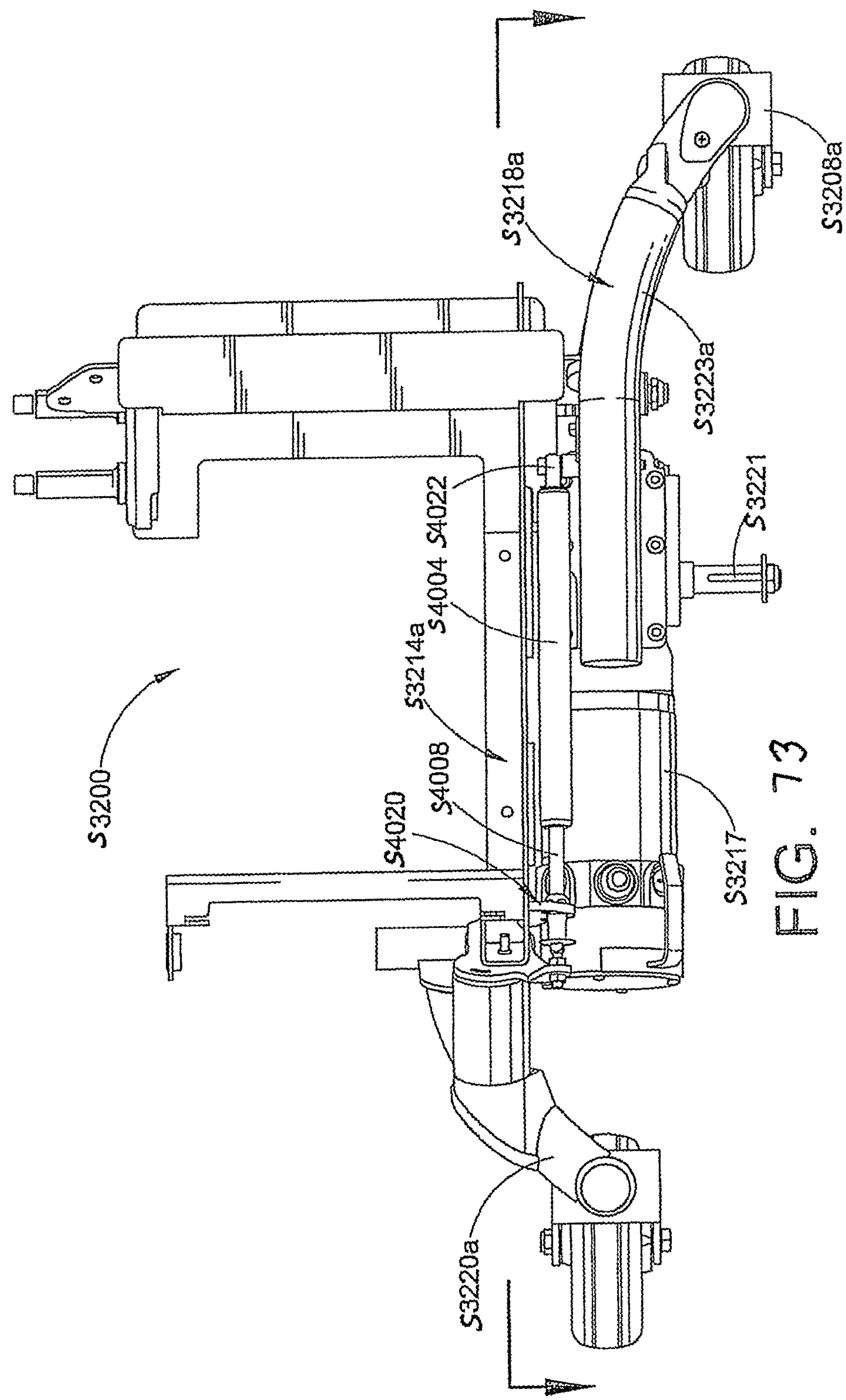
Figure 74:
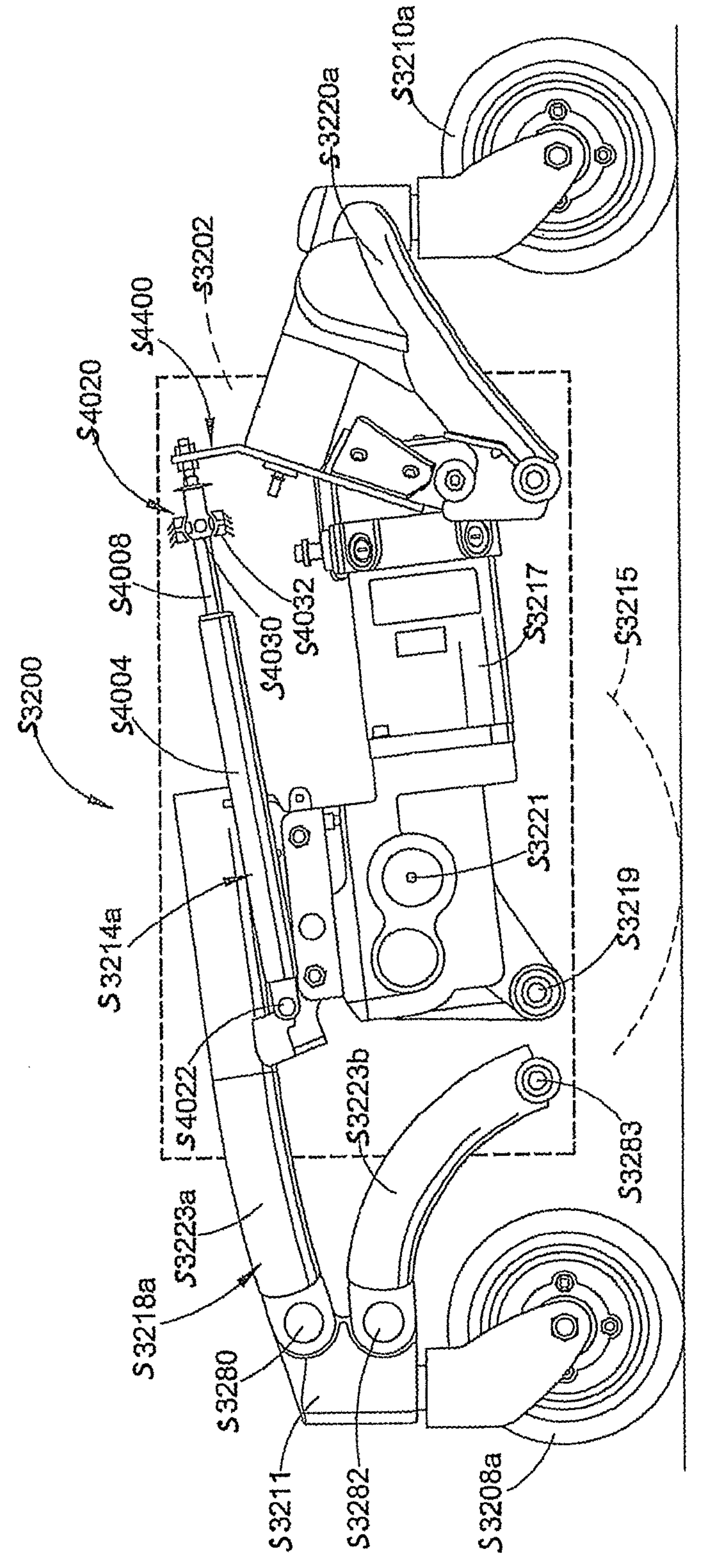
Figure 75:
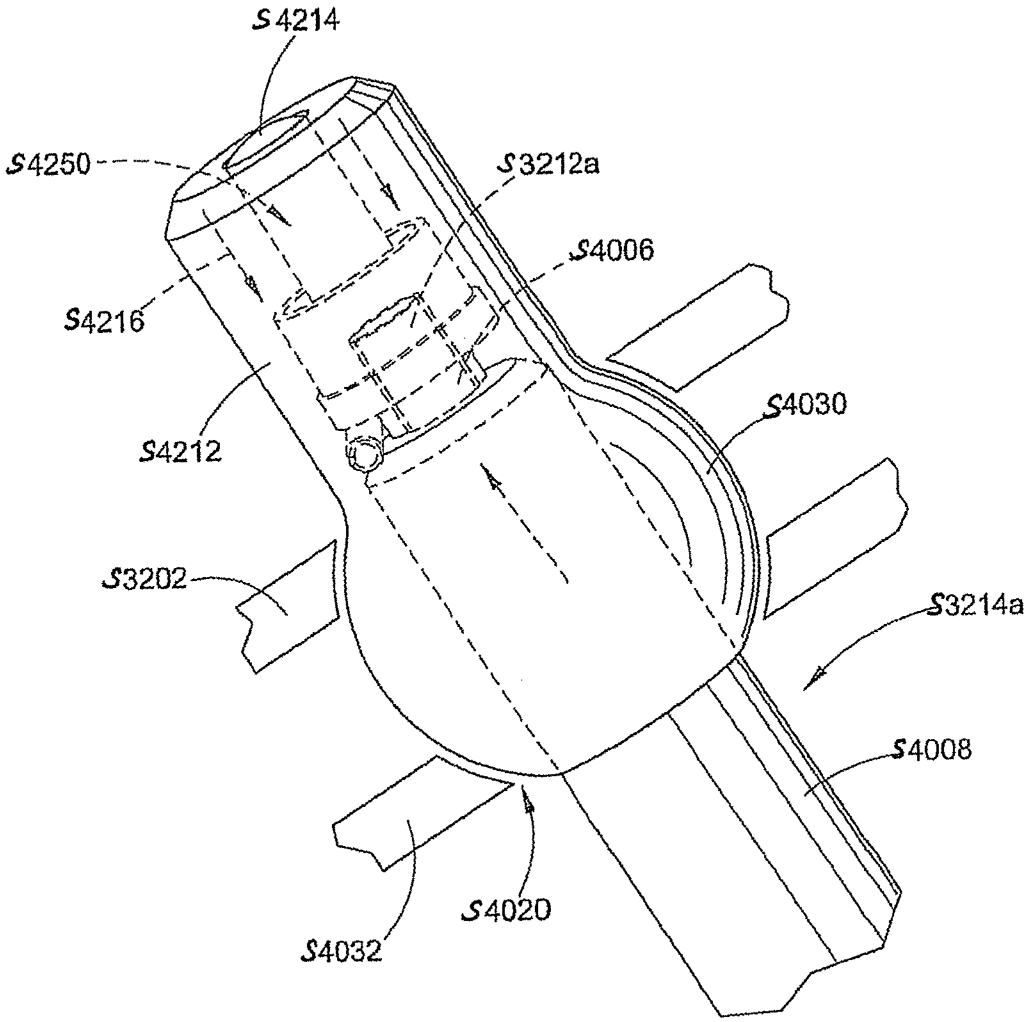

Referring to FIGS. 73-75, the stabilizing member S3214*a* comprises a hydraulic cylinder with a spring return (see also FIGS. 38 and 39). The stabilizing member S3214*a* includes a housing S4004, and a rod S4008. In this embodiment, the sensor or trigger S3212*a* is a portion of a button S4006 that extends from the stabilizing member S3214*a*. The position of the button S4006 determines the state of the stabilizing member S3214*a*. In the wheelchair S3200, when the button S4006 is depressed, the rod S4008 may move into and out of the housing S4004 to extend and shorten the length of the stabilizing member S3214*a*. When the button S4006 is extended, the rod S4008 may move out of the housing S4004 to extend the length of the stabilizing member S3214*a*, but is prevented from moving into the housing S4004 to shorten the length of the stabilizing member. When the button S4006 is in the depressed position, the movement of the fluid in the stabilizing member S3214*a* when the rod extends and retracts provides a damping effect. When the button S4006 is extended, the stabilizing member damps downward movement of the front caster. In the wheelchair S3200, a spring return (See FIG. 39) biases or returns the rod S4008 to an extended position to bias the front caster toward contact with the ground.

Referring to FIGS. 73-75, the stabilizing member S3214*a* is pivotally connected to the frame S3202 at a pivotal connection S4020 and to the drive assembly/front caster pivot arm at a pivotal connection S4022. When the button S4006 is extended, the stabilizing member S3214*a* can extend to allow the front caster to move downward with respect to the frame S3202, but cannot retract to prevent upward movement of the front caster with respect to the frame. When the button S4006 is depressed, the stabilizing member S3214*a* allows the front caster to move upward and downward with respect to the frame.

Referring to FIG. 75, the pivotal connection S4020 may comprise a ball S4030 and socket S4032 connection. The ball S4030 is mounted to the rod S4008. The socket S4032 is connected to the frame S3202. If the pivotal connection S4020 is made before the pivotal connection S4022, the ball S4030 can be turned in the socket S4032 to facilitate alignment required to make the pivotal connection S4022. If the pivotal connection S4022 is made before the connection S4022, the ball S4030 can be assembled in the socket S4022, regardless of the orientation of the ball with respect to the socket. As a result, assembly of the stabilizing members S3214*a*, S3214*b* to the frame and to the drive assembly/front caster pivot arm is made easier.

Figure 76:
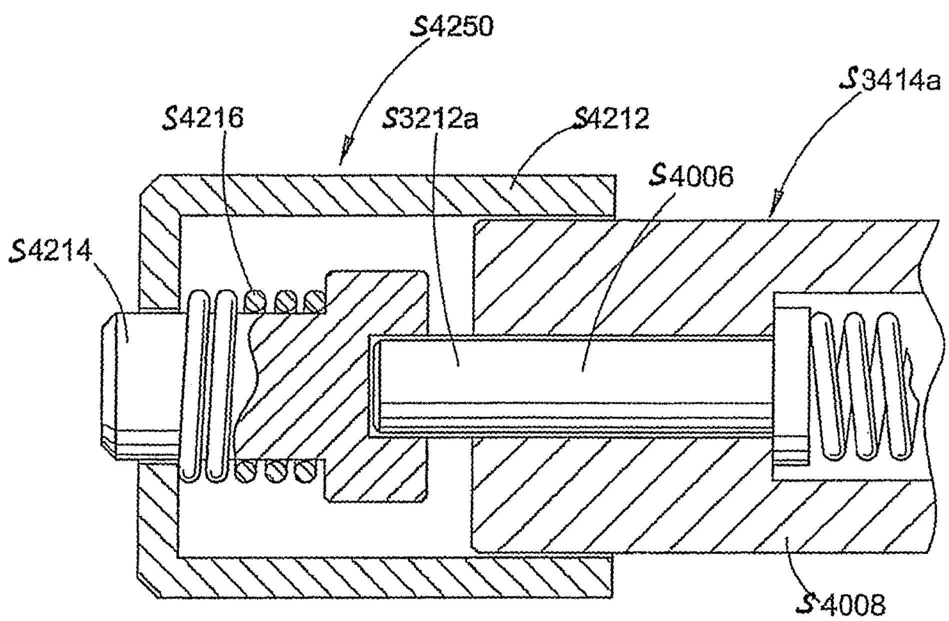

In the embodiment of wheelchair S3200, optional vibration damping assemblies S4250 are coupled to the button S4006 of each stabilizing member S3214*a*, S3214*b* to prevent vibration of the button S4006 in the rod S4008. FIG. 75 illustrates a vibration damping assembly S4250 that includes a ball portion for a ball and socket connection. FIG. 76 illustrates a vibration damping assembly S4250 where the ball is omitted and the stabilizing member S3214*a* is connected to the frame by a conventional pivotal coupling or the ball is coupled to the stabilizing member at another location. The vibration damping includes a housing S4212, a trigger extension member S4214, and a biasing member S4216, such as a spring or other resilient member. The housing S4212 is disposed on the end of the rod S4008. In the embodiment illustrated by FIG. 75, the ball S4030 is defined as part of the housing S4212. In the embodiment illustrated by FIG. 76, the housing S4212 does not include a ball portion. The trigger extension member S4214 is disposed in the housing S4212 in engagement with the control rod S4210. The biasing member S4216 biases the trigger extension member S4214 against the button S4006. The biasing member S4216 applies a preload to the button S4006 to inhibit vibration of the button S4006 in the rod S4008. The force applied by the biasing member S4216 is small enough that the biasing member S4216 does not depress the control rod S4210 to a point where the stabilizing member S3214*a*, S3214 changes state (i.e. from an engaged state to a disengaged state).

Figure 78:
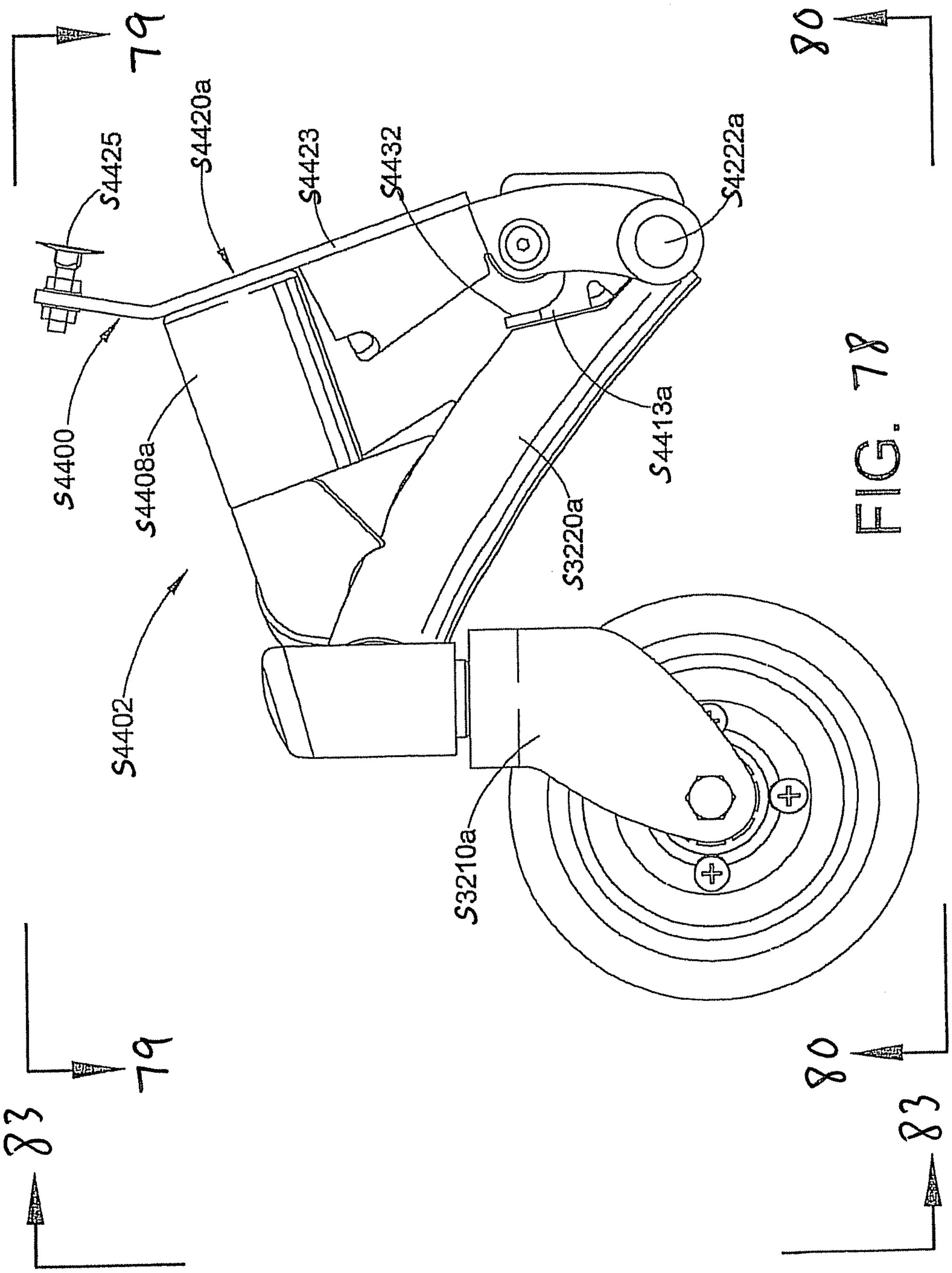
Figure 79:
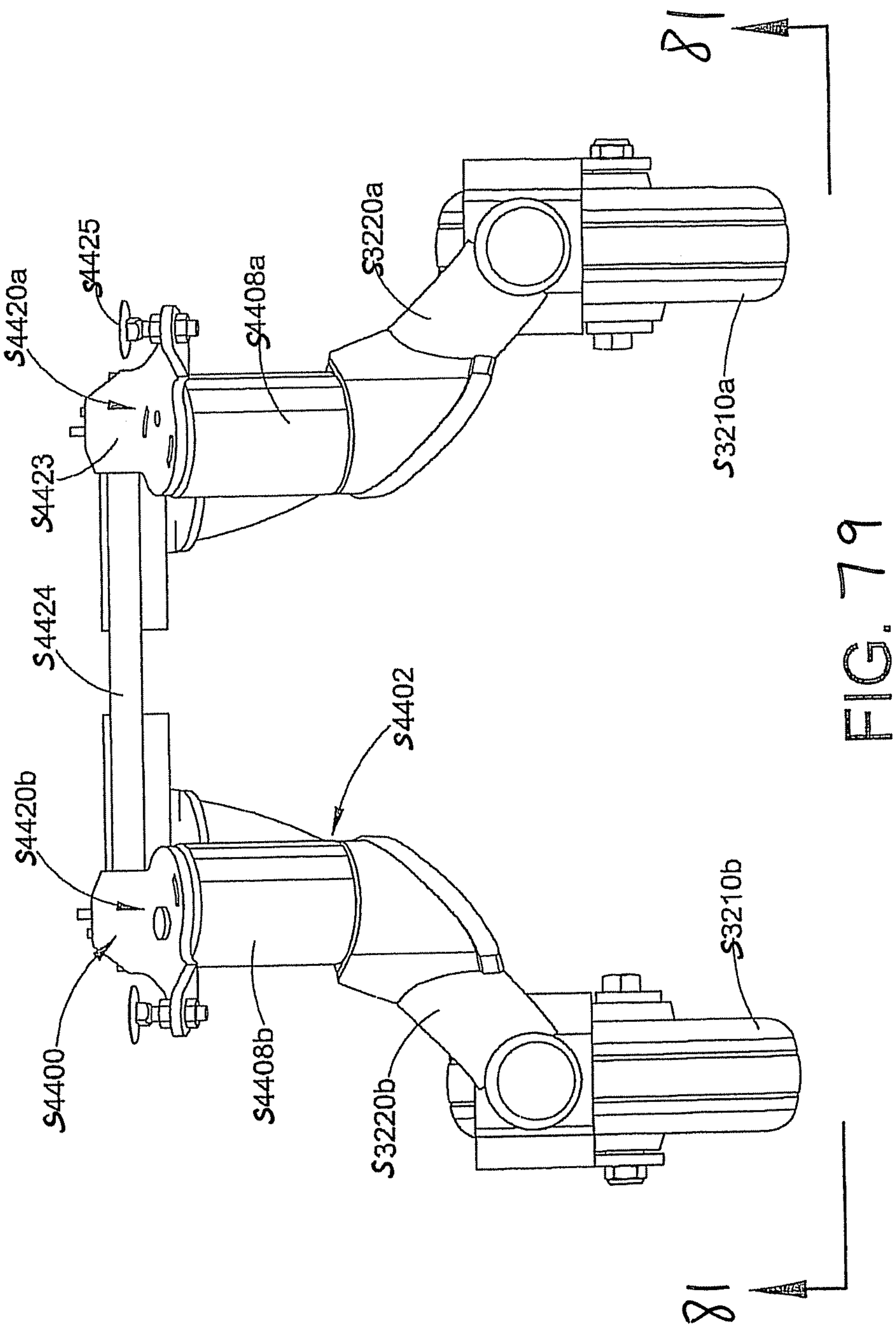
Figure 80:
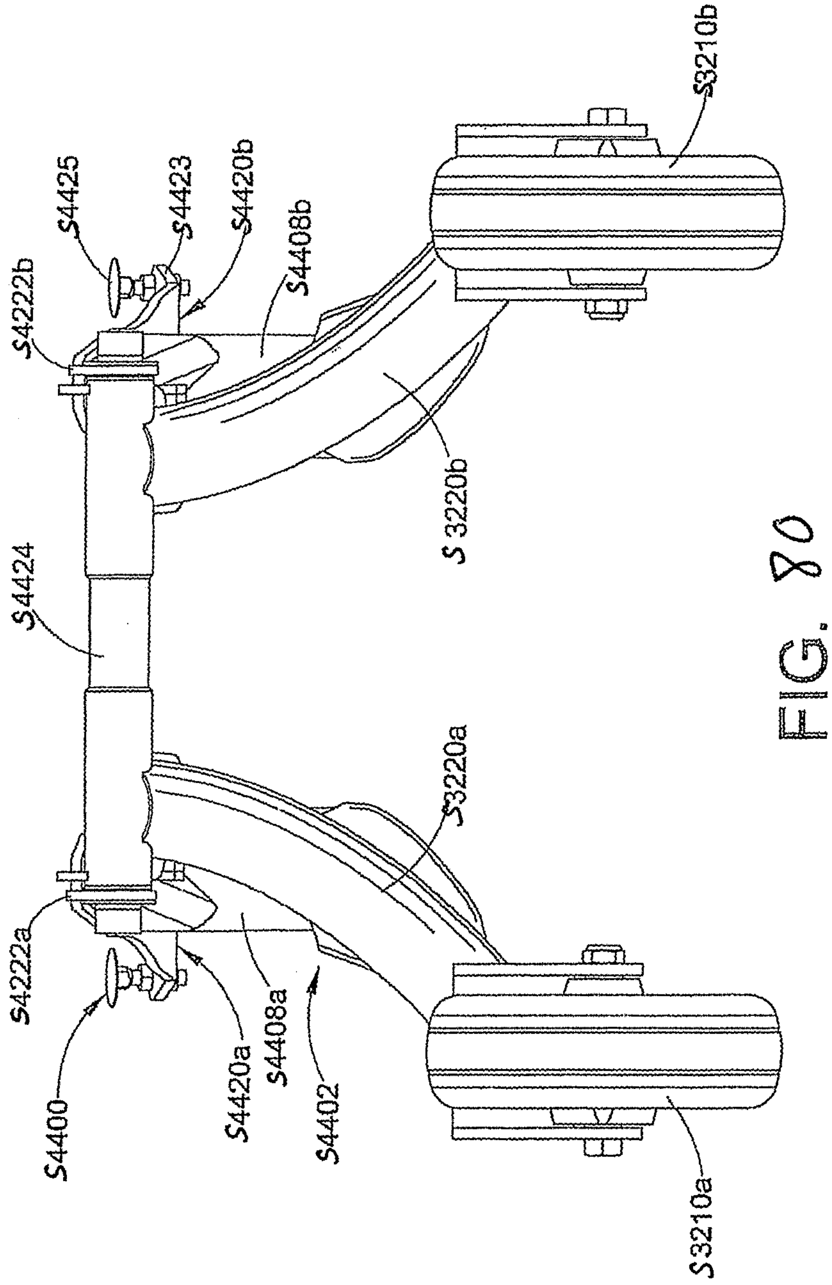
Figure 81:
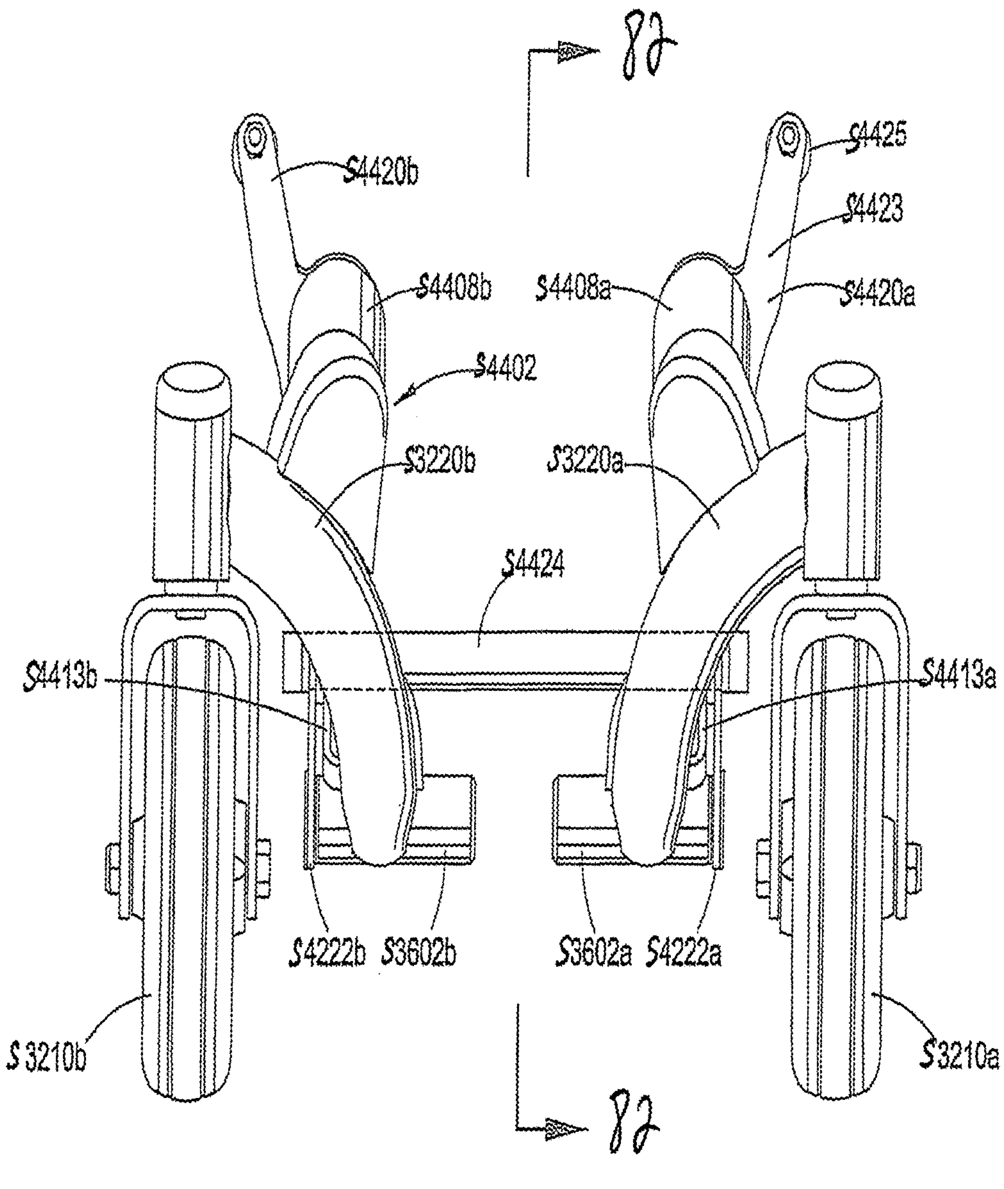

Referring to FIGS. 79 and 80, each rear caster pivot arm S3220*a*, S3220*b* is independently coupled to the frame S3202 at a pivotal connection 3602*a*, 3602*b*. Each rear caster S3210*a*, S3210*b* is coupled to a rear caster pivot arm S3220*a*, S3220*b*, such that each rear caster can rotate around a substantially vertical axis. FIGS. 77-83 illustrates the rear caster position sensing arrangement S4400 and a rear caster suspension S4402 of the wheelchair S3200. The rear caster suspension S4402 includes the rear caster pivot arms S3220*a*, S3220*b*, the rear casters S3210*a*, S3210*b*, and biasing members S4408*a*, S4408*b*, such as a spring or other resilient member. A stop member S4413*a*, S4413*b* is attached to each pivot arm. The stop members S4413*a*, S4413*b* rotate with the pivot arms S3220*a*, S3220*b*. The rear caster position sensing arrangement S4400 includes a pair of spaced apart trigger engagement assemblies S4420*a*, S4420*b* that are coupled to the wheelchair frame at pivotal connections S4422*a*, S4422*b*. In the illustrated embodiment, each rear caster position sensing arrangement includes an elongated member S4423 pivotally coupled to the frame, and an adjustable trigger engagement member S4425 connected to the elongated member S4423.

The adjustment between the engagement member S4425 and the elongated member S4423 allows the amount of rotation of the rear caster position sensing arrangement that causes engagement of the stabilizing members to be adjusted. Referring to FIGS. 78 and 79, the distance that the engagement members S4325 extend from the elongated members S4323 is adjustable. The distance that the engagement members S4325 extend from the elongated members determines the amount of rotation of the rear caster position sensing arrangement that is required to cause the stabilizing assemblies to engage and disengage. In another embodiment, the trigger engagement assemblies S4420*a*, S4420*b* are replaced with the single piece trigger engagement members.

In the embodiment illustrated by FIGS. 77-83, the pivotal connections S4422*a*, S4422*b* are coaxial with pivotal connections 3602*a*, 3602*b* of the rear caster pivot arms. In another embodiment, the pivotal connections S4422*a*, S4422*b* are offset form the pivotal connections S3602*a*, S3602*b*. The elongated members S4420*a*, S4420*b* are connected together by a bar S4424. Referring to FIGS. 78 and 84, the bar S4424 is disposed between first and second engagement surfaces S4430, S4432 of the stop members S4413*a*, S4413*b*. The bar S4424 selectively engages the stop members S4413*a*, S4413*b* to limit relative movement between the first and second rear caster pivot arms S3220*a*, 3S320*b*. The biasing members S4408*a*, S4408*b* are interposed between the rear caster pivot arms S3220*a*, S3220*b* and the elongated members S4420*a*, S4420*b*.

Figure 82:
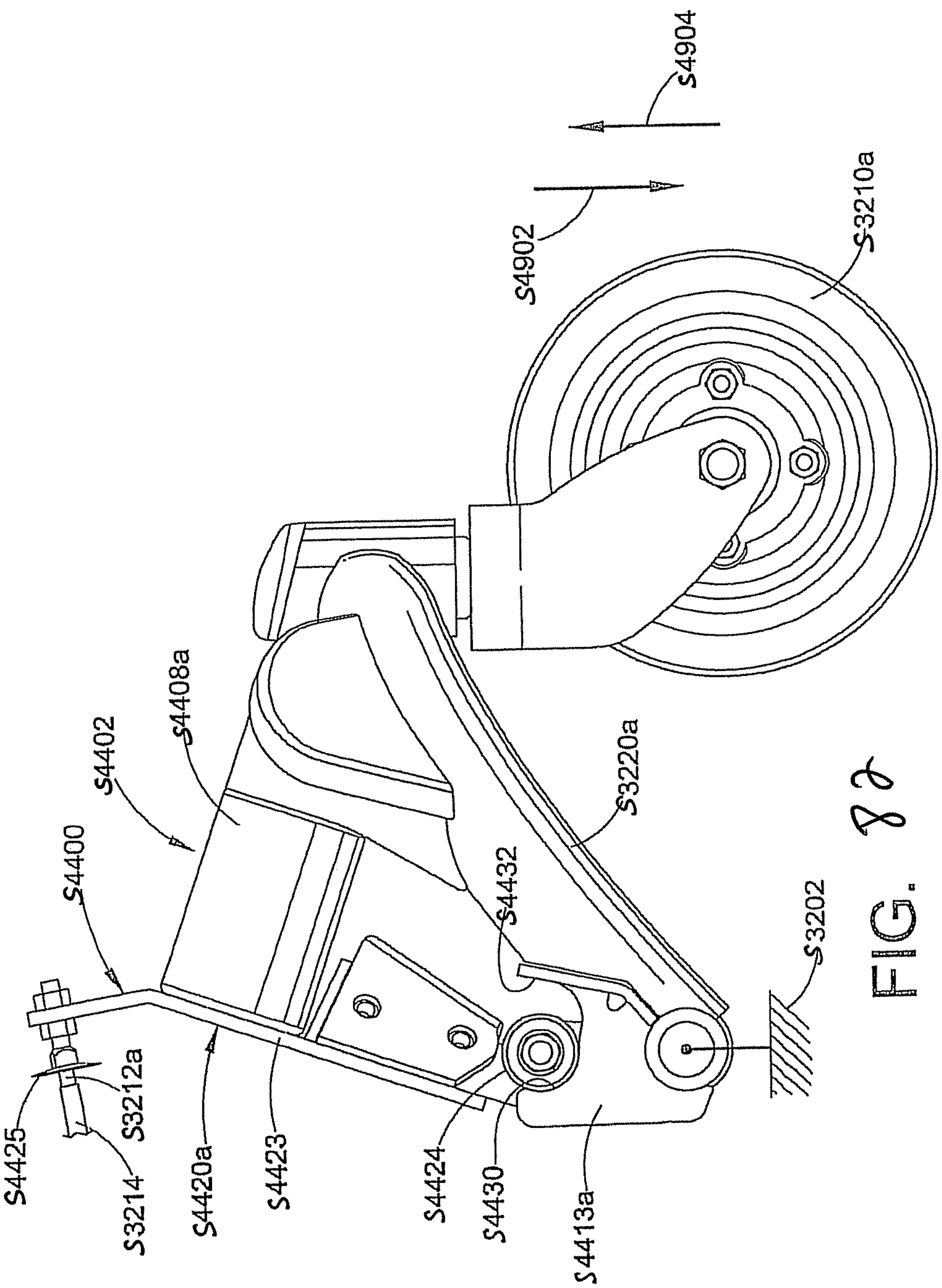
Figure 82:
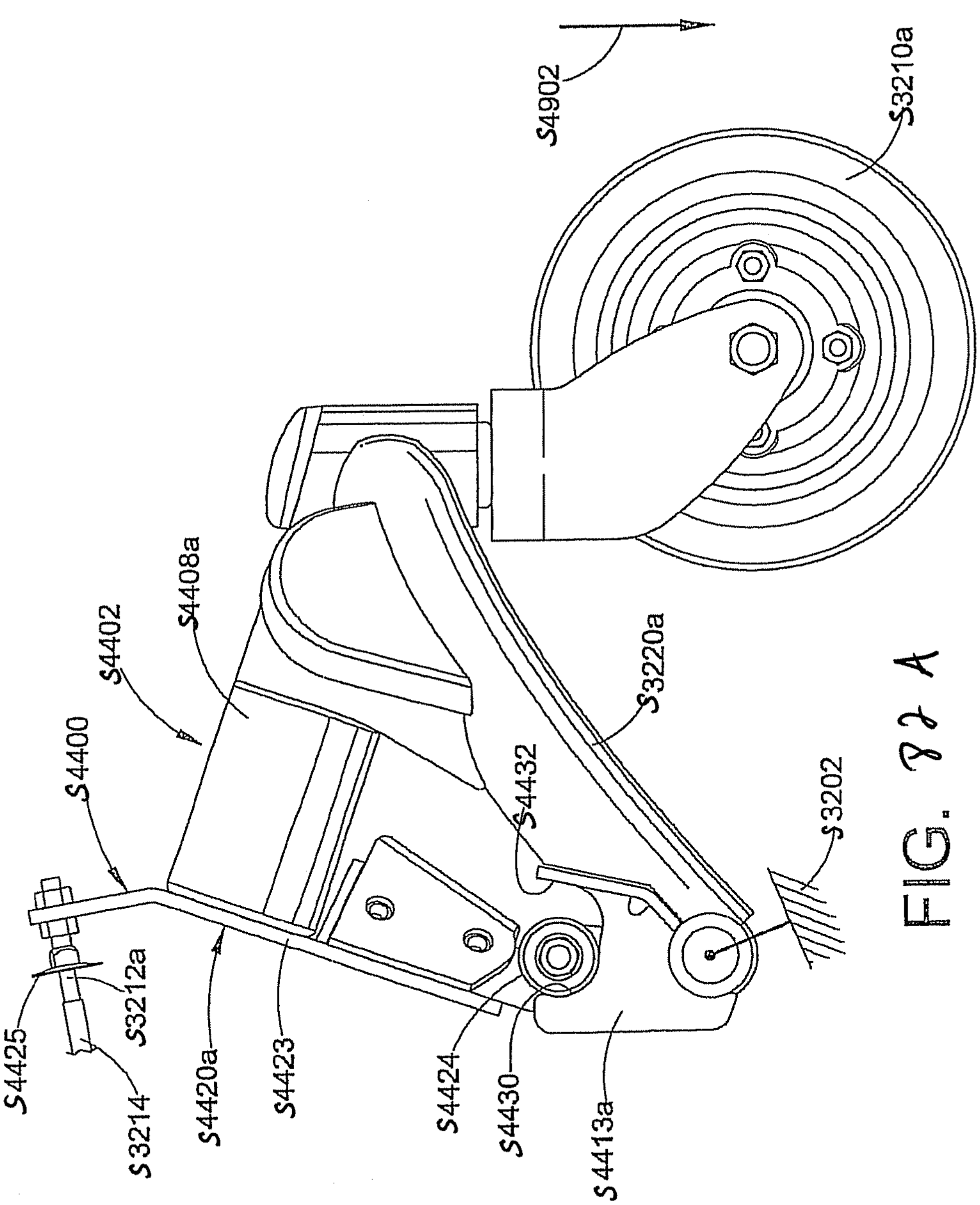

The rear caster position sensing arrangement S4400 operates to cause both sensors or triggers to place both of the stabilizing members S3214*a*, S3214*b* in the engaged and disengaged states based on the positions of the rear caster pivot arms S3320*a*, S3320*b*. FIG. 82 illustrates rear caster pivot arm S3320*a* in a normal operating position. Rear caster pivot arm S3320*b* is not visible in FIG. 82, because it is in the same, normal operating position, as rear caster pivot arm S3320*a*. When (shown schematically in FIG. 82) one or both of the rear caster pivot arms S3320*a*, S3320*b* are in normal operating positions relative to the frame S3202, one or more of the biasing members S4408*a*, S4408*b* hold both of the trigger engagement assemblies S4420*a*, S4420*b* against both of the sensors or triggers S3212*a*, S3212*b*, such that both stabilizing members are disengaged. The elongated members S4420*a*, S4420*b* position the bar S4424 with respect to the stop members S4413*a*, S4413*b*. As long as force applied by one or more of the biasing members S4408*a*, S4408*b* is sufficient to maintain the elongated members S4420*a*, S4420*b* against the sensors or triggers S3212*a*, S3212*b*, the position of the bar S4424 is fixed. When there is a gap between the bar S4424 and a stop member S4413*a*, S4413*b*, the rear caster pivot arms S3320*a*, S3320*b* are free to move upwardly and downwardly with respect to one another.

Figure 77:
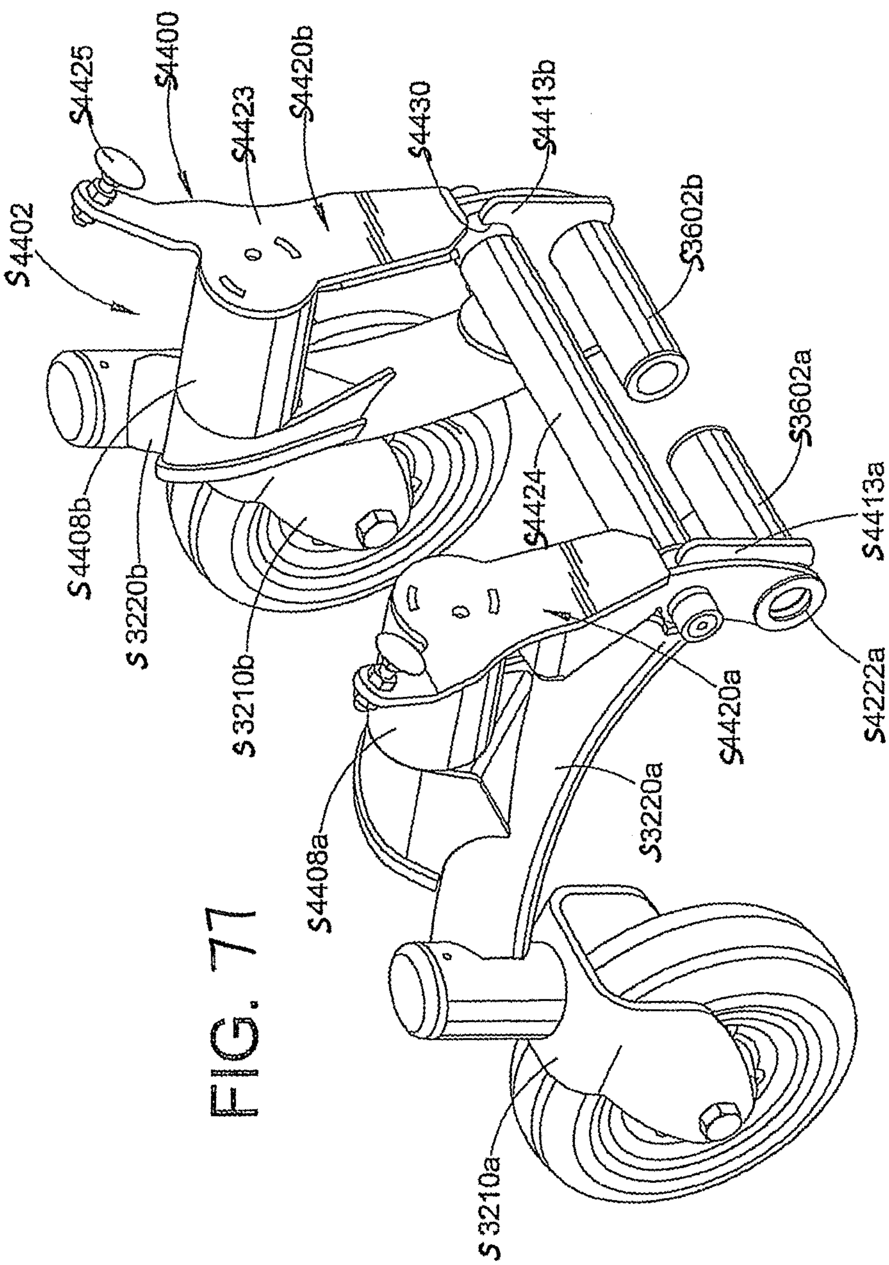

In FIGS. 77 and 82, the stop members S4413*a*, S4413*b* are in contact with the bar 24. When the stop members S4413*a*, S4413*b* engage the bar S4424, further relative movement of the of the rear caster pivot arms is inhibited by the bar S4424. In the position shown by FIGS. 77 and 82, the bar S4424 is in engagement with the engagement surface S4430 of both of the stop members. As a result, downward movement of only one pivot arm S3320*a*, S3320*b* (with the other pivot arm remains in the position illustrated by FIGS. 77 and 82) is inhibited by the bar 4024 and the biasing member S4408*a* or S4408*b* of the other pivot arm. However, both pivot arms S3320*a*, S3320*b* can pivot downward together relative to the frame. Referring to FIG. 82A, downward movement indicated by arrow 4902 of both pivot arms S3220*a* (S3220*b* is hidden) allows the rear caster position sensing arrangement S4400 to move away from both of the triggers S3212*a*, S3212*b*, allows the triggers to extend, and causes both of the locking members S3214 to disengage. As such, the rear caster pivot arms S3320*a*, S3320*b* move independently from the position shown in FIG. 82 in the direction of arrow 4904. Movement of each rear caster pivot arms S3320*a*, S3320*b* from the position shown in FIG. 82 in the direction indicated by arrow 4902 is dependent on the other rear caster pivot arm also moving in the direction indicated by arrow 4902.

Figure 83:
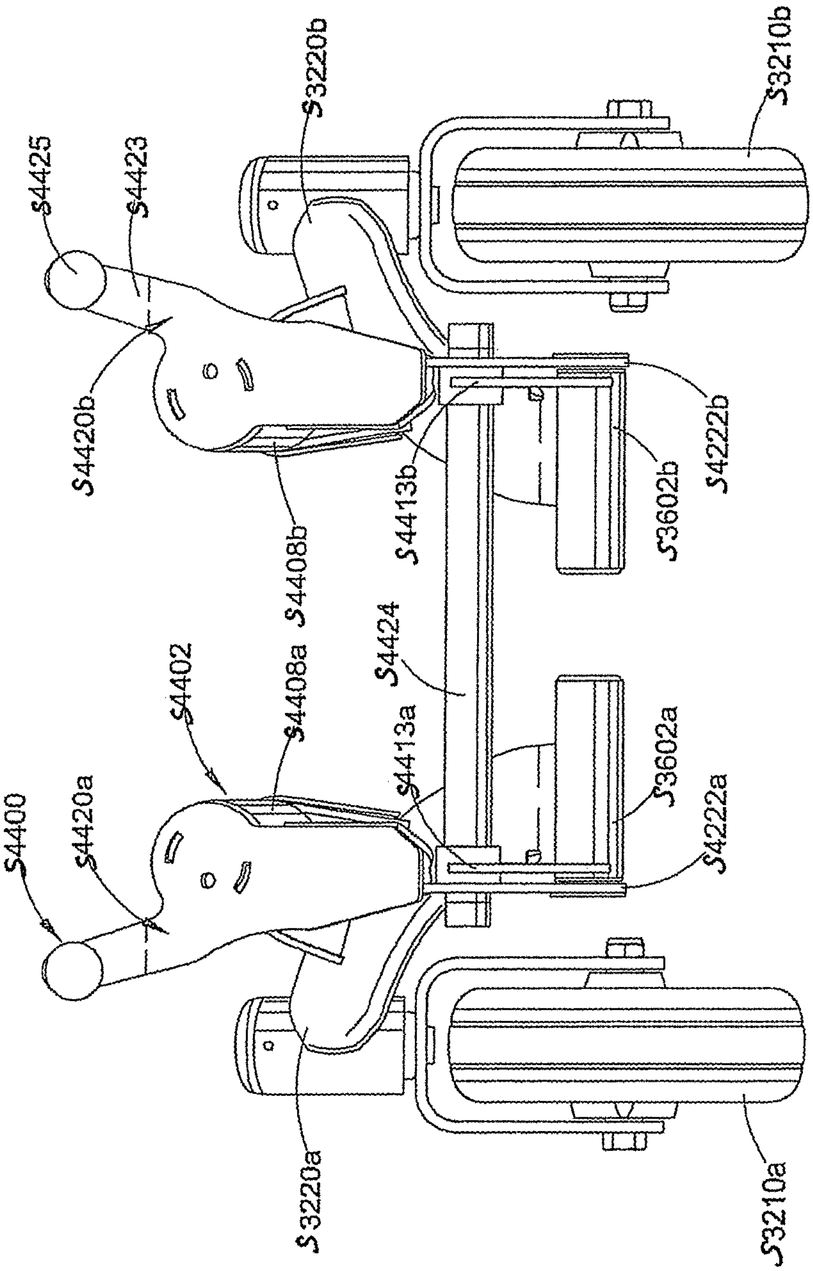

Referring to FIG. 83, each stabilizing member S3214*a* (S3214*b* not shown) is coupled to the frame S3202 and the front caster pivot arms S3218*a*, S3218*b*. The stabilizing members S3214*a* (S3214*b* not shown) allow upward and downward movement of the first and second front caster pivot arms S3218*a*, S3218*b* relative to the frame S3202 when first and second rear casters S3210*a*, S3210*b* are each in a normal position relative to the frame shown in FIG. 83, because the rear caster position sensing arrangement S4400 engages both of the triggers S3212*a*, S3212*b* of the stabilizing members S3214*a*, S3214*b* in this position.

When the wheelchair S3200 exhibits a tipping behavior, the frame S3202 of the wheelchair is pitched slightly forward toward the front casters S3208*a*, S3208*b*. As a result, both of the rear casters 3S3320*a*, 3S3320*b* move downward relative to the frame S3202 to maintain contact with the ground. This downward movement moves the rear caster position sensing arrangement S4400 away from the triggers S3212*a*, S3212*b*, allows the triggers to move to the extended position and causes the stabilizing assemblies S3214*a*, S3214*b* to engage. In an exemplary embodiment, the stabilizing assemblies S3214*a*, S3214*b* engage to lock the first and second front casters S3208*a*, S3208*b* against upward movement relative to the frame, but allow the front casters to move downward when engaged. The stabilizing assemblies S3214*a*, S3214*b* may be configured in any manner that inhibits further tipping of the wheelchair frame when the stabilizing members are engaged. In another embodiment, the stabilizing assemblies S3214*a*, S3214*b* lock the front caster pivot arms against both upward and downward movement with respect to the pivot arm when engaged. When one or more of the rear casters return to a normal operating position relative to the frame, the triggers are depressed again to disengage and allow upward and downward movement of the front casters relative to the frame. In the wheelchair S3200, the rear caster position sensing arrangement is configured such that movement of one of the rear casters to a normal operating position moves the other rear caster up as well.

FIGS. 84A-93 illustrate an exemplary embodiment of another stability control system S8400 that can be included in a mid-wheel drive wheelchair chassis, such as the chassis 2600 illustrated by FIGS. 26A-26C. The stability control system 8400 comprises sensors or triggers S8412*a*, S8412*b* and stabilizing members 2619*a*, 2619*b*. A rear caster position sensing arrangement S9600 communicates a condition of the rear caster pivot arms 2781*a*, 2781*b* to both of the sensors or triggers S8412*a*, S8412*b*. In the illustrated embodiment, the rear caster position sensing arrangement S9600 comprises the linkages 2785*a*, 2785*b* and a bar S8524 that connects the two linkages together.

The stabilizing members 2619*a*, 2619*b* may have the same configuration as the stabilizing member S3214*a* illustrated by FIGS. 73-76. As such, details of the stabilizing cylinders 2619*a*, 2619*b* are not repeated here. In addition, the stabilizing members 2619*a*, 2619*b* are pivotally connected to the frame 2602 in the same manner that the stabilizing member S3214*a* is pivotally connected to the frame S3202 at a pivotal connection S4020. The stabilizing members 2619*a*, 2619*b* are each pivotally connected to the bracket 2920 at a pivotal connection S9622.

When the button S4006 is extended (see FIG. 92A), the stabilizing member 2619*a* can extend to allow the front caster to move downward with respect to the frame 2602, but cannot retract to thereby prevent upward movement of the front caster 2620 with respect to the frame 2602. Referring to FIG. 87A, when the button S4006 is depressed, the stabilizing member 2619*a* allows the front caster to move upward and downward with respect to the frame.

FIG. 93 illustrates the rear caster position sensing arrangement S9600 and the rear caster pivot arms 2781*a*, 2781*b*. The rear caster position sensing arrangement S9600 include the linkages 2785*a*, 2785*b* and the bar S8524. The linkages 2785*a*, 2785*b* each include a link S8508*a*, S8508*b*. The links S8508A, S8508*b* may take a wide variety of different forms. In one exemplary embodiment, the links S8508*a*, S8508*b* are spring loaded shock absorbers The linkages 2785*a*, 2785*b* includes a pair of spaced apart trigger engagement members S8520*a*, S8520*b* that are coupled to the wheelchair frame at pivotal connections S8522*a*, S8522*b* (See FIG. 93). In the illustrated embodiment, the trigger engagement members S8520*a*, S8520*b* are each a single piece. In another embodiment, the engagement members S8520*a*, S8520*b* are each made from more than one piece to facilitate adjustment as described with respect to the embodiment illustrated by FIG. 65.

In the embodiment illustrated by FIG. 93, the pivotal connections S8522*a*, S8522*b* are offset from the pivotal connections 2783 of the rear caster pivot arms 2781. The trigger engagement members S8520*a*, S8520*b* are connected together by the bar S8524. The links S8508*a*, S8508*b* are interposed between the rear caster pivot arms 2781 and the trigger engagement members S8520*a*, S8520*b*. In the illustrated embodiment, links S8508*a*, S8508*b* are pivotally connected to the rear caster pivot arms 2781 and the trigger engagement members S8520*a*, S8520*b* to form the rear caster linkages 2785*a*, 2785*b*.

The rear caster position sensing arrangement S8500 operates to cause both sensors or triggers S8412*a*, S8412*b* to place both of the stabilizing members 2619*a*, 2619*b* in the engaged (See FIGS. 91, 92A, 92B, and 93) and disengaged (See FIGS. 86, 87A, 87B, and 88) states based on the positions of the rear caster pivot arms 2781*a*, 2781*b*. FIG. 88 illustrates the rear caster pivot arms 2781*a*, 2781*b* in a normal operating position. When one or both of the rear caster pivot arms 2781*a*, 2781*b* are in normal operating positions relative to the frame 2602, one or more of the biasing members of the links S8508*a*, S8508*b* hold both of the trigger engagement members S8520*a*, S8520*b* against both of the sensors or triggers S8412*a*, S8412*b*, such that both stabilizing members are disengaged. The stabilizing members 2619*a*, 2619*b* are both coupled to the bar S8524 through the trigger engagement members. As long as force applied by one or more of the biasing members of the links S8508*a*, S8508*b* is sufficient to maintain the trigger engagement members S8520*a*, S8520*b* against the sensors or triggers S8412*a*, S8412*b*, the position of the bar S8524 is fixed and the stabilizing members 2619*a*, 2619*b* are held in an unlocked state.

Referring to FIG. 93, downward movement indicated by arrow 8602 of both pivot arms 2781*a*, 2781*b* causes both of the trigger engagement members S8520*a*, S8520*b* of the rear caster position sensing arrangement S9600 to move away from both of the triggers S8412*a*, S8412*b*. This movement away from the triggers S8412*a*, S8412*b* allows the triggers to extend, and causes both of the locking members 2619*a*, 2619*b* to disengage.

Referring to FIGS. 84A and 84B, each stabilizing member 2619*a*, 2619*b* is coupled to the frame 2602 and a front caster pivot arm 2606*a*, 2606*b*. The stabilizing members 2619*a*, 2619*b* allow upward and downward movement of the first and second front caster pivot arms 2606*a*, 2606*b* relative to the frame 2602 when the first and second rear casters 2608*a*, 2608*b* are each in a normal position relative to the frame shown in FIGS. 87A, 87B, and 88. The stabilizing members 2619*a*, 2619*b* allow upward and downward movement of the first and second front caster pivot arms 2606*a*, 2606*b*, because the rear caster position sensing arrangement S9600 engages both of the triggers S8412*a*, S8412*b* of the stabilizing members 2619*a*, 2619*b* in this position.

When the wheelchair chassis 2600 exhibits a tipping behavior, the frame 2602 of the wheelchair is pitched slightly forward toward the front casters 2620. As a result, both of the rear casters 2608 move downward relative to the frame 2602 to maintain contact with the ground. This downward movement moves trigger engagement members S8520*a*, S8520*b* of the rear caster position sensing arrangement S9600 away from the triggers S8412*a*, S8412*b*. This downward movement allows the triggers to move to the extended position and causes the stabilizing assemblies 2619*a*, 2619*b* to engage. In an exemplary embodiment, the stabilizing assemblies 2619*a*, 2619*b* engage to lock the first and second front casters 2620*a*, 2620*b* against upward movement relative to the frame, but allow the front casters to move downward when engaged. The stabilizing assemblies 2619*a*, 2619*b* may be configured in any manner that inhibits further tipping of the wheelchair frame when the stabilizing members are engaged. In another embodiment, the stabilizing assemblies 2619*a*, 2619*b* lock the front caster pivot arms against both upward and downward movement with respect to the pivot arm when engaged. When one or more of the rear casters return to a normal operating position relative to the frame, the triggers are depressed again to disengage and allow upward and downward movement of the front casters relative to the frame.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, pivotal connections can be made of any number of structures including bearing assemblies, pins, nuts and bolts, and frictionless sleeve assemblies. Additionally, springs or shock absorbers can be added between pivoting and non-pivoting components to limit, dampen, or somewhat resist the pivotal motions of these components. Also, a brake-disc locking mechanism could be integrated into any of the pivotal connections and serve as a stabilizing member or assembly that locks components coupled to the pivotal connection from rotation when actuated and freely allows pivotal motion about the connection when not actuated. Therefore, the invention, in its broader aspects, is not limited to the specific details, the representative apparatus, and illustrative examples shown and described. Accordingly, departures can be made from such details without departing from the spirit or scope of the applicant's general inventive concept.

The invention claimed is:

1. A wheelchair suspension comprising:
- a frame;
- a drive assembly pivot arm pivotally connected to the frame;
- a drive assembly including a drive wheel, wherein the drive assembly is mounted to the drive assembly pivot arm;
- a front caster pivot arm pivotally mounted to the frame and coupled to the drive assembly pivot arm, the front caster pivot arm having an inner wall and an outer wall;
- a front caster coupled to the at least one front caster pivot arm; and
- a link pivotally connected to the drive assembly pivot arm and pivotally connected to the front caster pivot arm, wherein the link is positioned between the inner wall and the outer wall of the front caster pivot arm.

2. The wheelchair suspension according to claim 1, wherein the link is positioned between an outer wall of the drive assembly pivot arm and the frame.

3. The wheelchair suspension according to claim 1, wherein the link includes a spring and shock absorber.

4. The wheelchair suspension according to claim 1, wherein the link is rigid.

5. The wheelchair suspension according to claim 1, wherein the link is flexible.

6. The wheelchair suspension according to claim 1, wherein the link is extendible in length.

7. A wheelchair suspension comprising:
- a frame;
- a drive assembly pivot arm pivotally connected to the frame;

a drive assembly including a drive wheel, wherein the drive assembly is mounted to the drive assembly pivot arm;

a pivot sleeve connected to the drive assembly pivot arm, wherein the drive assembly pivot arm is pivotally connected to the frame by the pivot sleeve;

a front caster pivot arm pivotally mounted to the frame and coupled to the drive assembly pivot arm; and a front caster coupled to the at least one front caster pivot arm;

wherein the pivot sleeve passes in front of the front caster pivot arm when viewed from the front of the wheelchair suspension and when the wheelchair suspension is on a flat, horizontal support surface.

8. A wheelchair suspension comprising:

a frame;

a drive assembly pivot arm;

a drive assembly including a drive wheel, wherein the drive assembly is mounted to the drive assembly pivot arm;

a pivot sleeve connected to the drive assembly pivot arm, wherein the pivot sleeve has a contact surface that is adjacent to the frame and the pivot sleeve is pivotally connected to the frame;

a front caster pivot arm pivotally connected to the frame, wherein the front caster pivot arm has a contact surface that is adjacent to the frame, and wherein the front caster pivot arm is coupled to the drive assembly pivot arm; and a front caster coupled to the at least one front caster pivot arm;

wherein the pivot sleeve contact surface and the frame and the front caster pivot arm contact surface are substantially co-planar.

* * * * *